(12) United States Patent
Novek

(10) Patent No.: US 10,472,550 B1
(45) Date of Patent: *Nov. 12, 2019

(54) SYSTEMS AND METHODS FOR ACTIVE CLOUD POINT ADJUSTMENT AND REFRIGERATION CYCLES

(71) Applicant: Ethan J. Novek, Greenwich, CT (US)

(72) Inventor: Ethan J. Novek, Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,855

(22) Filed: Jun. 19, 2019

Related U.S. Application Data

(63) Continuation of application No. 16/258,384, filed on Jan. 25, 2019.

(60) Provisional application No. 62/622,528, filed on Jan. 26, 2018, provisional application No. 62/670,117, filed on May 11, 2018, provisional application No. 62/771,902, filed on Nov. 27, 2018.

(51) Int. Cl.
| | |
|---|---|
| *C09K 5/10* | (2006.01) |
| *C09K 5/04* | (2006.01) |
| *F25J 1/02* | (2006.01) |
| *F25J 1/00* | (2006.01) |

(52) U.S. Cl.
CPC ............ *C09K 5/041* (2013.01); *F25J 1/0022* (2013.01); *F25J 1/0211* (2013.01); *C09K 2205/12* (2013.01)

(58) Field of Classification Search
CPC ............ G06K 7/1417; G06K 19/06037; G06F 3/147; C09K 5/041; C09K 2205/12; C09K 5/10; F25J 1/0211; F25J 1/0022
USPC .............................................. 252/67, 71, 73
See application file for complete search history.

(56) References Cited

U.S. PATENT DOCUMENTS

| | | | | |
|---|---|---|---|---|
| 3,386,913 A * | 6/1968 | Lazare | ............... | B01D 11/0488 210/642 |
| 4,975,212 A * | 12/1990 | Thomas | ............... | C10M 107/38 252/68 |
| 5,100,569 A * | 3/1992 | Nalewajek | ......... | C10M 171/008 252/68 |
| 5,534,176 A * | 7/1996 | Nalewajek | ............. | C09K 5/045 252/68 |
| 5,711,165 A * | 1/1998 | Iizuka | ................... | C10M 129/18 62/474 |
| 9,963,627 B2 * | 5/2018 | Rajagopalan | ............ | C09K 5/14 |
| 10,400,148 B2 * | 9/2019 | Novek | | |
| 10,414,961 B2 * | 9/2019 | Novek | | |
| 2010/0095703 A1 * | 4/2010 | Jork | ........................ | C09K 5/047 62/476 |
| 2010/0132384 A1 * | 6/2010 | Shiflett | ................... | C09K 5/047 62/112 |
| 2014/0027668 A1 * | 1/2014 | Poncelet | ................... | C09K 5/20 252/77 |
| 2016/0167974 A1 * | 6/2016 | Novek | ................... | C07C 273/04 429/50 |
| 2017/0103191 A1 * | 4/2017 | Iga | ......................... | G16H 10/40 |
| 2017/0186662 A1 * | 6/2017 | Ullmann | ................... | C09K 5/02 |
| 2018/0259229 A1 * | 9/2018 | Moghaddam | ........... | F25B 15/02 |
| 2019/0143260 A1 * | 5/2019 | Novek | ............... | B01D 53/1475 95/206 |
| 2019/0233696 A1 * | 8/2019 | Novek | ................... | C09K 5/041 |
| 2019/0233697 A1 * | 8/2019 | Novek | ................... | C09K 5/041 |

FOREIGN PATENT DOCUMENTS

| | | | | |
|---|---|---|---|---|
| JP | 6278021 B2 * | 2/2018 | ......... | F28D 20/0039 |
| WO | 2015173816 A1 | 11/2015 | | |
| WO | WO-2017058747 A1 * | 4/2017 | .............. | F25B 15/02 |
| WO | 2018208308 A1 | 11/2018 | | |

OTHER PUBLICATIONS

Gat et al., "Heat transfer enhancement via liquid-liquid phase separation", 52 Int'l J. Heat and Mass Transfer (2009), pp. 1385-1399.

* cited by examiner

*Primary Examiner* — Douglas J McGinty
(74) *Attorney, Agent, or Firm* — Gregory L. Porter; Hunton Andrews Kurth LLP

(57) ABSTRACT

The present invention pertains to systems, methods, and compositions for liquid phase change, including for active cloud point, e.g., critical solution temperature, adjustment and heating or cooling, e.g., refrigeration, cycles. In some embodiments heat is absorbed, released or both due to phase changes in a liquid system. Advantageously, the phase changes may be controlled by controlling the ingredients or amounts of certain components of the liquid system. Advantages may include lower capital expenditures, lower operating expenses, or both for a diverse and wide range of heating and cooling applications. Such applications include, for example, cooling of data centers, cooled transportation of goods, refrigeration, heat pumps, extractions, ocean thermal energy conversion, and de-icing of roads to name just a few.

21 Claims, 36 Drawing Sheets

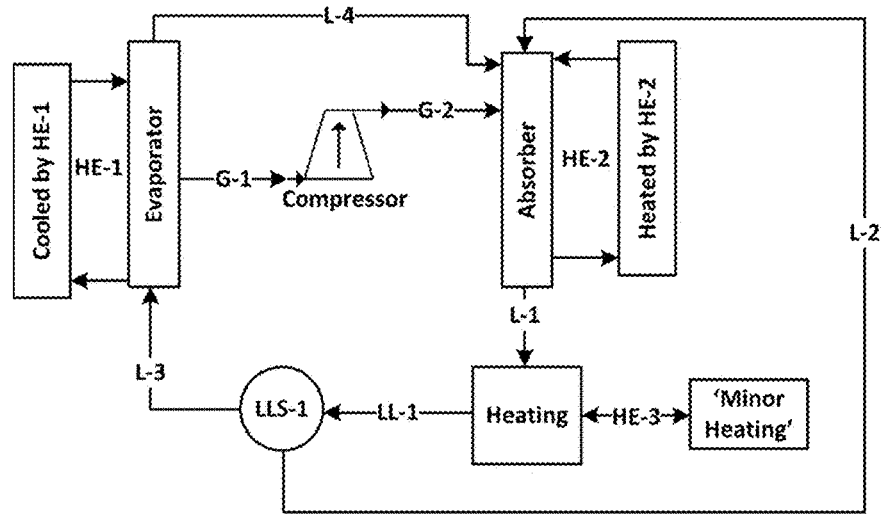
Figure 12:
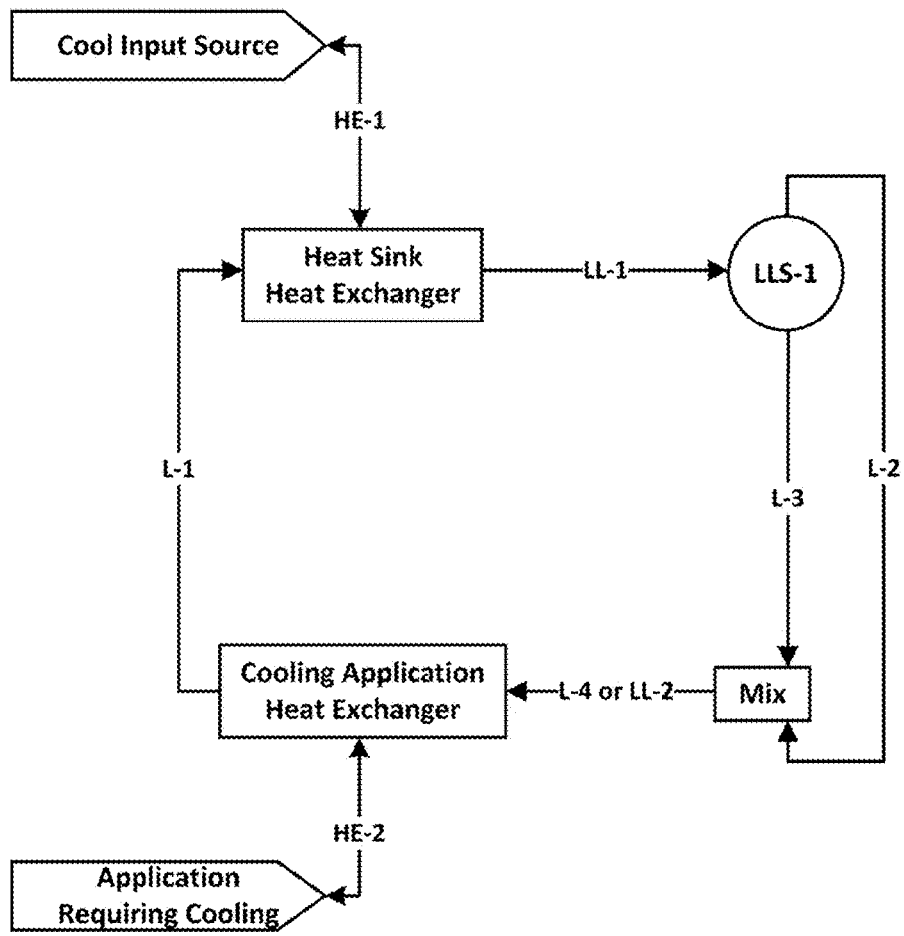
Figure 13 (Above)

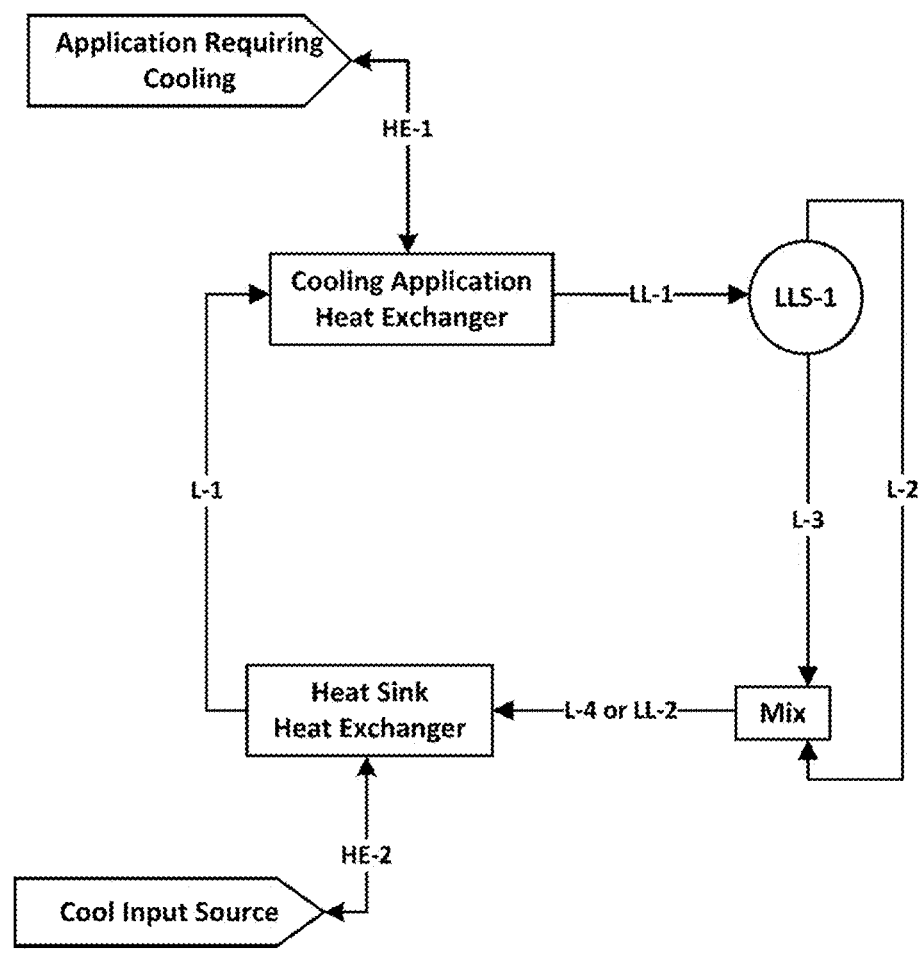
Figure 14 (Above)

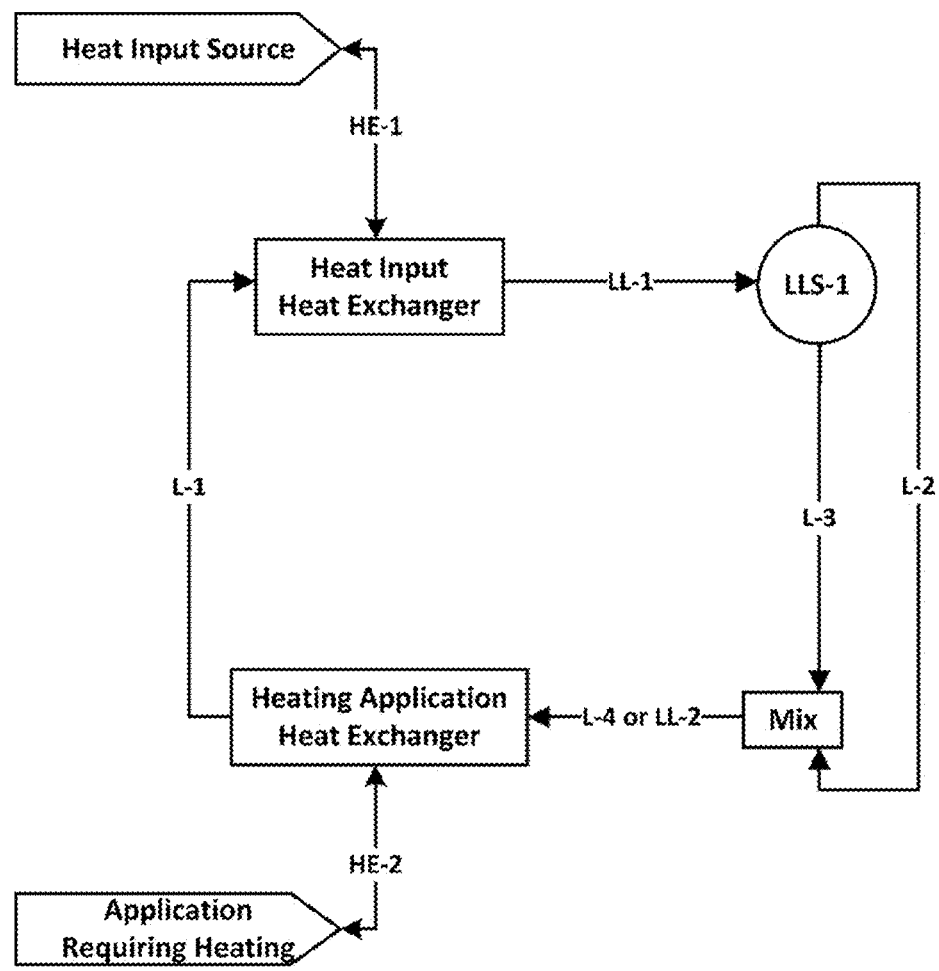
Figure 15 (Above)

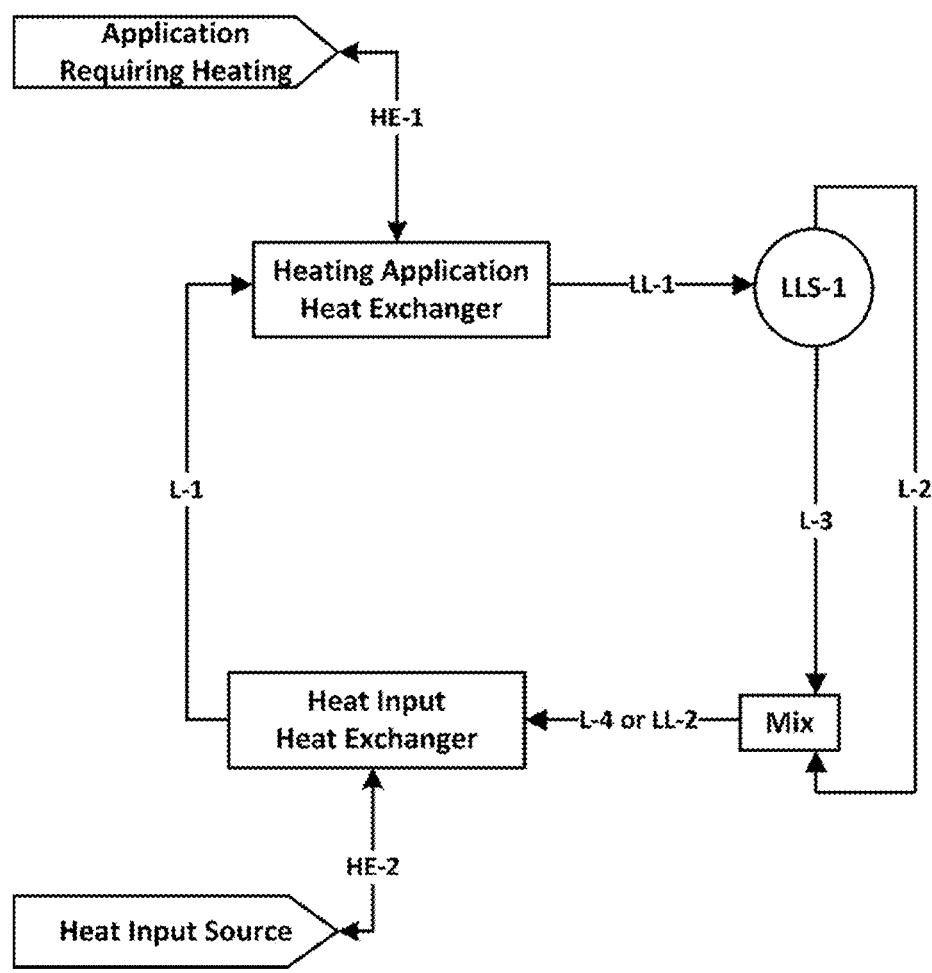
Figure 16 (Above)

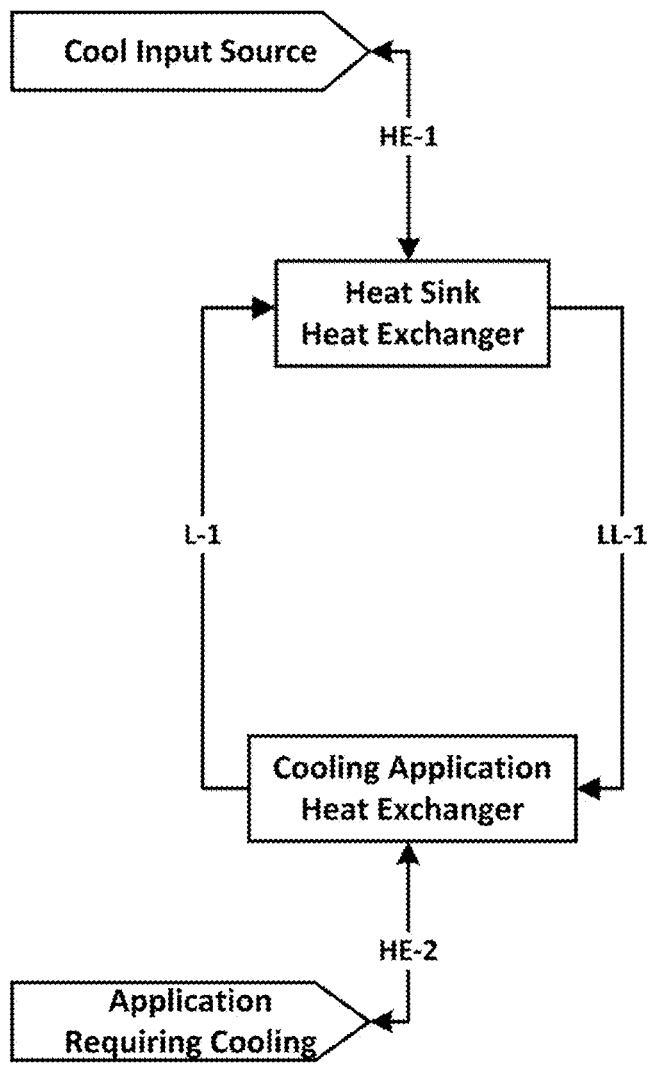
Figure 17 (Above)

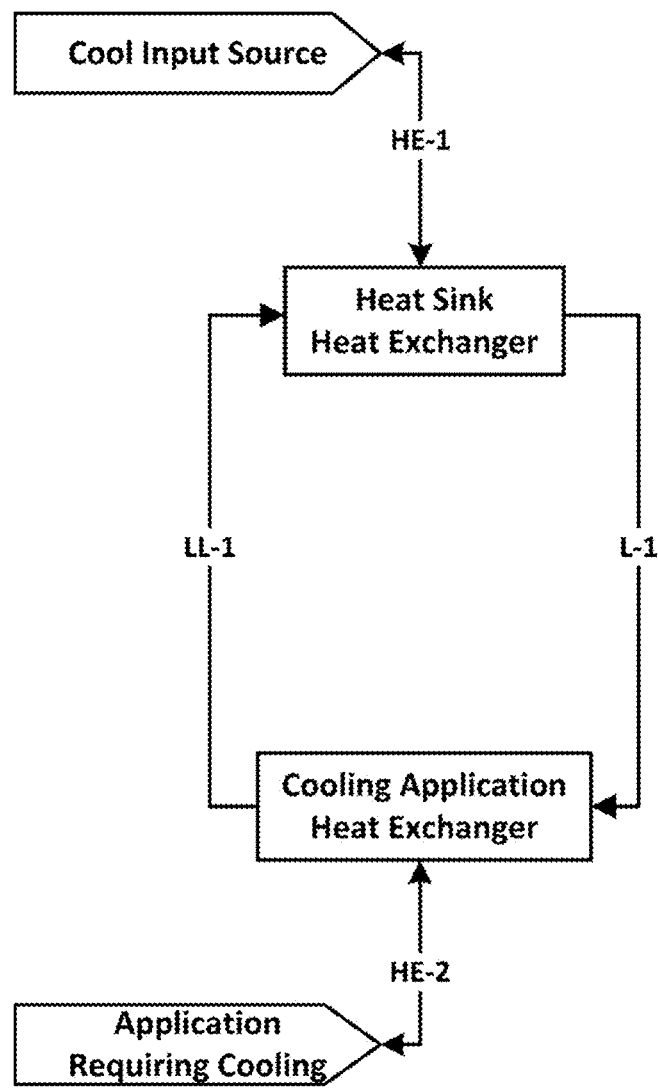
Figure 18 (Above)

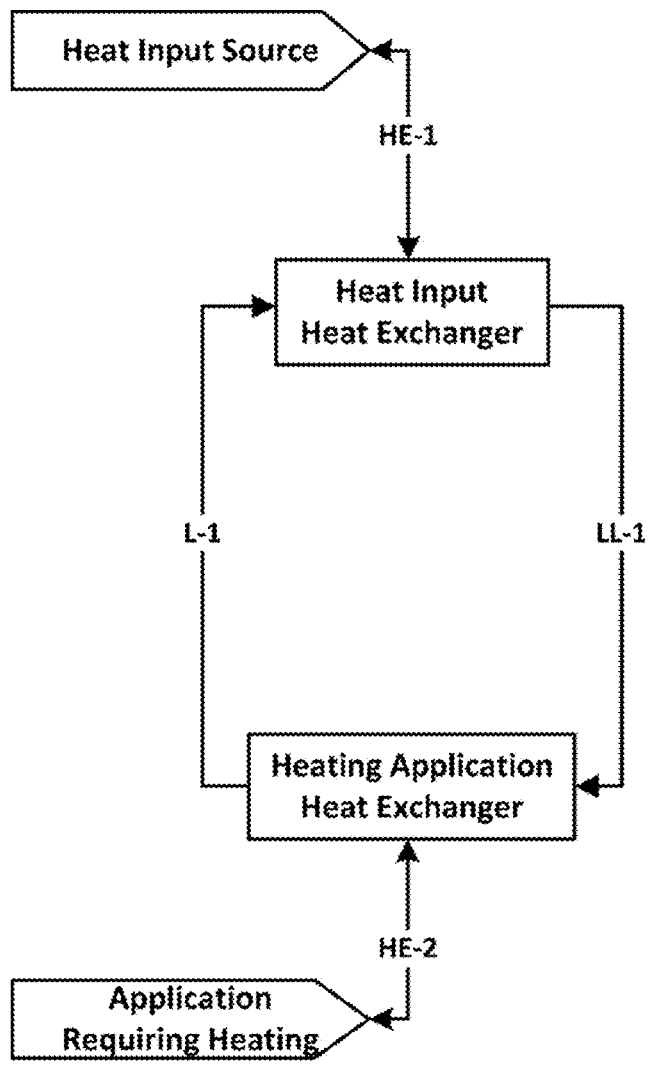
Figure 19 (Above)

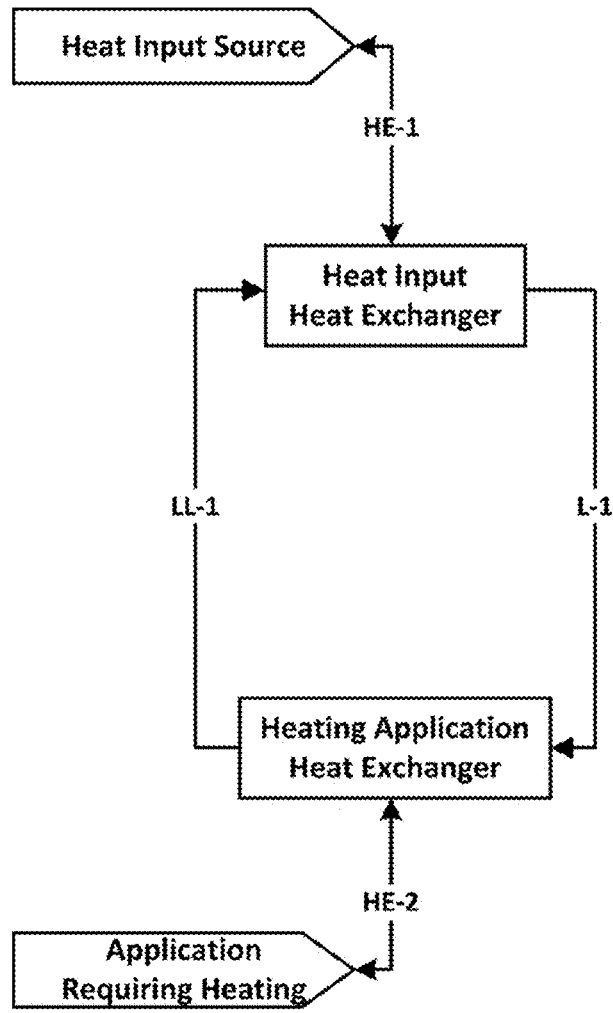
Figure 20 (Above)

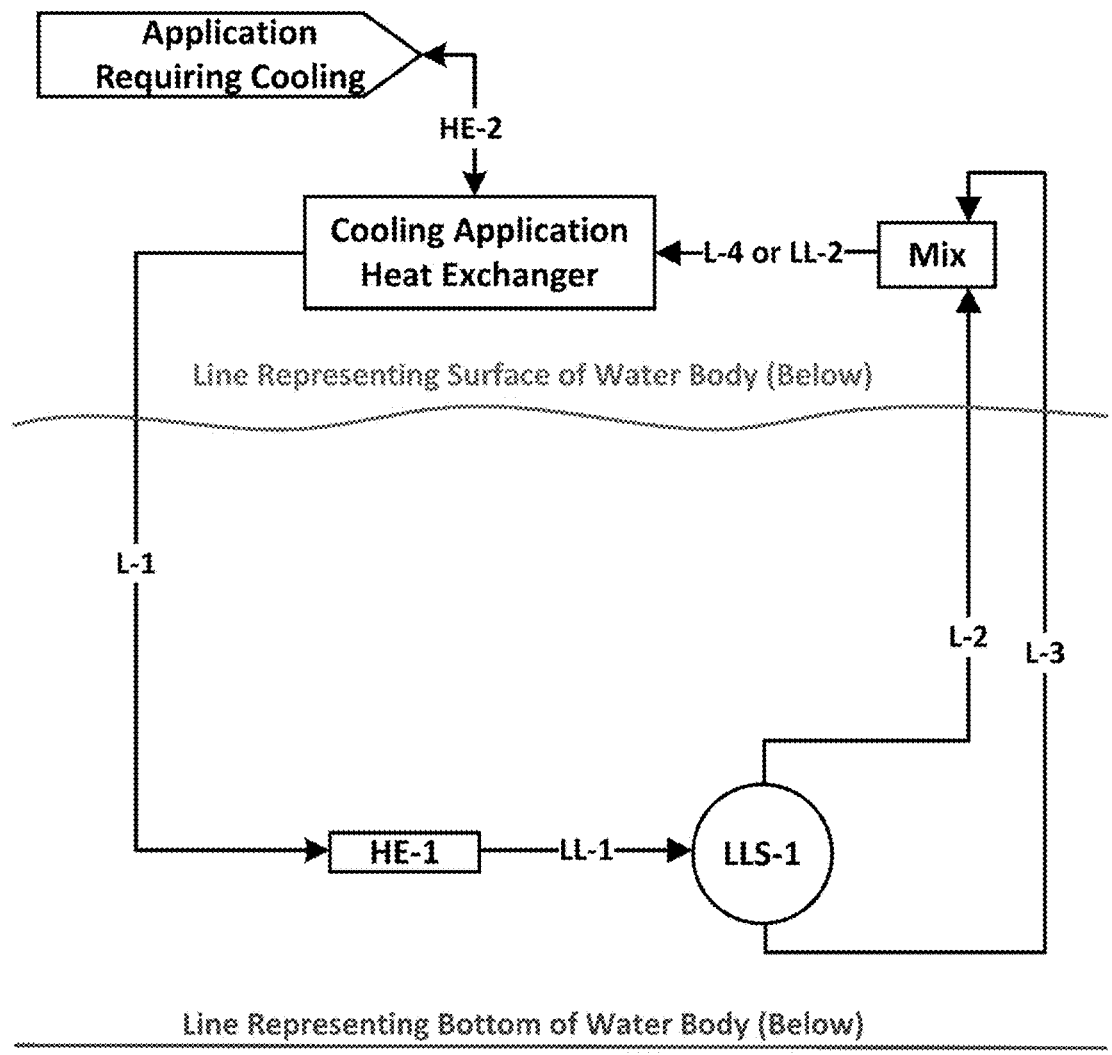
Figure 21A (Above)

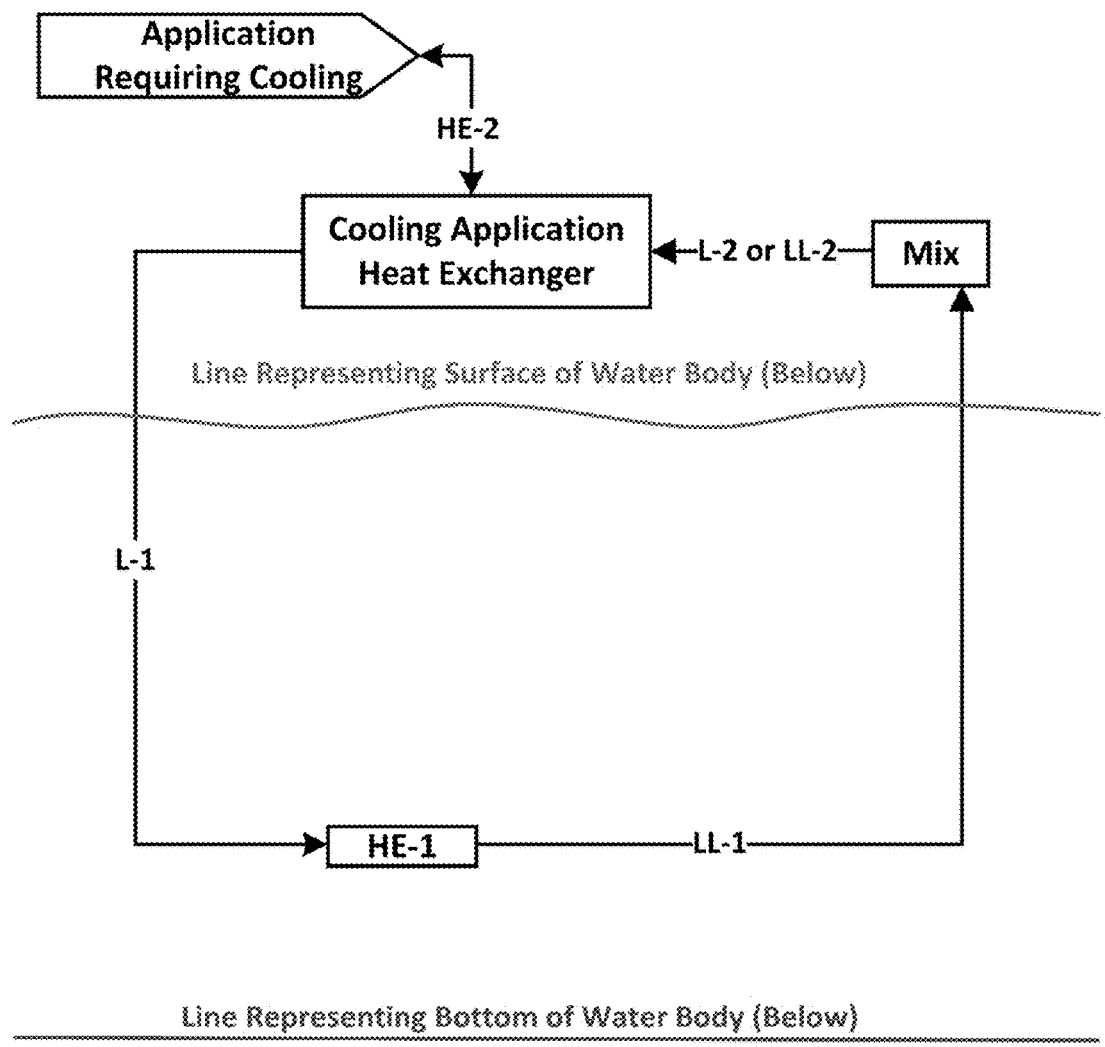
Figure 21B (Above)

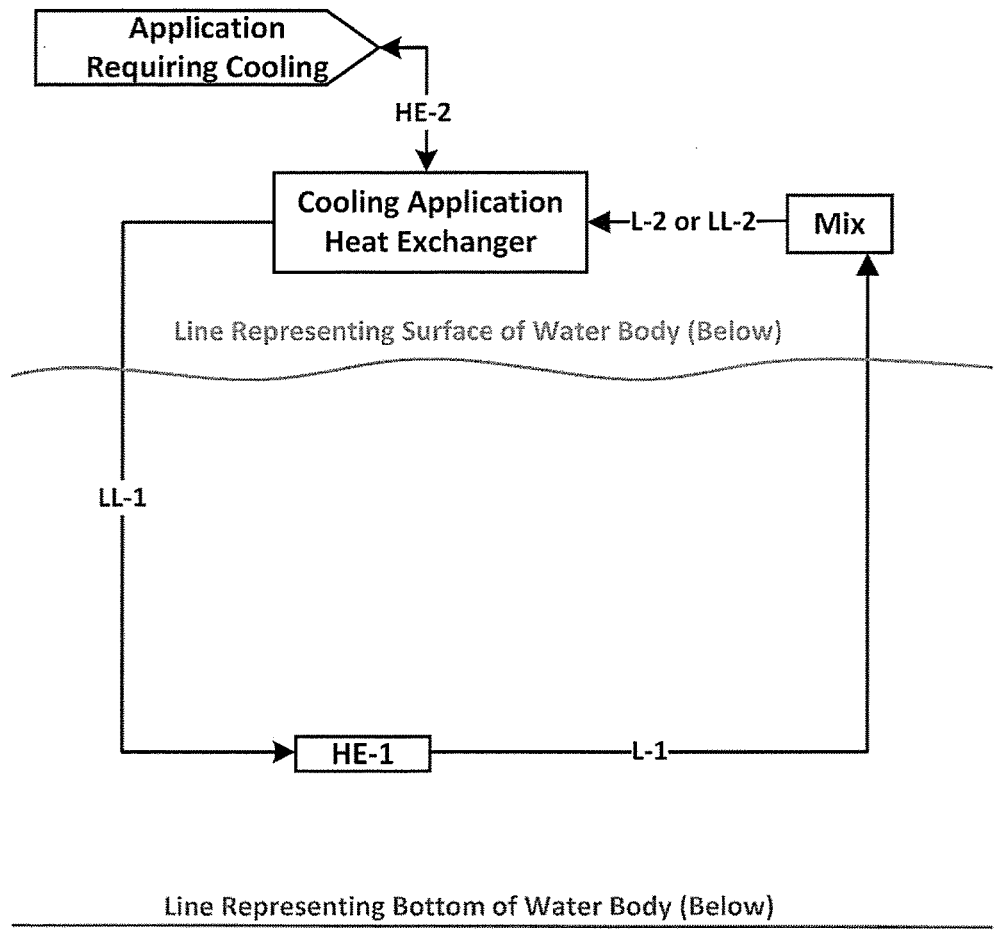
Figure 21C (Above)
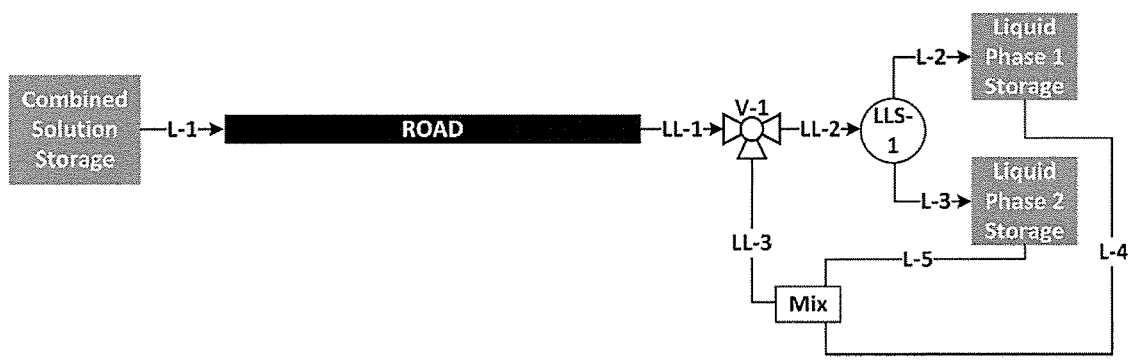
Figure 22A

US 10,472,550 B1

SYSTEMS AND METHODS FOR ACTIVE CLOUD POINT ADJUSTMENT AND REFRIGERATION CYCLES

CROSS-REFERENCE TO RELATED APPLICATIONS

The instant application is a continuation of U.S. application Ser. No. 16/258,384, filed Jan. 25, 2019, and allowed Apr. 4, 2019; this application also claims priority to the following provisional applications: 62/622,528 filed Jan. 26, 2018; 62/670,117 filed May 11, 2018; and 62/771,902 filed Nov. 27, 2018. Each of these applications is incorporated by reference for U.S. purposes.

BACKGROUND AND SUMMARY OF THE INVENTION

In the prior art, cool or heat transfer is conducted through cooling and heating a liquid, such as water, and is almost entirely driven by specific heat capacity. In other prior art, a refrigerant is employed where the refrigerant boils on the side requiring cooling and condenses on the side supplying the cooling, or, in the case of heating, the refrigerant working fluid boils on the side supplying heating and condenses on the side requiring the heating. This often requires expensive refrigerant handling systems and becomes cost prohibitive for transferring cold relatively long distances.

Additionally, both of said prior art systems do not typically transfer cold or heat independent of the temperature or other conditions of their surroundings. If the working fluid in these cooling systems arrives at the cooling application at the same temperature as the ambient surroundings, the working fluids may lose most or all of the cool or heat provided to them at the cooling or heating input source or sources. For example, in a specific heat coolant based cooling system, if the coolant heats up over the course of transfer to the cooling demand source, for example, due to elevated temperatures surrounding the transport pipe, the coolant loses a significant amount or all of its cooling potential upon arriving at the application requiring cooling. As a result, there are significant limitations to the distance a specific heat can be transported while maintaining its ability to cool. The same is true for heat transfer systems, except, for example, the losses due to surroundings heating the working fluid are substituted with losses due to the surroundings cooling the working fluid.

Additionally, the CAPEX and OPEX of specific heat coolant or heat transfer systems become very costly with distance traveled, including, but not limited, due to the progressively larger relative liquid volumes required with larger transport distances and the cost of insulated piping or other components. Similarly, with refrigerant based coolants, if the condensed refrigerant is heated by its surroundings during transportation to the cooling demand source, at least a portion of the refrigerant may evaporate or volatilize, resulting in reduced or non-existent cooling capacity upon arrival at the cooling application. The same is true for heat transfer systems, except, for example, the losses may be due to working fluid condensation rather than volatilization. Also, similarly, with refrigerant based coolants or heat transfer fluids, the CAPEX and OPEX becomes very costly with distance traveled, including, but not limited, due to the progressively larger working fluid flow rates per unit of cooling capacity required with larger distances, the cost of insulated piping, and the precautions and hazards associated with refrigerants. Accordingly, there is a need in the art for more effective systems and processes for both cooling and heating applications.

Advantageously, the embodiments described herein overcome many or all of the aforementioned deficiencies in the prior art and have their own independent advantages as well. There are many embodiments which are set forth in detail below. Certain embodiments pertain to refrigeration cycles while others pertain to adjustment of active cloud point, i.e., critical solution temperature. Additionally, novel compositions comprising various critical solution temperature reagents and the like are described.

BRIEF DESCRIPTION OF THE DRAWINGS

FIG. 12: Figure showing refrigeration or heat pump cycle.

FIG. 13: General figure showing cooling transfer using UCST phase change liquids with liquid-liquid separation.

FIG. 14: General figure showing cooling transfer using LCST phase change liquids with liquid-liquid separation.

FIG. 15: General figure showing heating transfer using LCST phase change liquids and liquid-liquid separation.

FIG. 16: General figure showing heating transfer using UCST phase change liquids and liquid-liquid separation.

FIG. 17: General figure showing cooling transfer using UCST phase change liquids while maintaining single liquid mixture.

FIG. 18: General figure showing cooling transfer using LCST phase change liquids while maintaining single liquid mixture.

FIG. 19: General figure showing heating transfer using LCST phase change liquids while maintaining single liquid mixture.

FIG. 20: General figure showing heating transfer using UCST phase change liquids while maintaining single liquid mixture.

FIG. 21A: Ocean or Other Thermocline or Cold Water Body Cooling Transport using UCST phase change liquids and liquid-liquid separation (Note: Side of objects may enlarged relative to size of water body or depth of water body to ensure they can be seen).

FIG. 21B: Ocean or Other Thermocline or Cold Water Body Cooling Transport using UCST phase change liquids with single liquid mixture (Note: Side of objects may enlarged relative to size of water body or depth of water body to ensure they can be seen).

FIG. 21C: Ocean or Other Thermocline or Cold Water Body Cooling Transport using LCST phase change liquids with single liquid mixture (Note: Side of objects may enlarged relative to size of water body or depth of water body to ensure they can be seen).

FIG. 22A: Road or Surface Heating or Deicing Employing LCST with Liquid-Liquid Separation and Liquid Storage—Embodiment operating in 'heat absorption' mode.

DETAILED DESCRIPTION OF THE INVENTION

Description of FIGS. 1-12

Figure 1A:
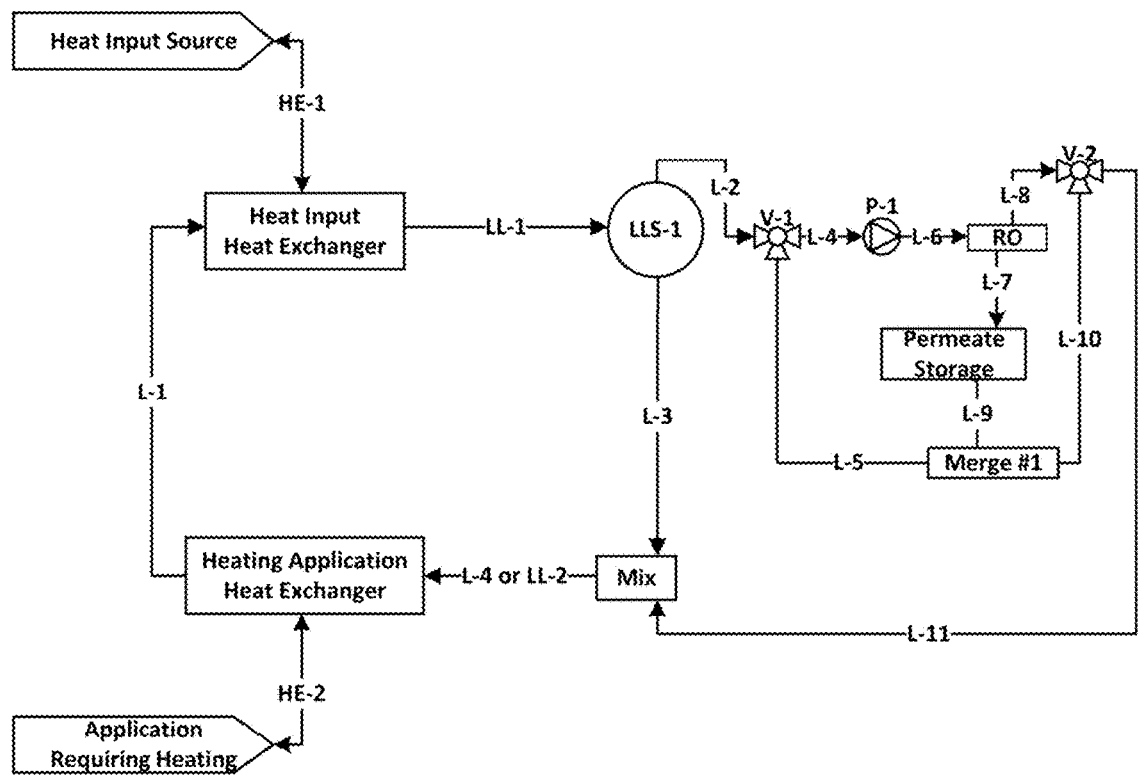
FIGS. 1A-D: Figures showing liquid phase change system for heating or cooling transfer.

FIG. 1A: The present figure may comprise a liquid phase change system for heating or cooling transfer. The system may employ separation of multi-liquid mixture into two or more constituent liquid phases and may employ active adjustment in liquid system cloud point temperature by, for example, changing the concentration of one or more reagents using, for example, one or more membrane-based processes. The present embodiment may comprise a Lower Critical Solution Temperature (LCST) liquid system phase change heating or cooling transfer system. The present embodiment may be capable of actively tailoring the temperature of one or more cloud points or maintaining the same cloud point temperature(s) in the liquid system. For example, the present figure may be showing an active decrease of LCST by, for example, increasing the concentration of one or more 'CST influencing reagents' or 'CST reducing reagents' (for example: salts) in one or more of the separated liquid phases.

Figure 1B:
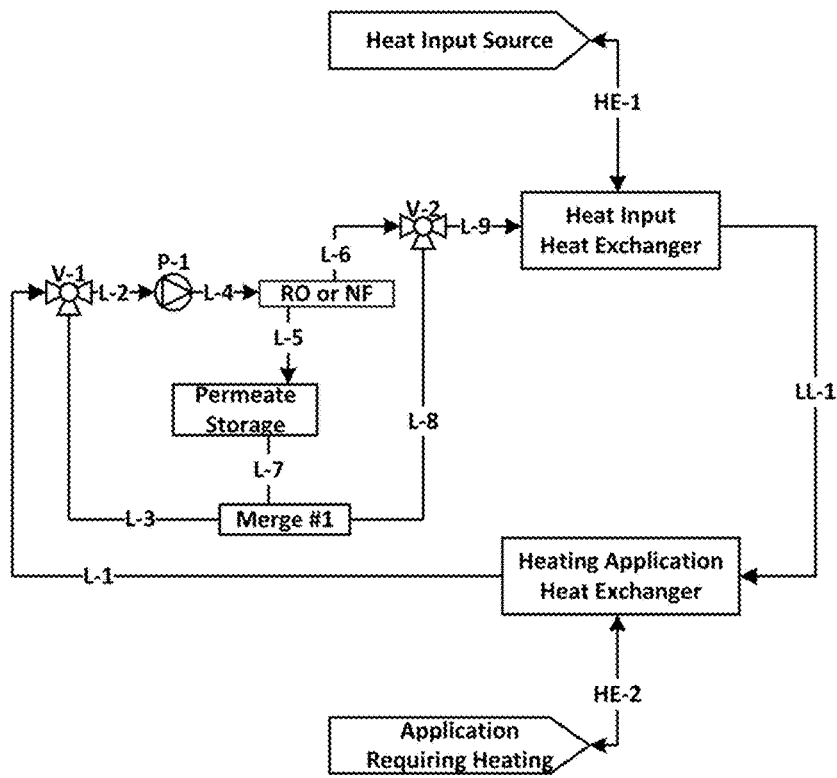

FIG. 1B: The present figure may comprise a liquid phase change system for heating or cooling transfer. The system may employ active adjustment in liquid system cloud point temperature by, for example, changing the concentration of one or more reagents using, for example, one or more membrane-based processes. The present embodiment may comprise a Lower Critical Solution Temperature (LCST) liquid system phase change heating or cooling transfer system. The present embodiment may be capable of actively adjusting of one or more cloud point temperatures or maintaining the same cloud point temperature(s). For example, the present figure may show an active decrease of LCST by, for example, increasing the concentration of one or more 'CST influencing reagents' or 'CST reducing reagents' (for example: salts), in for example, a combined solution.

Figure 1C:
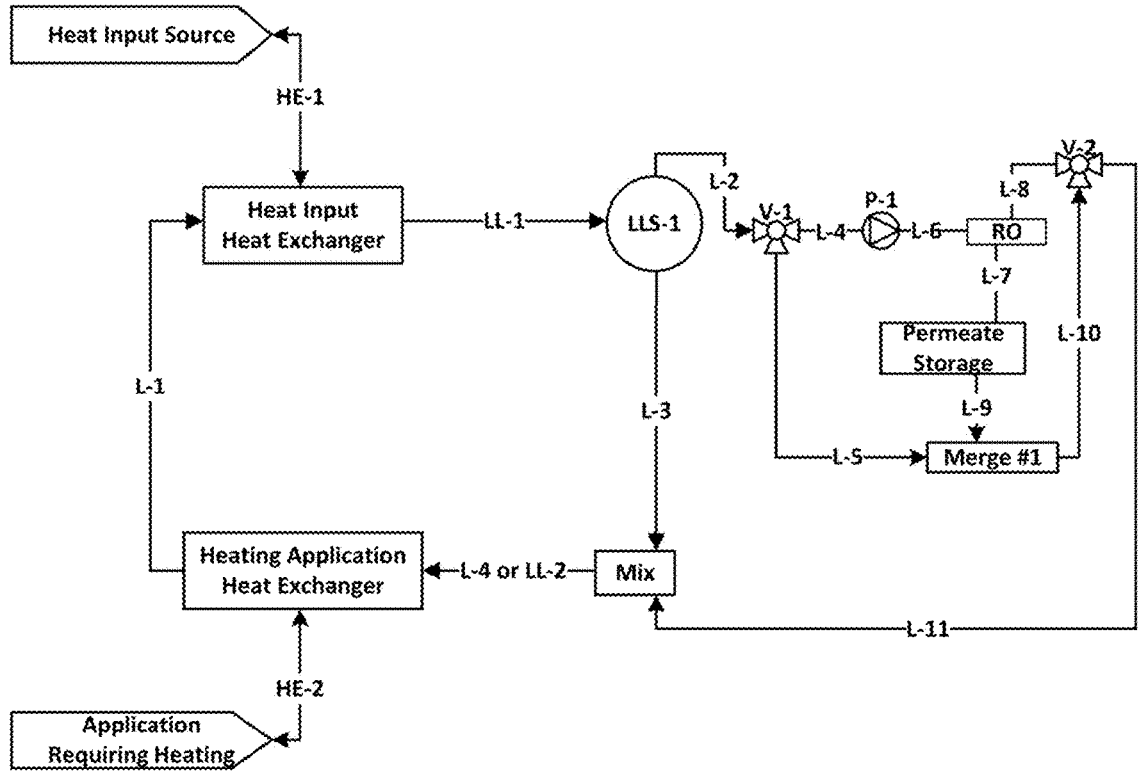

FIG. 1C: The present figure may comprise a liquid phase change system for heating or cooling transfer. The system may employ separation of multi-liquid mixture into two or more constituent liquid phases and may employ active tailoring of one or more liquid system cloud point temperatures by, for example, changing the concentration of one or more reagents using, for example, one or more membrane-based processes. The present embodiment may comprise a Lower Critical Solution Temperature (LCST) liquid system phase change heating or cooling transfer system. The present embodiment may be capable of actively tailoring one or more cloud point temperatures or maintaining the same cloud point temperature or temperatures. For example, the present figure may be showing an active increase of LCST by, for example, decreasing or diluting the concentration of one or more "LCST influencing reagents' or 'LCST reducing reagents' (for example: salts) in one or more of the separated liquid phases by, for example, adding permeate liquid or permeate equivalent liquid.

Figure 1D:
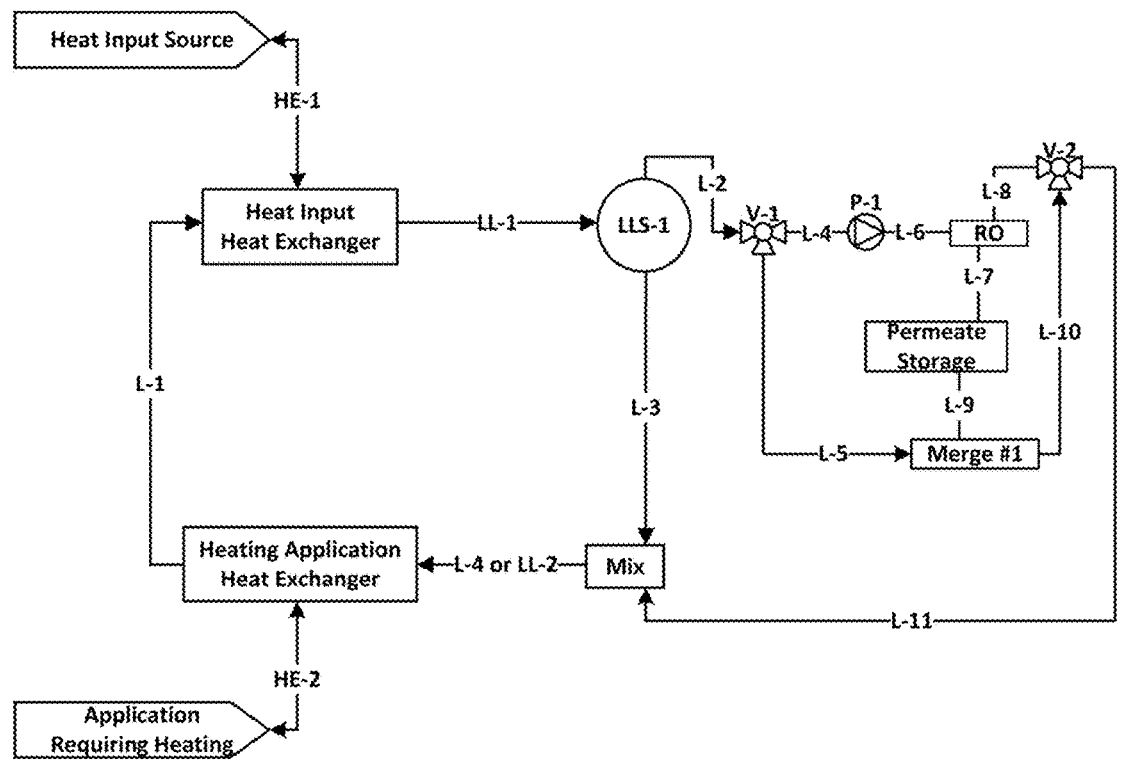

FIG. 1D: The present figure may comprise a liquid phase change system for heating or cooling transfer. The system may employ separation of multi-liquid mixture into two or more constituent liquid phases and may employ active adjustment of one or more liquid system cloud point temperatures by, for example, changing the concentration of one or more reagents using, for example, one or more membrane-based processes. The present embodiment may comprise a Lower Critical Solution Temperature (LCST) liquid system phase change heating or cooling transfer system. The present embodiment may be capable of actively adjusting one or more cloud point temperatures or maintaining the same cloud point temperature. For example, the present figure may be showing the system maintaining the same cloud point temperature by, for example, allowing the concentration of one or more 'LCST influencing reagents' or 'LCST reducing reagents' (for example: salts) to remain unchanged. For example, one or more liquid streams may bypass one or more steps to adjust the concentration of one or more reagents.

Figure 2A:
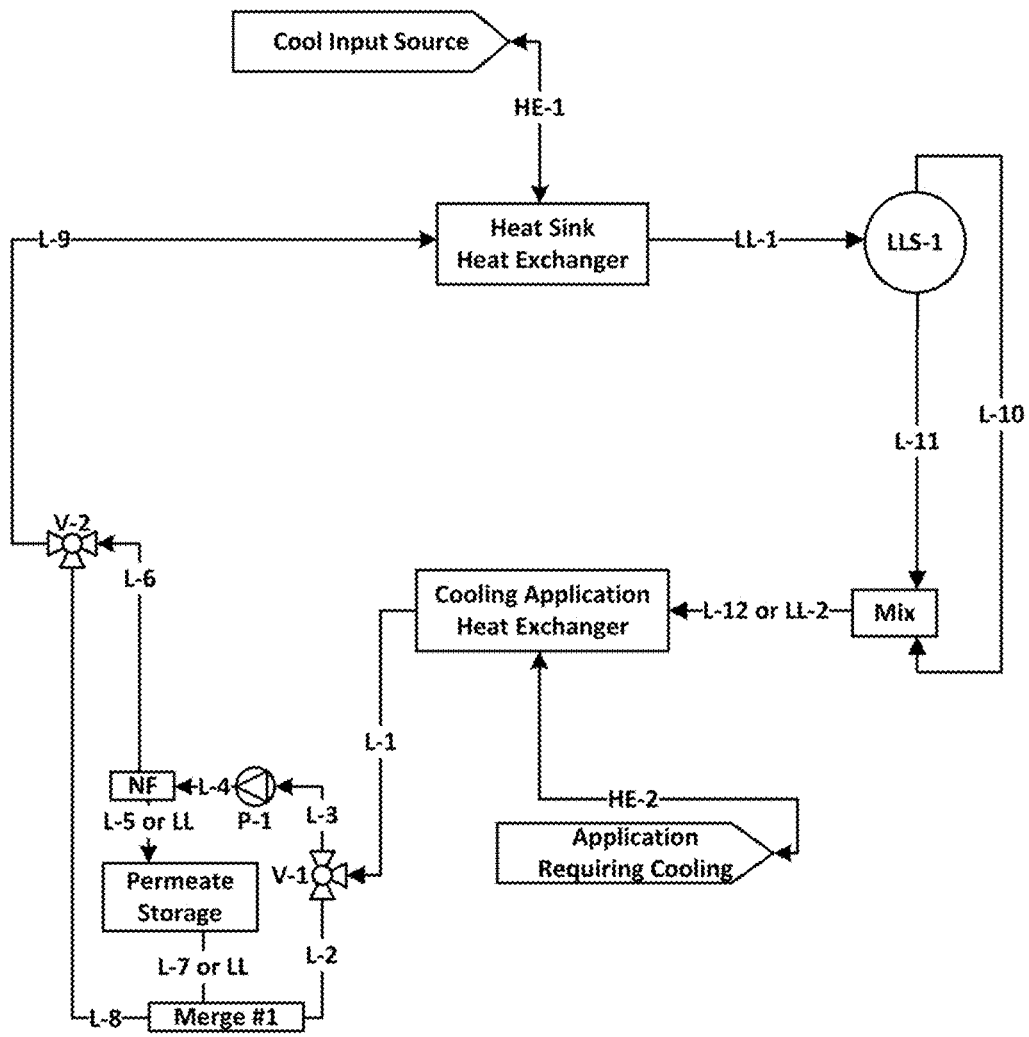
FIGS. 2A-G: Figures showing liquid phase change system for heating or cooling transfer.

FIG. 2A: The present figure may comprise a liquid phase change system for heating or cooling transfer. The system may employ separation of a multi-liquid mixture into two or more constituent liquid phases and may employ active adjustment of one or more liquid system cloud point temperatures by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively adjusting one or more cloud point temperatures or maintaining the same cloud point temperature. For example, the present figure may show an active decrease of UCST by, for example, increasing the concentration of, for example, one or more reagents which decrease UCST with increasing concentration. The adjustment of one or more cloud point temperatures may be conducted, for example, by adjusting concentration or composition in the combined single liquid phase solution produced by or following one or more 'heat absorption' steps.

Figure 2B:
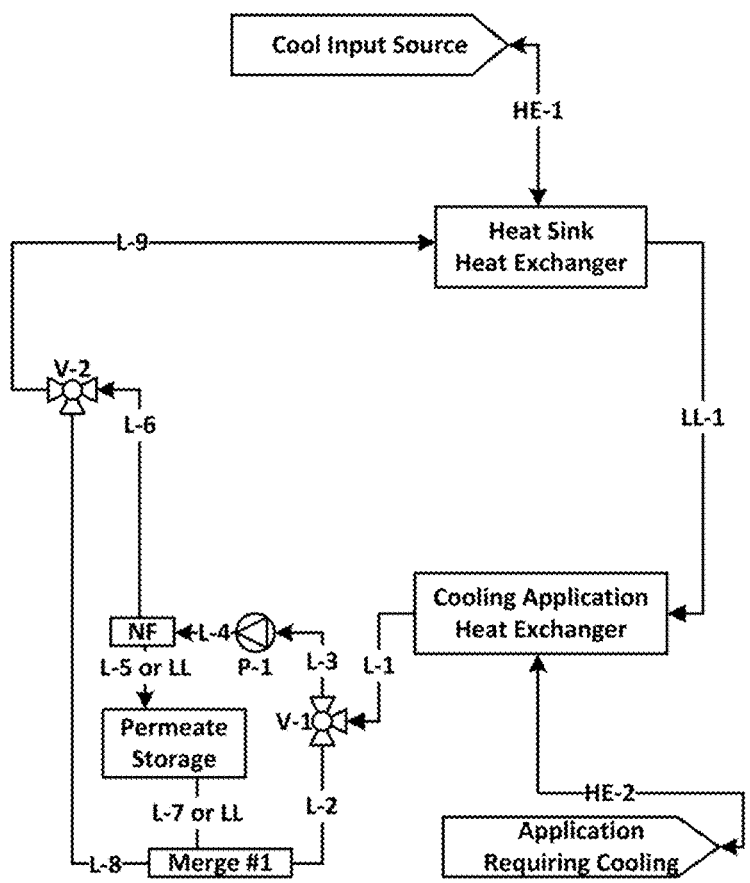

FIG. 2B: The present figure may comprise a liquid phase change system for heating or cooling transfer. The system may employ active adjustment in liquid system cloud point temperature by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively adjusting one or more cloud point temperatures or maintaining the same cloud point temperature. For example, the present figure may show an active decrease of UCST by, for example, increasing the concentration of, for example, one or more reagents which decrease UCST with increasing concentration. The adjustment of one or more cloud point temperatures may be conducted, for example, by adjusting concentration or composition in, for example, a combined single liquid phase solution produced by or following one or more 'heat absorption' steps.

Figure 2C:
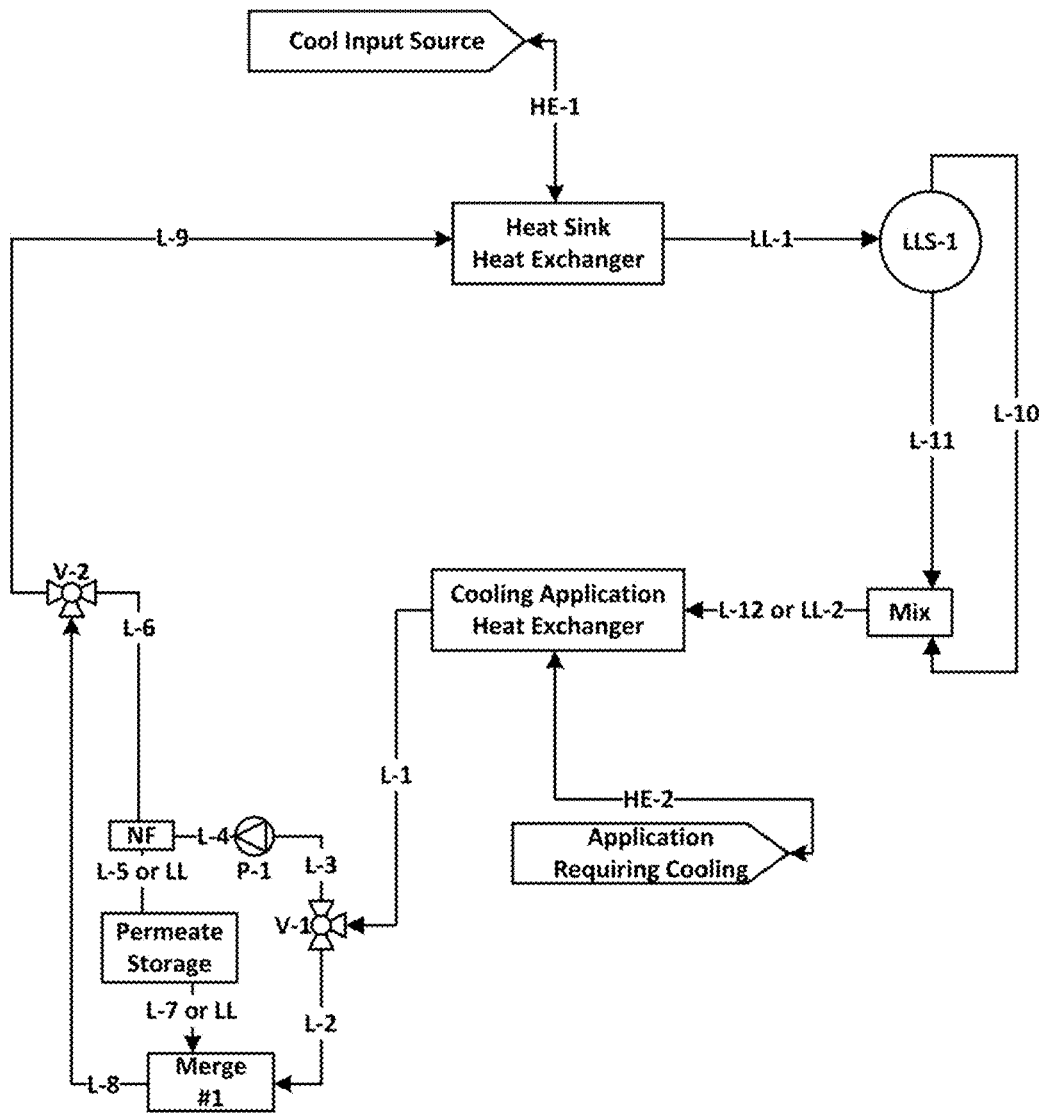

FIG. 2C: The present figure may comprise a liquid phase change system for heating or cooling transfer. The system may employ separation of a multi-liquid mixture into two or more constituent liquid phases and may employ active adjustment in liquid system cloud point temperature by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively tailoring one or more cloud point temperatures or maintaining the same cloud point temperature. For example, the present figure may show an active increase of UCST by, for example, diluting or decreasing the concentration of, for example, one or more reagents which decrease UCST with increasing concentration by, for example, the addition of permeate or permeate equivalent liquid to the liquid system. The adjustment of one or more cloud point temperatures may be conducted, for example, by adjusting concentration or composition in the combined single liquid phase solution produced by or following one or more 'heat absorption' steps.

Figure 2D:
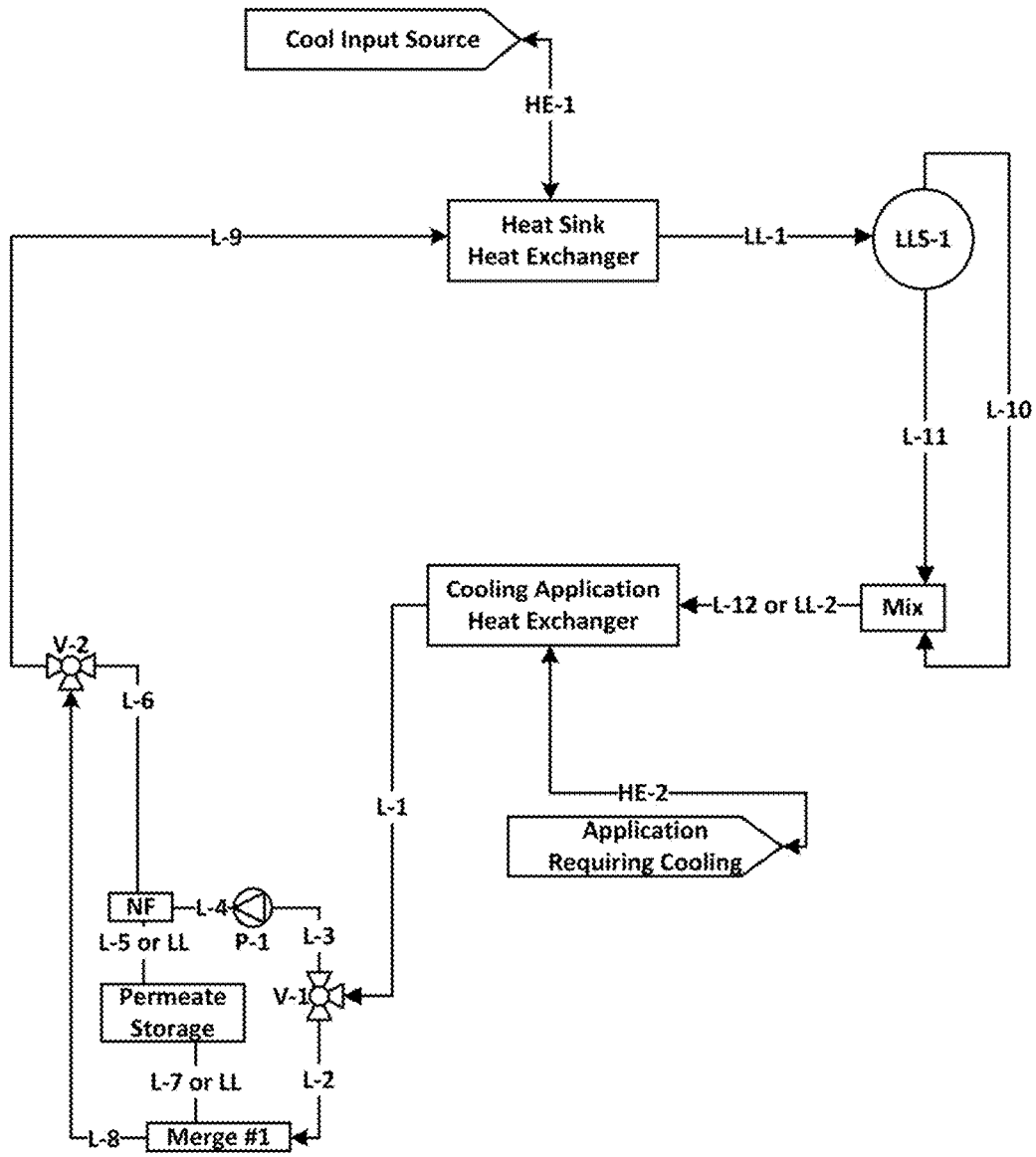

FIG. 2D: The present figure may comprise a liquid phase change system for heating or cooling transfer. The system may employ separation of a multi-liquid mixture into two or more constituent liquid phases and may employ active adjustment in liquid system cloud point temperature by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively tailoring one or more cloud point temperatures or maintaining the same cloud point temperature. For example, the present figure may show maintaining the same UCST by, for example, allowing one or more liquid streams to bypass one or more steps for adjusting composition or concentration.

Figure 2E:
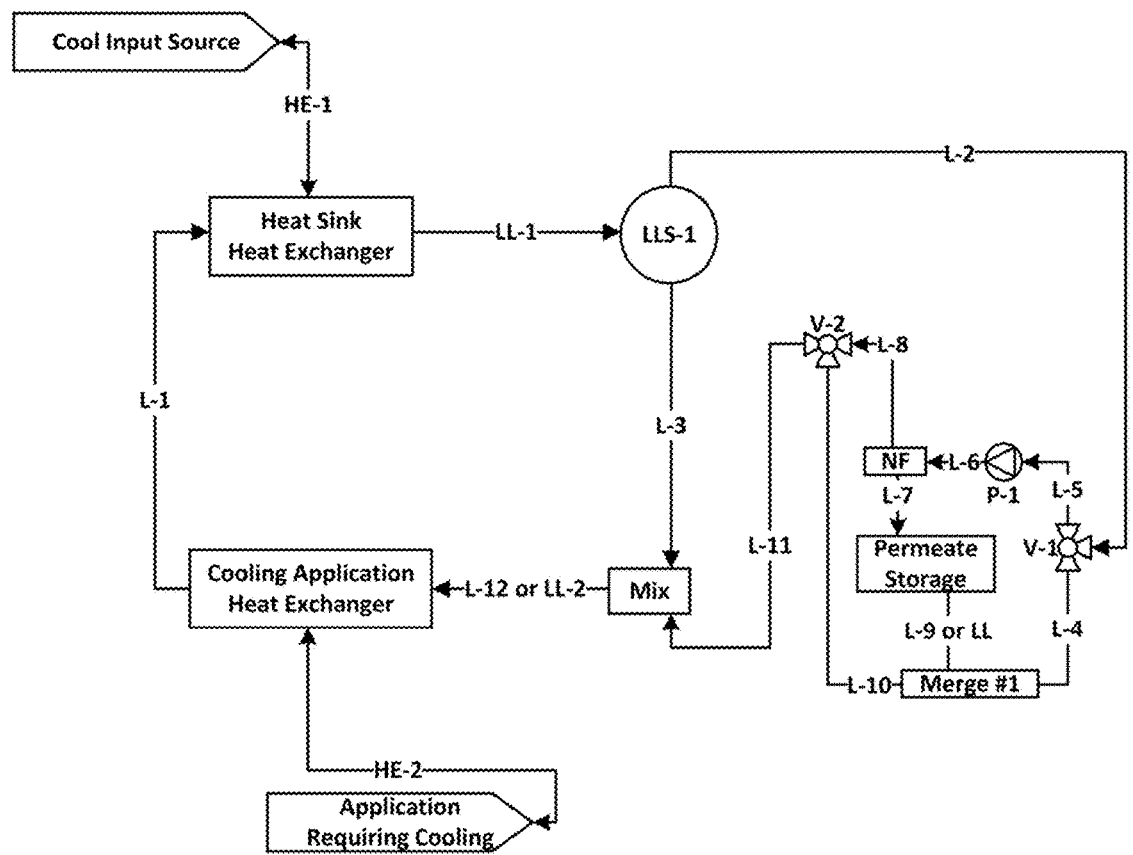

FIG. 2E: The present figure may comprise a liquid phase change system for heating or cooling transfer. The system may employ active change in liquid system cloud point temperature by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively adjusting one or more cloud point temperatures or maintaining the same cloud point temperature. For example, the present figure may show an active decrease of UCST by, for example, increasing the concentration of, for example, one or more reagents which decrease UCST with increasing concentration. The adjustment of one or more cloud point temperatures may be conducted, for example, by adjusting concentration or composition in one or more liquid streams at least partially separated from a multi-liquid phase mixture. Said one or more liquid streams may be combined with other separated liquid streams before or within the one or more heat exchangers with one or more applications requiring heating or cooling.

Figure 2F:
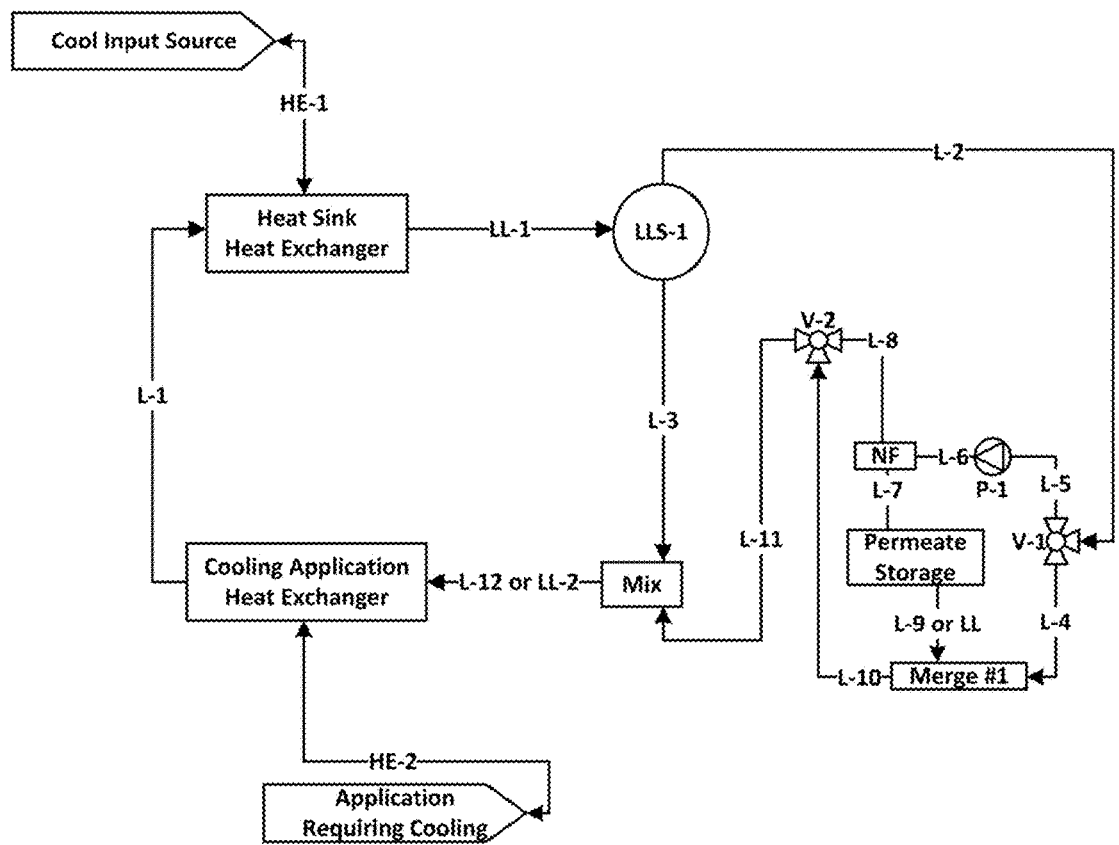

FIG. 2F: The present figure may comprise a liquid phase change system for heating or cooling transfer. The system may employ active change in liquid system cloud point temperature by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively adjusting one or more cloud point temperatures or maintaining the same cloud point temperature. For example, the present figure may show an active increase of UCST by, for example, diluting or decreasing the concentration of, for example, one or more reagents which decrease UCST with increasing concentration by, for example, adding permeate or permeate equivalent liquid. The adjustment of one or more cloud point temperatures may be conducted, for example, by adjusting concentration or composition in one or more liquid streams separated from the multi-liquid phase mixture. Said one or more liquid streams may be combined with other separated liquid streams before or within the one or more heat exchangers heat exchanging with one or more applications requiring heating or cooling.

Figure 2G:
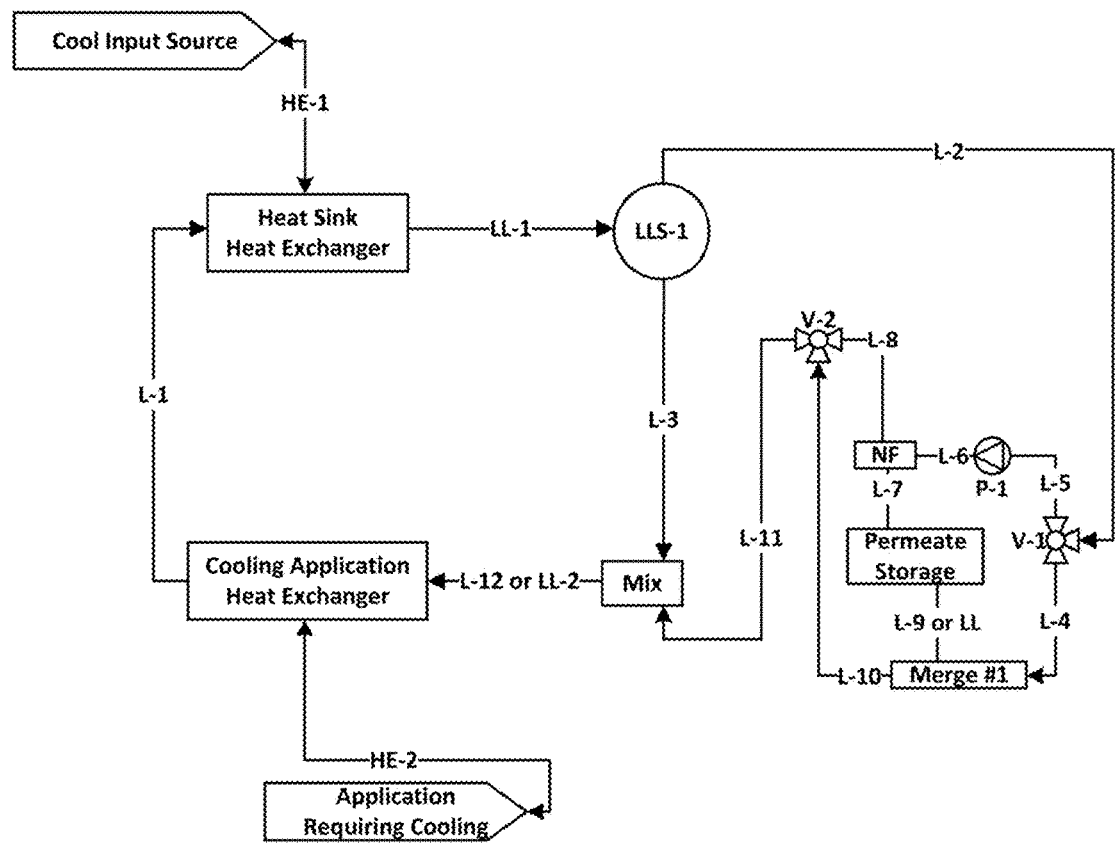

FIG. 2G: The present figure may comprise a liquid phase change system for heating or cooling transfer. The system may employ active adjustment in one or more liquid system cloud point temperatures by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively tailoring one or more cloud point temperatures or maintaining the same cloud point temperature. For example, the present figure may show maintaining the same UCST by, for example, allowing one or more liquid streams to bypass one or more steps to adjust the concentration or composition.

Figure 3:
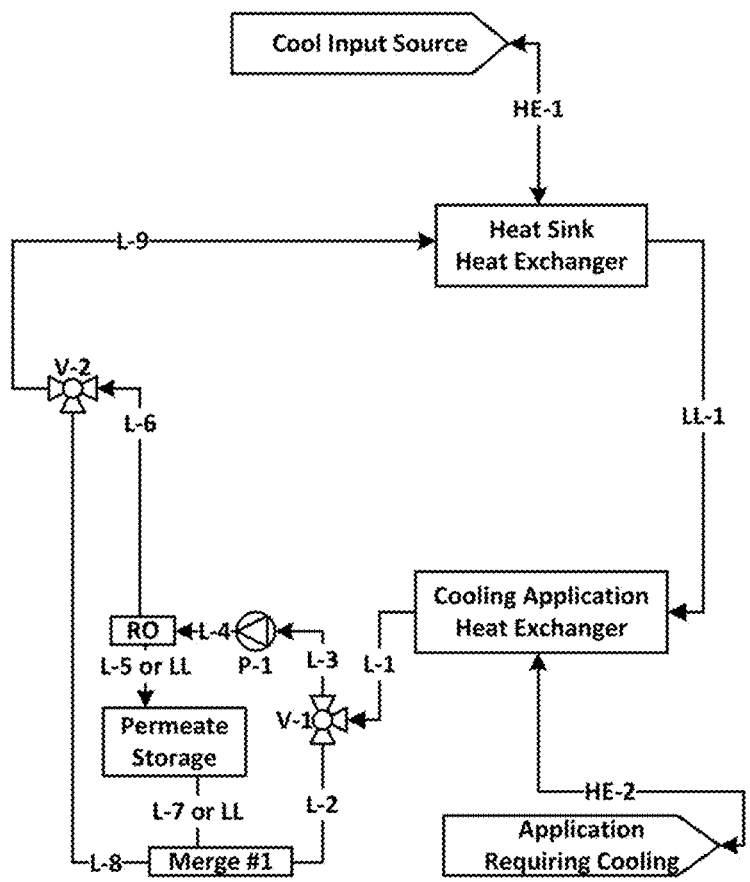
FIG. 3: Figure showing liquid phase change system for heating or cooling transfer.

FIG. 3: The present figure may comprise a liquid phase change system for heating or cooling transfer. The system may employ active adjustment in liquid system cloud point temperature by, for example, changing the concentration of one or more reagents using, for example, one or more membrane-based processes. The present embodiment may comprise an Upper Critical Solution Temperature (UCST) liquid system phase change heating or cooling transfer system. The present embodiment may be capable of actively change in one or more cloud point temperatures or maintaining the same cloud point temperature. For example, the present figure may show an active increase of UCST by, for example, increasing the concentration of, for example, one or more reagents which increase UCST with increasing concentration ('UCST Increasing Reagent'). The adjustment of one or more cloud point temperatures may be conducted, for example, by adjusting concentration or composition in the combined single liquid phase solution produced by or following one or more 'heat absorption' steps.

Figure 4:
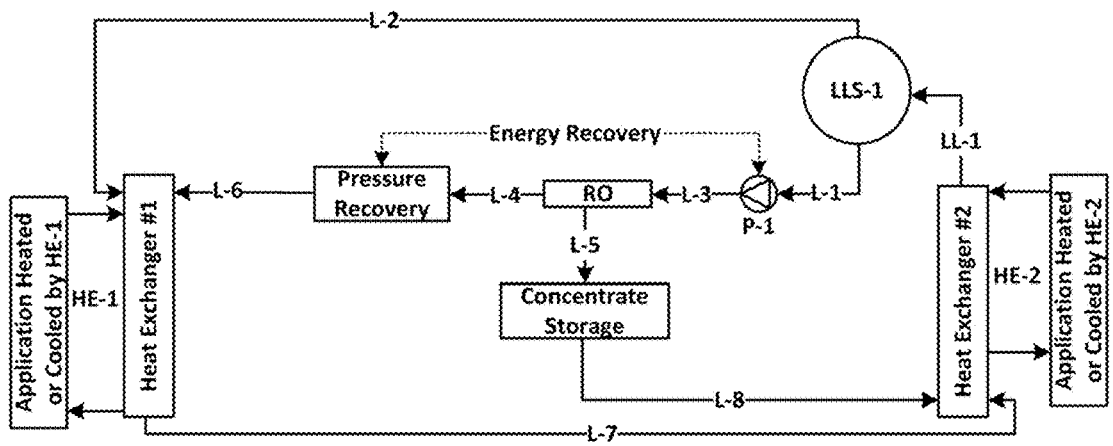
FIG. 4: Figure showing refrigeration or heat pump cycle.

FIG. 4: The present figure may comprise a refrigeration cycle or heat pump cycle. The present embodiment may employ one or more reversible endothermic and exothermic phase transitions of a liquid system to extract heat from one or more heat exchangers and/or release heat in one or more heat exchangers. The one or more reversible phase transitions may comprise endothermic or exothermic phase transitions. The present embodiment may involve adjusting the concentration or composition of one or more 'cloud point temperature influencing reagents' to, for example, form an endothermic (heat absorbing) phase transition at a relatively lower temperature and may involve, for example, adjusting the concentration or composition of one or more 'cloud point temperature influencing reagents' to, for example, form an exothermic (heat releasing) phase transition at a relatively higher temperature.

For example, the present embodiment may involve mixing a single liquid phase solution lean in one or more LCST reducing reagents with a solution concentrated in one or more LCST reducing reagents, which may result in an endothermic phase change into a two or more liquid phase mixture while, for example, absorbing heat from one or more applications requiring heat extraction. The resulting multi-liquid phase mixture may be separated into two or more liquid streams. One or more of said liquid streams may be concentrated using one or more membrane-based processes, which may result in a stream concentrated in one or more LCST reducing reagents and may result in a permeate stream lean or free of one or more LCST reducing reagents. Said permeate stream may be mixed with one or more other separated streams, which may result in exothermic dissolution, which may form, for example, a single liquid phase. Said exothermic dissolution may involve releasing heat to one or applications requiring heating or a heat sink during or after dissolution.

Figure 5A:
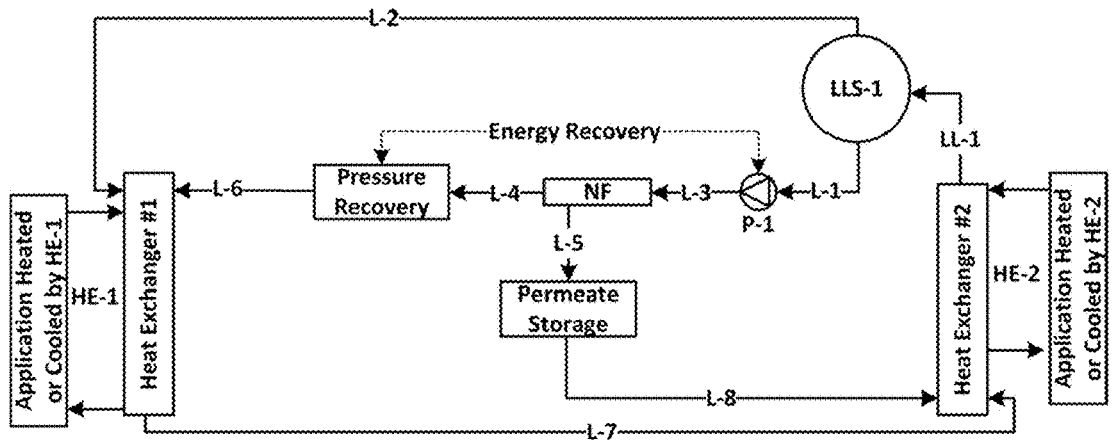
FIGS. 5A-E: Figures showing refrigeration or heat pump cycle.

FIG. 5A: The present figure may comprise a refrigeration cycle or heat pump cycle. The present embodiment may employ one or more reversible endothermic and exothermic phase transitions of a liquid system to extract heat from one or more heat exchangers and/or release heat into one or more heat exchangers. The one or more reversible phase transitions may comprise endothermic or exothermic phase transitions. The present embodiment may involve adjusting the concentration or composition of one or more 'cloud point temperature influencing reagents' to, for example, form an endothermic (heat absorbing) phase transition at a relatively lower temperature and may involve, for example, adjusting the concentration or composition of one or more 'cloud point temperature influencing reagents' to, for example, form an exothermic (heat releasing) phase transition at a relatively higher temperature.

For example, the present embodiment may involve mixing a single liquid phase combined solution concentrated in one or more CST reagents with one or more UCST increasing reagents (for example: 'permeate' or permeate equivalent liquid), which may result in an exothermic phase change into a multi-liquid phase mixture while, for example, releasing heat into one or more applications requiring heating or heat sinks. Said multi-liquid phase solution may be separated using one or more liquid separation devices, which may result in two or more liquid streams. One or more of said liquid streams may be a feed stream into one or more membrane processes, which may involve concentrating one or more reagents which decrease UCST phase change temperature with increasing concentration. Said one or more membrane based processes may result in one or more concentrate solutions with a higher concentration of one or more reagents which decrease UCST with increasing concentration and may result in one or more permeate solutions containing a low concentration of or free of one or more reagents which decrease UCST with increasing concentration. Said concentrate solution may be mixed with one or more other separated liquid phase streams, which may result in an endothermic dissolution phase change into a single liquid phase combined solution, for example, before or while absorbing heat from one or more applications requiring cooling or an enthalpy source. Said combined solution and said permeate solution may be returned to the first step.

Figure 5B:
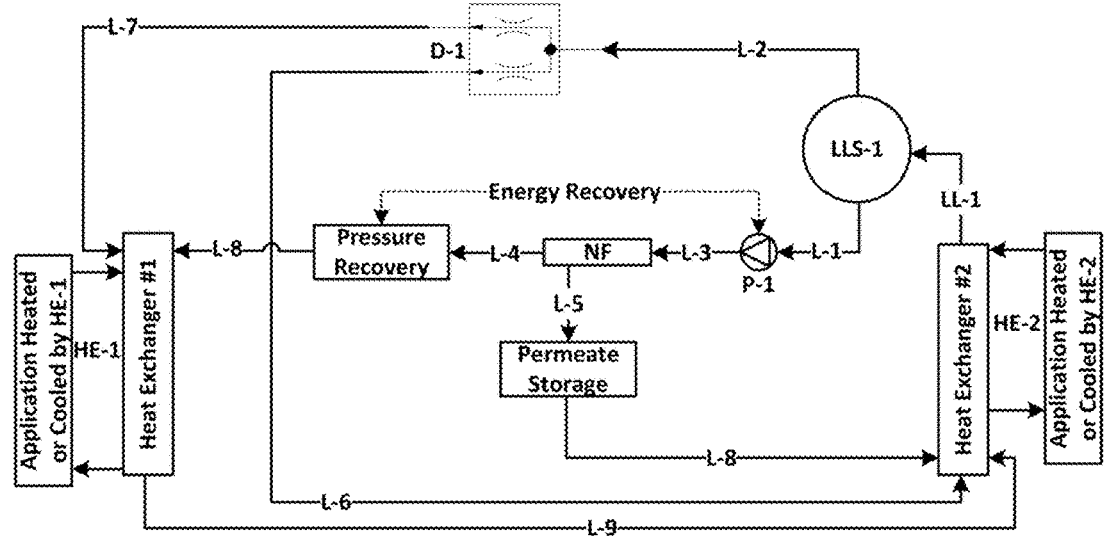

FIG. 5B: Figure is similar to FIG. 5A. In the present figure, one or more separated liquid streams may be divided into one or more separate liquid streams. For example, a liquid stream of one composition may be divided into two or more liquid streams of the same composition. One or more of said liquid streams may be employed in one or more different stages of the present embodiment.

The present figure may show a single liquid stream of the same composition being divided into two liquid streams of the same composition. One liquid stream may be employed to facilitate endothermic dissolution phase change and the other liquid stream may be employed to facilitate exothermic multi-liquid phase forming phase change.

Figure 5C:
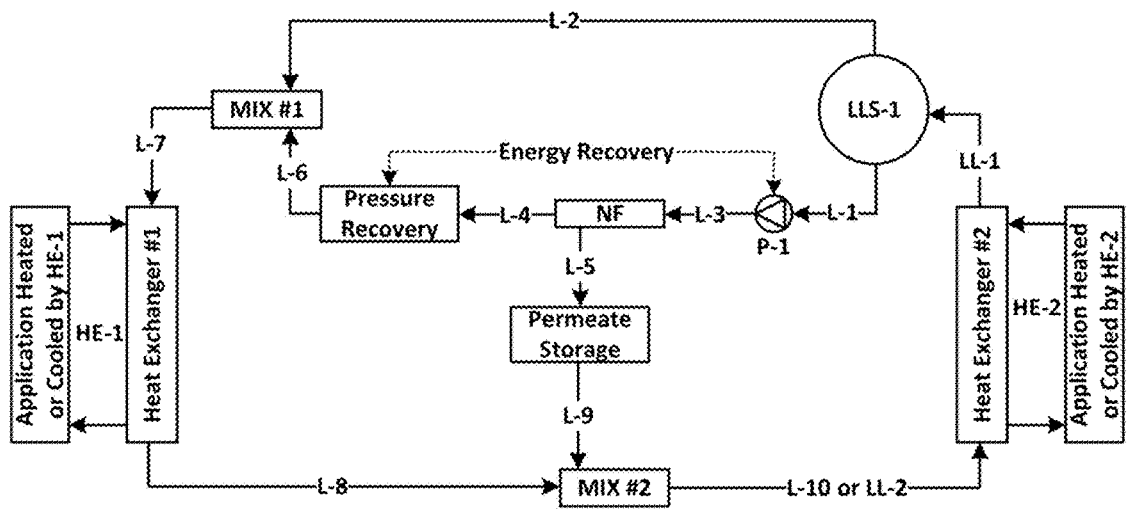

FIG. 5C: Figure is similar to FIG. 5A. In the present figure, two or more liquid streams may be combined or mixed separately or prior to or before entering one or more heat exchangers. The first merging, mixing, or combined of two or more liquid streams may be conducted in an apparatus separate from one or more heat exchangers.

Figure 5D:
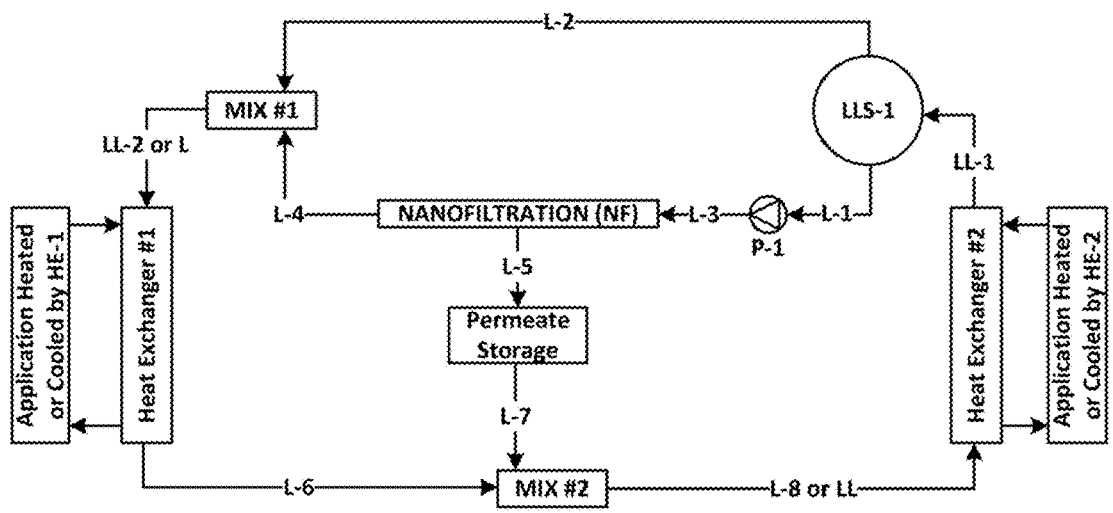

FIG. 5D: Figure is similar to FIG. 5A. Energy recovery devices may be absent in some process configurations. For example, including, but not limited to, energy recovery devices may be undesirable if the value of space/footprint is greater than the value of reduced energy consumption from an energy recovery device or due to limited energy recovery potential or a combination thereof.

Figure 5E:
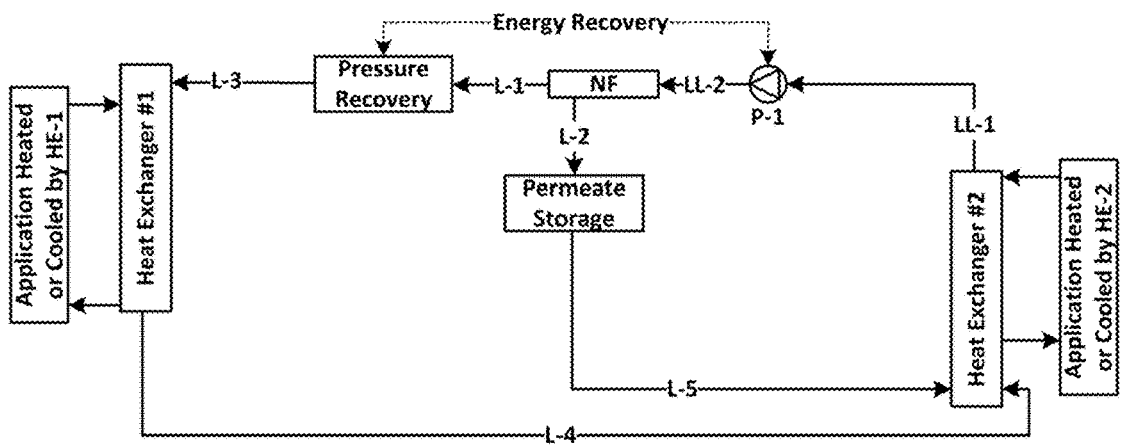

FIG. 5E: Figure is similar to FIG. 5A. In the present figure, one or more liquid-liquid mixtures may be concentrated or separated or a combination thereof directly by one or more semi-permeable membranes. The present figure may function without a liquid-liquid separation device before one or more membrane-based processes. The present figure may employ one or more heat exchangers within or in exchange with one or more membrane-based processes because, for example, the multi-liquid phase concentrate/retentate may undergo dissolution (which may be endothermic or exothermic) during the concentrating one or more reagents. One or more permeate streams produced in the present embodiment may comprise a multi-liquid phase mixture.

Figure 6A:
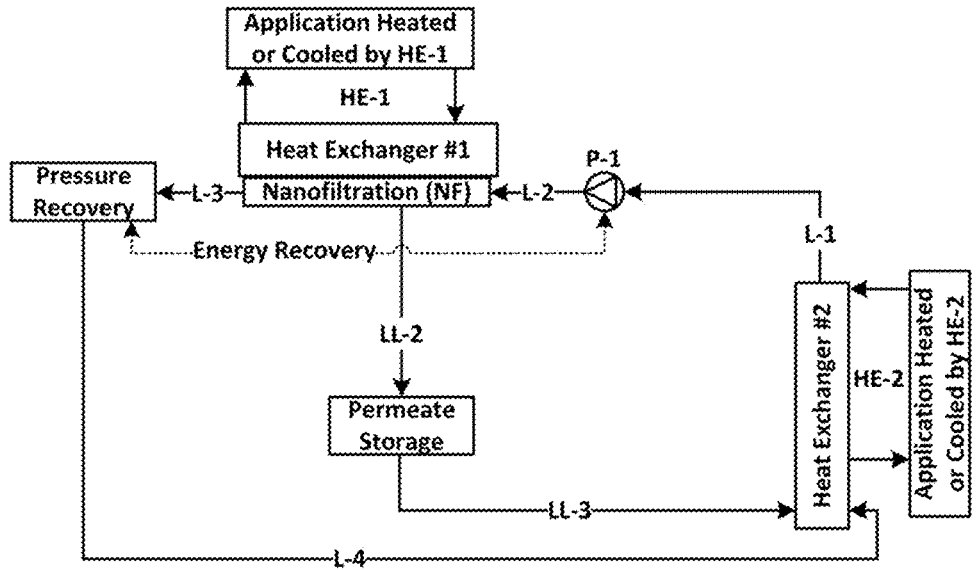
FIGS. 6A-C: Figures showing refrigeration or heat pump cycle.

FIG. 6A: The present figure may comprise a refrigeration cycle or heat pump cycle. The present embodiment may employ one or more reversible endothermic and exothermic phase transitions of a liquid system to extract heat from one or more heat exchangers and/or release heat in one or more heat exchangers. The one or more reversible phase transitions may comprise endothermic or exothermic phase transitions. The present embodiment may involve adjusting the concentration or composition of one or more 'cloud point temperature influencing reagents' to, for example, form an endothermic (heat absorbing) phase transition at a relatively lower temperature and may involve, for example, adjusting the concentration or composition of one or more 'cloud point temperature influencing reagents' to, for example, form an exothermic (heat releasing) phase transition at a relatively higher temperature.

For example, the present embodiment may involve concentrating a single liquid phase combined solution feed using one or more membrane-based processes. Said concentrating may employ nanofiltration to concentrate one or more CST reagents, which may form one or more concentrate solutions, which may comprise a greater concentration of one or more CST reagents than said solution feed. Said concentrating may result in one or more permeate streams. Said permeate stream or streams may comprise two or more reagents which may be insoluble or exhibit limited solubility in the absence of or with lower concentrations of said one or more CST reagents. Said permeate stream may form two or more liquid phases in a liquid-liquid phase change. Said liquid-liquid phase change may be endothermic or exothermic and may be heat exchanged with one or more applications requiring cooling or heating before, during, or after or a combination thereof said heat exchange. In the case of a UCST phase change process, said liquid-liquid phase change into two or more liquid phases may be, for example, exothermic. Said one or more permeate streams or a multi-liquid phase mixture permeate may be subsequently mixed with said concentrate solution, resulting in an endothermic or exothermic dissolution, which may be heat exchanged with one or more applications requiring cooling or heating before, during, or after or a combination thereof said heat exchange.

Figure 6B:
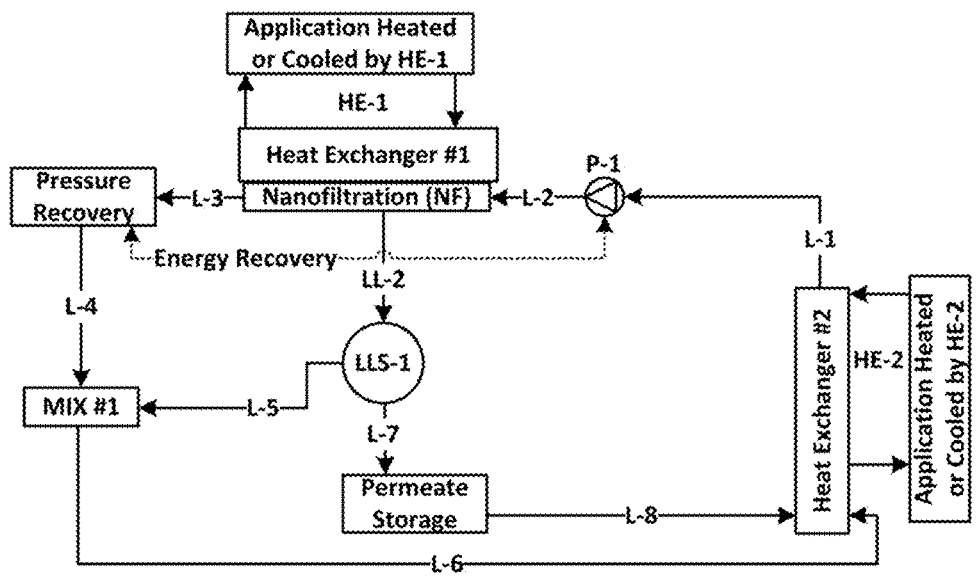

FIG. 6B: Figure similar to FIG. 6A. The present embodiment may employ one or more liquid-liquid separation devices to separate two or more liquid phases in a multi-liquid phase permeate stream into separate liquid streams. A portion of one or more liquid streams may be mixed with said concentrate before one or more other separated liquid phases.

Figure 6C:
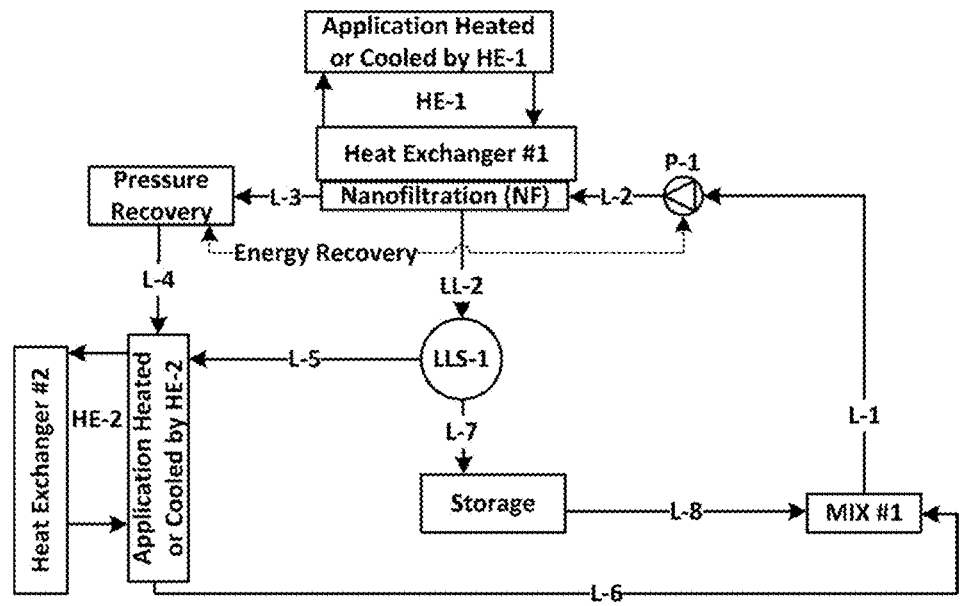

FIG. 6C: Figure similar to FIG. 6A. The present embodiment may employ one or more liquid-liquid separation devices to separate two or more liquid phases in a multi-liquid phase permeate stream into separate liquid streams. A portion of one or more liquid streams may be mixed with said concentrate before one or more other separated liquid phases.

Figure 7:
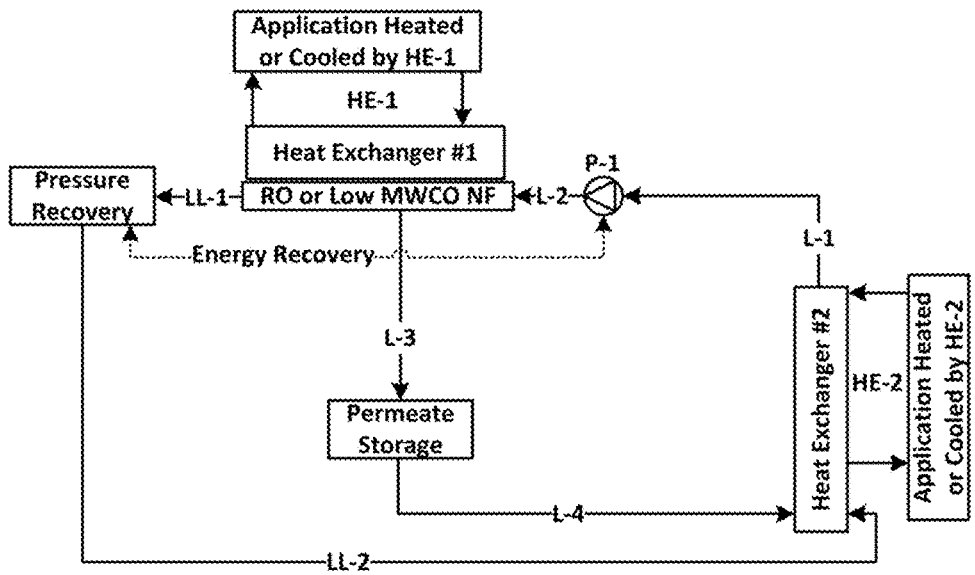
FIG. 7: Figure showing refrigeration or heat pump cycle.

FIG. 7: The present figure may comprise a refrigeration cycle or heat pump cycle. The present embodiment may employ one or more reversible endothermic and exothermic phase transitions of a liquid system to extract heat from one or more heat exchangers and/or release heat in one or more heat exchangers. The one or more reversible phase transitions may comprise endothermic or exothermic phase transitions. The present embodiment may involve adjusting the concentration or composition of one or more 'cloud point temperature influencing reagents' to, for example, form an endothermic (heat absorbing) phase transition at a relatively lower temperature and may involve, for example, adjusting the concentration or composition of one or more 'cloud point temperature influencing reagents' to, for example, form an exothermic (heat releasing) phase transition at a relatively higher temperature.

The present figure may involve concentrating one or more UCST increasing reagents (reagents which may increase UCST with increasing concentration) or one or more LCST decreasing reagents (reagents which may decrease LCST with increasing concentration) in a feed solution using one or more membrane-based processes. It may be desirable for one or more UCST increasing reagents or LCST decreasing reagents to possess a higher molecular weight or larger hydration radius than one or more or all other constituent reagents in one or more feed solutions. Said concentrating may result in a concentrate solution possessing a relatively greater concentration of one or more UCST increasing reagents or one or more LCST decreasing reagents than said feed solution. Said concentrate solution may phase change into a multi-liquid phase mixture, with, for example, at least one of said liquid phases in said multi-liquid phase mixture possessing a relatively greater concentration of one or more UCST increasing reagents or LCST decreasing reagents. Said phase change may be exothermic or endothermic and may be heat exchanged with one or more applications requiring heating or cooling before, during, or after, or combination thereof said phase change. Said concentrating may also result in a permeate solution lean in or free of said one or more UCST increasing reagents or LCST decreasing reagents. Next, said permeate stream may be mixed with said multi-liquid phase mixture concentrate stream, which may result in endothermic or exothermic dissolution and may result in the formation of a single liquid phase combined solution. Said dissolution may be exothermic or endothermic and may be heat exchanged with one or more applications requiring heating or cooling before, during, or after, or combination thereof said dissolution. Said resulting single liquid phase solution may be returned to step 1 as a feed solution.

Figure 8:
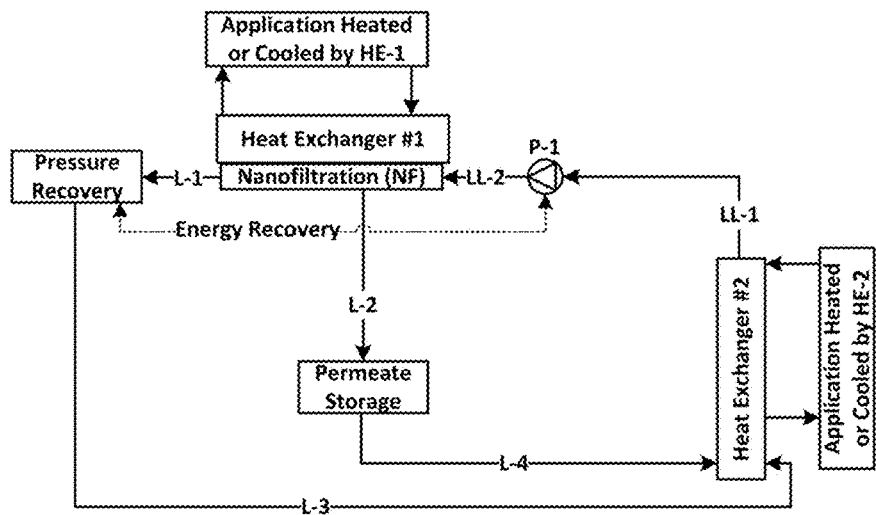
FIG. 8: Figure showing refrigeration or heat pump cycle.

FIG. 8: The present figure may comprise a refrigeration cycle or heat pump cycle. The present embodiment may employ one or more reversible endothermic and exothermic phase transitions of a liquid system to extract heat from one or more heat exchangers and/or release heat in one or more heat exchangers. The one or more reversible phase transitions may comprise endothermic or exothermic phase transitions. The present embodiment may involve adjusting the concentration or composition of one or more 'cloud point temperature influencing reagents' to, for example, form an endothermic (heat absorbing) phase transition at a relatively lower temperature and may involve, for example, adjusting the concentration or composition of one or more 'cloud point temperature influencing reagents' to, for example, form an exothermic (heat releasing) phase transition at a relatively higher temperature.

The present figure may involve concentrating one or more UCST increasing reagents using one or more membrane-based processes, which may include, but is not limited to, nanofiltration (NF). The feed solution in said concentrating may comprise a multi-liquid phase mixture. During said concentrating, the concentration of one or more CST reagents may increase in one or more concentrate or retentate solutions. Said increased concentration of one or more CST reagents may result in a decreased UCST, which may result in endothermic dissolution within the concentrate/retentate and may result in a single liquid phase concentrate solution. Said endothermic dissolution may be heat exchanged with one or more applications requiring cooling before, during, or after, or combination thereof said endothermic dissolution. Said concentrating may also result in one or more permeate liquids, which may be lean in or free of one or more CST reagents. Said single liquid phase concentrate solution may be mixed with said one or more permeate liquids and may undergo a phase transition into a multi-liquid phase mixture. Said phase transition may be exothermic and may be heat exchanged with one or more applications requiring cooling before, during, or after, or combination thereof said exothermic phase transition.

Figure 9:
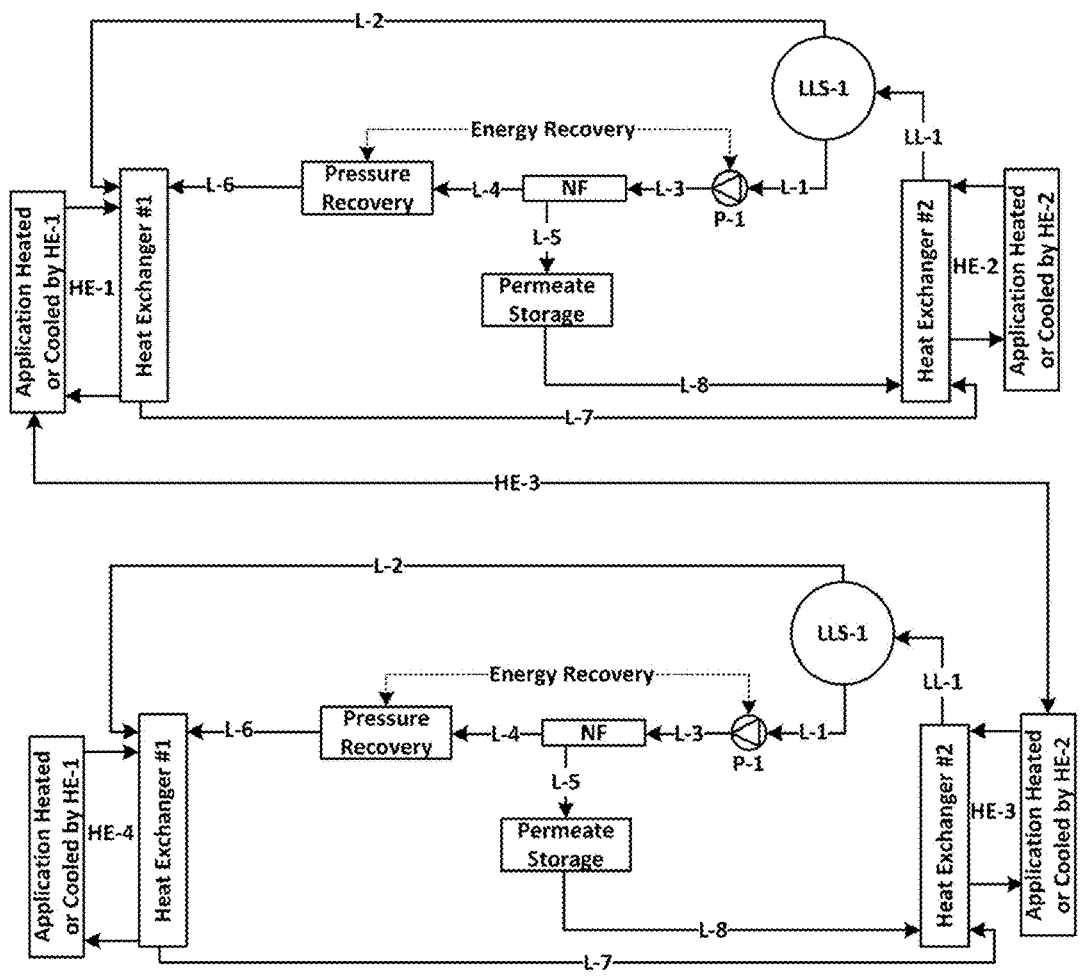
FIG. 9: Figure showing a multi-stage or multi-cycle refrigeration cycle.

FIG. 9: The present figure may show an example of a multi-stage or multi-cycle refrigeration cycle. Embodiments described or shown herein, which may include, but are not limited to, the embodiment shown in FIG. 9, may employ the cold side of one refrigeration or heat pump cycle/stage as the hot side of another refrigeration or heat pump cycle/stage or vice versa. Embodiments described or shown herein, which may include, but are not limited to, the embodiment shown in FIG. 9, may heat exchange the cold side of one refrigeration or heat pump cycle/stage as the hot side of another refrigeration or heat pump cycle/stage or vice versa. The 'cold side' may comprise one or more heat absorbing sections and 'hot side' may comprise one or more 'heat releasing' sections. By integrating multiple refrigeration or heat pump cycles in heat exchange, the combined refrigeration or heat pump cycle may have potential for greater temperature difference between hot and cold sides than the capacity of a single liquid system or of an individual stage or of an individual cycle.

Figure 10:
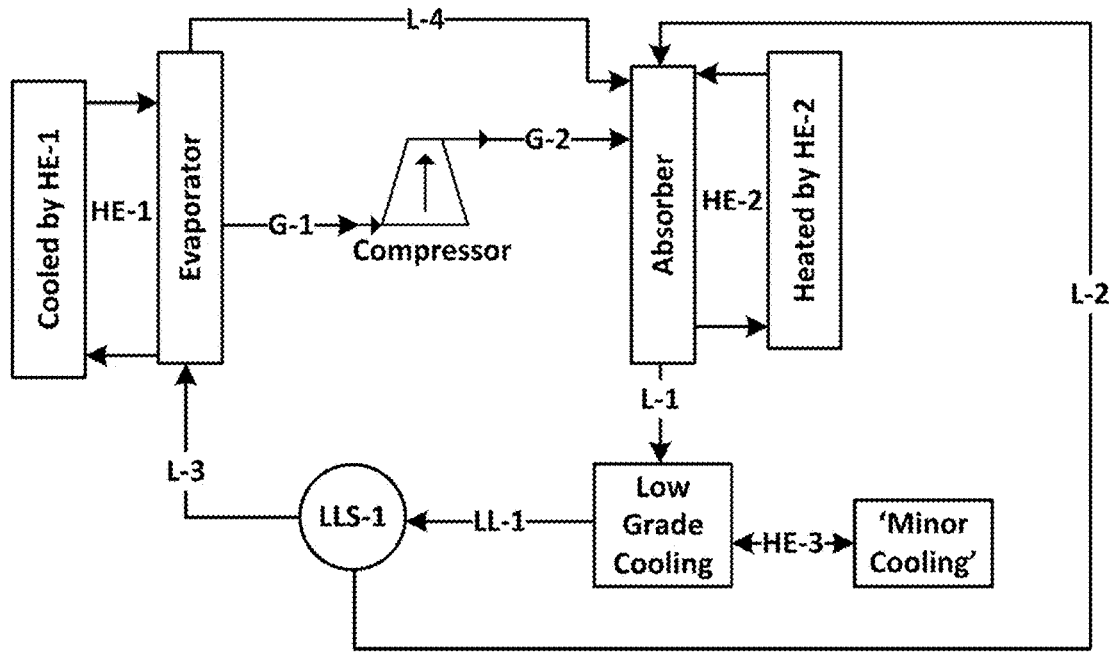
FIG. 10: Figure showing refrigeration or heat pump cycle.

FIG. 10: The present figure may comprise a refrigeration cycle or heat pump cycle. Alternatively, the present embodiment may comprise a heat engine, wherein the compressor may be, for example, substituted for a generator. Alternatively, the present embodiment may comprise a method for recovering or absorbing one or more gaseous vapors.

The present figure may involve a UCST phase change liquid system wherein one (or more) of the 'low solubility reagent(s)' may be volatile or possess greater vapor pressure than one or more of the other constituent reagents of the liquid system. The present embodiment may benefit from an equilibrium vapor pressure shift, which may be developed from a UCST phase transition, which may enable significantly more energy efficient refrigeration or heat pumps or heat engines or a combination thereof and may also reduce the required flow rate of liquid.

In, for example, the refrigeration cycle, the 'evaporator'/heat absorbing step may involve evaporating at least a portion of said 'low solubility reagent(s)' from a liquid phase comprising substantially 'low solubility reagent'. As a liquid substantially comprising said 'low solubility reagent', the liquid may possess a greater partial vapor pressure of gas phase low 'solubility reagent' at the same temperature compared to, for example, 'low solubility reagent' in a solution containing substantially one or more other reagents, in, for example, accordance with Raoult's Law. Said evaporated gas phase 'low solubility reagent(s)' may be compressed and absorbed into an absorption solution which may comprise UCST solvent and CST reagent, in for example, an 'absorption'/heat releasing step, which may form a combined solution comprising UCST solvent, CST reagent, and absorbed 'low solubility reagent'. Said absorption solution may possess a lower partial pressure of 'low solubility reagent(s)' relative to a condensed liquid 'low solubility reagent(s)' without the presence of said absorption solution at the same temperature, which may enable less energy consumption in the compression step relative to a prior art refrigerant refrigeration cycle. Said combined solution comprising UCST solvent, CST reagent, and absorbed 'low solubility reagent' may be cooled below said combined solutions UCST phase transition temperature, which may result in a multi-liquid phase mixture. Said multi-liquid phase mixture may be separated or remain combined. If separated, for example, said separation may comprise one or more liquid-liquid separation steps, which may result in at least partially separated constituent liquid phases. One of said at least partially separated constituent liquid phases may comprise a liquid phase comprising substantially 'low solubility reagent' and may be transferred to the evaporation step. One of said at least partially separated constituent liquid phases may comprise a liquid phase comprising substantially UCST solvent and CST reagent and may be transferred to the absorbing step as, for example, a constituent of the absorption solution.

Note: It is also important to note the dissolution of 'low solubility reagent' in a solution which may comprise UCST solvent and CST reagent may be endothermic if, for example, said 'low solubility reagent' is in the liquid phase. In the present embodiment, the 'low solubility reagent' may be absorbed from the gas phase. The enthalpy of condensation from the gas phase (exothermic) may exceed the enthalpy of dissolution of 'low solubility reagent' (endothermic), however said endothermic step or mechanism during the absorption process may reduce the amount of heat rejected during the 'absorption' step.

Note: UCST solvent, such as water, may also be employed as a volatile reagent in one or more of the present embodiments. For example, water may comprise the more volatile reagent in a liquid system comprising, for example, propylene carbonate, polypropylene glycol 425, and water. For example, the UCST solvent may comprise liquid ammonia. For example, the process may involve a heat absorbing step which may comprise evaporating a portion of UCST solvent from a solution comprising UCST solvent and CST reagent, which may form gaseous UCST solvent and a remaining solution comprising, for example, a higher concentration of CST reagent relative to UCST solvent. Said remaining solution may be mixed with liquid phase comprising substantially low-solubility reagent, which may form combined solution which may be employed as an absorption solution. Said UCST solvent gas may be compressed. Said compressed UCST solvent gas may be absorbed into said absorption solution in, for example a heat releasing step, which may form a combined solution comprising UCST solvent, CST reagent, and 'low solubility reagent'. Said combined solution may be phase transitioned into a multi-liquid phase mixture using, for example, cooling, the addition of one or more reagents, or the addition of permeate, or the addition of UCST solvent, or a combination thereof. Said multi-liquid phase mixture may be separated or remain combined. If separated, for example, said separation may comprise one or more liquid-liquid separation steps, which may result in at least partially separated constituent liquid phases. One of said at least partially separated constituent liquid phases may comprise a liquid phase comprising substantially 'low solubility reagent' and may be transferred to the mixing step to form the absorption solution. One of said at least partially separated constituent liquid phases may comprise a liquid phase comprising substantially UCST solvent and CST reagent and may be transferred to the evaporation/heat absorbing step.

1) The present embodiment may involve absorbing a vapor of one or more volatile reagents into an absorption solution with which said one or more volatile reagents form a combined solution with a UCST or LCST. Said absorbing may release heat, which may be heat exchanged with, for example, one or more applications requiring heating, or one or more heat sinks, or evaporative cooling, or a combination thereof.

2) The present embodiment may further comprise cooling or heating said combined solution below or above, respectively, said UCST or LCST, respectively, which may result in the formation of a multi-liquid (or supercritical) phase mixture (multi-phase mixture).

3) Said multi-phase mixture may be at least in part separated using, for example, one or more liquid-liquid or coalescer or density driven, or a combination thereof separation methods. One or more phases separated phases from said multi-phase mixture may comprise substantially 'absorption solution' from step '1)', which may be returned to step '1)'. One or more phases separated phases from said multi-phase mixture may comprise substantially 'absorption solution' from step '1)', which may be returned to step '1)'. One or more phases separated phases from said multi-phase mixture may comprise substantially one or more volatile reagents in a liquid and/or supercritical phase and may be transferred to step '4)'.

4) Said one or more separated volatile reagents may be transferred to one or more evaporators, where said one or more volatile reagents may be depressurized and/or evaporated into the gaseous phase. Said evaporation may absorb heat and may be heat exchanged with one or more applications requiring cooling, or heat sources, or enthalpy sources, or a combination thereof. Residuals following evaporation may be transferred to step '1)' and may be mixed with, for example, said absorption solution in step '1)'.

5) Said gaseous phase volatile reagents may be compressed to form higher pressure gaseous phase volatile reagents, which may be transferred to step '1)'.

Note: FIG. 10 may have an advantage wherein the phase transition into multiple liquid phases to regenerate the refrigerant and absorption liquid phases may be conducted using cool input, rather than heating input. This may be desirable, for example, wherein the application of the refrigeration cycle is primarily for heating.

Figure 11:
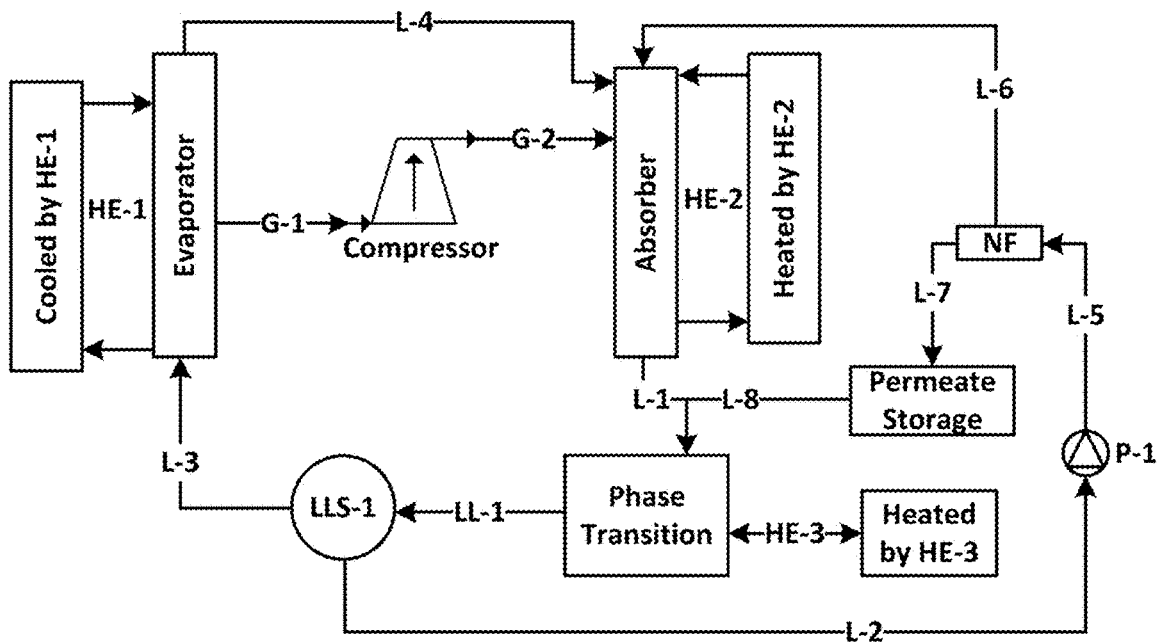
FIG. 11: Figure showing refrigeration or heat pump cycle.

FIG. 11: The present figure may comprise a refrigeration cycle or heat pump cycle. Alternatively, the present embodiment may comprise a heat engine, wherein the compressor may be, for example, substituted for a generator. Alternatively, the present embodiment may comprise a method for recovering or absorbing one or more gaseous vapors.

The present figure may involve a UCST phase change liquid system wherein one (or more) of the 'low solubility reagent(s)' may be volatile or possess greater vapor pressure than one or more of the other constituent reagents of the liquid system. The present embodiment may benefit from an equilibrium vapor pressure shift, which may be developed from a UCST phase transition, which may enable significantly more energy efficient refrigeration or heat pumps or heat engines or a combination thereof and may also reduce the required flow rate of liquid.

FIG. 11 may differ from FIG. 10 in that FIG. 11 may initiate or generate a phase transition using the addition of one or more reagents, such as permeate or permeate equivalent or a combination thereof, rather than or in addition to cooling. Additionally, said one or more added reagents may be recovered using one or more membrane-based processes.

FIG. 11 may involve diluting a combined single liquid phase solution comprising CST reagent, 'low solubility reagent', and UCST solvent with permeate or permeate equivalent comprising a portion UCST solvent, which may result in a lower concentration of CST reagent, which may trigger a phase transition into a multi-liquid phase mixture. Said multi-liquid phase mixture may comprise constituent liquid phases which may comprise: one or more of the liquid phases in the multi-liquid phase mixture may comprise volatile 'low solubility reagent' and one or more of the liquid phases in the multi-liquid phase mixture may comprise a solution of UCST solvent and CST reagent. Said constituent liquid phases may be at least in part separated. Said one or more of the liquid phases which may comprise 'low solubility reagent' may be transferred to the evaporation stage. Said added permeate and/or permeate equivalent may be recovered from said one or more of the liquid phases which may comprise a solution of UCST solvent and CST reagent using, for example, one or more membrane-based processes, such as nanofiltration. Said nanofiltration may form one or more permeate streams (which may be returned to the permeate addition step) and a retentate stream which may be employed as one or more of the streams employed in the absorption stage.

Note: One or more of said liquid phases may be contaminated with or contain residuals of one or more other reagents which may be present in, for example, one or more of the other liquid phases in said multi-liquid phase mixture.

FIG. 12: The present figure may comprise a refrigeration cycle or heat pump cycle. Alternatively, the present embodiment may comprise a heat engine, wherein the compressor may be, for example, substituted for a generator. Alternatively, the present embodiment may comprise a method for recovering or absorbing one or more gaseous vapors.

The present figure may involve a LCST phase change liquid system wherein one (or more) of the LCST binder reagents may be volatile or refrigerants or possess greater vapor pressure than one or more of the other constituent reagents of the liquid system. The present embodiment may benefit from an equilibrium vapor pressure shift, which may be developed from a LCST phase transition, which may enable significantly more energy efficient refrigeration or heat pumps or heat engines or a combination thereof and may also reduce the required flow rate of liquid.

In, for example, the refrigeration cycle, the 'evaporator'/heat absorbing step may involve evaporating at least a portion of said refrigerant from a liquid phase comprising substantially refrigerant and LCST reagent. As a liquid comprising a greater concentration of said refrigerant than in the absorption solution, the liquid may possess a greater partial vapor pressure of gas phase refrigerant at the same temperature compared to, for example, a solution of refrigerant dissolved in the absorption solution, in, for example, accordance with Raoult's Law. Remaining LCST reagent (and other residual reagents in solution with LCST reagents) during or following evaporation, may be transferred to the absorption/heat releasing stage as, for example, a component of the absorption solution. Said evaporated gas phase refrigerant may be compressed and absorbed into an absorption solution which may comprise LCST reagent and LCST solvent reagent, in for example, an 'absorption'/heat releasing step, which may form a combined solution comprising LCST solvent reagent, LCST reagent, and absorbed refrigerant. Said absorption solution may possess a lower partial pressure of refrigerant relative to a condensed liquid refrigerant without the presence of said absorption solution at the same temperature, which may enable less energy consumption in the compression step relative to a prior art refrigerant refrigeration cycle. Said combined solution comprising LCST solvent reagent, LCST reagent, and absorbed refrigerant may be heated above said combined solutions LCST phase transition temperature, which may result in a multi-liquid phase mixture. Said multi-liquid phase mixture may be separated or remain combined. If separated, for example, said separation may comprise one or more liquid-liquid separation steps, which may result in at least partially separated constituent liquid phases. One of said at least partially separated constituent liquid phases may comprise a liquid phase comprising substantially refrigerant and LCST reagent and may be transferred to the evaporation step. One of said at least partially separated constituent liquid phases may comprise a liquid phase comprising substantially LCST solvent reagent and may be transferred to the absorbing step as, for example, a constituent of the absorption solution.

Note: LCST solvent reagent, such as water, may also be employed as a volatile reagent or refrigerant in one or more of the present embodiments. For example, LCST solvent reagent may comprise the refrigerant in a liquid system comprising, for example, non-volatile LCST reagent and/or LCST binder reagent. For example, water may comprise the LCST solvent reagent, polypropylene glycol 425 may comprise the LCST reagent, and propylene carbonate may comprise a LCST binder reagent. For example, the LCST solvent liquid phase may also comprise high solubility compound or LCST reducing reagent or a combination thereof which may be volatile and may comprise, including, but not limited to, one or more or a combination of the following reagents: ammonia, amine, methanol, ethanol, THF, acetone, or other potentially volatile water soluble reagents which may or may not form an azeotrope with water. For example, the LCST solvent liquid phase may also comprise non-volatile reagents, such as LCST reducing reagents, including, but not limited to, salts. For example, the process may involve a heat absorbing step which may comprise evaporating a portion of LCST solvent reagent from a liquid phase comprising substantially LCST solvent reagent, which may form gaseous LCST solvent reagent and a remaining solution comprising any residual reagents. Said heat absorbing step may be heat exchanged with one or more applications requiring cooling, or one or more heat sources, or one or more enthalpy sources, or a combination thereof. Said remaining solution may be mixed with liquid phase comprising substantially LCST reagent and/or LCST binder reagent, which may form combined solution which may be employed as an absorption solution. Said LCST solvent reagent gas may be compressed. Said compressed LCST solvent reagent gas may be absorbed into said absorption solution in, for example, a heat releasing step, which may form a combined solution comprising LCST solvent reagent, LCST reagent, and/or LCST binder reagent. Said heat releasing step may be heat exchanged with one or more applications requiring heating, one or more cooling sources, evaporative cooling, enthalpy sources, or a combination thereof. Said combined solution may be phase transitioned into a multi-liquid phase mixture using, for example, heating, heat exchanging with one or more sources of heat, the addition of one or more reagents, the change in concentration of one or more reagents, or the addition of one or more reagents, or a combination thereof. Said multi-liquid phase mixture may be separated or remain combined. If separated, for example, said separation may comprise one or more liquid-liquid separation steps, which may result in at least partially separated constituent liquid phases. One of said at least partially separated constituent liquid phases may comprise a liquid phase comprising substantially LCST reagent and/or LCST binder reagent and may be transferred to to form an absorption solution. One of said at least partially separated constituent liquid phases may comprise a liquid phase comprising substantially LCST solvent reagent and may be transferred to the evaporation/heat absorbing step.

Note: The presently described embodiment may comprise a water removal or recovery from air technology or flue gas or other water laden gas stream. The present embodiment may also be employed for distilling water, wherein the evaporator evaporates water from a saline or contaminated water stream and the absorber absorbs said evaporated water vapor. The absorbed water is then recovered using an LCST phase transition, wherein it forms a multi-liquid phase mixture. Said multi-liquid phase mixture may be separated, at least in part, into its constituent liquid phases. At least one of said separated constituent liquid phases may contain substantially water and may undergo further treatment or may be removed from the process as separated water or a combination thereof.

Note: FIG. 12 may have an advantage wherein the phase transition into multiple liquid phases to regenerate the refrigerant and absorption liquid phases may be conducted using heat input, rather than cooling input. This may be desirable, for example, wherein the application of the refrigeration cycle is primarily for cooling. Additionally, this may be desirable as it may increase cooling capacity. Additionally, this may be desirable as it may employ heat generated by the compressor (for example: compressor waste heat).

FIG. 1:

FIG. 1A—Example Step by Step Description—Active LCST Decrease by Concentrating LCST Reducing Reagents in One or More Separated Streams:

1) Heat Absorption LCST Phase Change: Combined solution (L-1), which may comprise a single liquid phase, may be heated by one or more heat sources or one or more sources requiring cooling or a combination thereof ('Heat Input Source') in, for example, one or more heat exchangers (RE-1, 'Heat Input Heat Exchanger'). Before, or during, or after, or a combination thereof said 'heating', L-1 may phase transition into a multi-liquid phase mixture (LL-1). Said phase transition may be, for example, endothermic.

2) Multi-Liquid Phase Separation: LL-1 may be separated using one or more liquid-liquid separation devices into two or more at least partially separated liquid streams (L-2 and L-3), which may comprise, for example, one or more of the constituent liquid phases of LL-1.

3) Concentrating LCST Reducing Reagents in One or More Liquid Phases: L-2, which may contain one or more LCST reducing reagents, may be directed (V-1) as an input steam (L-4) to one or more pumps and/or pressure exchangers (P-1). L-4 may be pressurized in P-1, which may form, for example, one or more pressurized feed solutions (L-6). L-6 may be fed into one or more membrane-based processes (for example: reverse osmosis, 'RO'), which may separate L-6 into, for example, one or more concentrate streams (L-8) and/or one or more permeate streams (L-7). Said one or more concentrate streams may be more concentrated in one or more LCST reducing reagents relative to L-6. Said one or more permeate streams may contain a lower concentration of one or more LCST reducing reagents relative to L-6. L-8 may be transferred to step '4)' as L-11. L-7 may be transferred to 'Permeate Storage'.

4) Mixing Liquid Phases: L-8 may be mixed with L-3, which may form a multi-liquid phase mixture (LL-2), or a single liquid phase combined solution (L-4), or a combination thereof.

5) Heat Release LCST Phase Change: The liquid stream or streams from step '4)', may be 'cooled' by one or more applications requiring heating, or one or more cooling sources, or one or more heat sinks or a combination thereof ('Application Requiring Heating') in, for example, one or more heat exchangers (HE-2, 'Heating Application Heat Exchanger'). Before, or during, or after, or a combination thereof said 'cooling', the liquid stream or streams from step '4)' may phase transition into a single liquid phase combined solution (L-1). Said phase transition may be, for example, exothermic.

FIG. 1B—Example Step by Step Description—Active LCST Decrease by Concentrating LCST Reducing Reagents in Combined Single Liquid Phase Solution:

1) Heat Absorption LCST Phase Change: Combined solution (L-9), which may comprise a single liquid phase, may be heated by one or more heat sources or one or more sources requiring cooling or a combination thereof ('Heat Input Source') in, for example, one or more heat exchangers (RE-1, 'Heat Input Heat Exchanger'). Before, or during, or after, or a combination thereof said 'heating', L-1 may phase transition into a multi-liquid phase mixture (LL-1). Said phase transition may be, for example, endothermic.

2) Heat Release LCST Phase Change: LL-1 may be 'cooled' by one or more applications requiring heating, or one or more cooling sources, or one or more heat sinks or a combination thereof ('Application Requiring Heating') in, for example, one or more heat exchangers (HE-2, 'Heating Application Heat Exchanger'). Before, or during, or after, or a combination thereof said 'cooling', LL-1 may phase transition into a single liquid phase combined solution (L-1). Said phase transition may be, for example, exothermic.

3) Concentrating at LCST Reducing Reagents in One or More Liquid Phases: L-1 may be directed (V-1) as an input steam (L-2) to one or more pumps and/or pressure exchangers (P-1). L-2 may be pressurized in P-1, which may form, for example, one or more pressurized feed solutions (L-4). L-4 may be fed into one or more membrane-based processes (for example: nanofiltration, 'NF', and/or reverse osmosis, 'RO'), which may separate L-4 into, for example, one or more concentrate streams (L-6) and/or one or more permeate streams (L-5). Said one or more concentrate streams may be more concentrated in one or more LCST reducing reagents relative to L-4. Said one or more permeate streams may contain a lower concentration of one or more LCST reducing reagents relative to L-4. L-6 may be transferred to step '1)' as L-9. L-5 may be transferred to 'Permeate Storage'.

Note: FIG. 1B may actively increase LCST using permeate or permeate equivalent addition. Additionally, FIG. 1B may maintain LCST by, for example, allowing L-1 to bypass one or more cloud point adjusting steps.

Note: If one or more LCST reagents possess a molecular weight or hydration radius sufficiently large to be rejected by one or more membranes, the concentration of LCST reagents in the output concentrate solution from RO may be greater than the concentration of LCST reagents in the input feed solution. Because of the greater concentration of LCST reagents and/or greater concentration of LCST reducing reagents, the output concentrate solution may comprise a multi-liquid phase mixture. If a multi-liquid mixture forms, for example, within one or more RO concentrating unit or directly following one or more RO concentrating units, it may be desirable to heat exchange with the RO concentrating unit.

Note—Alternative Embodiment for Active LCST Increase: To, for example, minimize osmotic pressure or required applied pressure or concentration polarization or energy consumption or a combination thereof, it may be desirable to first concentrate one or more LCST reagents using nanofiltration (NF) (if, for example, one or more of the LCST reagent(s) possess a sufficiently large hydration radius to be rejected by NF). Said NF stage may benefit by having larger pore size, enabling, for example, less concentration polarization, potentially reducing energy consumption and required applied pressure. Said NF may form one or more concentrate solutions with, for example, a greater concentration of one or more LCST reagents than, for example, one or more feed solutions, and/or may form one or more permeate solutions, which may contain a significantly lower concentration of one or more LCST reagents than, for example, one or more feed solutions. Said NF permeate stream may comprise a solution containing one or more LCST reducing reagents (if, for example, one or more of the LCST reducing reagents possess a hydration radius, for example, below the molecular weight cutoff of one or more membranes in said NF stage). LCST reducing reagents in said NF permeate may be concentrated using one or more reverse osmosis (RO) stages, which may form, for example, one or more concentrate streams comprising a greater concentration of one or more LCST reducing reagents relative to, for example, said NF permeate, and/or may form one or more permeate streams containing a lower concentration of one or more LCST reducing reagents relative to, for example, said NF permeate. Said RO concentrate may be mixed with NF concentrate and may be returned to the process. Said RO permeate may be added to, for example, permeate storage, where it may be later employed or added to actively increase LCST. Energy consumption and/or required applied pressure may also be reduced by enabling the concentrating of LCST reagent(s) and LCST reducing reagent(s) to be concentrated separately, rather than simultaneously.

FIG. 1C—Example Step by Step Description—Active LCST Increase by Diluting LCST Reducing Reagents in One or More Streams:

1) Heat Absorption LCST Phase Change: Combined solution (L-1), which may comprise a single liquid phase, may be heated by one or more heat sources or one or more sources requiring cooling or a combination thereof ('Heat Input Source') in, for example, one or more heat exchangers (RE-1, 'Heat Input Heat Exchanger'). Before, or during, or after, or a combination thereof said 'heating', L-1 may phase transition into a multi-liquid phase mixture (LL-1). Said phase transition may be, for example, endothermic.

2) Multi-Liquid Phase Separation: LL-1 may be separated using one or more liquid-liquid separation devices into two or more at least partially separated liquid streams (L-2 and L-3), which may comprise, for example, one or more of the constituent liquid phases of LL-1.

3) Diluting LCST Reducing Reagents in One or More Liquid Phases: L-2, which may contain one or more LCST reducing reagents, may be directed (V-1) as an input steam (L-5) to one or more stream merging or mixing process elements (Merge #1), where L-5 may be mixed with permeate or permeate equivalent liquid or a combination thereof (L-9), which may form a diluted solution (L-10). L-10 may comprise a lower concentration of one or more LCST reducing reagents relative to, for example, L-2. L-10 may be transferred to step '4)' as L-11.

4) Mixing Liquid Phases: L-11 may be mixed with L-3, which may form a multi-liquid phase mixture (LL-2), or a single liquid phase combined solution (L-4), or a combination thereof.
5) Heat Release LCST Phase Change: The liquid stream or streams from step '4)', may be 'cooled' by one or more applications requiring heating, or one or more cooling sources, or one or more heat sinks or a combination thereof ('Application Requiring Heating') in, for example, one or more heat exchangers (HE-2, 'Heating Application Heat Exchanger'). Before, or during, or after, or a combination thereof said 'cooling', the liquid stream or streams from step '4)' may phase transition into a single liquid phase combined solution (L-1). Said phase transition may be, for example, exothermic.

Note: In an operation increasing LCST using dilution with permeate or permeate equivalent, the LCST, permeate or permeate equivalent liquid may be added directly to, for example, LL-1 or LL-2 or during 'Heating Application Heat Exchanger' or L-1 or one or more other locations within the process. The increase in cloud point may not require the permeate be added to a separated liquid phase.

FIG. 1D—Example Step by Step Description—Maintaining LCST by Bypassing One or More Cloud-Point Adjustment Steps:

1) Heat Absorption LCST Phase Change: Combined solution (L-1), which may comprise a single liquid phase, may be heated by one or more heat sources or one or more sources requiring cooling or a combination thereof ('Heat Input Source') in, for example, one or more heat exchangers (RE-1, 'Heat Input Heat Exchanger'). Before, or during, or after, or a combination thereof said 'heating', L-1 may phase transition into a multi-liquid phase mixture (LL-1). Said phase transition may be, for example, endothermic.
2) Multi-Liquid Phase Separation: LL-1 may be separated using one or more liquid-liquid separation devices into two or more at least partially separated liquid streams (L-2 and L-3), which may comprise, for example, one or more of the constituent liquid phases of LL-1.
3) Bypassing One or More Cloud Point Adjustment Steps: L-2, which may contain one or more LCST reducing reagents, may be directed (V-1) as an input steam (L-5) to one or more stream merging or mixing process elements (Merge #1), where L-5 may remain the same or similar composition and may exit Merge #1 as stream L-10. L-5 may also bypass the process element 'Merge #1' to, for example, potentially minimize contamination with residual L-9 or other potential residuals in Merge #1. L-10 may comprise the same or similar concentration of one or more LCST reducing reagents relative to, for example, L-2. L-10 may be transferred to step '4)' as L-11.
4) Mixing Liquid Phases: L-11 may be mixed with L-3, which may form a multi-liquid phase mixture (LL-2), or a single liquid phase combined solution (L-4), or a combination thereof.
5) Heat Release LCST Phase Change: The liquid stream or streams from step '4)', may be 'cooled' by one or more applications requiring heating, or one or more cooling sources, or one or more heat sinks or a combination thereof ('Application Requiring Heating') in, for example, one or more heat exchangers (HE-2, 'Heating Application Heat Exchanger'). Before, or during, or after, or a combination thereof said 'cooling', the liquid stream or streams from step '4)' may phase transition into a single liquid phase combined solution (L-1). Said phase transition may be, for example, exothermic.

Note: L-2 may comprise, for example, a solution with a lower mass % concentration of one or more LCST reagents relative to L-1 and/or greater mass % concentration of one or more LCST reducing reagents or LCST reagent solvents or a combination thereof relative to, for example, L-1.

Note: L-3 may comprise, for example, a solution with a greater mass % concentration of one or more LCST reagents relative to L-1 and/or lower mass % concentration of one or more LCST reducing reagents or LCST reagent solvents or a combination thereof relative to, for example, L-1.

Note: Although all LCST reducing reagents may reduce LCST of one or more liquid systems with increasing concentration of the LCST reducing reagent, not all reagents which reduce LCST may be considered LCST reducing reagents. An 'LCST reducing reagent' may be more soluble in one or more 'LCST reagent solvents' than one or more 'LCST reagents'. On the other hand, reagents which may decrease LCST with increasing concentration and may be more soluble or appreciably more soluble in the one or more 'LCST reagents' than one or more 'LCST reagent solvents', may be classified as a 'LCST binder reagent'.

For example, given an example liquid system comprising polypropylene glycol 425 (PPG 425), propylene carbonate, water, and 5 wt % sodium chloride: PPG 425 may be classified as an 'LCST reagent', 'Propylene Carbonate' may be classified as a 'LCST binder reagent', water may be classified as a 'LCST reagent solvent', and sodium chloride may be classified as a 'LCST reducing reagent'. PPG 425 may be classified as a LCST reagent, as, for example, in a solution water and sodium chloride in, it may form a LCST phase transition. Propylene Carbonate may be classified as a 'LCST binder reagent' as, for example, it may predominantly dissolve in a phase more concentrated in PPG 425 in a LCST phase transition where PPG 425 is the LCST reagent. Additionally, for example, in a mixture of water only (water comprising an example LCST reagent solvent) or water and sodium chloride only, propylene carbonate may lack a LCST phase transition. Water may be classified as an 'LCST reagent solvent' as, for example, the 'LCST reagent' may form a LCST phase transition in a solution comprising LCST reagent dissolved in water. Sodium chloride may be classified as a 'LCST reducing reagent' as, for example, sodium chloride may be more soluble in the 'LCST reagent solvent' than the 'LCST reagent'. Additionally, for example, in a mixture of water only (water comprising an example LCST reagent solvent) or water and sodium chloride only, sodium chloride may lack a LCST phase transition.

Note: L-6 may be first treated with, for example, Nanofiltration (NF), to, for example, remove one or more residual LCST reagents, before, for example, concentrating one or more LCST reducing reagents using, for example, Reverse Osmosis (RO). The one or more LCST reagent concentrate streams which may result from said NF may be, for example, mixed with L-3, or L-8, or L-11, or mixed in 'Mix' process element, or a combination thereof.

Note: One way to potentially differentiate 'LCST binder reagents' from 'LCST reagents' is, for example, a LCST binder reagent may lack a LCST or possess a very different LCST with one or more 'LCST reagent solvents'. For example, in a mixture of water only (water comprising an example LCST solvent) or water and sodium chloride only, propylene carbonate may lack a LCST phase transition.

Note: One or more or all embodiments herein may include one or more 'LCST binder reagents.' For convenience, 'LCST binder reagent' may or may not be explicitly stated in one or more descriptions.

Note: One or more or a combination of liquid streams may be stored in storage tanks as, for example, excess capacity or buffer capacity. For example, liquid-liquid separation may require sufficient time wherein one or more buffer storage containers may be employed to store separated liquid phases. Said buffer storage containers may be desirable, for example, during startup of the heating or cooling transfer process.

Note: Steps 4 and 5 may be conducted at simultaneously, or in the same process element, or sequentially, or in separate process elements, or a combination thereof.

Note: Active cloud point adjustment may be employed in LCST embodiments for cooling transfer as well. In LCST embodiments for cooling transfer, it may be desirable to not include or to bypass one or more multi-phase liquid separation devices.

Note: The present embodiment may function as a cooling transfer technology. For example, the 'Application Requiring Heating' may comprise a 'cold source', for example, including, but not limited to, a heat sink, or evaporative cooling, or other cooling source, or a combination thereof. In operation as a cooling transfer system, the present embodiment may bypass one or more multi-phase liquid separation devices. Multi-phase liquid separation devices may be desirable in heating transfer in the present embodiment LCST phase change as transporting separate liquid phases separately may enable effective heat transfer over varying conditions and distances, maybe even at least partially independent of varying conditions and transport distances.

| Example Inputs & Outputs (FIGS. 1A-1D) | |
| --- | --- |
| Inputs | Outputs |
| Cool Input or Cool Sink | Cooling Output to Application Requiring Cooling |
| Electricity (active cloud point adjustment, fluid pumping, liquid-liquid separation devices, or a combination thereof) | |

| Example Inputs & Outputs (FIGS. 1A-1D) | |
| --- | --- |
| Inputs | Outputs |
| Heat Input | Heat Output to Application Requiring Heating |
| Electricity (active cloud point adjustment, fluid pumping, liquid-liquid separation devices, or a combination thereof) | |

FIG. 2:

FIG. 2A—Example Step by Step Description—Active UCST Decrease by Concentrating CST Reagent in One or More Combined Streams, System with Multi-Liquid Phase Mixture Separation:

1) Concentrating One or More CST Reagents using One or More Membrane Based Processes: Combined solution (L-1), which may comprise a single liquid phase, may be directed (V-1) as an input solution (L-3) to one or more pumps (P-1). L-3 may be pressurized using P-1, forming one or more pressurized solutions (L-4). L-4 may comprise one or more feed streams to one or more membrane-based processes (for example: Nanofiltration 'NF'), which may form one or more concentrate streams (L-6) and one or more permeate streams (L-5 or LL). Said one or more concentrate streams (L-6) may comprise a greater concentration of one or more CST reagents than said one or more feed streams. Said one or more permeate streams (L-5 or LL) may comprise a lower concentration of one or more CST reagents than said one or more feed streams. Said one or more permeate streams (L-5 or LL) may comprise two or more liquid phases, due to, for example, significantly lower concentration or absence of one or more CST reagents. L-5 or LL may be transferred to one or more permeate and/or permeate equivalent storage units ('Permeate Storage'). L-6 may be directed (V-2) to step '2)' as L-9.

2) Heat Release UCST Phase Change: L-9, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-9 may phase transition into a multi-liquid phase mixture (LL-1). Said phase transition may be, for example, exothermic.

3) Multi-Liquid Phase Mixture Separation: LL-1 may be separated using one or more liquid-liquid separation devices into two or more at least partially separated liquid streams (L-10 and L-11), which may comprise, for example, one or more of the constituent liquid phases of LL-1.

4) Mixing Liquid Phases: L-11 may be mixed with L-10, which may form a multi-liquid phase mixture (LL-2), or a single liquid phase combined solution (L-12), or a combination thereof 5) Heat Absorption UCST Phase Change: The one or more liquid streams from step '4)' LL-2 or L-12 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', the liquid stream or streams from step '4)' may phase transition into a single liquid phase combined solution (L-1). Said phase transition may be, for example, endothermic.

FIG. 2B—Example Step by Step Description—Active UCST Decrease by Concentrating CST Reagent in One or More Combined Streams, System without Multi-Liquid Phase Mixture Separation:

1) Concentrating One or more CST reagents using One or More Membrane Based Processes: Combined solution (L-1), which may comprise a single liquid phase, may be directed (V-1) as an input solution (L-3) to one or more pumps (P-1). L-3 may be pressurized using P-1, forming one or more pressurized solutions (L-4). L-4 may comprise one or more feed streams to one or more membrane-based processes (for example: Nanofiltration 'NF'), which may form one or more concentrate streams (L-6) and one or more permeate streams (L-5 or LL). Said one or more concentrate streams (L-6) may comprise a greater concentration of one or more CST reagents than said one or more feed streams. Said one or more permeate streams (L-5 or LL) may comprise a lower concentration of one or more CST reagents than said one or more feed streams. Said one or more permeate streams (L-5 or LL) may comprise two or more liquid phases, due to, for example, significantly lower concentration or absence of one or more CST reagents. L-5 or LL may be transferred to one or more permeate and/or permeate equivalent storage units ('Permeate Storage'). L-6 may be directed (V-2) to step '2)' as L-9.

2) Heat Release UCST Phase Change: L-9, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-9 may phase transition into a multi-liquid phase mixture (LL-1). Said phase transition may be, for example, exothermic.

3) Heat Absorption UCST Phase Change: LL-1 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', LL-1 may phase transition into a single liquid phase combined solution (L-1). Said phase transition may be, for example, endothermic.

FIG. 2C—Example Step by Step Description—Active UCST Increase by Diluting CST Reagent in One or More Combined Streams with Permeate and/or Permeate Equivalent, System with Multi-Liquid Phase Mixture Separation:

1) Diluting One or more CST reagents in One or More Liquid Phases: Combined solution, L-1, which may comprise a single liquid phase, may be directed (V-1) as an input steam (L-2) to one or more stream merging or mixing process elements (Merge #1), where L-2 may be mixed with permeate or permeate equivalent liquid or a combination thereof (L-7 or LL), which may form a diluted CST reagent solution (L-8). L-8 may comprise a lower concentration of one or more CST reagents relative to, for example, L-2. L-8 may be transferred to step '2)' as L-9.

2) Heat Release UCST Phase Change: L-9, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-9 may phase transition into a multi-liquid phase mixture (LL-1). Said phase transition may be, for example, exothermic.

3) Multi-Liquid Phase Mixture Separation: LL-1 may be separated using one or more liquid-liquid separation devices into two or more at least partially separated liquid streams (L-10 and L-11), which may comprise, for example, one or more of the constituent liquid phases of LL-1.

4) Mixing Liquid Phases: L-11 may be mixed with L-10, which may form a multi-liquid phase mixture (LL-2), or a single liquid phase combined solution (L-12), or a combination thereof 5) Heat Absorption UCST Phase Change: The one or more liquid streams from step '4)' LL-2 or L-12 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', the liquid stream or streams from step '4)' may phase transition into a single liquid phase combined solution (L-1). Said phase transition may be, for example, endothermic.

FIG. 2D—Example Step by Step Description—Maintaining UCST by Bypassing One or More Cloud Point Adjustment Steps, System with Multi-Liquid Phase Mixture Separation, 'Bypassed' Active Cloud Point Adjustment Units may be in Contact with Combined Single Liquid Phase Solution:

1) Bypassing One or More Cloud Point Adjustment Steps: L-1, which may comprise a single liquid phase, may be directed (V-1) as an input steam (L-2) to one or more stream merging or mixing process elements (Merge #1), where L-2 may remain the same or similar composition and may exit Merge #1 as stream L-8. L-2 may also or alternatively bypass the process element 'Merge #1' to, for example, potentially minimize contamination with residual L-7 or LL or other potential residuals in Merge #1. L-8 may comprise the same or similar concentration of one or more CST reagents relative to, for example, L-2. L-8 may be transferred to step '2)' as L-9.

2) Heat Release UCST Phase Change: L-9, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-9 may phase transition into a multi-liquid phase mixture (LL-1). Said phase transition may be, for example, exothermic.

3) Multi-Liquid Phase Mixture Separation: LL-1 may be separated using one or more liquid-liquid separation devices into two or more at least partially separated liquid streams (L-10 and L-11), which may comprise, for example, one or more of the constituent liquid phases of LL-1.

4) Mixing Liquid Phases: L-11 may be mixed with L-10, which may form a multi-liquid phase mixture (LL-2), or a single liquid phase combined solution (L-12), or a combination thereof 5) Heat Absorption UCST Phase Change: The one or more liquid streams from step '4)' LL-2 or L-12 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', the liquid stream or streams from step '4)' may phase transition into a single liquid phase combined solution (L-1). Said phase transition may be, for example, endothermic.

FIG. 2E—Example Step by Step Description—Active UCST Decrease by Concentrating CST Reagent in One or More Separated Streams, System with Multi-Liquid Phase Mixture Separation:

1) Heat Release UCST Phase Change: Combined solution L-1, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-1 may phase transition into a multi-liquid phase mixture (LL-1). Said phase transition may be, for example, exothermic.
2) Multi-Liquid Phase Mixture Separation: LL-1 may be separated using one or more multi-liquid phase separation devices into two or more at least partially separated liquid streams (L-2 and L-3), which may comprise, for example, one or more of the constituent liquid phases of LL-1.
3) Concentrating LCST Reducing Reagents in One or More Liquid Phases: L-2, which may contain one or more CST reagents, may be directed (V-1) as an input steam (L-5) to one or more pumps and/or pressure exchangers (P-1). L-5 may be pressurized in P-1, which may form, for example, one or more pressurized feed solutions (L-6). L-6 may be fed into one or more membrane-based processes (for example: nanofiltration, 'NF'), which may separate L-6 into, for example, one or more concentrate streams (L-8) and/or one or more permeate streams (L-7). Said one or more concentrate streams may be more concentrated in CST reagent relative to L-6. Said one or more permeate streams may contain a lower concentration of one or more CST reagents relative to L-6. L-8 may be transferred to step '4)' as L-11. L-7 may be transferred to permeate and/or permeate equivalent storage ('Permeate Storage').
4) Mixing Liquid Phases: L-11 may be mixed with L-3, which may form a multi-liquid phase mixture (LL-2), or a single liquid phase combined solution (L-12), or a combination thereof
5) Heat Absorption UCST Phase Change: The one or more liquid streams from step '4)' LL-2 or L-12 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', the liquid stream or streams from step '4)' may phase transition into a single liquid phase combined solution (L-1). Said phase transition may be, for example, endothermic.

FIG. 2F—Example Step by Step Description—Active UCST Increase by Diluting CST Reagent in One or More Separated Streams with Permeate and/or Permeate Equivalent, System with Multi-Liquid Phase Mixture Separation:

1) Heat Release UCST Phase Change: Combined solution L-1, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-1 may phase transition into a multi-liquid phase mixture (LL-1). Said phase transition may be, for example, exothermic.
2) Multi-Liquid Phase Mixture Separation: LL-1 may be separated using one or more multi-liquid phase separation devices into two or more at least partially separated liquid streams (L-2 and L-3), which may comprise, for example, one or more of the constituent liquid phases of LL-1.
3) Diluting One or more CST reagents in One or More Liquid Phases: L-2, which may contain one or more CST reagents, may be directed (V-1) as an input steam (L-4) to one or more stream merging or mixing process elements (Merge #1), where L-4 may be mixed with permeate or permeate equivalent liquid or a combination thereof (L-9 or LL), which may form a diluted CST reagent solution (L-10). L-10 may comprise a lower concentration of one or more CST reagents relative to, for example, L-2. L-10 may be transferred to step '4)' as L-11.
4) Mixing Liquid Phases: L-11 may be mixed with L-3, which may form a multi-liquid phase mixture (LL-2), or a single liquid phase combined solution (L-12), or a combination thereof
5) Heat Absorption UCST Phase Change: The one or more liquid streams from step '4)' LL-2 or L-12 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', the liquid stream or streams from step '4)' may phase transition into a single liquid phase combined solution (L-1). Said phase transition may be, for example, endothermic.

FIG. 2G—Example Step by Step Description—Maintaining UCST by Bypassing One or More Cloud Point Adjustment Steps, System with Multi-Liquid Phase Mixture Separation, 'Bypassed' Active Cloud Point Adjustment Units may be in Contact with One or More Separated Liquid Streams:

1) Heat Release UCST Phase Change: Combined solution L-1, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-1 may phase transition into a multi-liquid phase mixture (LL-1). Said phase transition may be, for example, exothermic.
2) Multi-Liquid Phase Mixture Separation: LL-1 may be separated using one or more multi-liquid phase separation devices into two or more at least partially separated liquid streams (L-2 and L-3), which may comprise, for example, one or more of the constituent liquid phases of LL-1.
3) Bypassing One or More Cloud Point Temperature Adjustment Steps: L-2, which may contain one or more CST reagents, may be directed (V-1) as an input steam (L-4) to one or more stream merging or mixing process elements (Merge #1), where L-4 may remain the same or similar composition and may exit Merge #1 as stream L-10. L-4 may also bypass the process element 'Merge #1' to, for example, potentially minimize contamination with residual L-9 or LL or other potential residuals in Merge #1. L-10 may comprise the same or similar concentration of one or more CST reagents relative to, for example, L-2. L-10 may be transferred to step '4)' as L-11.

4) Mixing Liquid Phases: L-11 may be mixed with L-3, which may form a multi-liquid phase mixture (LL-2), or a single liquid phase combined solution (L-12), or a combination thereof 5) Heat Absorption UCST Phase Change: The one or more liquid streams from step '4)' LL-2 or L-12 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', the liquid stream or streams from step '4)' may phase transition into a single liquid phase combined solution (L-1). Said phase transition may be, for example, endothermic.

| Example Inputs & Outputs (FIGS. 2A-2G) | |
|---|---|
| Inputs | Outputs |
| Cool Input or Cool Sink | Cooling Output to Application Requiring Cooling |
| Electricity (active cloud point adjustment, fluid pumping, liquid-liquid separation devices, or a combination thereof) | |

| Example Inputs & Outputs (FIGS. 2A-2G) | |
|---|---|
| Inputs | Outputs |
| Heat Input | Heat Output to Application Requiring Heating |
| Electricity (active cloud point adjustment, fluid pumping, liquid-liquid separation devices, or a combination thereof) | |

Note: UCST liquid system may comprise, including, but not limited to, one or more or a combination of the following:

'UCST solvent': A reagent which may dissolve 'CST reagent' and may exhibit limited solubility in 'Low solubility reagent'

'CST reagent': A reagent which may enable 'low solubility reagent' to be nearly or completely soluble in UCST solvent reagent under certain temperatures and/or other conditions and insoluble or only partially soluble under certain different temperatures and/or other conditions. Increasing the concentration of CST reagent may, for example, decrease UCST.

'Low solubility reagent': A reagent which may possess low solubility in UCST solvent alone, or relatively high solubility in 'CST reagent', or may exhibit complete solubility in UCST solvent in the presence of CST reagent above one or more concentrations and/or at certain temperatures and/or other conditions, or a combination thereof 'High solubility reagent': A reagent which may possess high solubility in UCST solvent alone, or high solubility in 'CST reagent', or high solubility in 'low solubility reagent', or a combination thereof. High solubility reagent may, for example, decrease UCST and/or influence other phase transition properties in the liquid system.

'UCST increasing reagent': A reagent which may possess high solubility in UCST solvent alone, or low solubility in 'CST reagent' alone, or low solubility in 'low solubility reagent' alone, or a combination thereof. Low solubility reagent may, for example, increase UCST and/or influence other phase transition properties in the liquid system.

Note: Depending on the CST reagent and liquid system composition, increasing the concentration of CST reagent beyond a certain concentration relative to 'low solubility reagent' and/or one or more other reagents may transition the liquid system from liquid system possessing an UCST into a liquid system possessing a LCST. Said transition may be exploited in one or more refrigeration cycles or heating cooling transfer systems or extractions or heat engines or one or more applications described herein.

FIG. 3:

FIG. 3—Example Step by Step Description—Active UCST Increase by Increasing the Concentration of One or More UCST Increasing Reagents, System may be, for example, without Multi-Liquid Phase Mixture Separation 1) Concentrating One or More UCST Increasing Reagents using One or More Membrane Based Processes: Combined solution (L-1), which may comprise a single liquid phase, may be directed (V-1) as an input solution (L-3) to one or more pumps (P-1) or pressure exchangers or energy recovery devices or a combination thereof. L-3 may be pressurized using P-1, forming one or more pressurized solutions (L-4). L-4 may comprise one or more feed streams to one or more membrane-based processes (for example: Reverse Osmosis 'RO' or Nanofiltration 'NF'), which may form one or more concentrate streams (L-6) and one or more permeate streams (L-5 or LL). Said one or more concentrate streams (L-6) may comprise a greater concentration of one or more UCST increasing reagents than said one or more feed streams. Said one or more permeate streams (L-5 or LL) may comprise a lower concentration of one or more UCST increasing reagents than said one or more feed streams. L-5 or LL may be transferred to one or more permeate and/or permeate equivalent storage units ('Permeate Storage'). L-6 may be directed (V-2) to step '2)' as L-9.

2) Heat Release UCST Phase Change: L-9, which may comprise a single liquid phase, may be cooled by one or more cold sources or evaporative cooling or one or more applications requiring heating or a combination thereof ('Cool Input Source') in, for example, one or more heat exchangers (RE-1, 'Heat Sink Heat Exchanger'). Before, or during, or after, or a combination thereof said 'cooling', L-9 may phase transition into a multi-liquid phase mixture (LL-1). Said phase transition may be, for example, exothermic.

3) Heat Absorption UCST Phase Change: LL-1 may be 'heated' by one or more applications requiring cooling, or one or more heating sources, or one or more enthalpy sources, or a combination thereof ('Application Requiring Cooling') in, for example, one or more heat exchangers (HE-2, 'Cooling Application Heat Exchanger'). Before, or during, or after, or a combination thereof said 'heating', LL-1 may phase transition into a single liquid phase combined solution (L-1). Said phase transition may be, for example, endothermic.

For example, the present figure may show an active increase of UCST by, for example, increasing the concentration of, for example, one or more reagents which increase UCST with increasing concentration ('UCST Increasing Reagent'). The adjustment of one or more cloud point temperatures may be conducted, for example, by adjusting concentration or composition in the combined single liquid phase solution produced by or following one or more 'heat absorption' steps.

Note: In FIG. 3, it may be desirable for the one or more CST reagents to have a smaller molecular weight or hydration radius than one or more UCST increasing reagents. For example, the one or more UCST increasing reagents may be rejected by one or more membranes, while the CST reagent passes through, at least in part, one or more of said membranes, which may enable, for example, concentrating UCST increasing reagents without or while minimally or to a lesser extent concentrating one or more CST reagents.

Note: In FIG. 3, UCST may be decreased by adding, for example, permeate or permeate equivalent or a combination thereof.

FIG. 4:

FIG. 4 Example Summary of Advantages:

FIG. 4—Example Step by Step Description—LCST Liquid System Refrigeration Cycle, Employing Membrane-Based LCST Reducing Reagent Concentrating and Multi-Liquid Phase Mixture Separation 1) Heat Absorbing Phase Change into Multi-Liquid Phase Mixture: A single liquid phase combined solution (L-7), which may be lean in one or more LCST reducing reagents and contain one or more LCST reagents, LCST binder reagents, or a combination thereof, may be mixed with one or more solutions (L-8) which may be concentrated or rich in one or more LCST reducing reagents and may be lean in one or more LCST reagents and/or LCST binder reagents. Said mixing may result in a phase transition, which may be endothermic, which may form a multi-liquid phase mixture (LL-1). Said mixing may occur before, during, or after or a combination thereof one or more heat exchangers (Heat Exchanger #2), which may heat exchange (HE-2) with one or more applications requiring cooling, or heat removal, or enthalpy sources, or a combination thereof. The liquid system may absorb heat during said phase transition. Said application requiring cooling may be at a similar or lower temperature than the application requiring heating in, for example, step 4.

2) Multi-Liquid Phase Mixture Separation: LL-1 may comprise a multi-liquid phase mixture. LL-1 may be separated into at least a portion of the multi-liquid phase mixture's constituent liquid phases. Said multi-liquid phase mixture's constituent liquid phases may, for example, comprise a liquid phase comprising rich concentrations of one or more LCST reagents, LCST binder reagents, or a combination thereof (L-2) and, for example, may comprise another liquid phase comprising one or more LCST reducing reagents and LCST reagent solvents (L-1).

3) Concentrating One or More LCST Reducing Reagents using One or More Membrane Based Processes: L-1 may be pressurized using one or more pumps or energy recover devices or a combination thereof (P-1), which may form a pressurized feed solution (L-3) to one or more membrane-based processes (for example: Reverse Osmosis 'RO'). Said reverse osmosis may separate L-3 into, for example, one or more concentrate streams (L-5) which may comprise greater concentrations of one or more LCST reducing reagents relative to L-3 and, for example, one or more permeate streams (L-4) which may comprise lower concentrations of one or more LCST reducing reagents relative to L-3 or may be free of one or more LCST reducing reagents. L-5 may undergo one or more pressure and/or other energy recovery steps, or L-4 may undergo one or more pressure and/or other energy recovery steps, or a combination thereof. L-5 may be transferred to one or more 'Concentrate Storage' vessels and/or step '1)'. L-4 may be labeled L-6 in Step '4)'.

4) Heat Releasing LCST Phase Change: L-6, which may comprise a liquid lean in or free of one or more LCST reducing reagents, may be mixed with L-2, which may comprise one or more LCST reagents, LCST binder reagents, or a combination thereof. Said mixing may result in a phase transition, which may be exothermic, which may involve dissolution and may involve forming a single liquid phase combined solution (L-7). Said mixing may occur before, during, or after or a combination thereof one or more heat exchangers (Heat Exchanger #1), which may heat exchange (RE-1) with one or more or a combination of the following: applications requiring heating, or an evaporative cooling step, or a heat sink. The liquid system may release heat during said phase transition. Step '4)' may, if desired, occur at a similar or greater temperature than Step '1)'.

Note: It may be desirable to first treat L-1 with, for example, nanofiltration, to, for example, remove one or more residual LCST reagents, which may form, for example, one or more concentrate streams rich in one or more LCST reagents and one or more permeate streams lean in or free of one or more LCST reagents. Said nanofiltration concentrate solution may be mixed with, for example, L-7. Said nanofiltration feed stream may be a feed stream for one or more reverse osmosis stages, to, for example, concentrate one or more LCST reducing reagents and may form, for example, one or more solutions lean in or free of one or more LCST reducing reagents.

Note: Embodiments described herein may employ pressure or energy recovery devices during one or more membrane-based processes.

FIG. 5:

FIG. 5 Example Summary of Advantages:

FIG. 5A—Example Step by Step Description—UCST Liquid System Refrigeration Cycle, Employing Membrane-Based CST reagent Concentrating and Multi-Liquid Phase Mixture Separation 1) Heat Releasing Phase Change into Multi-Liquid Phase Mixture: A single liquid phase combined solution (L-7), which may be rich in one or more CST reagents, may be mixed with one or more solutions (L-8), which may comprise one or more UCST solvent reagents and may be lean in or free of one or more CST reagents. Said mixing may result in a phase transition, which may be exothermic, which may involve dissolution and forming a multi-liquid phase mixture (LL-1). Said mixing may occur before, during, or after or a combination thereof one or more heat exchangers (Heat Exchanger #2), which may heat exchange (HE-2) with one or more or a combination of the following: applications requiring heating, or an evaporative cooling step, or a heat sink. The liquid system may release heat during said phase transition. Said application requiring heating may be at a similar or greater temperature than the application requiring cooling in, for example, step 4.

2) Multi-Liquid Phase Mixture Separation: LL-1 may comprise a multi-liquid phase mixture. LL-1 may be separated into at least a portion of the multi-liquid phase mixture's constituent liquid phases. Said multi-liquid phase mixture's constituent liquid phases may, for example, comprise a liquid phase comprising one or more 'low solubility reagents' (L-2) and, for example, may comprise another liquid phase comprising one or more CST reagents and UCST solvent reagents (L-1).

3) Concentrating One or More CST reagents using One or More Membrane Based Processes: L-1 may be pressurized using one or more pumps or energy recover devices or a combination thereof (P-1), which may form a pressurized feed solution (L-3) to one or more membrane-based processes (for example: Nanofiltration, 'NF'). Said nanofiltration may separate L-3 into, for example, one or more concentrate streams (L-5) which may comprise UCST solvent with greater concentrations of one or more CST reagents relative to L-3 and, for example, one or more permeate streams (L-4) which may comprise UCST solvent with lower concentrations of one or more CST reagents relative to L-3 or may comprise UCST solvent free of one or more CST reagents. L-5 may undergo one or more pressure and/or other energy recovery steps, or L-4 may undergo one or more pressure and/or other energy recovery steps, or a combination thereof. L-5 may be transferred to one or more 'Permeate Storage' vessels and/or step '1)'. L-4 may be labeled L-6 in Step '4)'.

4) Heat Absorbing UCST Phase Change: L-6, which may comprise UCST solvent with greater concentrations of one or more CST reagents, may be mixed with L-2, which may comprise one or more 'low solubility reagents'. Said mixing may result in a phase transition, which may be endothermic, which may involve dissolution and may involve forming a single liquid phase combined solution (L-7). Said mixing may occur before, during, or after or a combination thereof one or more heat exchangers (Heat Exchanger #1), which may heat exchange (RE-1) with one or more applications requiring cooling, or heat removal, or enthalpy sources, or a combination thereof. The liquid system may absorb heat during said phase transition. Step '4)' may, if desired, occur at a similar or lower temperature than Step '1)'.

FIG. 5E—Example Step by Step Description—UCST Liquid System Refrigeration Cycle, Employing Membrane-Based CST reagent Concentrating with Liquid Separation using Membrane Note: FIG. 5E may employ 'Heat Exchanger #1' and RE-1 within or integrated with or heat exchanged with one or more membrane based concentrating units. During membrane based concentrating, solution on, for example, the retentate side of the membrane may undergo endothermic dissolution.

Note: One or more streams or the liquid system may contain one or more 'high solubility reagents' and/or may contain one or more 'UCST increasing reagents'.

FIG. 6:

FIG. 6 Example Summary of Advantages:

FIG. 6A—Example Step by Step Description—UCST Liquid System Refrigeration Cycle, Employing Membrane-Based CST reagent Concentrating in Combined Solution and Permeate Multi-Liquid Phase Mixture 1) Heat Absorbing UCST Phase Change: L-4, which may comprises UCST solvent with greater concentrations of one or more CST reagents, may be mixed with LL-3, which may comprise a multi-liquid phase mixture of one or more 'low solubility reagents' with one or more 'UCST solvent reagents'. Said mixing may result in a phase transition, which may be endothermic, which may involve dissolution and may involve forming a single liquid phase combined solution (L-1). Said mixing may occur before, during, or after or a combination thereof one or more heat exchangers (Heat Exchanger #2), which may heat exchange (HE-2) with one or more applications requiring cooling, or heat removal, or enthalpy sources, or a combination thereof. The liquid system may absorb heat during said phase transition. Step '1)' may, if desired, occur at a similar or lower temperature than Step '2)'.

2) Concentrating One or More CST reagents using One or More Membrane Based Processes and Potentially Heat Releasing Phase Change: L-1 may be pressurized using one or more pumps or energy recover devices or a combination thereof (P-1), which may form a pressurized feed solution (L-2) to one or more membrane-based processes (for example: Nanofiltration, 'NF'). Said nanofiltration may separate L-2 into, for example, one or more concentrate streams (L-3, and, may comprise L-4 following pressure recovery) which may comprise UCST solvent with greater concentrations of one or more CST reagents relative to L-2 and, for example, one or more permeate streams (LL-2, and, may comprise LL-3 following permeate storage) which may comprise a multi-liquid phase mixture of UCST solvent with lower concentrations of one or more CST reagents relative to L-2 and 'low solubility reagent' or may comprise a multi-liquid phase mixture of UCST solvent free of one or more CST reagents and 'low solubility reagent'. Said permeate stream may comprise UCST solvent and 'low solubility reagent' in the substantial absence or in the presence of a low concentration of one or more CST reagents, which may result in the permeate phase transitioning into two or more liquid phases due to, for example, the low solubility of 'low solubility reagent' in UCST solvent. Said phase transition in the permeate stream may be, for example, exothermic. Said phase transition may occur before, during, or after or a combination thereof one or more heat exchangers (Heat Exchanger #1), which may heat exchange (RE-1) with one or more applications requiring heating, or heat sinks, or evaporative cooling, or a combination thereof. Said heat exchangers may heat exchange directly or indirectly with the membrane-based process, or with the one or more permeate streams exiting said membrane-based process or a combination thereof. L-3 may undergo one or more pressure and/or other energy recovery steps, or LL-2 may undergo one or more pressure and/or other energy recovery steps, or a combination thereof. LL-2 may be transferred to one or more 'Permeate Storage' vessels and/or transferred to step ' 1)' as LL-3. L-3 may be labeled L-4 in Step '1)'.

FIG. 6B—Example Step by Step Description—UCST Liquid System Refrigeration Cycle, Employing Membrane-Based CST reagent Concentrating in Combined Solution and Separation of Multi-Liquid Phase Mixture Permeate, Mixing of UCST solvent reagent in permeate before 'Low Solubility Reagent' in Permeate 1) Concentrating One or More CST reagents using One or More Membrane Based Processes and Potentially Heat Releasing Phase Change: L-1 may be pressurized using one or more pumps or energy recover devices or a combination thereof (P-1), which may form a pressurized feed solution (L-2) to one or more membrane-based processes (for example: Nanofiltration, 'NF'). Said nanofiltration may separate L-2 into, for example, one or more concentrate streams (L-3, and, may comprise L-4 following pressure recovery) which may comprise a solution with greater concentrations of one or more CST reagents relative to L-2 and, for example, one or more permeate streams (LL-2) which may comprise a multi-liquid phase mixture of 'low solubility reagent' and UCST solvent with lower concentrations of one or more CST reagents relative to L-2 or may comprise a multi-liquid phase mixture of 'low solubility reagent' and UCST solvent free of one or more CST reagents. Said permeate stream may comprise UCST solvent and 'low solubility reagent' in the substantial absence or in the presence of a low concentration of one or more CST reagents, which may result in the permeate phase transitioning into two or more liquid phases due to, for example, the relatively low solubility of 'low solubility reagent' in the UCST solvent alone. Said phase transition into two or more liquid phases in the permeate stream may be, for example, exothermic. Said phase transition may occur before, during, or after or a combination thereof one or more heat exchangers (Heat Exchanger #1), which may heat exchange (RE-1) with one or more applications requiring one or more applications requiring heating, or heat sinks, or evaporative cooling, or a combination thereof. Said heat exchangers may heat exchange directly or indirectly with the membrane-based process, or with the one or more permeate streams exiting said membrane-based process or a combination thereof. L-3 may undergo one or more pressure and/or other energy recovery steps, or LL-2 may undergo one or more pressure and/or other energy recovery steps, or a combination thereof. LL-2 may be transferred to step '2)'. L-3 may be labeled L-4 in Step '3)'. 2) Separation of Multi-Liquid Phase Permeate: LL-2 may comprise a multi-liquid phase mixture. LL-2 may be separated into at least a portion of the multi-liquid phase mixture's constituent liquid phases. Said multi-liquid phase mixture's constituent liquid phases may, for example, comprise a liquid phase predominantly comprising one or more 'low solubility reagents' (L-7) and, for example, may comprise another liquid phase predominantly comprising one or more UCST solvent reagents (L-5).
3) Mixing 'UCST solvent' with CST reagent-Rich Concentrate: L-5 may be mixed (MIX #1) with CST reagent-rich concentrate (L-4), which may dissolve and form a lower concentration CST reagent solution (L-6). Said dissolving may be exothermic and heat released, if any, may be heat exchanged with, for example, RE-1.
4) Heat Absorbing UCST Phase Change: L-6 may be mixed with L-7. Said mixing may result in a phase transition, which may be endothermic, which may involve dissolution and may involve forming a single liquid phase combined solution (L-1). Said mixing may occur before, during, or after or a combination thereof one or more heat exchangers (Heat Exchanger #2), which may heat exchange (HE-2) with one or more applications requiring cooling, or heat removal, or enthalpy sources, or a combination thereof. The liquid system may absorb heat during said phase transition. Step '4)' may, if desired, occur at a similar or lower temperature than Step '1)' or Step '3)' or both.

FIG. 6C—Example Step by Step Description—UCST Liquid System Refrigeration Cycle, Employing Membrane-Based CST reagent Concentrating in Combined Solution and Separation of Multi-Liquid Phase Mixture Permeate, Mixing of Low Solubility Reagent in permeate with Concentrate Solution (may be Endothermic) before 'Low Solubility Reagent' in Permeate 1) Concentrating One or More CST reagents using One or More Membrane Based Processes and Potentially Heat Releasing (Potentially Exothermic) Phase Change: L-1 may be pressurized using one or more pumps or energy recover devices or a combination thereof (P-1), which may form a pressurized feed solution (L-2) to one or more membrane-based processes (for example: Nanofiltration, 'NF'). Said nanofiltration may separate L-2 into, for example, one or more concentrate streams (L-3, and, may comprise L-4 following pressure recovery) which may comprise a solution with greater concentrations of one or more CST reagents relative to L-2 and, for example, one or more permeate streams (LL-2) which may comprise a multi-liquid phase mixture of 'low solubility reagent' and UCST solvent with lower concentrations of one or more CST reagents relative to L-2 or may comprise a multi-liquid phase mixture of 'low solubility reagent' and UCST solvent free of one or more CST reagents. Said permeate stream may comprise UCST solvent and 'low solubility reagent' in the substantial absence or in the presence of a low concentration of one or more CST reagents, which may result in the permeate phase transitioning into two or more liquid phases due to, for example, the relatively low solubility of 'low solubility reagent' in the UCST solvent alone. Said phase transition into two or more liquid phases in the permeate stream may be, for example, exothermic. Said phase transition may occur before, during, or after or a combination thereof one or more heat exchangers (Heat Exchanger #1), which may heat exchange (RE-1) with one or more applications requiring heating, or heat sinks, or evaporative cooling, or a combination thereof. Said heat exchangers may heat exchange directly or indirectly with the membrane-based process, or with the one or more permeate streams exiting said membrane-based process or a combination thereof. L-3 may undergo one or more pressure and/or other energy recovery steps, or LL-2 may undergo one or more pressure and/or other energy recovery steps, or a combination thereof. LL-2 may be transferred to step '2)'. L-3 may be labeled L-4 in Step '3)'.
2) Separation of Multi-Liquid Phase Permeate: LL-2 may comprise a multi-liquid phase mixture. LL-2 may be separated into at least a portion of the multi-liquid phase mixture's constituent liquid phases. Said multi-liquid phase mixture's constituent liquid phases may, for example, comprise a liquid phase predominantly comprising one or more 'low solubility reagents' (L-5) and, for example, may comprise another liquid phase predominantly comprising one or more UCST solvent reagents (L-7). L-7 may be labeled L-8 in transfer to step '4)'.
3) Heat Absorbing UCST Phase Change: L-4, which may comprise UCST solvent with greater concentrations of one or more CST reagents relative to L-2, may be mixed with L-5, which may comprise a liquid phase predominantly comprising one or more 'low solubility reagents'. Said mixing may result in a phase transition, which may be endothermic, which may involve dissolution and may involve forming a single liquid phase combined solution (L-6). Said mixing may occur before, during, or after or a combination thereof one or more heat exchangers (Heat Exchanger #2), which may heat exchange (HE-2) with one or more applications requiring cooling, or heat removal, or enthalpy sources, or a combination thereof. The liquid system may absorb heat during said phase transition. Step '3)' may, if desired, occur at a similar or lower temperature than Step ' 1)'.

4) Mixing 'UCST solvent' Permeate Phase with Solution Previously Mixed with 'Low Solubility Reagent' Permeate Phase: L-8 may be mixed with L-6 ('Mix #1'), which may result in dissolution, which may form a combined single liquid phase solution (L-1), which may contain the constituent reagents of the end-to-end liquid system. Said dissolution may be heat releasing or exothermic.

Note: One or more reagents may be stored, for example, in buffer storage. Fresh streams or makeup streams or new inputs may be employed if desired.

FIG. 7:

FIG. 7 Example Summary of Advantages:

FIG. 7—Example Step by Step Description—UCST Liquid System Refrigeration Cycle, Employing Membrane-Based Concentrating of UCST Increasing Reagent 1) Concentrating UCST Increasing Reagents using One or More Membrane Based Processes and Potentially Heat Releasing (Potentially Exothermic) Phase Change: L-1 may be pressurized using one or more pumps or energy recover devices or a combination thereof (P-1), which may form a pressurized feed solution (L-2) to one or more membrane-based processes (for example: Reverse Osmosis 'RO' or Low Molecular Weight Cutoff Nanofiltration 'Low MWCO NF'). Said membrane-based process may separate L-2 into, for example, one or more concentrate streams (LL-1, and, may comprise LL-2 following pressure recovery) which may comprise a multi-liquid phase mixture of 'low solubility reagent' and UCST solvent with greater concentrations of one or more UCST increasing reagents relative to L-2 and, for example, one or more permeate streams (L-3 and L-4), which may comprise a single liquid phase solution with a lower concentration of one or more UCST increasing reagents relative to L-2. Said concentrate stream may comprise UCST solvent and 'low solubility reagent' with a higher concentration of one or more UCST increasing reagents, which may result in the permeate phase transitioning into two or more liquid phases due to, for example, the increasing in UCST temperature from the increase in concentration of UCST increasing reagents. Said phase transition into two or more liquid phases in the concentrate stream may be, for example, exothermic. Said phase transition may occur before, during, or after or a combination thereof one or more heat exchangers (Heat Exchanger #1), which may heat exchange (RE-1) with one or more applications requiring one or more applications requiring heating, or heat sinks, or evaporative cooling, or a combination thereof. Said heat exchangers may heat exchange directly or indirectly with the membrane-based process, or with the one or more permeate streams exiting said membrane-based process or a combination thereof. L-3 may undergo one or more pressure and/or other energy recovery steps, or LL-2 may undergo one or more pressure and/or other energy recovery steps, or a combination thereof. LL-2 may be transferred to step '2)'. L-3 may be labeled L-4 in Step '2)'.

2) Mixing Permeate and Concentrate Streams (Potentially Heat Absorbing) Dissolution Phase Change: LL-2 may be mixed with L-4. Said mixing may result in a phase transition, which may be endothermic, which may involve dissolution and may involve forming a single liquid phase combined solution (L-1). Said mixing may occur before, during, or after or a combination thereof one or more heat exchangers (Heat Exchanger #2), which may heat exchange (HE-2) with one or more applications requiring cooling, or heat removal, or enthalpy sources, or a combination thereof. The liquid system may absorb heat during said phase transition. Step '2)' may, if desired, occur at a similar or lower temperature than Step '1)'.

Note: Said concentrate stream comprising a multi-liquid phase mixture may undergo separation, at least in part, into its constituent liquid phases. One or more of the constituent liquid phases of the concentrate stream may be mixed with the permeate stream before or after or simultaneously, or a combination thereof one or more other constituent liquid phases of the concentrate stream.

Note: The present embodiment may employ a LCST phase change and LCST reducing reagents, in which case, exothermic and endothermic steps in the UCST system may be respectively reversed in the LCST system and UCST increasing reagents may be substituted with LCST reducing reagents.

FIG. 8:

FIG. 8 Example Summary of Advantages:

Summary Description: FIG. 8 shows an example refrigeration cycle employing membrane based process to form a concentrate and permeate stream from a multi-liquid phase mixture and may facilitate endothermic dissolution during said membrane based process in the retentate solution. The present embodiment may reduce or eliminate the need for a multi-liquid phase separation device preceding the membrane based concentrating step. The present embodiment may also enable in situ heat absorption phase transition during membrane-based concentrating.

FIG. 9:

FIG. 9 Example Summary of Advantages: May enable greater temperature difference between heat absorbing and heat releasing stages, allowing, for example, for high efficiency liquid phase change refrigeration cycles to operate with greater temperature difference demands, which may, for example, enable a wider range of applications which may require a greater temperature difference between heated and cooled sides of a refrigeration or heat pump system.

Summary Description: One or more refrigeration cycles may be interconnected with one or more other refrigeration cycles. For example, the heat releasing side of one refrigeration cycle may be interconnected to one or more heat absorbing sides of another refrigeration cycle. Different refrigeration cycles, for example, refrigeration cycles with different operating principles or the same operating principles or both, may be interconnected. Refrigeration cycle may also refer to a heat pump cycle.

FIG. 10:

FIG. 10 Example Summary of Advantages:

FIG. 10—Example Step by Step Description—UCST Volatile Gas Absorption Refrigeration Cycle with Cool Input UCST Phase Change 1) Evaporation of a Portion of Liquid Phase Comprising Substantially 'Low Solubility Reagent' (Heat Absorption): A volatile liquid (L-3), which may comprise substantially 'low Solubility Reagent' (although may comprise other residual reagents), enters one or more evaporators ('Evaporator'), which may reduce the pressure and/or facilitate the evaporation of at least a portion of the liquid into the gaseous phase (G-1). Said evaporation may be endothermic and may be heat exchanged (RE-1) with one or more applications requiring cooling, or heat sources, or enthalpy sources, or a combination thereof ('Cooled by RE-1'). Due to, for example, the presence of residual non-volatile and/or less volatile reagents, a stream comprising, for example, residual UCST solvent and/or CST reagent, may also exit said evaporator as a liquid or solid or a combination thereof (L-4, note: in the present figure, L-4 may comprise a liquid).

2) Compression: G-1, which may comprise substantially gaseous 'low Solubility Reagent', may enter one or more compressors, which may compress G-1 to form, for example, pressurized G-1 (G-2).

3) Absorption of 'Low Solubility Reagent' (Heat Release): G-2 may be absorbed into stream L-2, or stream L-4, or a combination thereof, which may result in a combined solution (L-1). Said absorption may be exothermic and may be heat exchanged (HE-2) with one or more applications requiring heating, or cool sources, or cool sink, or evaporative cooling, or enthalpy sources, or a combination thereof ('Heated by HE-2').

4) Cooling Below UCST to Form Multi-Liquid Phase Mixture: L-1 may be cooled to at or below its UCST, which may result in the formation of a multi-liquid phase mixture (LL-1). Said cooling may involve heat exchange (HE-3) with a small portion of RE-1, or cooling from evaporative cooling, or non-parasitic sources of cooling, or air cooling, or a combination thereof ('Minor Cooling'). It may be important to note the cooling requirement in 'Minor Cooling' may be lower or significantly lower than the heat absorbed or cooling generated in the 'Evaporator'.

5) Separation of Multi-Liquid Phase Mixture into Constituent Reagents: LL-1 may comprise a mixture of a constituent liquid phase comprising substantially UCST solvent and CST reagent and a constituent liquid phase comprising substantially 'low solubility reagent'. Said constituent liquid phases may be at least partially separated, which may form a stream comprising substantially UCST solvent and CST reagent (L-2) and a stream comprising substantially 'low solubility reagent' (L-3).

Note: Example Reagents, may include, but are not limited to, one or more or a combination of the following:

UCST solvent Reagent (for example: Water)

CST reagent (for example: PPG, Polyethylene Glycol Dimethyl Ether (PEGDME), PEG, or a combination thereof)

Low Solubility Reagent or Refrigerant (may comprise a volatile liquid with low solubility in water, however miscible solubility in CST reagent, for example: ethyl acetate, methyl acetate, methyl formate, dimethyl ether, diethyl ether, dimethoxymethane, diethoxymethane, carbon dioxide, or a combination thereof)

Note: The present embodiment may employ active cloud point adjustment. For example, one or more embodiments describing active cloud point adjustment herein may be employed.

FIG. 11:

FIG. 11 Example Summary of Advantages:

FIG. 11—Example Step by Step Description—UCST Volatile Gas Absorption Refrigeration Cycle with Permeate Addition UCST Phase Change 1) Evaporation of a Portion of Liquid Phase Comprising Substantially 'Low Solubility Reagent' (Heat Absorption): A volatile liquid (L-3), which may comprise substantially 'low Solubility Reagent' (although may comprise other residual reagents), may enter one or more evaporators ('Evaporator'), which may reduce the pressure and/or facilitate the evaporation of at least a portion of the liquid into the gaseous phase (G-1). Said evaporation may be endothermic and may be heat exchanged (RE-1) with one or more applications requiring cooling, or heat sources, or enthalpy sources, or a combination thereof ('Cooled by RE-1'). Due to, for example, the presence of residual non-volatile and/or less volatile reagents, a stream comprising, for example, residual UCST solvent and/or CST reagent, may also exit said evaporator as a liquid or solid or a combination thereof (L-4, note: in the present figure, L-4 may comprise a liquid).

2) Compression: G-1, which may comprise substantially gaseous 'low Solubility Reagent', may enter one or more compressors, which may compress G-1 to form, for example, pressurized G-1 (G-2).

3) Absorption of 'Low Solubility Reagent' (Heat Release): G-2 may be absorbed into stream L-6, or stream L-4, or a combination thereof, which may result in a combined solution (L-1). Said absorption may be exothermic and may be heat exchanged (HE-2) with one or more applications requiring heating, or cool sources, or cool sink, or evaporative cooling, or enthalpy sources, or a combination thereof ('Heated by HE-2'). 4) Phase Transition Induced by Reagent Addition (Heat Release): Permeate or permeate equivalent (L-8), which may comprise substantially UCST solvent, may be added to L-1, which may result in a phase transition forming a multi-liquid phase mixture (LL-1). Said phase transition may be exothermic and may be heat exchanged (HE-3) with one or more applications requiring heating, or heat sinks, or evaporative cooling, or a combination thereof (Heated by HE-3).

5) Separation of Multi-Liquid Phase Mixture into Constituent Reagents: LL-1 may comprise a mixture of a constituent liquid phase comprising substantially UCST solvent and CST reagent and a constituent liquid phase comprising substantially 'low solubility reagent'. Said constituent liquid phases may be at least partially separated, which may form a stream comprising substantially UCST solvent and CST reagent (L-2) and a stream comprising substantially 'low solubility reagent' (L-3). L-3 may be transferred to step '1)'. L-2 may be transferred to step '6)'.

6) Concentrating One or More CST reagents and Recovering Added Permeate using One or More Membrane Based Processes: L-2 may be pressurized using one or more pumps or energy recover devices or a combination thereof (P-1), which may form a pressurized feed solution (L-5) to one or more membrane-based processes (for example: Nanofiltration, 'NF'). Said nanofiltration may separate L-5 into, for example, one or more concentrate streams (L-6) which may comprise UCST solvent with greater concentrations of one or more CST reagents relative to L-2 and, for example, one or more permeate streams (L-7) which may comprise UCST solvent with lower concentrations of one or more CST reagents relative to L-2 or may comprise UCST solvent free of one or more CST reagents. L-6 may undergo one or more pressure and/or other energy recovery steps, or L-7 may undergo one or more pressure and/or other energy recovery steps, or a combination thereof. L-7 may be transferred to one or more 'Permeate Storage' vessels and/or step '1)'. L-6 may be transferred to step '1)'.

Note: The present embodiment may also or alternatively be employed as a heat or cool transfer system.

FIG. 12:

FIG. 12 Example Summary of Advantages:

FIG. 12—Example Step by Step Description—LCST Volatile Gas Absorption Refrigeration Cycle with Heat Input LCST Phase Change 1) Evaporation of a Portion of Liquid Phase Comprising Substantially Refrigerant (Heat Absorption): L-3, which may comprise substantially refrigerant and LCST reagent, may enter one or more evaporators ('Evaporator') which may reduce the pressure and/or facilitate the evaporation of at least a portion of refrigerant into the gaseous phase (G-1). Said evaporation may be endothermic and may be heat exchanged (RE-1) with one or more applications requiring cooling, or heat sources, or enthalpy sources, or a combination thereof ('Cooled by RE-1'). During or following evaporation, remaining solution (L-4), which may comprise LCST reagent and residual refrigerant, may be transferred to the absorber stage or may be mixed with L-2 or may be transferred to step '3)' or a combination thereof.

2) Compression: G-1, which may comprise substantially gaseous refrigerant, may enter one or more compressors, which may compress G-1 to form, for example, pressurized G-1 (G-2).

3) Absorption of Refrigerant (Heat Release): G-2 may be absorbed into stream L-2, or stream L-4, or a combination thereof, which may result in a combined solution (L-1). Said absorption may be exothermic and may be heat exchanged (HE-2) with one or more applications requiring heating, or cool sources, or cool sink, or evaporative cooling, or enthalpy sources, or a combination thereof ('Heated by HE-2').

4) Heating Above LCST to Form Multi-Liquid Phase Mixture: (Heat Absorbing): L-1 may be heated to at or above its LCST, which may result in the formation of a multi-liquid phase mixture (LL-1). Said heat exchanging may involve heat exchange (HE-3) with a one or more heat sources, one or more applications requiring cooling, or waste heat, or compressor waste heat, or non-parasitic sources of heating, or other sources of heating, or a combination thereof ('Minor Heating').

5) Separation of Multi-Liquid Phase Mixture into Constituent Reagents: LL-1 may comprise a mixture of a constituent liquid phase comprising substantially LCST solvent reagent and a constituent liquid phase comprising substantially refrigerant and LCST reagent. Said constituent liquid phases may be at least partially separated, which may form a stream comprising substantially LCST reagent (L-2) and a stream comprising substantially refrigerant and LCST reagent (L-3).

Note: Refrigerant may comprise LCST binder reagent.

EXEMPLARY EMBODIMENTS

Example Embodiments 1 [UCST]

A refrigeration or heat pump cycle comprising:
1) A heat absorbing step wherein two or more liquid phases are mixed and dissolve endothermically; and
2) A heat releasing step wherein a single liquid phase or liquid phases of different compositions or volumes exothermically phase transition into two or more liquid phases and/or into liquid phases of different compositions or volumes Further comprising adjusting the concentrations or compositions of one or more liquid phases between, before, during or after, or a combination thereof step '1)' or step '2)' such that the phase transition temperature of step '1)' is different than the phase transition temperature of step '2)'

A refrigeration or heat pump cycle comprising:
1) A heat absorbing step wherein two or more liquid phases are mixed and dissolve endothermically; and
2) A heat releasing step wherein a single liquid phase or liquid phases of different compositions or volumes exothermically phase transition into two or more liquid phases and/or into liquid phases of different compositions or volumes Further comprising adjusting the concentrations or compositions or pressure of one or more liquid phases between, before, during or after, or a combination thereof step '1)' or step 2)' such that the phase transition temperature of step '1)' is different than the phase transition temperature of step '2)'

A refrigeration or heat pump cycle comprising:
1) A heat absorbing step wherein two or more liquid phases are mixed and dissolve endothermically; and
2) A heat releasing step wherein a single liquid phase or liquid phases of different compositions or volumes exothermically phase transition into two or more liquid phases and/or into liquid phases of different compositions or volumes Further comprising adjusting the phase transition temperature between, before, during or after, or a combination thereof step '1)' or step '2)' such that the phase transition temperature of step '1)' is different than the phase transition temperature of step '2)'

A refrigeration or heat pump cycle comprising:
1) A heat absorbing step wherein two or more liquid phases are mixed and/or dissolve endothermically; and 2) A heat releasing step wherein a single liquid phase and/or liquid phases of different compositions or volumes exothermically form two or more liquid phases and/or into liquid phases of different compositions or volumes Further comprising adjusting the concentrations or compositions of one or more liquid phases between, before, during or after, or a combination thereof step '1)' or step '2)' such that the phase transition temperature of step '1)' is different than the phase transition temperature of step '2)'

A refrigeration or heat pump cycle comprising:
1) A heat absorbing step wherein two or more liquid phases are mixed and dissolve endothermically; and
2) A heat releasing step wherein a single liquid phase and/or liquid phases of different compositions or volumes exothermically form two or more liquid phases and/or into liquid phases of different compositions or volumes Further comprising adjusting the phase transition temperature between, before, during or after, or a combination thereof step '1)' or step '2)' such that the phase transition temperature of step '1)' is different than the phase transition temperature of step '2)'

Example Embodiments 2 [LCST]

A refrigeration or heat pump cycle comprising:
1) A heat releasing step wherein two or more liquid phases are mixed and dissolve exothermically; and
2) A heat absorbing step wherein a single liquid phase or liquid phases of different compositions or volumes endothermically phase transition into two or more liquid phases and/or into liquid phases of different compositions or volumes
Further comprising adjusting the concentrations or compositions of one or more liquid phases between, before, during or after, or a combination thereof step '1)' or step '2)' such that the phase transition temperature of step '1)' is different than the phase transition temperature of step '2)'

A refrigeration or heat pump cycle comprising:
1) A heat releasing step wherein two or more liquid phases are mixed and dissolve exothermically; and
2) A heat absorbing step wherein a single liquid phase or liquid phases of different compositions or volumes endothermically phase transition into two or more liquid phases and/or into liquid phases of different compositions or volumes
Further comprising adjusting the concentrations or compositions or pressure of one or more liquid phases between, before, during or after, or a combination thereof step '1)' or step '2)' such that the phase transition temperature of step '1)' is different than the phase transition temperature of step '2)'

A refrigeration or heat pump cycle comprising:
1) A heat releasing step wherein two or more liquid phases are mixed and dissolve exothermically; and
2) A heat absorbing step wherein a single liquid phase or liquid phases of different compositions or volumes endothermically form two or more liquid phases and/or into liquid phases of different compositions or volumes
Further comprising adjusting the phase transition temperature between, before, during or after, or a combination thereof step '1)' or step '2)' such that the phase transition temperature of step '1)' is different than the phase transition temperature of step '2)'

A refrigeration or heat pump cycle comprising:
1) A heat releasing step wherein two or more liquid phases are mixed and dissolve exothermically; and
2) A heat absorbing step wherein a single liquid phase and/or liquid phases of different compositions or volumes endothermically phase transition into two or more liquid phases and/or into liquid phases of different compositions or volumes
Further comprising adjusting the concentrations or compositions of one or more liquid phases between, before, during or after, or a combination thereof step '1)' or step '2)' such that the phase transition temperature of one or more liquid solutions in step '1)' is different than the phase transition temperature of one or more solutions in step '2)'

A refrigeration or heat pump cycle comprising:
1) A heat releasing step wherein two or more liquid phases are mixed and dissolve exothermically; and
2) A heat absorbing step wherein a single liquid phase and/or liquid phases of different compositions or volumes endothermically phase transition into two or more liquid phases and/or into liquid phases of different compositions or volumes
Further comprising adjusting the phase transition temperature between, before, during or after, or a combination thereof step '1)' or step '2)' such that the phase transition temperature of step '1)' is different than the phase transition temperature of step '2)'

Example Sub-Embodiments

Wherein said multi-liquid phase mixture may be separated, at least in part, into constituent liquid phases Wherein said adjusting the phase transition temperature involves adjusting the composition, concentration or a combination thereof of one or more separated liquid phases from the multi-liquid phase mixture Wherein said adjusting the phase transition temperature involves adjusting the composition, concentration or a combination thereof of one or more reagents in one or more separated liquid phases which may have been separated from a multi-liquid phase mixture Wherein said adjusting the phase transition temperature involves adjusting the composition, concentration or a combination thereof of one or more reagents in a combined solution Wherein said adjusting the phase transition temperature results in said heat releasing step occurring, at least in part, at a different temperature than said heat absorbing step Wherein said adjusting the phase transition temperature results in said heat releasing occurring, at least in part, at a greater temperature than said heat absorbing Wherein said adjusting the phase transition temperature is reversible Wherein said adjusting the concentrations or compositions of one or more liquid phases is reversed within the cycle Wherein said cycle is continuous, semi-continuous, batch, or a combination thereof Wherein said adjusting the phase transition temperature involves the addition of one or more reagents Wherein said adjusting the phase transition temperature involves increasing the concentration of one or more reagents using one or more membrane-based processes Wherein said adjusting the phase transition temperature involves decreasing or diluting the concentration of one or more reagents using the addition of permeate and/or permeate equivalent Wherein said adjusting the phase transition temperature involves the addition of one or more reagents Wherein said one or more reagents are regenerated within the cycle Wherein said adjusting the concentrations or compositions of one or more liquid phases may be conducted using one or more membrane based processes Wherein said one or more membrane based processes comprise one or more or a combination of the following: reverse osmosis, or nanofiltration, or ultrafiltration, or osmotically assisted membrane based process, or forward osmosis Wherein said phase transition comprises a UCST, LCST, or both, or a combination thereof The process of claim 1 wherein there are more than one of one or more or a combination of the following steps: heat absorbing, heat releasing, or cloud point adjusting, Example Embodiments 3 [UCST Absorption Refrigeration Cycle]

An absorption refrigeration cycle comprising:
    An absorption solution comprising water and one or more CST reagents
    A refrigerant which exhibits substantial or miscible solubility in said absorption solution above one or more temperatures and limited solubility or immiscible solubility below one or more of said temperatures
    Wherein a solution comprising said absorption solution and refrigerant exhibits one or more upper critical solution temperatures An absorption refrigeration cycle comprising:
    An absorption solution
    A refrigerant which exhibits substantial or miscible solubility in said absorption solution above one or more temperatures and limited solubility or immiscible solubility below one or more of said temperatures
    Wherein a solution comprising said absorption solution and refrigerant exhibits one or more upper critical solution temperatures An absorption refrigeration cycle comprising:
    An absorption solution
    A refrigerant which exhibits one or more UCSTs in a solution comprising refrigerant and absorption solution An absorption refrigeration cycle comprising:
    An absorption solution comprising UCST solvent and one or more CST reagents
    A refrigerant which exhibits substantial or miscible solubility in said absorption solution above one or more temperatures and limited solubility or immiscible solubility below one or more of said temperatures
    Wherein a solution comprising said absorption solution and refrigerant exhibits one or more upper critical solution temperatures An absorption refrigeration cycle comprising:
    An absorption solution comprising UCST solvent and one or more CST reagents
    A refrigerant which exhibits UCST solubility in said absorption solution An absorption refrigeration cycle comprising:
    An absorption solution comprising UCST solvent and one or more CST reagents
    A refrigerant which exhibits UCST solubility in a solution dissolved with or in said absorption solution An absorption refrigeration cycle comprising:
    An absorption solution comprising solvent and one or more CST reagents
    A refrigerant which exhibits UCST solubility in said absorption solution Example Sub-Embodiments Wherein refrigerant is evaporated in a heat absorbing step and absorbed into said absorption solution in a heat releasing step, forming an absorption solution—refrigerant solution Wherein the UCST of said absorption solution—refrigerant solution is adjusted such that said absorption solution—refrigerant solution phase transitions into a multi-liquid phase mixture Wherein said multi-liquid phase mixture comprises at least one liquid phase comprising predominantly refrigerant Wherein said multi-liquid phase mixture comprises at least one liquid phase comprising predominantly absorption solution Wherein said multi-liquid phase mixture is separated, at least in part, into constituent liquid phases Wherein said UCST adjusting occurs by adding solvent Wherein said solvent is regenerated from said liquid phase comprising predominantly absorption solution by separating at least a portion of solvent using one or more membrane-based processes Wherein refrigerant is evaporated in a heat absorbing step and absorbed into said absorption solution in a heat releasing step, forming an absorption solution—refrigerant solution Wherein the UCST of said absorption solution—refrigerant solution is adjusted such that said absorption solution—refrigerant solution phase transitions into a multi-liquid phase mixture Wherein said phase transition into a multi-liquid phase mixture may also comprise a heat releasing step Wherein said multi-liquid phase mixture comprises at least one liquid phase comprising predominantly refrigerant Wherein said multi-liquid phase mixture comprises at least one liquid phase comprising predominantly absorption solution Wherein said multi-liquid phase mixture is separated, at least in part, into constituent liquid phases Wherein said UCST adjusting occurs by adding solvent Wherein said solvent is regenerated from said liquid phase comprising predominantly absorption solution by separating at least a portion of solvent using one or more membrane-based processes Wherein refrigerant is evaporated in a heat absorbing step and absorbed into said absorption solution in a heat releasing step, forming an absorption solution—refrigerant solution Wherein said absorption solution—refrigerant solution is cooled or composition adjusted, or a combination thereof such that said absorption solution—refrigerant solution phase transitions into a multi-liquid phase mixture Wherein said phase transition into a multi-liquid phase mixture may also comprise a heat releasing step Wherein said multi-liquid phase mixture comprises at least one liquid phase comprising predominantly refrigerant Wherein said multi-liquid phase mixture comprises at least one liquid phase comprising predominantly absorption solution Wherein said multi-liquid phase mixture is separated, at least in part, into constituent liquid phases Wherein said UCST adjusting occurs by adding solvent Wherein said solvent is regenerated from said liquid phase comprising predominantly absorption solution by separating at least a portion of solvent using one or more membrane-based processes Wherein refrigerant is evaporated in a heat absorbing step and absorbed into said absorption solution in a heat releasing step, forming an absorption solution—refrigerant solution Wherein said absorption solution—refrigerant solution is cooled or a combination thereof such that said absorption solution—refrigerant solution phase transitions into a multi-liquid phase mixture Wherein said phase transition into a multi-liquid phase mixture may also comprise a heat releasing step Wherein said multi-liquid phase mixture comprises at least one liquid phase comprising predominantly refrigerant Wherein said multi-liquid phase mixture comprises at least one liquid phase comprising predominantly absorption solution Wherein said multi-liquid phase mixture is separated, at least in part, into constituent liquid phases Wherein refrigerant is evaporated in a heat absorbing step and absorbed into said absorption solution in a heat releasing step, forming an absorption solution—refrigerant solution Wherein the UCST of said absorption solution—refrigerant solution is adjusted such that said absorption solution—refrigerant solution phase transitions into a multi-liquid phase mixture Wherein said phase transition into a multi-liquid phase mixture may also comprise a heat releasing step Wherein said multi-liquid phase mixture comprises at least one liquid phase comprising predominantly refrigerant Wherein said multi-liquid phase mixture comprises at least one liquid phase comprising predominantly absorption solution Wherein said multi-liquid phase mixture is separated, at least in part, into constituent liquid phases Wherein said UCST adjusting occurs by adding solvent Wherein said solvent is regenerated from said liquid phase comprising predominantly absorption solution by separating at least a portion of solvent using one or more membrane-based processes Wherein refrigerant liquid phase is regenerated by adjusting the concentration, composition, or a combination thereof of absorption solution—refrigerant solution such that the UCST increases and the absorption solution—refrigerant solution phase transitions into two or more liquid phases, Wherein at least one of said liquid phases comprises predominantly refrigerant Wherein at least one of said liquid phases comprises predominantly absorption solution Wherein refrigerant liquid phase is regenerated by adding water or 'solvent' to absorption solution—refrigerant such that the UCST increases and the liquid system phase transitions into two or more liquid phases, Wherein at least one of said liquid phases comprises predominantly refrigerant Wherein said two or more liquid phases are at least in part separated Wherein said water or 'solvent' is regenerated using one or more membrane-based processes from at least one of said liquid streams or liquid phases or separated liquid phases Wherein said liquid phase comprising predominantly refrigerant may contain residual other reagents Wherein said liquid phase comprising predominantly refrigerant may contain residual absorption solution Wherein said liquid phase comprising predominantly refrigerant may contain residual absorption solution reagents Further comprising returning said residual reagents to the absorption stage before, during, or following the evaporation of refrigerant Wherein said liquid phase comprising predominantly absorption solution may contain residual other reagents Wherein said liquid phase comprising predominantly absorption solution may contain residual refrigerant Wherein said liquid phase comprising predominantly absorption solution may contain residual refrigerant reagents Wherein absorption solution liquid phase comprises one or more or a combination of the following: UCST solvent, CST reagent, high solubility reagent, low solubility reagent, residual low solubility reagent which may comprise refrigerant, residual refrigerant, UCST increasing reagent, or a combination thereof Wherein refrigerant liquid phase comprises one or more or a combination of the following: refrigerant, low solubility reagent, low solubility reagent which may comprise refrigerant, residual high solubility reagent, residual UCST solvent, residual CST reagent, residual UCST increasing reagent, or a combination thereof Wherein absorption solution comprises one or more or a combination of the following: water, ammonia, amine, salts, organic solvent, polar organic solvent, reagents with temperature sensitive solubility, reagents with temperature sensitive osmotic pressure, reagents with LCST in water, reagents with UCST in water, CST reagent, organic compound, polypropylene glycol, polyethylene glycol, polyethylene glycol dimethyl ether Wherein refrigerant comprises one or more or a combination of the following: methyl acetate, ethyl acetate, alcohol, ester, dimethyl ether, diethyl ether, methyl formate, aldehyde, ether, diol, ketone, hydrocarbon, cyclic hydrocarbon, polar hydrocarbon, non-polar hydrocarbon, inorganic compound, inorganic reagent Example Embodiments 3 [LCST Absorption Refrigeration Cycle]

An absorption refrigeration cycle comprising:
An absorption solution comprising LCST reagent
A refrigerant liquid phase comprising LCST solvent reagent
Wherein a solution comprising refrigerant and LCST reagent exhibits one or more LCSTs An absorption refrigeration cycle comprising:
An absorption solution comprising LCST reagent, or LCST binder reagent, or a combination thereof
A refrigerant liquid phase comprising LCST solvent reagent
Wherein a solution comprising refrigerant, LCST reagent, and LCST binder reagent exhibits one or more LCSTs An absorption refrigeration cycle comprising:
An absorption solution comprising one or more CST reagents
A refrigerant liquid phase comprising water, ammonia, or a combination thereof
Wherein a solution comprising refrigerant and LCST reagent exhibits one or more LCSTs An absorption refrigeration cycle comprising:
  An absorption solution comprising one or more CST reagents and one or more non-volatile binder reagents
  A refrigerant liquid phase comprising water, ammonia, or a combination thereof
  Wherein a solution comprising refrigerant and LCST reagent exhibits one or more LCSTs Example Sub-Embodiments Wherein refrigerant is evaporated in a heat absorbing step and absorbed into said absorption solution in a heat releasing step, forming an absorption solution—refrigerant solution
Wherein said absorption solution—refrigerant solution phase transitions into a multi-liquid phase mixture
Wherein said multi-liquid phase mixture comprises at least one liquid phase comprising predominantly refrigerant
Wherein said multi-liquid phase mixture comprises at least one liquid phase comprising predominantly absorption solution
Wherein said multi-liquid phase mixture is separated, at least in part, into constituent liquid phases
Wherein refrigerant is evaporated in a heat absorbing step and absorbed into said absorption solution in a heat releasing step, forming an absorption solution—refrigerant solution
Wherein said absorption solution—refrigerant solution phase transitions into a multi-liquid phase mixture
Wherein said multi-liquid phase mixture comprises at least one liquid phase comprising predominantly refrigerant
Wherein said multi-liquid phase mixture comprises at least one liquid phase comprising predominantly absorption solution
Wherein said multi-liquid phase mixture is separated, at least in part, into constituent liquid phases
Wherein said liquid phase comprising predominantly refrigerant is employed in said refrigerant evaporating stage
Wherein said liquid phase comprising predominantly absorption solution is employed in said absorption stage
Wherein residual reagents following said evaporator stage may be employed in said absorption stage
Wherein refrigerant is evaporated in a heat absorbing step and absorbed into said absorption solution in a heat releasing step, forming an absorption solution—refrigerant solution
Wherein said absorption solution—refrigerant solution phase transitions into a multi-liquid phase mixture
Wherein said multi-liquid phase mixture comprises at least one liquid phase comprising predominantly refrigerant
Wherein said multi-liquid phase mixture comprises at least one liquid phase comprising predominantly absorption solution
Wherein said multi-liquid phase mixture is separated, at least in part, into constituent liquid phases
Wherein said liquid phase comprising predominantly refrigerant is employed in said refrigerant evaporating stage
Wherein said liquid phase comprising predominantly absorption solution is employed in said absorption stage
Wherein residual reagents following said evaporator stage may be employed in said absorption stage Example Embodiments 4 [LCST Absorption Refrigeration Cycle]

An absorption refrigeration cycle comprising:
  An absorption solution comprising water
  A refrigerant liquid phase comprising refrigerant and LCST reagent
  Wherein said refrigerant liquid phase exhibits one or more LCSTs in a solution comprising refrigerant, LCST reagent, and water
An absorption refrigeration cycle comprising:
  An absorption solution comprising water
  A refrigerant liquid phase comprising refrigerant and LCST reagent
  Wherein said refrigerant liquid phase exhibits one or more LCSTs in a solution comprising refrigerant, CST reagent, and water
  Wherein said refrigerant comprises an LCST binder reagent
An absorption refrigeration cycle comprising:
  An absorption solution comprising LCST solvent reagent
  A refrigerant liquid phase comprising refrigerant and LCST reagent
  Wherein said refrigerant liquid phase exhibits one or more LCSTs in a solution comprising refrigerant, CST reagent, and water
  Wherein said refrigerant exhibits one or more properties of an LCST binder reagent
An absorption refrigeration cycle comprising:
  An absorption solution comprising water
  A refrigerant liquid phase comprising refrigerant and CST reagent
  Wherein said refrigerant liquid phase exhibits one or more cloud point temperatures in a solution comprising refrigerant, CST reagent, and water
An absorption refrigeration cycle comprising:
  An absorption solution comprising solvent
  A refrigerant liquid phase comprising refrigerant and CST reagent
  Wherein said refrigerant liquid phase exhibits one or more cloud point temperatures in a solution comprising refrigerant, CST reagent, and solvent
An absorption refrigeration cycle comprising:
  An absorption solution comprising water
  A refrigerant liquid phase comprising refrigerant and LCST reagent
  Wherein said refrigerant liquid phase exhibits one or more LCSTs in a solution of refrigerant liquid phase and absorption solution
An absorption refrigeration cycle comprising:
  An absorption solution comprising water
  A refrigerant liquid phase comprising refrigerant and CST reagent
  Wherein said refrigerant liquid phase exhibits one or more cloud point temperatures in a solution of refrigerant liquid phase and absorption solution
An absorption refrigeration cycle comprising:
  An absorption solution comprising solvent
  A refrigerant liquid phase comprising refrigerant and LCST reagent Wherein said refrigerant liquid phase exhibits one or more LCSTs in a solution comprising refrigerant, CST reagent, and water Example Sub-Embodiments Wherein refrigerant is evaporated in a heat absorbing step and absorbed into said absorption solution in a heat releasing step, forming an absorption solution—refrigerant solution Wherein said absorption solution—refrigerant solution phase transitions into a multi-liquid phase mixture Wherein said multi-liquid phase mixture comprises at least one liquid phase comprising predominantly refrigerant and LCST reagent Wherein said multi-liquid phase mixture comprises at least one liquid phase comprising predominantly LCST solvent reagent Wherein said multi-liquid phase mixture is separated, at least in part, into constituent liquid phases Wherein said liquid phase comprising predominantly refrigerant and LCST reagent is employed in said refrigerant evaporating stage Wherein said liquid phase comprising predominantly absorption solution is employed in said absorption stage Wherein residual reagents following said evaporator stage may be employed in said absorption stage Wherein refrigerant is evaporated in a heat absorbing step and absorbed into said absorption solution in a heat releasing step, forming an absorption solution—refrigerant solution Wherein said absorption solution—refrigerant solution phase transitions into a multi-liquid phase mixture Wherein said multi-liquid phase mixture comprises at least one liquid phase comprising predominantly refrigerant liquid phase Wherein said multi-liquid phase mixture comprises at least one liquid phase comprising predominantly absorption solution Wherein said multi-liquid phase mixture is separated, at least in part, into constituent liquid phases Wherein said liquid phase comprising predominantly refrigerant liquid phase is employed in said refrigerant evaporating stage Wherein said liquid phase comprising predominantly absorption solution is employed in said absorption stage Wherein residual reagents following said evaporator stage may be employed in said absorption stage or may be mixed with said absorption solution or a combination thereof Wherein refrigerant is evaporated in a heat absorbing step and absorbed into said absorption solution in a heat releasing step, forming an absorption solution—refrigerant solution Wherein said absorption solution—refrigerant solution phase transitions into a multi-liquid phase mixture Wherein said multi-liquid phase mixture comprises at least one liquid phase comprising predominantly refrigerant and LCST reagent Wherein said multi-liquid phase mixture comprises at least one liquid phase comprising predominantly LCST solvent reagent Wherein said multi-liquid phase mixture is separated, at least in part, into constituent liquid phases Wherein said liquid phase comprising predominantly refrigerant and LCST reagent is employed in said refrigerant evaporating stage Wherein said liquid phase comprising predominantly absorption solution is employed in said absorption stage Wherein residual reagents following said evaporator stage may be employed in said absorption stage Example Embodiments 5 [Active Cloud Point Adjustment UCST]

Heating or Cooling Transfer Fluids and Systems comprising:
  Releasing heat in a heat releasing phase transition forming two or more liquid phases from a single liquid phase and/or liquid phases of different volumes and/or compositions and/or concentrations
  Absorbing heat in a dissolution heat releasing phase transition, forming a single liquid phase solution and/or liquid phases of different volumes and/or compositions and/or concentrations
  Wherein the temperature of said phase transition or the temperature at which said phase transition occurs may be adjusted by changing the composition or concentration of one or more reagents Heating or Cooling Transfer Fluids and Systems comprising:
  Absorbing heat in a dissolution heat absorbing phase transition, forming a single liquid phase solution
  Releasing heat in a heat releasing phase transition forming two or more liquid phases from a single liquid phase
  Wherein the temperature of said phase transition or the temperature at which said phase transition occurs may be adjusted by changing the composition or concentration of one or more reagents Heating or Cooling Transfer Fluids and Systems comprising:
  Absorbing heat in a dissolution heat releasing phase transition, forming a single liquid phase solution and/or liquid phases of different volumes and/or compositions and/or concentrations
  Releasing heat in a heat releasing phase transition forming two or more liquid phases from a single liquid phase and/or liquid phases of different volumes and/or compositions and/or concentrations
  Wherein the temperature of said phase transition or the temperature at which said phase transition occurs may be adjusted by changing the composition or concentration of one or more reagents Heating or Cooling Transfer Fluids and Systems comprising:
  Releasing heat in a heat releasing phase transition forming two or more liquid phases from a single liquid phase and/or liquid phases of different volumes and/or compositions and/or concentrations
  At least partially separating said two or more liquid phases
  Transferring said two or more liquid phases as separate streams for at least a portion of fluid transport
  Absorbing heat in a dissolution heat absorbing phase transition by combining or mixing at least a portion of said separated liquid phases, forming a single liquid phase solution and/or liquid phases of different volumes and/or compositions and/or concentrations Wherein the temperature of said phase transition or the temperature at which said phase transition occurs may be adjusted by changing the composition or concentration of one or more reagents in one or more liquid phases Heating or Cooling Transfer Fluids and Systems comprising:
Releasing heat in a heat releasing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Absorbing heat in a dissolution heat absorbing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more separated liquid phases Heating or Cooling Transfer Fluids and Systems comprising:
Releasing heat in a heat releasing phase transition forming two or more liquid phases from a single liquid phase and/or liquid phases of different volumes and/or compositions and/or concentrations
Absorbing heat in a dissolution heat absorbing phase transition, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more combined solutions Heating or Cooling Transfer Fluids and Systems comprising:
Releasing heat in a heat releasing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Absorbing heat in a dissolution heat absorbing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more liquid phases using one or more membrane based processes or one or more compositions derived from one or more membrane based processes or similar to one or more reagents employed in the liquid system or similar to one or more compositions derived from one or more membrane based processes or a combination thereof Heating or Cooling Transfer Fluids and Systems comprising:
Releasing heat in a heat releasing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Absorbing heat in a dissolution heat absorbing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more combined solutions using one or more membrane based processes or one or more compositions derived from one or more membrane based processes or similar to one or more reagents employed in the liquid system or similar to one or more compositions derived from one or more membrane based processes or a combination thereof.

Example Embodiments 6 [Active Cloud Point Adjustment LOST]

Heating or Cooling Transfer Fluids and Systems comprising:
Absorbing heat in a heat absorbing phase transition forming two or more liquid phases from a single liquid phase and/or liquid phases of different volumes and/or compositions and/or concentrations
Releasing heat in a dissolution heat releasing phase transition, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents Heating or Cooling Transfer Fluids and Systems comprising:
Releasing heat in a dissolution heat releasing phase transition, forming a single liquid phase solution and/or liquid phases of different volumes and/or compositions and/or concentrations
Absorbing heat in a heat absorbing phase transition forming two or more liquid phases from a single liquid phase and/or liquid phases of different volumes and/or compositions and/or concentrations
Wherein the temperature of said phase transitions or the temperature at which said phase transition occurs may be adjusted by changing the composition or concentration of one or more reagents Heating or Cooling Transfer Fluids and Systems comprising:
Releasing heat in a dissolution heat releasing phase transition, forming a single liquid phase solution and/or liquid phases of different volumes and/or compositions and/or concentrations
Absorbing heat in a heat absorbing phase transition forming two or more liquid phases from a single liquid phase and/or liquid phases of different volumes and/or compositions and/or concentrations Wherein the temperature of said phase transition or the temperature at which said phase transition occurs may be adjusted by changing the composition or concentration of one or more reagents Heating or Cooling Transfer Fluids and Systems comprising:
Absorbing heat in a heat absorbing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Releasing heat in a dissolution heat releasing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more liquid phases Heating or Cooling Transfer Fluids and Systems comprising:
Absorbing heat in a heat absorbing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Releasing heat in a dissolution heat releasing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more separated liquid phases Heating or Cooling Transfer Fluids and Systems comprising:
Absorbing heat in a heat absorbing phase transition forming two or more liquid phases from a single liquid phase and/or liquid phases of different volumes and/or compositions and/or concentrations
Releasing heat in a dissolution heat releasing phase transition, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more combined solutions Heating or Cooling Transfer Fluids and Systems comprising:
Absorbing heat in a heat absorbing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Releasing heat in a dissolution heat releasing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more liquid phases using one or more membrane based processes or one or more compositions derived from one or more membrane based processes or similar to one or more reagents employed in the liquid system or similar to one or more compositions derived from one or more membrane based processes or a combination thereof Heating or Cooling Transfer Fluids and Systems comprising:
Absorbing heat in a heat absorbing phase transition forming two or more liquid phases from a single liquid phase and/or liquid phases of different volumes and/or compositions and/or concentrations
At least partially separating said two or more liquid phases
Transferring said two or more liquid phases as separate streams for at least a portion of fluid transport
Releasing heat in a dissolution heat releasing phase transition by combining or mixing at least a portion of said separated liquid phases, forming a single liquid phase solution and/or liquid phases of different volumes and/or compositions and/or concentrations
Wherein the temperature of said phase transition or the temperature at which said phase transition occurs may be adjusted by changing the composition or concentration of one or more reagents in one or more combined solutions using one or more membrane based processes or one or more compositions derived from one or more membrane based processes or similar to one or more reagents employed in the liquid system or similar to one or more compositions derived from one or more membrane based processes or a combination thereof.

Example Sub-Embodiments

Wherein said phase transition temperature adjustment is reversible
Wherein said phase transition may comprise a UCST, or LCST, or cloud point, or a combination thereof
Wherein said phase transition temperature is adjusted to reflect changes in or predicted changes in the temperature of heat exchanging fluids, surrounding temperature, the presence of contaminants, other system conditions, or a combination thereof.

Example Sub-Embodiments

Wherein cloud point temperature may be adjusted by increasing the concentration of one or more reagents using one or more membrane-based processes
Wherein cloud point temperature may be adjusted by decreasing the concentration by adding a water or a solution comprising substantially water Wherein solution comprising water or substantially water comprise the permeate stream from a membrane-based process or an added stream of similar composition Example UCST Compositions Independent Embodiments A reagent mixture with one or more tunable UCST or 'cooling' cloud point comprising:
Water
Propylene Carbonate
and Polypropylene Glycol, Polyethylene Glycol, Polypropylene Glycol Dimethyl Ether, or a combination thereof
A method for creating reagents blends with upper critical solution temperatures with reagents which may, independently not have upper critical solution temperatures.
A method for creating a reagent mixture that has a cooling solubility swing or upper critical solution temperature or cooling 'thermally switchable solubility' or cooling cloud point while maintaining other desirable properties:
A reagent mixture which forms X+n number of liquid phases upon cooling below one or more cloud point temperatures from an initial liquid with X number of liquid phases comprising one or more or a combination of the following:
Reagent 1: One or more reagents with relatively low solubility in Reagent 2 and temperature dependent relatively higher or miscible solubility in Reagent 3.
Reagent 2: One or more reagents with relatively low solubility in Reagent 1 and relatively higher or miscible solubility in Reagent 3.
Reagent 3: one or more reagents comprising one or more or combination of the following properties:
A reagent with high solubility in both Reagent 1 and Reagent 2 under certain conditions, which may be the same conditions.
A reagent with higher solubility or higher affinity or more attraction for Reagent 1 than Reagent 2 at relatively elevated temperatures or above certain relatively elevated temperatures (if cooling cloud point is desired).
A reagent with higher solubility or higher affinity or more attraction for Reagent 2 than Reagent 1 at relatively cooler temperatures or below certain relatively cooler temperatures (if cooling cloud point is desired).

Example UCST Compositions Dependent Embodiments

Wherein Reagent 1 comprises one or more or a combination of the following: water, ethylene glycol, propylene glycol, glycerol, organic reagents, inorganic reagents, ammonia
Wherein Reagent 2 comprises one or more or a combination of the following: diethyl ether, dimethyl ether, propylene carbonate, ethers, glycols, polyethylene glycol dimethyl ether, ethylene carbonate, organic reagents, inorganic reagents, ammonia
Wherein Reagent 3 comprises one or more or a combination of the following: polypropylene glycol, polypropylene glycol with one or more molecular weights ranging from 400 g/mol-10,000 g/mol, polyethylene glycol, polyethylene glycol with one or more molecular weights ranging from 200 g/mol-100,000 g/mol, organic reagents, inorganic reagents, ammonia
Wherein the reagent combination further comprises Reagent 4, a reagent which is soluble in Reagent 1 alone, and exhibits limited solubility, in Reagent 2, Reagent 3, or both.
Wherein the reagent combination further comprises Reagent 4, a reagent which is soluble in Reagent 1 alone
Wherein the reagent combination further comprises Reagent 4, a reagent which is soluble in Reagent 1 alone, and may exhibit limited solubility, in Reagent 2, Reagent 3, or both
Wherein the reagent combination further comprises Reagent 5, a reagent which is soluble in Reagent 1, Reagent 2, Reagent 3, or combination thereof
Wherein the reagent combination further comprises Reagent 4, a reagent which is soluble in Reagent 1 Wherein Reagent 4 comprises one or more salts, glycerol, urea, ethylene glycol or a combination thereof
Wherein the reagent combination further comprises Reagent 5, a reagent which is soluble in Reagent 1, Reagent 2, Reagent 3, or combination thereof
Wherein Reagent 5 comprises propylene glycol, polypropylene glycol, polyethylene glycol, ethylene glycol, organic solvent or a combination thereof
Wherein the reagent combination further comprises one or more salts
Wherein the biphasic solution comprises one phase composed primarily of propylene carbonate and another phase composed primarily of water and polypropylene glycol
Wherein the cloud point temperature of the reagent combination is adjusted by changing the relative concentration of one or more or a combination of reagents
Wherein the cloud point temperature of the reagent combination is adjusted by changing the relative concentration of one or more salts in the solution
Wherein the cloud point temperature of the reagent combination is adjusted by changing the composition of the constituent reagents
Wherein the solution comprises a single liquid phases above the one or more cloud point temperatures and a multiphase solution below the one or more cloud point temperatures
Wherein the solution comprises two liquid phases above the one or more cloud point temperatures and a three or more liquid phase solution below the one or more cloud point temperatures
Wherein the solution comprises a X number of liquid phases above the one or more cloud point temperatures and a X number of liquid phases below the one or more cloud point temperatures
Wherein the composition of one or more of the X number of liquid phases is different above or below said cloud point temperature
Wherein the solution is mixed to facilitate transitioning toward the equilibrium state
Wherein the viscosity of the liquid is below 15 cP
Wherein the viscosity of the liquid is below 5 cP
Wherein the mass of reagent 2 is greater than the mass of reagent 1 or reagent 3

Example LCST Compositions Independent Embodiments

A reagent mixture which forms X+n number of liquid phases upon heating above one or more cloud point temperatures from an initial liquid with X number of liquid phases with desirable properties for heat exchange comprising one or more or a combination of the following:
- Reagent 1: One or more reagents with a LCST in a solution mixed with Reagent 2
- Reagent 2: One or more reagents where Reagent 1 and Reagent 3 are soluble
- Reagent 3: One or more reagents soluble in Reagent 2 and with limited solubility in Reagent 1

A reagent mixture which forms X+n number of liquid phases upon heating above one or more cloud point temperatures from an initial liquid with X number of liquid phases with desirable properties for heat exchange comprising one or more or a combination of the following:
- Reagent 1: One or more reagents with a LCST in a solution mixed with Reagent 2
- Reagent 2: One or more reagents where Reagent 1 and Reagent 3 are soluble
- Reagent 3: One or more reagents soluble in Reagent 2 and with limited solubility in Reagent 1 and Reagent 4
- Reagent 4: One or more reagents soluble in Reagent 1, with limited solubility in Reagent 2 and Reagent 3.

Example Embodiments

1. A composition comprising:
water;
a CST reagent; and
a low solubility reagent;
wherein said low solubility reagent has limited solubility in a solution consisting of water and a critical solution temperature (CST) reagent below a cloud point temperature and has miscible solubility in a solution consisting of water and CST reagent above a cloud point temperature.

2. A composition for refrigeration comprising:
an absorption solution comprising water and a critical solution temperature (CST) reagent; and a reagent with limited solubility in water that is substantially miscible with said absorption solution above an upper critical solution temperature and has limited solubility with said absorption solution below the upper critical solution temperature.

3. The composition of '1.' or '2.' wherein the CST reagent comprises (1) a reagent which exhibits decreasing osmotic pressure with increasing temperature in a solution consisting of water and said CST reagent or (2) a reagent which possesses greater affinity for said low solubility reagent relative to water with increasing temperature.

4. The composition of 1.' or '2.' wherein the CST reagent comprises 'CST reagent', Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200, or a mixture thereof.

5. The composition of '1.' or '2.' wherein (1) the cloud point temperature of the composition changes over a range of from about 0 to about 100° C. based on the concentration of CST reagent in the composition, or (2) the composition has a viscosity of less than 50 cP at room temperature; or (3) both (1) and (2).

6. The composition of ' 1.' or '2.' wherein said reagent with limited solubility in water comprises a volatile reagent, non-volatile reagent, ethyl acetate, methyl acetate, methyl formate, dimethyl ether, diethyl ether, dimethoxymethane, diethoxymethane, carbon dioxide, supercritical carbon dioxide, sulfur dioxide, a refrigerant, a hydrocarbon, a fluorocarbon, an organic solvent, Ethylene Glycol Diacetate, Propylene Glycol Diacetate, Dipropylene Glycol Dimethyl Ether (DPE), 2-Heptanone, Propylene glycol monomethyl ether acetate, Propylene Carbonate, Cyclohexanone, 1-Octanol, Dipropylene Glycol Methyl Ether Acetate, 1-Methyl-2-pyrrolidinone, Ethylene glycol monohexyl ether, Acetal (1,1-Diethoxyethane), Isoamyl acetate, Dibutyl ether, m-Xylene, Isopropyl acetate, Dimethyl carbonate, Butanone, Methyl tert-butyl ether (MTBE), o-Xylene, Acetylacetone, p-Xylene, Methyl Isobutyl Ketone, Toluene, 3-Pentanone, Propyl acetate, Ethylene glycol monopropyl ether, 2-Methoxyethyl acetate, 5-Methyl-2-hexanone, 4-Methyl-2-pentanone, 3-Pentanone, 2-Pentanone, 2-methyl tetrahydrofuran, a reagent which is a liquid or gas or supercritical fluid at room temperature, or a mixture thereof.

7. The composition of 'I.' or '2.' further comprising one or more salts.

8. A UCST process for heating or cooling comprising:
1) phase transitioning a liquid phase into two or more liquid phases to release heat;
2) separating at least a portion of each of said two or more liquid phases into separate streams; and
3) mixing and dissolving said separate streams to form a single liquid phase solution to absorb heat;
wherein the liquid phase comprises water; a CST reagent; and a low solubility reagent having a limited solubility in a solution consisting of water and CST reagent below a cloud point temperature and having a miscible solubility in a solution consisting of water and CST reagent above a cloud point temperature.

9. A LCST process for heating or cooling comprising:
1) phase transitioning a liquid phase into two or more liquid phases to absorb heat;
2) separating at least a portion of each of said two or more liquid phases into separate streams; and
3) mixing and dissolving said separate streams to form a single liquid phase solution to release heat;
wherein the liquid phase comprises a critical solution temperature (CST) reagent, an LCST reducing or binding reagent, and water.

10. The process of '8.' or '9.' wherein said phase transitioning is conducted at a temperature greater than the temperature of an application of heating or less than the temperature of an application of cooling.

11. A liquid phase refrigeration or heat pump cycle process with a liquid system wherein the process comprises:
1) absorbing heat by mixing two or more liquid phases endothermically in a phase transition; and
2) releasing heat exothermically by transforming a liquid phase into two or more liquid phases in a phase transition; and
3) adjusting the phase transition temperature such that the phase transition temperature of step 1) is different than the phase transition temperature of step 2);
wherein said liquid system comprises (1) an absorption solution comprising a critical solution temperature (CST) reagent and a UCST solvent; and (2) a reagent that is substantially miscible with said absorption solution above an upper critical solution temperature and has limited solubility with said absorption solution below the upper critical solution temperature and wherein said adjusting comprises changing the concentration of said CST reagent with respect to the UCST solvent.

12. A liquid phase refrigeration or heat pump cycle process with a liquid system wherein the process comprises:
1) releasing heat by mixing two or more liquid phases exothermically in a phase transition; and
2) absorbing heat endothermically by transforming a liquid phase into two or more liquid phases in a phase transition; and
3) adjusting the phase transition temperature such that the phase transition temperature of step 1) is different than the phase transition temperature of step 2);
wherein said liquid system comprises a critical solution temperature (CST) reagent, an LCST reducing reagent, and water and wherein said adjusting comprises removing substantially all of said LCST reducing reagent before or during step 1) and introducing said LCST reducing reagent before or during step 2).

13. The process of '11.' or '12.' wherein said CST reagent exhibits decreasing osmotic pressure with increasing temperature in a solution consisting of water and said CST reagent.

14. The process of Claims '11.' or '12: or 13 wherein said CST reagent comprises Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200, or mixtures thereof.

15. An absorption refrigeration cycle process comprising:
forming a liquid system comprising (1) an absorption solution that comprises a lower critical solution temperature reagent, a lower critical solution temperature binder reagent, or a combination thereof and (2) a refrigerant comprising a solvent reagent and a LCST reducing reagent; and
forming two or more liquid phases due to a LCST phase transition wherein one liquid phase comprises an absorption solution comprising a lower critical solution temperature reagent, a lower critical solution temperature binder reagent, or a combination thereof and wherein another liquid phase comprises a refrigerant liquid phase comprising a solvent reagent and a LCST reducing reagent.

Example LCST Compositions Independent Embodiments

Wherein the reagent composition comprises one or more or a combination of the following:
Reagent 1: Polypropylene glycol, Polyethylene Glycol, Polypropylene Glycol Dimethyl Ether, Polyethylene Glycol Dimethyl Ether, or Organic polymer
Reagent 2: Water, ammonia, polar organic solvent, polar solvent
Reagent 3: Ionic compounds, glycerol, acids, bases, or urea
Reagent 4: Propylene Carbonate, Ethylene Carbonate, dimethyl ether, toluene, or diethyl ether
Wherein the temperature of the one or more 'cloud-points' are adjusted by changing the concentration of one or more reagents Heating and Cooling Transfer
Example Independent Embodiments: Heat or Cooling Transfer with UCST or LCST Phase Change and Liquid-Liquid Separation Systems and Methods for transferring heating or cooling comprising:
A liquid system with one or more upper critical solution temperature (UCST) or lower critical solution temperature (LCST) phase change solutions
Wherein a liquid solution comprising a single liquid phase or a system with less liquid phases transforms into two or more liquid phases or a multi-phase liquid solution upon heating or cooling at, above or below the one or more UCST, LCST, or cloud point temperatures of said liquid solution
Wherein said multi-phase liquid solution is separated into to or more separate liquid streams
Wherein said liquid streams each comprise, at least in part, a separated liquid phase
Further comprising transporting said separated liquid streams to one or more applications requiring heating or cooling
Wherein said separate liquid streams are mixed at or near or in heat exchange with the one or more applications requiring heating or cooling
Wherein said mixing results, at least in part, in the dissolution of one or more liquid phases
Wherein said dissolution results, at least in part, the absorption or release of heat or heating or cooling of said application requiring heating or cooling
Systems and Methods for transferring heating or cooling comprising:
Two or more liquid phases originating from an LCST or UCST phase change system
Wherein said liquid phases are stored or transferred or a combination thereof separately
Further comprising mixing said liquid phases to absorb or release heat Example Dependent Embodiments: Heat or Cooling Transfer with UCST or LCST Phase Change and Liquid-Liquid Separation Wherein said mixing said liquid phases results in the dissolution of one or more of the liquid phases in one or more of the other liquid phases
Wherein said mixing is conducted before, during, or after heat exchange with one or more applications requiring or employing heating or cooling
Wherein said mixing is conducted under conditions to result in the dissolution of one or more liquid phases
Wherein said mixing is conducted under conditions wherein one or more liquid phases do not dissolve
Wherein said system includes a liquid separation device comprising one or more or a combination of the following: centrifuge, coalescer, decanter, filter, separatory funnel, cyclone, membrane Example Independent Embodiments: Heat or Cooling Transfer with UCST or LCST Phase Change as Single Liquid Stream or Mixture Systems and Methods for transferring heating or cooling comprising:
A liquid system with one or more upper critical solution temperature (UCST) or lower critical solution temperature (LCST) phase change solutions Wherein a liquid solution comprising a single liquid phase or less liquid phases transforms into two or more liquid phases or a multi-phase liquid solution upon heating or cooling to at, below or above the one or more UCST, LCST, or cloud point temperatures of said liquid solution Wherein said multi-phase liquid solution is transported to one or more applications requiring heating or cooling Systems and Methods for transferring heating or cooling comprising:

A liquid system with one or more upper critical solution temperature (UCST) or lower critical solution temperature (LCST) phase change solutions Wherein a multi-phase liquid solution or more liquid phases transforms into a single liquid phase solution or less liquid phases upon heating or cooling at, above or below the one or more UCST, LCST, or cloud point temperatures of said liquid solution Wherein said single phase liquid or less liquid phases is transported to one or more applications requiring heating or cooling Example Dependent Embodiments: Heat or Cooling Transfer with UCST or LCST Phase Change as Single Liquid Stream or Mixture Wherein said single phase liquid solution transforms into two or more liquid phases during transport Wherein said single phase liquid solution transforms into two or more liquid phases during transport Wherein said transformation absorbs or releases heat Wherein said single phase liquid solution transforms into two or more liquid phases during transport Wherein said transformation functions as a temperature buffer, minimizing temperature change despite heat or cooling losses to the surroundings Wherein a portion of one or more of the liquid phases dissolves in one or more other liquid phases during transport Wherein a portion of one or more of the liquid phases dissolves in one or more other liquid phases during transport Wherein said dissolution absorbs or releases heat Wherein a portion of one or more of the liquid phases dissolves in one or more other liquid phases during transport Wherein said dissolution functions as a temperature buffer, minimizing temperature change despite heat or cooling losses to the surroundings Wherein a portion of said two or more liquid phases dissolve before or during heat exchange with one or more applications requiring heating or cooling Wherein a portion of said two or more liquid phases dissolve before or during heat exchange with one or more applications requiring heating or cooling Wherein said dissolving absorbs or releases heat Wherein a portion of said single liquid phase transforms into two or more liquid phases before or during heat exchange with one or more applications requiring heating or cooling Wherein a portion of said single liquid phase transforms into two or more liquid phases before or during heat exchange with one or more applications requiring heating or cooling Wherein said transformation absorbs or releases heat Wherein said transformations are fully reversible Wherein said dissolution is fully reversible Wherein said liquid system transfers heat due to both specific heat and latent heat change Example Independent Embodiments: Ocean or Thermocline Powered Air Conditioning Using Low Viscosity UCST Working Fluid with Liquid—Liquid Separation Systems and methods for transferring cold from beneath the surface of a liquid body comprising:

One or more UCST phase change liquids in a liquid system

Wherein one or more of said UCST phase change liquids are transferred beneath the surface of a liquid body Wherein said UCST liquid forms two or more liquid phases from one liquid phase or relatively less liquid phases by cooling at or below said liquid's one or more UCST temperatures Wherein said two or more liquid phases are separated Wherein said separated liquid phases are transported in separate liquid channels to one or more applications requiring cooling Further comprising mixing said liquid phases before or in heat exchange with or in the presence of one or more applications requiring cooling Wherein one or more of said liquid phases dissolve Wherein said dissolution absorbs heat or is endothermic Example Dependent Embodiments: Ocean or Thermocline Powered Cooling Using Low Viscosity UCST Working Fluid with Liquid—Liquid Separation Wherein said liquid phases are transported, at least in part, in isolation from the other liquid phase or phases Wherein said liquid phases are transported, at least in part, without fluid contact with the other liquid phase or phases Wherein said liquid body possesses a thermocline Wherein said cooling results from heat exchange with the relatively cooler liquid beneath the surface of said thermocline liquid body Wherein said UCST phase change liquids comprises a working fluid Wherein said working fluid is heat exchanged with the surrounding water body without fluid contact between the heat exchanged fluids Wherein said separation of liquid phases Wherein said separation of liquid phases is conducted beneath the surface of the water body Wherein said separation of liquid phases is conducted at or near the cold temperature depth of the thermocline Wherein said UCST liquid functions absorbs heat or supplies cooling through endothermic phase change into less liquid phases, specific heat capacity, or a combination thereof.

Example Independent Embodiments: Ocean or Thermocline Powered Air Conditioning Using Low Viscosity UCST or LCST Working Fluid with Single Liquid Stream or Mixture Systems and methods for transferring cold from beneath the surface of a thermocline body or solid, liquid, or gas or combination thereof body with some form of temperature variation comprising:
  One or more liquids possessing one or more UCSTs
  Wherein said one or more liquids transform into more liquid phases upon cooling below said one or more UCSTs
  Wherein said one or more liquid phases transform into less liquid phases or the original liquid phase or phases during heating above said one or more UCSTs temperatures
  Wherein heat is absorbed during transforming into less liquid phases and heat is released during transforming into more liquid phases
Systems and methods for transferring cold from beneath the surface of a thermocline body or solid, liquid, or gas or combination thereof body with some form of temperature variation comprising:
  One or more liquids possessing one or more LCSTs
  Wherein said one or more liquids transform into less liquid phases or a single liquid phase upon cooling below said one or more LCSTs
  Wherein said less liquid phases transforms into more liquid phases during heating above said one or more LCSTs temperatures
  Wherein heat is absorbed during transforming into more liquid phases and heat is released during transforming into less liquid phases Example Dependent Embodiments: Ocean or Thermocline Powered Air Conditioning Using Low Viscosity UCST or LCST Working Fluid with Single Liquid Stream or Mixture Wherein said cooling or heat release comprises heat exchanging with the relatively cooler temperature region in a thermocline body
Wherein said heat absorption or cooling comprises heat exchanging with one or more applications employing cooling
Wherein said liquids are transferred between cooler depths of a thermocline body and
Wherein said UCST or LCST temperature or temperatures are within the temperature range of the thermocline liquid body
Wherein said UCST or LCST phase change functions as a temperature buffer
Wherein said UCST or LCST phase change functions as a temperature buffer
Wherein said temperature buffer reduces temperature change or cooling losses or heating losses during transport due to latent heat of phase change of dissolution or transformation of liquid phases into more or less liquid phases during, for example, the intrusion of heating or cooling or heat release or absorption with surroundings Example Independent Embodiments: Heating or Deicing Road or Other Surface Powered by Outside Temperature Variation Using LCST Phase Change System with Working Fluid Storage Systems and methods for absorbing heat from roads or other surfaces and storing said heat for present or later use, comprising:
  A liquid solution forming two or more liquid phases before, during, or after heat exchange with a relatively warm surface
    Further comprising separating said two or more liquid phases into separate liquid streams
Systems and methods for heating or deicing roads or other surfaces comprising:
  Two or more separate liquid phases
  Wherein said two or more liquid phases are mixed before, during, or in the presence, or combination thereof of heat exchange with one or more surfaces requiring heating or deicing
  Wherein said mixing results in the dissolution of one or more liquid phases Example Dependent Embodiments: Heating or Deicing Road or Other Surface Powered by Outside Temperature Variation Using LCST Phase Change System with Working Fluid Storage Wherein said dissolution is exothermic or releases heat
Wherein said dissolution heats said one or more surfaces
Wherein said dissolution heats said one or more surfaces and melts at least a portion of ice on one or more surfaces
Wherein said solution following at least a portion dissolution between one or more liquid phases is transferred to one or more vessels employed to store said utilized solution or working fluid
Wherein said dissolution occurs with heat exchange with a heat pump
Wherein said heat pump employs said heat exchange as an enthalpy source for heat extraction
Wherein said heat pump transfers heat to a second relatively warmer heat exchange fluid
Wherein said relatively warmer heat exchange fluid is heat exchanged with said one or more surfaces requiring heating
Wherein said dissolution occurs with heat exchange with a heat pump
Wherein said heat pump employs said heat exchange as an enthalpy source for heat extraction
Wherein said heat pump transfers heat to a second relatively warmer heat exchange fluid
Wherein said relatively warmer heat exchange fluid is heat exchanged with said one or more surfaces requiring heating
Wherein said heat pump is powered by electricity, steam, hydraulic fluid, mechanical source, combustion engine, or combination thereof
Wherein said two or more liquid phases may have originated from separate storage vessels or separate liquid channels
Wherein said two or more liquid phases may have originated from a previous multi-liquid phase solution resulting from heating at or above one or more cloud point temperatures
Wherein one or more of said relatively warm surfaces is at or above the one or more LCST temperatures of the solution
Wherein said two or more separate liquid phases are stored in one or more storage vessels
Wherein said separate liquid phases are store in separate storage vessels
Wherein said phase change into two or more liquid phases absorbs heat or is endothermic
Wherein said phase change is due to the increase in temperature of a road or other surface due to diurnal temperature variation, outdoor temperature variation, or the presence of light or sunlight, or a combination thereof Wherein there are more than one said liquid solutions Wherein said liquid originates from one or more combined or utilized liquid solution storage vessels Wherein said liquid comprises a portion of the liquid phases above the one or more cloud point temperatures before the heat exchange with one or more surfaces Wherein said liquid comprises a portion of the liquid phases above the one or more cloud point temperatures before the heat exchange with one or more surfaces Wherein said liquid comprises a portion of the liquid phases above the one or more cloud point temperatures before the heat exchange with one or more relatively warm surfaces Wherein the liquid may have been heated or experienced heat intrusion in the one or more utilized solution storage tanks Wherein said two or more phase liquid solution originates from a single liquid phase solution or a solution with less liquid phases or a solution with liquid phases comprising different compositions Wherein there are sensors located above, on, in, or below, or combination thereof one or more surfaces to determine the temperate of said surface Wherein there are sensors located above, on, in, or below, or combination thereof one or more surfaces to determine the temperate of said surface Wherein said sensors may be employed as one or more of the tools utilized to determine whether to absorb heat from the surface, release heat into the surface, or neither thereof Wherein live weather data, weather reports, and other weather information is employed to determine whether to employ deicing or other method Wherein the system further comprises a heat pump Wherein the system further comprises a heat pump Wherein said heat pump employs said two or more liquid phase stored solution as an enthalpy source Wherein the relatively warmer stream produced by said heat pump is heat exchanged with the road or one or more surfaces requiring heating or deicing Wherein the system for determining whether to and how to operate said system may be, at least in part, automated Wherein said separate liquid phases are stored in separately or without fluid contact between said liquid phases Wherein said storage vessels are located above the ground Wherein freezing in said one or more storage vessels may function as a temperature buffer and may, at least in part, be desired Example Independent Embodiments: Heating or Deicing Road or Other Surface Powered by Powered by Relatively 'Warm' Temperature Beneath Surface of Water Body Systems and methods for deicing or heating roads or other surfaces comprising:
Heating a single liquid phase solution or multiphase liquid solution with less liquid phases using the relatively warm water beneath the surface of a water body
Forming a multiphase liquid solution or a multiphase liquid solution with more liquid phases or larger formed liquid phases
Wherein said multi-liquid phase liquid is separated into its two or more constituent liquid phases as two or more separate liquid streams Systems and methods for deicing or heating roads or other surfaces comprising:
A heat exchange fluid
Wherein said heat exchange fluid is heated in heat exchange with relatively warm water beneath the surface of a water body
Wherein a portion of said heat exchange fluid is removed from said one or more storage vessels and heat exchanged with one or more applications requiring heating or an enthalpy source or entropy source or heat source Example Dependent Embodiments: Heating or Deicing Road or Other Surface Powered by Powered by Relatively 'Warm' Temperature Beneath Surface of Water Body Wherein said separated liquid phases are stored in separate liquid storage vessels beneath the surface of said water body Wherein said separated liquid phases are stored in separate liquid storage vessels floating on the surface of said water body Wherein said separated liquid phases are stored in separate liquid storage vessels above the surface of said water body Wherein said separated liquid phases are transported as separate liquid streams to one or more applications requiring heating Wherein said separated liquid phases are mixed near, in close proximity to, at, during, or combination thereof the one or more heat exchanges with one or more applications requiring heating Wherein a portion of said mixing occurs at or below the LCST of the combined liquid phases Wherein a portion of said mixing results in the dissolution of one or more liquid phases Wherein a portion of said mixing results in the dissolution of one or more liquid phases Wherein said dissolution forms a combined single liquid phase Wherein a portion of said mixing results in the dissolution of one or more liquid phases Wherein said dissolution forms a combined single liquid phase Wherein said combined liquid phase is transferred to beneath the surface of the water body and heat exchanged with said warmer water to absorb a portion of said heat Wherein said absorption of said heat results from an endothermic phase change or transformation resulting in the formation of two or more separate liquid phases Wherein said dissolution is exothermic or releases heat Wherein a portion of said heat exchange fluid is stored in one or more storage vessels beneath the surface of said water body Wherein a portion of said heat exchange fluid is returned beneath the surface of said water body Wherein said heat exchange fluid is heated by heat exchange with said water body Wherein said application requiring a heat source comprises a heat pump
Wherein said application requiring a heat source comprises a heat pump
Wherein said heat pump extracts heat from said heat exchange fluid or said multiphase liquid
Wherein said heat pump generates a second warmer heat exchange fluid
Wherein said warmer heat exchange fluid is heat exchanged with a road or other surface requiring heating
Wherein said one or more liquid phases or said heat exchange fluid as a freezing point below the freezing point of water
Wherein said two or more separate liquid streams are storage in separate storage vessels beneath the surface of the water body
Wherein said heat exchange fluid is stored in one or more vessels beneath the surface of the water body
Wherein said one or more
Wherein the relatively warm water or seawater or aqueous solution in the water body is at or above the freezing point of said water or seawater or aqueous solution
Wherein there is ice floating on the surface of said water body Example Independent Embodiments: Power Plant Condenser Cooling Using UCST or LCST Phase Change Liquid with Liquid Phase Separation Systems & Methods for industrial or power plant cooling using a relatively low viscosity UCST phase change fluid with multi-liquid phase separation comprising:
Heat exchanging a single liquid phase solution with one or more cool input sources
Wherein said single liquid phase solution transforms into two or more liquid phases at or below said single liquid phase solution's UCST temperature
Wherein said two or more liquid phases are separated into two or more separate liquid streams
Wherein said two or more separate liquid streams are transported to one or more applications requiring cooling
Combining said two or more separate liquid streams
Wherein one or more of said liquid streams dissolve
Wherein said dissolution is endothermic and provides cooling to one or more of said cooling applications Example Dependent Embodiments: Power Plant Condenser Cooling Using UCST or LCST Phase Change Liquid with Liquid Phase Separation Wherein said single liquid phase solution may comprise a multiphase solution with combined solution remaining that is yet to have undergone phase change into two or more liquid phases
Wherein said dissolution results in the formation of a single-phase liquid stream
Wherein the UCST or LCST temperature of the solution is tuned to the available cooling or heating temperatures in the system, ambient conditions, or cooling or heating application, or combination thereof
Wherein said one or more cool input sources may comprise evaporative cooling
Wherein said one or more cool input sources may comprise evaporative cooling
Wherein said evaporative cooling comprises water evaporation from said solution
Wherein said combining of two or more separate liquid streams is conducted before or during heat exchange with one or more applications requiring cooling
Wherein said cooling source is a further distance from said industrial application requiring cooling than generally employed in said application
Wherein said greater cooling transport distance is enabled by the present embodiments
Wherein a portion of said two or more liquid streams may be stored in separate containers to, for example, provide storage for cooling that may be of future use Example Independent Embodiments: Power Plant Condenser Cooling Using UCST or LCST Phase Change Liquid with Combined Liquid Mixture Systems & Methods for industrial or power plant cooling using a relatively low viscosity LCST phase change fluid with multi-liquid phase separation comprising:
Heat exchanging a single liquid phase solution with one or more applications requiring cooling
Wherein said single liquid phase solution transforms into a solution comprising two or more liquid phases
Wherein said transformation absorbs heat or is endothermic, cooling said application requiring cooling Example Dependent Embodiments: Power Plant Condenser Cooling Using UCST or LCST Phase Change Liquid with Combined Liquid Mixture Wherein said single liquid phase solution may comprise a multiphase solution with combined solution remaining that is yet to have undergone phase change into two or more liquid phases
Further comprising cooling said two or more phase liquid solution
Wherein one or more liquid phases dissolve
Wherein said dissolution is exothermic
Wherein said dissolution results in a combined single liquid phase solution
Wherein said cooling further comprises evaporative cooling
Wherein said cooling further comprises evaporative cooling
Wherein said water is evaporated from said UCST or LCST phase change liquid
Wherein evaporated water or other losses are made—up with the addition of the equivalent masses of each reagent in one or more makeup streams
Wherein evaporated water is made up by employing said solution as a draw solution in forward osmosis with another liquid stream containing water
Wherein the LCST of said single liquid phase solution may function as a temperature buffer during transport to the application requiring cooling
Wherein a portion of said liquid phase may form two or more liquid phases
Wherein said forming of two or more liquid phases is endothermic
Wherein heat for said endothermic phase change is from heat intrusion from or cooling losses to the surroundings during transport
Wherein the temperature of said solution remains relatively stable as a result Example Independent Embodiments: Heating or Cooling Osmotic Heat Engine Systems and methods for generating electricity from one or more temperature differences comprising:
  Heating or cooling a single liquid phase solution to form two or more liquid phases
  Separating said two or more liquid phases into two or more separate liquid streams comprising each of said liquid phases
  Wherein said two or more liquid streams are transported to one or more osmotic power or mixing power devices
  Wherein power is generated from the combining or mixing or dissolution of said two or more liquid phases Example Dependent Embodiments: Heating or Cooling Osmotic Heat Engine Wherein said two or more liquid phases are heated or cooled before, during, or after said mixing or said power generation or combination thereof
Wherein said two or more liquid phases are heated above one or more UCST temperatures or cooled below one or more LCST temperatures before, during, or after said mixing or said power generation or combination thereof
Wherein one or more of said liquid phases comprises a draw solution
Wherein one or more of said liquid phases comprises a feed solution
Wherein said one or more osmotic power or mixing power embodiments employs pressure retarded osmosis or forward osmosis
Wherein said one or more liquid phases may be treated before being employed as a draw solution or a feed solution
Wherein said two or more separate liquid streams transport energy independent of the temperature variations experienced by said two or more separate liquid streams during transport
Wherein said two or more separate liquid streams transport energy independent of the temperature variations experienced by said two or more separate liquid streams during transport
Wherein said temperatures are below the decomposition temperatures of the infrastructure transporting said reagents or the decomposition temperature of said reagents, or the boiling point of said reagents, or above the freezing point of said reagents, or within a range of the freezing point of said reagents, or combination thereof
Wherein said separated liquid phases may be stored
Wherein said separated liquid phases may be stored in separate liquid vessels
Wherein said separated liquid phases may be stored in separate liquid vessels
Wherein said storage of separate liquid phases functions as an electricity storage device
Wherein a portion of said liquid phases may be removed from said storage provide additional energy or electricity generation when needed by powering said osmotic engine
Wherein said integrated embodiment is employed in generating energy from relatively small temperature differences
Wherein said integrated embodiment is employed in generating energy from waste heat at a power plant or industrial site
Wherein said integrated embodiment is employed in generating energy from waste heat at a power plant or industrial site
Wherein said integrated embodiment generates energy while cooling said power plant or industrial site and heating one or more applications requiring heating
Wherein said integrated embodiment is employed in generating energy from the temperature differences in a thermocline water body
Wherein said multi-liquid phase separation device is located beneath the surface of a thermocline liquid body Notes Example Notes Related to Definitions, Synonyms 1) The upper or lower critical solution temperature may also be referred to as a cloud point which is generally the point at which a liquid system undergoes a change such as a change in the composition of a phase and/or number of phases, which may also be referred to as switching, e.g., thermal switching, or a transition, e.g., liquid phase transition, or phase change, e.g., liquid phase change, or clouding-out, e.g. the solution clouding-out, or a combination thereof. A UCST phase transition into two or more liquid phases may also be referred to as a 'cooling' cloud point or UCST ranges or cloud point temperature range or phase transition temperature range. A LCST phase transition into two or more liquid phases may also be referred to as a 'heating' cloud point or cloud point temperature range or phase transition temperature range. Alternatively, phase transition solutions may be referred to as solutions exhibiting 'condition sensitive solubility change' or 'phase transition temperature'. 2) A liquid mixture with more than one liquid phase may be referred to as, including, but not limited to, a multiphasic liquid solution, multiphase liquid solution, multiphase solution, multi-liquid phase solution, biphasic solution, a 'cloudy' solution, multiphasic liquid mixture, multiphase mixture, multiphase liquid mixture, a multi-liquid phase mixture, biphasic mixture, biphasic liquid mixture, bilayer mixture, multilayer mixture, multi-liquid phase state, multiphase liquid state, or a combination thereof 3) The dissolution of one or more liquid phases in one or more other liquid phases to form a combined single liquid phase solution or a solution with a different number or composition or both of liquid phases may be referred to as 'combining' or 'dissolution' or 'mutually dissolve' or 'dissolve' or 'combine' or 'mixing.' 4) The mixture of two or more separate liquid phases may also occur without or with minimal dissolution of the liquid phases, which may be referred to as 'mixing' or 'combining' or 'merging' or forming one or more of the example descriptors in '2)'. 5) Physical absorbents, media which absorbs one or more gases via physical phenomena or physical interactions, may be referred to as a physical solvent, solvent, physical absorbent solvent, liquid, or a combination thereof. 6) A 'desired gas' may comprise, for example, a gas is desired to dissolve in the physical solvent or a gas that is desired to be separated from one or more other gases. In some instances, one or more dissolved gases may comprise the desired gas or gases. 7) Separation of one or more liquid phases from one or more other liquid phases in a mixture comprising two or more liquid phases may be referred to as, including, but not limited to, liquid-liquid separation, or separation of liquid phases, or liquid phase separation, phase separation, separating said liquid phases, or a combination thereof 8) 'Permeate' or permeate liquid may comprise liquid which passes through one or more semi-permeable membranes or was not or was minimally rejected by one or more semipermeable membranes. 'Permeate equivalent liquid' or liquid equivalent to permeate may comprise a liquid with similar composition or characteristics to one or more permeate liquids, however may not have originated, in whole or in part, from a permeate solution resulting from the separation of one or more or a combination of reagents in a liquid system using a semipermeable membrane. 9) 'CST Reagent', 'UCST Reagent' or 'UCST Forming Reagent', 'LCST Forming Reagent' or 'LCST reagent': May comprise A) a reagent which exhibits decreasing osmotic pressure with increasing temperature in a solution consisting soft water and said CST reagent, B) a reagent which possesses greater affinity for said low solubility reagent relative to water with increasing temperature, C) a reagent which is soluble in solvent or water under certain conditions, D) one or more combinations of A to D.

15) 'LCST binder reagent': Although all LCST reducing reagents may reduce LCST of one or more liquid systems with increasing concentration of the LCST reducing reagent, not all reagents which reduce LCST may be considered LCST reducing reagents. An 'LCST reducing reagent' may be more soluble in one or more 'LCST reagent solvents' than one or more 'LCST reagents'. On the other hand, reagents which may decrease LCST with increasing concentration and may be more soluble or appreciably more soluble in the one or more 'LCST reagents' than one or more 'LCST reagent solvents', may be classified as a 'LCST binder reagent'.

For example, given an example liquid system comprising polypropylene glycol 425 (PPG 425), propylene carbonate, water, and 5 wt % sodium chloride: PPG 425 may be classified as an 'LCST reagent', 'Propylene Carbonate' may be classified as a 'LCST binder reagent', water may be classified as a 'LCST reagent solvent', and sodium chloride may be classified as a 'LCST reducing reagent'. PPG 425 may be classified as a LCST reagent, as, for example, in a solution water and sodium chloride in, it may form a LCST phase transition. Propylene Carbonate may be classified as a 'LCST binder reagent' as, for example, it may predominantly dissolve in a phase more concentrated in PPG 425 in a LCST phase transition where PPG 425 is the LCST reagent. Additionally, for example, in a mixture of water only (water comprising an example LCST reagent solvent) or water and sodium chloride only, propylene carbonate may lack a LCST phase transition. Water may be classified as an 'LCST reagent solvent' as, for example, the 'LCST reagent' may form a LCST phase transition in a solution comprising LCST reagent dissolved in water. Sodium chloride may be classified as a 'LCST reducing reagent' as, for example, sodium chloride may be more soluble in the 'LCST reagent solvent' than the 'LCST reagent'. Additionally, for example, in a mixture of water only (water comprising an example LCST reagent solvent) or water and sodium chloride only, sodium chloride may lack a LCST phase transition.

'UCST solvent': A reagent which may dissolve 'CST reagent' and may exhibit limited solubility in 'Low solubility reagent'

'CST Reagent': A reagent which may enable 'low solubility reagent' to be nearly or completely soluble in UCST solvent reagent under certain temperatures and/or other conditions and insoluble or only partially soluble under certain different temperatures and/or other conditions. Increasing the concentration of CST reagent may, for example, decrease UCST.

'Low solubility reagent': A reagent which may possess low solubility in a solvent alone, or relatively high solubility in 'CST reagent', or may exhibit complete solubility in solvent in the presence of CST reagent above one or more concentrations and/or at certain temperatures and/or other conditions, or a combination thereof 'High solubility reagent': A reagent which may possess high solubility in UCST solvent alone, or high solubility in 'CST Reagent', or high solubility in 'low solubility reagent', or a combination thereof. High solubility reagent may, for example, decrease UCST and/or influence other phase transition properties in the liquid system.

'UCST increasing reagent': A reagent which may possess high solubility in UCST solvent alone, or low solubility in 'CST reagent' alone, or low solubility in 'low solubility reagent' alone, or a combination thereof. Low solubility reagent may, for example, increase UCST and/or influence other phase transition properties in the liquid system.

Solvents, UCST solvents, LCST solvents, UCST solvent reagent, LCST solvent reagent: May comprise a reagents which may dissolve CST reagent, which may comprise, for example, including, but not limited to, water or ammonia.

Miscible solubility or substantially miscible solubility or miscible may defined as a composition, which may be at specific temperatures or other conditions, which comprises a single liquid phase combined solution. For example, a low solubility reagent may be miscible or substantially miscible in a UCST solvent and CST reagent solution above a UCST, meaning a specific or defined amount of low solubility reagent or a liquid phase comprising mostly low solubility reagent may form a single liquid phase solution at these conditions. Miscible solubility or substantially miscible solubility or miscible may not mean miscible in a proportions and temperatures, as, for example, a low solubility reagent may not be miscible in a proportions and temperatures in a UCST system.

Substantially miscible or miscible may be defined as a one or more or a combination of reagents which, when combined at specific temperatures or other conditions, form a liquid stream with at least 90% of the total mass of said reagents in a combined single liquid phase.

Substantially Insoluble:
1) o 1) solubility less than 30 wt %, or 20 wt %, or 10 wt %; or
2) o 2) solubility less than 30 wt % and solubility greater than 70 wt %, or 80 wt %, or 90 wt %; or
3) o 3) maximum solubility less than 100 wt %, or 90 wt %, or 80 wt %, or 70 wt %, or 60 wt %, or 50 wt %, or 40 wt %, or 30 wt %, or 20 wt %, or 10 wt %; or
4) 4) solubility less than 3 wt %, or 2 wt %; or
5) 50 one or more or a combination of 1) to 5).

Limited solubility or Low Water Solubility:
1) o 1) solubility less than 50 wt %, or less than 40 wt %, or less than 30 wt %, or 20 wt %, or 10 wt %
2) o 2) solubility less than 30 wt % and solubility greater than 70 wt %, or 80 wt %, or 90 wt %
3) o 3) maximum solubility less than 100 wt %, or 90 wt %, or 80 wt %, or 70 wt %, or 60 wt %, or 50 wt %, or 40 wt %, or 30 wt %, or 20 wt %, or 10 wt %

LCST binder reagents may will follow the CST reagent—if the CST reagent is predominately dissolved in water, the binder reagent may will predominately dissolve in water. If the CST reagent is predominately a separate liquid phase from water, the binder reagent with be may be predominately dissolved in said separate liquid phase containing predominately CST reagent.

A 'low solubility reagent' may not always be in the liquid phase containing the relative greatest amount or most of the CST reagent. For example, given a UCST liquid system comprising 'low solubility reagent', UCST solvent, and CST reagent, the 'low solubility reagent' may substantially form a liquid phase containing mostly low solubility reagent below a UCST and may form a combined single liquid phase solution with UCST solvent and CST reagent above a UCST. Said liquid phase containing mostly low solubility reagent may contain the minority amount of CST reagent, while another liquid phase comprising CST reagent and UCST solvent may contain most of the CST reagent in the liquid system.

Note: Depending on the CST reagent and liquid system composition, increasing the concentration of CST reagent beyond a certain concentration relative to 'low solubility reagent' and/or one or more other reagents may transition the liquid system from liquid system possessing an UCST into a liquid system possessing a LCST. Said transition may be exploited in one or more refrigeration cycles or heating cooling transfer systems or extractions or heat engines or one or more applications described herein.

Other Notes:
Note: Adjusted may be a synonym to, including, but not limited to, tuned, tailored, change,
Note: 'CST reagent' may also refer to 'UCST reagent'
Note: A 'low solubility reagent' may exhibit substantial or miscible solubility in a solution above one or more temperatures and limited solubility or immiscible solubility below one or more of said temperatures.
Note: One or more reagents may be 'refrigerants'. Refrigerants in the context of embodiments with evaporators and absorbers may comprise reagents with relatively low boiling point or relatively high vapor pressure. Refrigerants may exhibit properties of, for example, low solubility reagents.'
Note: Nanofiltration (NF) and Reverse Osmosis (RO) are provided as example membrane based processes in the figures. Other membrane based processes or membrane based separation devices may be employed instead or in addition to NF or RO.
Note: Example summaries of other example embodiments, which may include, but are no limited to the following:
Datacenter cooling transfer using UCST phase change liquids and liquid-liquid separation
Datacenter cooling transfer using LCST phase change liquids and combined two-phase liquid (without liquid-liquid separation)
Datacenter cooling transfer using LCST phase change liquids and combined two-phase liquid with evaporative cooling
Power Plant Condenser Cooling using LCST phase change liquids with Liquid-Liquid Separation
Power Plant Condenser Cooling using LCST phase change liquids and combined two-phase liquid with evaporative cooling
Power Plant Condenser Cooling using UCST phase change liquids with Liquid-Liquid Separation
Power Plant Condenser Cooling using UCST solubility change liquids and combined two-phase liquid with evaporative cooling
Employing LCST solubility change liquids as an electronic coolant or high power electronic coolant
Note: A CST reagent+refrigerant solution from which refrigerant is evaporated and the remaining residuals (which may be residual CST reagent) are mixed with the absorption solution
Note: One or more embodiments may further comprise or employ one or more stages for evaporative cooling
Note: Applicable to, for example, indirect and/or direct cooling
Note: CST reagents may include CST reagents. CST reagents may also refer to reagents which enable or result in a solution exhibiting one or more LCST or UCST. For example, an example compound which may be referred to as an example 'CST reagent' in the present document, although is not necessarily a polymer according to conventional definitions, may be, including, but not limited to, Propylene Glycol n-Propyl Ether (PnP). CST reagents may exhibit or enable liquid phase transition properties in an aqueous solution. A CST reagent may comprise one or more reagents which exhibit or enable one or more liquid phase transition properties in a solution. CST reagents may also refer to one or more reagents which may decrease UCST with increasing concentration, which may involve a limited concentration range.

Other Example Descriptions

Example UCST Refrigeration Working Fluid System:
1) A two or more liquid phase multi-liquid phase mixture is separated into separate liquid streams. Said separate liquid stream may comprise two separate liquid streams, which may comprise pre-dominantly separated constituent liquid phases.
Note: Said multi-liquid phase mixture may remain a mixture. In this version, it may be desirable to begin the process at step 2 with the concentrating of a multi-liquid phase mixture using one or more membrane based processes. In said version, the concentrate or retentate may undergo endothermic or exothermic dissolution during concentrating, which may be recovered using in-situ heat exchanging with the one or more membrane modules or heat exchange following said membrane based process.
2) One or more liquid phase containing one or more CST reagents may be concentrated using one or more membrane based processes. Said concentrating may result in one or more concentrate solutions with a relatively greater concentration of said one or more CST reagents and may result in a permeate solution with a relatively lower concentration or free concentration of said one or more CST reagents.
3) Said concentrate stream may be mixed one or more separated liquid phases, which may comprise one or more of said liquid streams separated in step 1. Said mixing may result in endothermic dissolution at a relatively lower temperature than one or more applications requiring cooling or one or more enthalpy sources and may result in a combined, single liquid phase solution. Said liquids or combined liquid solution may be heat exchanged with one or more applications requiring cooling or one or more enthalpy sources before, during, or after said mixing, or a combination thereof.
4) Said combined single liquid phase solution may be mixed with permeate solution from step 2 or permeate equivalent solution or a combination thereof. Said resulting mixing may undergo an exothermic phase transition into a two or more liquid phase multi-liquid phase mixture. Said phase transition may be conducted in the presence of one or more heat exchangers, to for example, heat one or more applications requiring heating or release heat to a heat sink. Said resulting multi-liquid phase mixture may be transferred to step 1.

Example Embodiment Employing Surfactant and Two or More Liquid Reagents:

Two or more other reagents are insoluble or have limited solubility in each other without the surfactant. With the surfactant, the two other liquid phases dissolve in each other with significant endothermic or exothermic dissolution. The surfactant is higher molecular weight or has a larger hydration or dissolution radius than the solvating molecules/the other liquid reagents.

The system is regenerated by concentrating the surfactant using reverse osmosis, resulting in a permeate stream comprising the two reagents without the surfactant. Without the surfactant, the two liquid reagents are insoluble, are supersaturated, or exhibit limited solubility, or a combination thereof. As a result, the permeate stream becomes cloudy with two or more liquid phases or the two or more liquid reagents without the surfactant. The mixture of these two or more liquid phases may be separated or remain a mixture. One or more of these liquid phases or the liquid phase mixture may undergo evaporative cooling, especially if one of these liquid phases comprise water and the other liquid phases are not or exhibit low volatility or vapor pressure.

1) single phase liquid solution of the surfactant and the two or more other reagents is fed into a reverse osmosis system. The surfactant is concentrated, while the permeate comprises the two or more other reagents with lower molecular weight or smaller hydration radius or are otherwise un-rejected or limited rejected reagents (for example: the 'solvents'). Without the surfactant, the two or more other reagents are insoluble or exhibit limited solubility in each other, resulting in the 'clouding' of the permeate stream due to the formation of two or more liquid phases. In the endothermic dissolution process, this step may be exothermic or release heat, and may be cooled by ambient cooling, such as heat exchange with air or evaporative cooling before or during or after or combination thereof said step.

2) The following steps are optional:
   Optional: Separation of permeate liquid phases
   Optional: Evaporation or evaporative cooling of water in a separated water-rich liquid phase or from the mixture of liquid phases 3) Mixing of the one or more liquid phases with the surfactant-rich concentrate stream, resulting in the endothermic dissolution of the liquid phases into a single liquid phase. Said step reduces the temperature or provides cooling or heat removal and comprises the 'cooling' step. The application requiring cooling is heat exchanged with this step before, during, or after, or a combination thereof this step. Following dissolution and heat exchanging, the single phase liquid solution is transferred to step 1.

May employ evaporative cooling before the endothermic dissolution or the membrane based process or both. Note: The evaporative cooling temperature may be above one or more of the UCSTs of the liquid system, if the reagents have an UCST.

Example LCST Working Fluid Refrigeration Cycle:

1) Endothermic Phase Transition into Multi-Liquid Phase Mixture: A solution which may comprise one or more LCST reagents (such as CST reagent) and water may be mixed with a 'concentrate' solution. Said concentrate solution may be 'concentrated' in one or more reagents which reduce LCST cloud point (for example: salts). Said mixing may result in a phase change (for example: an endothermic phase change), which may involve the formation of two or more liquid phases. Said liquid phases or solutions may be heat exchanged before, during, or after, or combination thereof said mixing. Said heat exchanging may be with one or more applications requiring cooling or one or more enthalpy sources.

2) Liquid-Liquid Phase Separation: Two or more liquid phases may be separated, at least in part, into separate two or more separate liquid streams, each which may comprise one or more of said liquid phases. One or more of said liquid streams may containing a relatively significant concentration of one or more LCST reducing reagents and/or may be lean in one or more LCST reagents. One or more of said liquid streams may be rich in one or more LCST reagents and may be lean in one or more LCST reducing reagents.

3) Concentrating LCST Reducing Reagent in One or More Liquid Streams: One or more LCST reducing reagents in said liquid stream containing a relatively significant concentration of one or more LCST reducing reagents may be concentrated using one or more semi-permeable membrane-based processes. Said concentrating may result in one or more 'concentrate' solutions containing a relatively higher concentration of one or more LCST reducing reagents and/or one or more permeate liquids lean-in or practically free of one or more LCST reducing reagents (for example: salts). Said concentrate solution(s) may be transferred to step 1 and said permeate liquid(s) may be transferred to step 4.

4) Exothermic Dissolution into Combined Single Liquid Phase Solution: One or more permeate liquids may be combined or mixed with one or more liquid streams rich in one or more LCST reagents, which may result in exothermic dissolution. Said liquid phases or solutions may be heat exchanged before, during, or after, or combination thereof said mixing. Said heat exchanging may be with one or more applications requiring cooling or one or more heat sinks.

Note: It may be desirable for step 1 to generate a temperature lower than the temperature generated in step 4.

Note: Step 3 may be treated with nanofiltration first to, for example, separate a portion of residual CST reagent, if, for example, CST reagent is employed as an LCST reagents; then, second, treat the resulting permeate with reverse osmosis or lower molecular weight cutoff (MWCO) nanofiltration to concentrate one or more LCST reducing reagents (for example: salts).

Note: It may be desirable to minimize the salt concentration required to appreciably reduce LCST. It may be desirable to employ other LCST reducing reagents than salts which may include, but are not limited to, reagents which may not be rejected by one or more membranes employed in the process. For example, it may be desirable to employ, for example, in part, reagents which reduce LCST cloud which are not or minimally rejected by employed semi-permeable membranes because, for example, they may not or may minimally contribute to the osmotic pressure of the LCST reagent being concentrated. In other words, energy consumption required to sufficiently concentrate said LCST reducing reagent may be lower if a lower concentration of LCST reagent(s) which are rejected by one or more membranes are required to achieve sufficient LCST reduction. For example, it may be desirable to reduce the cloud point with glycerol or urea.

Summary Active Cloud Point Adjustment:

Embodiments described herein may employ systems and methods for actively adjusting the cloud point or LCST or UCST or a combination thereof. Active cloud point adjustment may comprise changing the compositions of one or more or a combination of liquid phases to increase or decrease or maintain one or more LCSTs or UCSTs or combination thereof. Active cloud point adjustment may involve removing a portion of one or more liquid system reagents, or re-introducing additional one or more liquid system reagents, or adding one or more external reagents to a liquid system, or removing one or more external reagents from a liquid system. Active cloud point adjustment may involve changing one or more system conditions to adjust cloud point. Active adjustments of cloud point may be desirably reversible. Active cloud point adjustment may be in response to, for example, changes in one or more system conditions or compositions or economic factors. Said changes may include, but are not limited to, one or more or a combination of the following: changes in the temperature of one or more available heat sources, changes in the temperature of one or more available cooling sources, changes in outside temperature, changes in pressure, changes in composition, changes in the concentration of one or more reagents affecting cloud point temperature, changes in the value of inputs or outputs, the presence or lack of presence of one or more reagents, change in the cost of one or more energetic inputs, change in the value of one or more outputs, degradation, impurities, or a combination thereof.

Example Embodiment for Active Cloud Point Adjustment in an LCST Liquid System:

An embodiment for active adjustment of cloud point may involve reversibly adjusting the concentration of one or more reagents which may have influence on the one or more LCSTs, UCSTs, phase transitions, the composition of or one or more liquid phases, the relative mass of one or more liquid phases, the relative volume of one or more liquid phases, or a combination thereof. For example, a LCST liquid system may comprise, including, but not limited to, one or more or a combination of the following: 1) one or more CST reagents, 2) water, 3) one or more reagents insoluble or exhibiting low solubility in said one or more CST reagents without the presence of water, or 4) one or more reagents soluble in said CST reagent and/or water. Said example LCST liquid system and/or other example liquid systems may employ one or more or a combination of the following example systems & methods for adjusting LCST.

The present embodiment may employ a membrane-based process and/or the addition of a 'permeate' liquid or 'permeate equivalent liquid' to adjust one or more or a combination cloud points.

Decreasing LCST:

The present example embodiment may involve first forming a multi-liquid phase solution, which may involve a phase transition before or during the present example embodiment. One or more of said liquid phases in said multi-liquid phase solution may comprise an aqueous solution lean in one or more CST reagents. The present embodiment may employ one or more multi-liquid phase liquid-liquid separation devices, which may separate said liquid phase aqueous solution lean in one or more CST reagents from one or more other liquid phases. Said separated liquid phase aqueous solution lean in one or more CST reagents may comprise, for example, water, one or more salts (or other reagents which facilitate reduction of LCST cloud point), and/or residuals of non-rich reagents (for example: CST reagent). Said solution may be concentrated using, for example, one or more membrane-based process, such as reverse osmosis and nanofiltration.

In one version of the present embodiment, the liquid phase aqueous solution lean in one or more CST reagents may comprise a feed solution to a reverse osmosis system, wherein said salt and residual CST reagent may be concentrated, forming, for example, a concentrate. A portion of water and other reagents not rejected or fully rejected by the one or more membranes may pass through said one or more membranes, forming, for example, a permeate liquid or permeate liquid mixture (liquid mixture may form, for example, if one more reagents are insoluble or exhibit limited solubility without or with less presence of one or more reagents rejected by said one or more membranes). A liquid system containing said concentrate solution may possess a lower LCST than the LCST of the liquid system before treatment with one or more membranes. Relatively higher concentration of, for example, salt, may decrease the LCST of liquid system. Said permeate, may, for example, be stored. Said permeate liquid may be later re-introduced into a liquid system. For example, said permeate liquid may be added to said liquid system to, for example, increase the one or more LCSTs.

In another version of the present embodiment said liquid phase aqueous solution lean in one or more CST reagents may first undergo separation of one or more residual CST reagents from a portion of the remaining solution. Said first separation may involve concentrating one or more of said residual CST reagents using one or more semi-permeable membranes. It may be desirable for said permeable membranes to reject one or more of said CST reagents, while, for example, allowing one or more other reagents to pass through the membrane. Said semi-permeable membranes may comprise, including, but not limited to, nanofiltration or ultrafiltration. Said concentrating may resulting in a CST reagent rich concentrate solution or mixture and a CST reagent-lean or CST reagent-free permeate. Said CST reagent concentrate may be re-introduced into the liquid system or stored for later use or re-introduction to the liquid system or combination thereof. Said CST reagent-lean or CST reagent-free permeate may comprise, including, but not limited to, one or more or a combination of the following: water, or salts, or other reagents which influence phase transition, or combination thereof. Said CST reagent-lean or CST reagent-free permeate may be concentrated in a second separation using one or more semi-permeable membranes, for example, reverse osmosis, which may be able to concentrate or reject one or more reagents unrejected or minimally rejected by said first separation. Said second separation may form a concentrate solution more concentrated in salts or other reagents which may influence phase transition or combination thereof and a permeate solution lean in said one or more reagents. Said concentrate may be re-introduced into the liquid system, which may decrease said liquid system's phase transition temperature (such as a LCST) or multi-liquid phase composition or multi-liquid phase distribution, other adjustments to said liquid systems cloud point or phase transition, or a combination thereof. Said permeate liquid may be later introduced into a liquid system. For example, said permeate liquid may be added or later added to said liquid system to, for example, increase the one or more LCSTs.

In another version of the present embodiment, a single liquid phase combined solution may be concentrated using one or more membranes.

A) For example, said single liquid phase may be first concentrated using one or more membrane which rejects one or more larger molecular weight reagents, such as residual CST reagents, while, for example, allowing smaller molecular weight reagents, such as salts or low molecular weight organics or water, to pass through said membranes. Examples of said membranes, may include, but are not limited to, nanofiltration or ultra-filtration membranes or other semi-permeable membrane systems & methods described in herein. Said concentrating may form a concentrate solution rich in said one or more larger molecular weight reagents, and a permeate stream lean or free of said larger molecular weight reagents. Said concentrate solution may be stored or introduced into the liquid system. Said permeate may be returned to the liquid system or may undergo one or more further steps, for example, step B).

B) Said permeate may be concentrated in a second concentrating step using one or more semi-permeable membranes, for example, reverse osmosis, which may be able to concentrate or reject one or more reagents unrejected or minimally rejected by said first concentrating step. Said second concentrating step may form a concentrate solution more concentrated in salts or other reagents which may influence phase transition or combination thereof and a permeate solution lean in said one or more reagents. Said concentrate may be re-introduced into the liquid system, which may decrease said liquid system's phase transition temperature (such as an LCST) or multi-liquid phase composition or multi-liquid phase distribution, other adjustments to said liquid system's cloud point or phase transition, or a combination thereof. Said permeate liquid may be later introduced into a liquid system. For example, said permeate liquid may be added or later added to said liquid system to, for example, increase the one or more LCSTs.

Alternatively, said single liquid phase combined solution may be first concentrated using reverse osmosis. Said concentrating may reject CST reagent or salts or one or more other reagents which may influence phase transition or a combination thereof. Said concentrating may result in concentrate solution or multi-liquid phase mixture more concentrated in CST reagent and salts or one or more other reagents and a permeate solution lean in one or more or nearly all or all said reagents. Said concentrate solution or multi-liquid phase mixture may exhibit a lower LCST relative to the input single liquid phase combined solution. Said concentrate solution may be introduced to the liquid system or may comprise a component of the liquid system. Said permeate liquid may be later introduced into a liquid system. For example, said permeate liquid may be added or later added to said liquid system to, for example, increase the one or more LCSTs.

Increasing LCST:

LCST of a liquid system may be increased, for example, by adding permeate liquid or permeate equivalent liquid to said liquid system. Said permeate liquid may desirably be lean or essentially free of salts or other reagents which may decrease LCST when in one or more liquid systems. Said addition of permeate liquid or permeate equivalent liquid may, for example, dilute or reduce the concentration of one or more salts or other reagents which may influence LCST, which may result in an increase in LCST temperature.

Example Embodiment for Active Cloud Point Adjustment in UCST System:

An embodiment for active adjustment of cloud point may involve reversibly adjusting the concentration of one or more reagents which may have influence on the one or more LCSTs, UCSTs, phase transitions, the composition of or one or more liquid phases, the relative mass of one or more liquid phases, the relative volume of one or more liquid phases, or a combination thereof. For example, a UCST liquid system may comprise, including, but not limited to, one or more or a combination of the following: 1) one or more CST reagents, 2) water, 3) one or more reagents insoluble or exhibiting low solubility in said water without the presence of CST reagent and/or one or more other reagents, or 4) one or more reagents soluble in said CST reagent and/or water. Said example UCST liquid system and/or other example liquid systems may employ one or more or a combination of the following example systems & methods for adjusting UCST.

The present embodiment may employ a membrane-based process and/or the addition of a 'permeate' liquid or 'permeate equivalent liquid' to adjust one or more or a combination cloud points.

Decreasing UCST: The present example embodiment may involve first forming a multi-liquid phase solution, which may involve a phase transition before or during the present example embodiment. One or more of said liquid phases in said multi-liquid phase solution may comprise a solution containing one or more CST reagents. In some UCST liquid systems described herein, one or more CST reagents may function as a necessary reagent (for example: polypropylene glycols or polyethylene glycols) to ensure another one or more reagents (for example: propylene carbonate) are soluble in yet another reagent (for example: water) at or below one or more UCSTs. Furthermore, in one or more embodiments described herein, the concentration of said CST reagent relative to said one or more other reagents may influence the UCST of the liquid system. For example, in some liquid systems, an increase in concentration of, for example, PPG 425, relative to propylene carbonate and/or water, may decrease said UCST. One or more of said liquid phases comprising one or more CST reagents may be separated, in part or in whole, or may remain a multi-liquid phase mixture. Said one or more liquid phases comprising a solution containing one or more CST reagents may be concentrated using one or more semi-permeable membranes, for example, which may include, but are not limited to, reverse osmosis (RO), nanofiltration (NF), or ultrafiltration (UF). To decrease cloud point temperature, it may be desirable for said one or more semipermeable membranes to reject one or more CST reagents, while, for example, allowing other reagents to pass through said membrane. By concentrating one or more CST reagents, while allowing other reagents to pass through said semi-permeable membrane, salts and other reagents which may increase UCST, if any, may remain at similar or the same concentration in solution. Said concentrating may result in a concentrate solution, which may possess a greater concentration of one or more CST reagents, and/or a permeate solution, which may comprise a liquid or multi-liquid phase mixture lean or free of one or more CST reagents. Said concentrate may be re-introduced into the liquid system, which may decrease said liquid system's phase transition temperature (such as an UCST) or multi-liquid phase composition or multi-liquid phase distribution, other adjustments to said liquid system's cloud point or phase transition, or a combination thereof. Said permeate liquid may be later introduced into a liquid system. For example, said permeate liquid may be added or later added to said liquid system to, for example, increase the one or more UCSTs.

In another version of the present embodiment, a single liquid phase combined solution may be a feed solution concentrated using one or more semi-permeable membranes. For example, one or more CST reagents in said single liquid phase combined solution may be concentrated. Said concentrating may result in a concentrate solution with a greater concentration of one or more CST reagents relative to the said feed solution and a permeate solution lean or substantially free of said one or more CST reagents. In the substantial absence of one or more CST reagents, one or more of said reagents in said permeate may be mutually insoluble or exhibit limited solubility in each other, which may result in, for example, the resulting permeate comprising a multi-liquid phase mixture. Said concentrate solution may exhibit a lower UCST due to, for example, greater CST reagent concentration. Said permeate liquid may be later introduced into a liquid system. For example, said permeate liquid may be added or later added to said liquid system to, for example, increase the one or more UCSTs.

Increasing UCST:
The UCST of a liquid system may be increased, for example, by adding permeate liquid or permeate equivalent liquid to said liquid system. Said permeate liquid may dilute or reduce the concentration of one or more CST reagents, which may enable an increased UCST.

Alternatively, or additionally, UCST may be increased using, for example, a membrane separation process. For example, if a UCST liquid system may contain salts or one or more other reagents which may increase UCST, one or more of said reagents may be concentrated. In one version of the present embodiment, said concentrating may occur in by concentrating a solution lean or free of one or more CST reagents (for example: the permeate from a CST reagent concentrating or separation step using, for example, nanofiltration or ultrafiltration). Said concentrating a solution lean or free of one or more CST reagents may be desirable as it may prevent the substantial simultaneous concentrating of one or more CST reagents.

The present embodiment may employ said active cloud point adjustment to, for example, actively adjust one or more UCSTs in the embodiment's liquid system.

The present embodiment for cloud point adjustment may actively adjust said solution's cloud point by, including, but not limited to, one or more or a combination of the following: changing UCST through one or more nanofiltration concentrating steps or changing UCST through the addition of permeate or permeate equivalent or changing UCST through one or more reverse osmosis concentrating steps or maintaining composition or cloud point by, for example, by-passing composition adjustment steps.

Step-by-Step Description:
The present embodiment may start with, for example, a liquid in a liquid system with one or more cloud points. The liquid may have a UCST (or may have a LCST) and may comprise a single liquid phase combined solution or a multi-liquid phase mixture solution. One or more embodiments may show a single liquid phase combined solution as an example. Said solution may be transferred to one of two or three pathways depending on, for example, if one or more cloud points of said solution or liquid system may need to be increased, decreased, or remained constant.

If, for example, one or more cloud points of said liquid system may need to be decreased, it may be desirable for one or more of the reagents which may decrease cloud point to be concentrated, using, for example, nanofiltration. Said concentrating with nanofiltration may involve pressurizing the solution using one or more pumps, which may form a pressurized feed solution to be concentrated in one or more nanofiltration units (NF). Said feed solution may be fed into one or more nanofiltration units, which may result in a concentrate stream and a permeate stream. Said concentrate stream may possess a greater concentration of, for example, one or more reagents which decrease cloud point, which may include, but are not limited to, one or more reagents which may be rejected by said one or more nanofiltration units. Said concentrate stream may possess a lower UCST than said feed solution. Said permeate solution may be transferred to one or more liquid storage vessels ('Permeate Storage'). Said permeate may be re-introduced into the liquid system, for example, upon the need for active increase in UCST.

If, for example, one or more cloud points of said liquid system may need to be increased, it may be desirable for said solution to be mixed with permeate or permeate equivalent liquid. Said mixing with permeate or permeate equivalent may dilute or reduced the concentration of one or more reagents which may decrease UCST, which may result in an increase in one or more UCSTs. Said solution mixed with permeate may be returned to said liquid system or comprise the liquid system.

If, for example, one or more cloud points of said liquid system may need to be unadjusted, said solution may be transferred to the next stage of the process without, for example, adjusting its composition.

Alternatively, or additionally, one or more UCSTs may be adjusted by one or more membranes-based processes (for example: reverse osmosis), which may be conducted by concentrating one or more reagents which may increase cloud point temperature with increased concentration in the liquid system. For example, the present embodiment may involve first forming a multi-liquid phase mixture by, for example, cooling a liquid system to at or below one or more UCSTs. Then, the present embodiment may involve at least partially separating said multi-liquid phase mixture into two or more of its constituent liquid phases. One or more of said constituent liquid phases may be lean in one or more reagents which decrease UCST at greater concentrations and may possess sufficiently large molecular weight or hydration radius to be at least partially rejected by a reverse osmosis membrane. Said one or more 'lean' liquid phases may contain one or more reagents which increase UCST with increased concentration and may possess sufficiently large molecular weight or hydration radius to be at least partially rejected by a reverse osmosis membrane. Said one or more 'lean' liquid phases may be a feed solution in one or more membrane based concentrating steps. Said one or more membrane based concentrating steps may include one or more concentrating steps to increase the concentration of one or more reagents which increase UCST with increased concentration. Said one or more membrane based concentrating steps may result in the formation of a concentrate solution and a permeate solution. Said concentrate solution may possess a greater concentration of one or more reagents which increase UCST with increased or greater concentration of said one or more reagents reagent. Said concentrate solution may be introduced into the liquid system, which may involve mixing one or more liquid phases in the liquid system or re-formation of a UCST liquid system. Said concentrate may increase one or more of the UCSTs of the liquid system relative to the liquid system before said concentrating. Said permeate solution may comprise a solution lean or free of one or more reagents which appreciably influence the UCST of the liquid system. Said permeate solution may be stored. Said permeate solution may be later introduced or added to the liquid system to, for example, decrease one or more UCSTs.

The present embodiment may employ said active cloud point adjustment to, for example, actively adjust one or more LCSTs in the embodiment's liquid system.

The present embodiment for cloud point adjustment may actively adjust one or more solutions' cloud point(s) by, including, but not limited to, one or more or a combination of the following: changing LCST through one or more reverse osmosis concentrating steps or changing LCST through the addition of permeate or permeate equivalent or changing LCST through one or more nanofiltration concentrating steps or maintaining composition or cloud point by, for example, by-passing composition adjustment steps.

Step-by-Step Description:

The present embodiment may start with, for example, a liquid in a liquid system with one or more cloud points. The liquid may have a LCST (or may have a UCST) and may comprise a single liquid phase combined solution or a multi-liquid phase mixture solution. Said solution may be transferred to one of two or three pathways depending on, for example, if one or more cloud points of said solution or liquid system may need to be increased, decreased, or remained constant.

If, for example, a liquid system requires a decrease in one or more LCSTs, one or more LCSTs may be adjusted by membrane-based concentrating (for example: Reverse Osmosis) of one or more reagents which may decrease cloud point temperature with increased concentration in the liquid system. For example, the present embodiment may involve first forming a multi-liquid phase mixture by, for example, heating a liquid system to at or above one or more LCSTs. Then, the present embodiment may involve at least partially separating said multi-liquid phase mixture into two or more of its constituent liquid phases. One or more of said constituent liquid phases may contain a relatively greater concentration of one or more reagents which decrease LCST with increased concentration, one or more of said reagents which may possess sufficiently large molecular weight or hydration radius to be at least partially rejected by a reverse osmosis membrane. Said one or more liquid phases rich in one or more reagents which decrease LCST with increased concentrations may be one or more feed solutions in one or more membrane based concentrating steps. Said one or more membrane based concentrating steps may include one or more concentrating steps to increase the concentration of one or more reagents which decrease LCST with increased concentration. Said one or more membrane based concentrating steps may result in the formation of a concentrate solution and a permeate solution. Said concentrate solution may possess a greater concentration of one or more reagents which decrease LCST with increased or greater concentration in an example liquid system. Said concentrate solution may be introduced into one or more liquid systems, which may involve mixing one or more liquid phases in a liquid system or re-formation of a LCST liquid system. Said concentrate may increase one or more of the LCSTs of the liquid system relative to the liquid system before said concentrating. Said permeate solution may comprise a solution lean or free of one or more reagents which appreciably influence the LCST of a liquid system. Said permeate solution may be stored. Said permeate solution may be later introduced or added to a liquid system to, for example, increase one or more LCSTs.

If, for example, a liquid system requires an increase in one or more LCSTs, one or more LCSTs may be adjusted by, for example, adding permeate or permeate equivalent solution to said liquid system. The reduced concentration of one or more reagents which decrease LCST with increasing concentration may result in an increase in the one or more LCSTs of said liquid system.

If, for example, one or more cloud points of said liquid system may need to be unadjusted, said solution may be transferred to the next stage of the process without, for example, adjusting its composition.

Note: Cooling or heating transfer independent of surrounding temperature

Note: Ionic liquids may be employed in the systems and methods described herein

Note: Example applications include, but are not limited to, one or more or a combination of the following: extractive separations where one or more chemicals may be extracted or concentrated in one liquid phase relative to another liquid phase, extractive separations where one or more chemicals are absorbed or dissolved and, subsequently, regenerated, precipitated or desorbed, cooling or heating in food production or storage, cooling or heating in beverage production or storage, pharmaceuticals, chemical and climatic chamber applications, cold transfer, heat transfer, cold transfer over long distances, heat transfer over long distances, cold transfer over long distances independent of surrounding temperature, heat transfer over long distances independent of surrounding temperature, low grade heat or cold transfer over long distances, lower CAPEX heat transfer or cold transfer, lower OPEX heat transfer or cold transfer, heat storage, cold storage, Osmotic Heat Engines, extractive separations, gas separations, HVAC, enthalpy source for heat pump or air conditioner, waste heat transport, ocean thermal energy conversion, deep water body derived cooling, ocean thermal energy conversion, power generation from low grade waste heat, deicing roads, cooling power plant condenser, datacenter cooling, or industrial cooling.

Note: The temperature surrounding the separate liquid phases storage vessels (for example: outside temperature) may be expected to drop below the freezing temperature of water. If this occurs, the temperature of the liquid phases may cool. If the temperature of one or more of the liquid phases drops below the freezing point of water, it may be desirable for one or more of the liquid phases to be allowed to partially freeze. The freezing may function as a temperature buffer, as the liquid below the 'ice' layer may maintain a temperature at or above the freezing point of the solution.

Note: Said osmotic heat engine may be employed to generate power from the difference in temperature between the surface of a road or other hot surface and a cooler source, such as a cool water body, cool ground, evaporative cooling, or a combination thereof.

Note: One or more phase change fluids or osmotic heat engines described herein may be employed as regenerable draw solutions for a forward osmosis desalination embodiment. For example, the draw solution may comprise one or more of the liquid phases in the phase change system. The feed solution may comprise, for example, a salt water solution that may, for example, be external from the phase change system. A portion of the water in the feed solution migrates to the draw solution through one or more forward osmosis membranes. The resulting diluted draw solution is heated above a LCST temperature or cooled below a UCST temperature or combination thereof to form two or more liquid phases from the single liquid phase diluted draw solution. One liquid phase may be water 'rich.' Another liquid phase may be, for example, draw solution 'rich.' The water rich solution may undergo further treatment, for example, removal of at least a portion of residual non-water reagents, before comprising desalinated or freshwater.

Note: The water body or salt water body or other liquid body or ground (for example geothermal or geo-cooling) or solid body or combination thereof may be a heat source (for example, including, but not limited to, solar pond, or evaporative cooling pond, or a evaporation pond, or the water section beneath the ice in a water body, the bottom of a water body when the surface of the water body contains ice or a combination thereof). The heat from the liquid body or solid body or gas body or combination thereof may be recovered or harnessed or transferred using a liquid with LCST phase change into two or more liquid phases due to heating from the 'heat' or enthalpy source of the liquid body. The two or more liquid phases may be separated using one or more liquid-liquid or liquid-liquid-liquid or liquid separation devices. This may enable the transfer of at least a portion of the heat absorbed independent of the temperature surrounding the heat transfer fluids being transported and independent of the distance heat transfer fluids are required to travel.

Note: In an alternative embodiment, an LCST phase change liquid system may be employed to transport cold from a relatively cooler depth of a water or other liquid body possessing a thermocline. The LCST phase change liquid may form two or more liquid phases when heated above one or more LCST. The LCST liquid system may transfer the LCST heat exchange fluid as a two or more phase liquid mixture or two or more phase separate liquid stream. Said transfer may be conducted to one or more cooler depths of the thermocline water body. The LCST working fluid may transform into a single liquid phase or a less liquid phases during cooling or heat exchange with the surrounding cooler temperatures at the relatively cooler depth in said thermocline liquid body. The LCST Note: An LCST working fluid may be employed in the generation of electricity from the difference in temperature between different depths of a thermocline water or other liquid body. The LCST phase change into a two or more liquid mixture may occur, for example, at or near the surface of the thermocline water body. The multi liquid phase solution separation device may be located at or near the surface of the thermocline water body, forming two or more separate liquid streams each comprising the separate liquid phases. The pressure retarded osmosis unit or other osmotic power device or devices may be located beneath the surface of the water body. For example, it may be desired to have the hydroelectric generator or hydropower turbine located at or near the surface of the water body. The hydraulic pressure and input and output liquid streams from the pressure retarded osmosis system may, for example, be transported to the surface. For example, the pressurized outlet stream from the pressure retarded osmosis system may be transported in one or more designated pipes to the surface, wherein, for example, said pressurized outlet stream is passed through one or more hydroelectricity generators or hydropower turbines before being, for example, regenerated and recirculated within the integrated embodiment.

Note: The thermocline water or other liquid body embodiments may, if desired, employ one or more liquids pumped from different depths of the thermocline as the heat or cool source or combination thereof. This may desired, for example, if it is desired for one or more unit operations to be located above the liquid body or near the surface of the liquid body, rather than, for example, at a significant depth beneath the surface of the liquid body.

Note: Alternatively, antifreeze or LCST or UCST phase change liquids or LCST or UCST liquids phases may be stored beneath the surface or at the bottom of a water body in, for example, one or more storage vessels. The temperature at the bottom of the water body, depending on its depth, may be relatively stable regardless of air temperatures above the water body surface. Even in shallower water bodies, the temperature of water at the bottom or otherwise beneath the surface of the water body is relatively stable when there is ice floating on the surface of the water body. When the 'heat' or 'cold' may need to be extracted from the water body, one or more liquids may be transferred from one or more of said storage vessels to the application requiring heating or cooling. The 'spent' solution may be returned to one or more of the storage vessels. The storage vessels enable, for example, significant storage of heat or cool with the ability to be immediately utilized if needed. The previously described systems & methods are superior to, for example, simply pumping water from beneath the surface of the water body, as pumping water may result in ice formation, biofouling, and environmental damage.

Note:
With Underwater Storage of Working Fluid with Freezing Point Below the Freezing Point of Water
With Heat Pump
With LCST Phase Change System with Working Fluid Storage
With LCST Phase Change System with Liquid-Liquid Separation With LCST Phase Change System combined liquid mixture or single liquid stream or without liquid-liquid separation Note: The two or more liquid phase storage containers may be in part or in whole insulated or store a large volume of liquid or both to, for example, prevent the solution from completely freezing during a surrounding temperature drop.

Note: If desirable, the one or more liquid phases may contain other additives to reduce freezing point. It is important to note, however, partial freezing of one or more of the liquid phases may be desirable in, for example, embodiments for heating or de-icing surfaces, as it may function, for example, as a temperature buffer.

Note: Phase change may comprise, including, but not limited to, a single liquid phase transforming into two or more liquid phases, two or more liquid phases transforming into less liquid phases, two or more liquid phases transforming into less liquid phases due to dissolution of one or more or a portion of liquid phases, 'n' number of liquid phases transforming into 'n' number+'x' number of liquid phases, into 'n' number+'x' number of liquid phases transforming into 'n' number of liquid phases Note: Heat input may be provided by the absorption of water vapor or other vapor or a combination thereof into, for example, the one or more liquid streams described herein. Cool input or heat removal may be provided by the desorption or evaporation or stripping of water vapor or other vapor of a combination thereof into, for example, the one or more liquid streams described herein. None, one or more or a combination of the previous methods may be employed.

Note: Alternatively, for example, in climates with temperatures consistently significantly below the freezing point of water, the exothermic dissolution may increase the temperature of the solution at the destination relative to ambient temperatures, enabling reduced energy consumption for a heating device that may be employed to further heat the solution to melt the ice. For example, by supplying a higher temperature heat source, a heat pump or other heating device may require less energy to melt a surface relative to heat or extracting enthalpy or entropy or heat from a working fluid with lower temperature.

Note: In, for example, embodiments transferring cold from a thermocline water body from deeper liquid depths, the pipe transferring the cool transfer liquid or coolant may function as a heat exchanger with the surroundings. By the time the cool transfer liquid reaches the point of a liquid-liquid separation apparatus, the cool transfer liquid may have undergone a UCST phase change into two or more liquid phases. An additional heat exchange apparatus may be employed, although it may be unnecessary as the coolant transport pipe may provide sufficient heat exchange with the surroundings.

Note: Relatively warm may comprise a temperature above the cloud point or phase change temperature of the LCST or UCST solution.

Note: Relatively cold may comprise a temperature below the cloud point or phase change temperature of the LCST or UCST solution.

Note: The exiting combined single phase liquid solution may, if desired, be heat exchanged with the incoming liquid solution, as the temperature of the outgoing solution may be greater than the incoming or input solution. This may enable recovery of some heat.

Note: Liquid-liquid separation devices may alternatively be located at or above the surface of a water body. This may be applicable, for example, including, but not limited to, in instances where the UCST or LCST working fluid is employed in district cooling or where the cooling source is in close proximity to the surface of a water body or the surface of land, however the distance of the cooling source to the one or more applications requiring cooling may be far.

Note:
LCST with liquid storage, road can act as both the heat source and the cold source depending on the temperature of the road. For example, the systems and methods may be powered by ambient temperature change.

The LCST point may be tuned one or more temperatures, for example, near the temperature of freezing of water, including, but not limited to, one or more or a combination of the following: 0° C. to 5° C., 0° C. to 10° C., 0° C. to 20° C.

Whenever the road is above the LCST temperature, for example, a 'single phase' solution may be passed through one or more pipes or heat exchangers under the road, forming a two or more liquid phase multiphasic solution due to endothermic phase change, while absorbing heat from the road which may be further separated using a liquid-liquid separation device and the two separate liquid phases transferred to two separate liquid storage containers.

Whenever the road temperature is below, for example, 1° C. or there is precipitation or risk of ice or combination thereof, the separate liquid phases from the liquid storage containers may be transferred into the pipes under the roads where they are mixed either before or within the pipes The pipes under the roads may contain baffles or other mixing devices to promote heat or cool transfer or accelerate shift of liquid phases to at or near equilibrium.

Heat sources may include, but are not limited to, the ambient temperature of the road, industrial waste heat sources, or the relatively 'warm' temperature of the bottom of as water body Note: In embodiments for de-icing surfaces or roads, it may be desirable for the LCST cloud point temperature to be:
Sufficiently above the temperature of water freezing to ensure effective delta T for effective heat exchange with the surface Sufficiently low of a temperature for abundant ambient sources of heat (for example, including, but not limited to, one or more or a combination of the following: diurnal temperature variation, temperature variation of the surface from surrounding sources, waste heat, solar heat) to be able to supply heat for the LCST phase change.

An example temperature range for the LCST cloud point may be as large as, for example, including, but not limited to, 0-50° C., although for applications dependent on, for example, diurnal temperature variation, it may be, for example, including, but not limited to, 3-12° C.

Note: Example Compositions
LCST: propylene carbonate, water, PPG 425, or ionic compound or compound with relatively low solubility in propylene carbonate and PPG 425 and relatively high solubility in water or combination thereof UCST: propylene carbonate, water, PPG 425, or combination thereof The concentration ratios in the LCST case may be, for example, ~0-40 wt % propylene carbonate, ~20-50 wt % PPG 425, and ~30-65 wt % aqueous salt solution The concentration ratios in the UCST case are ~10-80 wt % propylene carbonate (for near equal layering, 40-60 wt % may be desired), ~3-25 wt % PPG 425, and ~15-35 wt % water (for near equal layering, 20-30 wt % may be desired)

Adding additives which are soluble in water and insoluble or exhibit limited solubility in PPG 425 or Propylene Carbonate or both may, for example, have the following impact on the cloud point temperature:
LCST: Decrease the LCST temperature
UCST: Increase the UCST temperature Example components that are insoluble or exhibit low solubility in both PPG 425 and Propylene Carbonate include, but are not limited to, one or more or a combination of the following: ionic compounds, glycerol, ethylene glycol, or polyethylene glycols).

Adding additives which are soluble in water and soluble in PPG 425 or Propylene Carbonate or both may, for example, have the following impact on the cloud point temperature:
LCST: Increase the LCST temperature
UCST: Decrease the UCST temperature Example components that are soluble in Water, PPG 425, and Propylene Carbonate include, but are not limited to, one or more or a combination of the following: ionic compounds, propylene glycol, polyethylene glycol dimethyl ethers).

Note: Embodiments herein may incorporate a gas phase or vapor-liquid equilibrium component to, including, but not limited to, heating and cooling transfer.
For example, the cooling or heating transfer may involve a liquid phase that vaporizes a gas at a site requiring heat removal, the gas phase and liquid phases being at least in part separated, transporting the gas phase separate from the liquid phase to the heat release or heat sink, combining the gas phase and liquid phase before or at the one or more heat release or heat sink sites, or a combination thereof.
For example: The UCST or LCST phase change may incorporate one or more gas phases. For example, one or more of the liquid phases resulting from the UCST or LCST phase change may possess a higher vapor pressure of one or more gases relative to, for example, the combined single-phase solution or another liquid phase.
For example: Heating or cooling may be transferred or utilized by a combination of UCST phase change, LCST phase change, specific heat, and phase change between liquid and gas phases.
Note: low viscosity at low and elevated temperatures, temperature tunability, high enthalpy of phase change, does not require insulation on pipes if not desired, lower volume of liquid requiring piping, latent heat driven—not entirely specific heat Note: The fluid flow rate and surface area of the surface or road heated or cooled by the LCST or UCST liquid phase change solution heat exchange may be dependent on, including, but not limited to, the enthalpy change of dissolution or multiphase liquid formation, the specific heat capacity of the road or surface being heated or cooled, the depth of the heat exchange piping relative to the surface, the configuration of the specific heat piping (for example coils or parallel heat exchanger configurations), the density or proximity of the specific heat piping relative to each other, the cloud point temperature or temperatures of the solution, estimated annual precipitation, the average diurnal temperature variation and frequency during, for example, cooler seasons, or combination thereof.

Note: The combined liquid solution (L-1) may comprise two or more liquid phases if, for example, the temperature outside is sufficiently warm or sufficient heat penetration has occurred to enable a multiphase phase change in, for example, the liquid storage container.

Note: Specific Heat, or Specific Heat Capacity, or Heat Capacity

Note: Cooling or heating application may be floating on the surface of the water or liquid body or located on land or combination thereof Note: Embodiments herein may employ pumps or other fluid or mass transfer devices. Figures may not include pumps and other devices even if these devices may be required in the embodiment shown. For example, there are numerous configurations and types of pumps that may be employed.

Note: Phase change may occur over the course of liquid transfer. The pipe itself may function as a heat exchanger with the surroundings. The phase change into two or more liquid phases may occur gradually as the liquid is transferred through water depths where the temperature of the surrounding water body is at or below the one or more UCST cloud point temperatures.

Note: Polypropylene carbonate, polyethylene carbonate,

Note: metals, transition metals, metals with low melting point, molten salts, salts with low melting point, salts with melting point, metals with melting point Note: Thermocline bodies are not limited to liquid bodies. For example, geothermal temperature gradients in the ground are considered thermocline bodies. For example, the temperature gradient in the atmosphere by altitude is an example of a thermocline body. A combination thereof may be employed in the embodiments described herein.

Note: Salinity difference may include, but is not limited to, a halocline or salinity concentration gradient

| Example Experimental Data | | | |
|---|---|---|---|
| Ethylene Glycol Diacetate - PPG-425 Example UCST Cloud Point | | | |
| ID | General Field (Down) | Specific Field (Down) | Data Values |
| 1A | Solvent Composition | Ethylene Glycol Diacetate (grams) | 20.03 g |
| | | DI Water (grams) | 15.22 g |
| | | PPG-425 (grams) | 14.58 g |
| | Temperatures | Solution Temperature (Celsius) | 32.5 C. |
| | | Estimated UCST (Celsius) | <8 C. |
| | Clouding/ Layering | Number of Layers | 2 |
| | | Top Layer Est. Volume (mL) (if any) | 28 |
| | | Middle Layer Est. Volume (mL) (if any) | N/A |

Example Experimental Data

Ethylene Glycol Diacetate - PPG-425 Example UCST Cloud Point

| ID | General Field (Down) | Specific Field (Down) | Data Values |
|---|---|---|---|
| | | Bottom Layer Est. Volume (mL) (if any) | 22 |
| | | Other Layering Notes (mL) (if any) | Two nearly transparent layers form in ice bath. Likely too much PPG - cloud point is less than 8 C. (clouding was conducted in an ice bath than cloud point was determined by heating the solution gradually). |

Propylene Carbonate - PPG-425 Example UCST Cloud Point

| ID | General Field (Down) | Specific Field (Down) | Data Values |
|---|---|---|---|
| 1F | Solvent Composition | Propylene Carbonate (grams) | 20.00 g |
| | | DI Water (grams) | 15.01 g |
| | | PPG-425 (grams) | 6.93 g |
| | Temperatures | Solution Temperature (Celsius) | 31.7 C. |
| | | Estimated UCST (Celsius) | 29.5 C. |
| | Clouding/ Layering | Number of Layers | 2 |
| | | Top Layer Est. Volume (mL) (if any) | 18-20 mL |
| | | Middle Layer Est. Volume (mL) (if any) | N/A |
| | | Bottom Layer Est. Voulme (mL) (if any) | 20-22 mL |
| | | Other Layering Notes (mL) (if any) | Two transparent layers |

Propylene Carbonate - PEGDME 500 Example UCST Cloud Point

| ID | General Field (Down) | Specific Field (Down) | Data Values |
|---|---|---|---|
| | Solvent Composition | Propylene Carbonate (grams) | 45.07 g |
| | | DI Water (grams) | 30.07 g |
| | | PEGDME 500 (grams) | 21.08 g |
| | Temperatures | Solution Temperature (Celsius) | |
| | | Estimated UCST (Celsius) | First: 22° C. Second: 15° C. |
| | Clouding/ Layering | Number of Layers | 2 or 3 |
| | | Top Layer Est. Volume (mL) (if any) | 55 mL |
| | | Middle Layer Est. Volume (mL) (if any) | Visually seen, although inconsistent volume and eventual disappearance |
| | | Bottom Layer Est. Volume (mL) (if any) | 35 mL |
| | | Other Layering Notes (mL) (if any) | Two transparent layers, although three layers during a certain temperature range |

Note: PEGDME 500—Propylene Carbonate—Water system appears it may possess two different UCST cloud points, one UCST cloud point which forms three liquid phases or layers and another UCST cloud which forms two layers. The three liquid phase cloud point may exist within a specific temperature range and, upon further temperature reduction, may form two liquid phases.

Propylene Carbonate - PEGDME 500 Example UCST Cloud Point

| ID | General Field (Down) | Specific Field (Down) | Data Values |
|---|---|---|---|
| | Solvent Composition | Propylene Carbonate (grams) | 39.99 g |
| | | DI Water (grams) | 30.00 g |
| | | PEGDME 500 (grams) | 10.96 g |
| | Temperatures | Solution Temperature (Celsius) | |
| | | Estimated UCST (Celsius) | First: 37.9° C. Three Layers defined at: ~26° C. Three Layers appear to turn into two layers at: ~24° C. |
| | Clouding/ Layering | Number of Layers | 2 or 3 |
| | | Top Layer Est. Volume (mL) (if any) | |
| | | Middle Layer Est. Volume (mL) (if any) | |
| | | Bottom Layer Est. Volume (mL) (if any) | |
| | | Other Layering Notes (mL) (if any) | Two transparent layers, although three layers under certain temperature range |

Summary: The present embodiments may pertain to reagents for creating novel upper critical solution temperature and lower critical solution temperature solubility swing compositions and novel systems and methods employing their unique capabilities. The present embodiments also be novel systems & methods. Applications improved, facilitated, or enabled may also be described herein.

Some embodiments may describe compositions to create a cooling cloud point ('LCST') or heating cloud point ('UCST') with desirable characteristics for the applications and novel systems & methods described herein. Examples of said desirable characteristics may include, but are not limited to, one or more or a combination of the following: significant tunability of cloud-point temperature, low viscosity, large enthalpy of liquid-liquid phase change, small enthalpy of liquid-liquid phase change, non-volatile, non-toxic, low cost, no degradation, stable, limited or no corrosion, selectivity for one or more chemicals, significant layer separation, difference in density between liquid phases, or separability of liquid phases using liquid-liquid separation devices.

Reagent Compositions and Combinations

The relatively low viscosity of one or more UCST working fluids described herein may be one of the breakthroughs introduced herein, as prior art temperature tunable UCST reagents involve high viscosity complex polymer gels. The relatively low viscosity UCST working fluids introduced herein may include compositions that possess a UCST temperature that is adjustable or tunable to any temperature from −20-1000° C.

The relatively low viscosity of the LCST working fluids may be another of the unprecedented fundamental science breakthroughs introduced herein, as prior art temperature tunable UCST reagents involve complex polymer gels or higher viscosity reagents. The relatively low viscosity LCST working fluids introduced herein may include compositions that possess a LCST temperature that is adjustable or tunable to any temperature from −20-1000° C.

UCST reagent compositions may include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol LCST reagent compositions may include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol Example Reagent Combinations with Tunable or Adjustable UCST or LCST Cloud Point Temperature and Regenerability Reagent combination comprising: X+Y+Z
- Wherein X comprises one or more or a combination of the following:
  - DI Water
  - Water
  - Low molecular weight organic solvent
  - Alcohols
- Wherein Y comprises one or more or a combination of the following:
  - Propylene Carbonate
  - Propylene acetate
  - Ethylene Carbonate
  - Organic solvent partially solvent in water
  - Dimethoxymethane
  - Acetals
  - Ethers
  - Esters
- Wherein Z comprises one or more or a combination of the following:
  - Polypropylene Glycol 425
  - Polypropylene Glycol 725
  - Polypropylene Glycol 1000
  - Polyethylene Glycol molecular weights 200-100,000
  - Polyethylene Glycol Dimethyl Ethers
  - Ethers
  - Acrylamides Reagent combination comprising: X+Y+Z+A
- Wherein X comprises one or more or a combination of the following:
  - DI Water
  - Water
  - Low molecular weight organic solvent
  - Alcohols
  - Ketones
- Wherein Y comprises one or more or a combination of the following:
  - Propylene Carbonate
  - Ethylene Carbonate
  - Organic solvent partially solvent in water
  - Dimethoxymethane
  - Acetals
  - Ethers
  - Esters
- Wherein Z comprises one or more or a combination of the following:
  - Polypropylene Glycol 425
  - Polypropylene Glycol 725
  - Polypropylene Glycol 1000
  - Polyethylene Glycol molecular weights 200-100,000
  - Polyethylene Glycol Dimethyl Ethers
  - Ethers
  - Acrylamides
- Wherein A comprises one or more or a combination of the following:
  - A reagent with high solubility in reagent X and low solubility in reagent Y or reagents Y and Z
  - One or more ionic compounds
  - Glycerol Reagent combination comprising: X+Y+Z+B
- Wherein X comprises one or more or a combination of the following:
  - DI Water
  - Water
  - Low molecular weight organic solvent
  - Alcohols
  - Ketones
- Wherein Y comprises one or more or a combination of the following:
  - Propylene Carbonate
  - Ethylene Carbonate
  - Organic solvent partially solvent in water
  - Dimethoxymethane
  - Acetals
  - Ethers
  - Esters
- Wherein Z comprises one or more or a combination of the following:
  - Polypropylene Glycol 425
  - Polypropylene Glycol 725
  - Polypropylene Glycol 1000
  - Polyethylene Glycol molecular weights 200-100,000
  - Polyethylene Glycol Dimethyl Ethers
  - Ethers
  - Acrylamides
- Wherein B comprises one or more or a combination of the following:
  - A reagent with high solubility in reagent X and high solubility in reagent Y or reagents Y and Z
  - Propylene Glycol
  - Ethylene Glycol
  - Diols
  - Polyethylene Glycol Dimethyl Ether 250
  - Ethers
  - Ketones Esters
Glymes
Glycols
Polyols
Lactams Example Reagent Compositions with UCST Cloud Point Temperature and Cloud Point Temperature Adjustment or Tuning and Relatively Low Viscosity The below compositions may demonstrate the relatively small adjustments in composition that may be employed to adjust the cloud point temperature or UCST of the liquid system. The below compositions may also demonstrate the ability to adjust the size and composition of the bottom and top liquid layers (or middle layers or other layers or phases) formed from the UCST phase change. Some of the below compositions may also demonstrate tunable UCST compositions comprising only non-toxic, non-volatile or nearly non-volatile chemicals (for example: water vapor). Some of the below compositions may also demonstrate tunable UCST compositions comprising only non-corrosive or low corrosivity reagents. Some of the below compositions may also demonstrate tunable UCST compositions comprising no or limited presence of an ionic compound.

It is important to note the one or more phases which may forming below the UCST temperature in a UCST system may have different density compared to one or more other phases. As a result, the one or more phases may form liquid 'layers,' where each layer is concentrated or comprises a liquid phase.

Note: The presence of most ionic compounds which may comprising, for example, including, but not limited to, sodium chloride, potassium bicarbonate, potassium carbonate, ammonium bicarbonate, ammonium carbonate, ammonium phosphates, ammonium sulfate, increase the UCST cloud point temperature in aqueous systems with, for example, Polypropylene Glycol or Polyethylene Glycol or Polyethylene Glycol Dimethyl Ether. In aqueous systems with, for example, Polypropylene Glycol, the cloud point temperature may increase with increased concentration of glycerol. In aqueous systems with, for example, Polypropylene Glycol, the cloud point temperature may decrease with increased concentration of propylene glycol.

| Example Composition #1 | |
|---|---|
| Composition | 19.4 wt % PPG 425 |
| | 53.6 wt % Propylene Carbonate |
| | 27 wt % Deionized Water |
| Cloud Point Temperature | ~18° C. |
| Volume % of Top Layer Below Cloud Point Temperature | ~45.5% |
| Composition of Top Layer | Water + PPG 425 Rich Phase |
| Volume % of Bottom Layer Below Cloud Point Temperature | ~54.5% |
| Composition of Bottom Layer | Propylene Carbonate Rich Phase |

| Example Composition #2 | |
|---|---|
| Composition | 23.0 wt % PPG 425 |
| | 51.2 wt % Propylene Carbonate |
| | 25.8 wt % Deionized Water |

| Example Composition #2 (continued) | |
|---|---|
| Cloud Point Temperature | ~4.1° C. |
| Volume % of Top Layer Below Cloud Point Temperature | ~51% |
| Composition of Top Layer | Water + PPG 425 Rich Phase |
| Volume % of Bottom Layer Below Cloud Point Temperature | ~49% |
| Composition of Bottom Layer | Propylene Carbonate Rich Phase |

| Example Composition #3 | |
|---|---|
| Composition | 19.3 wt % PPG 425 |
| | 48.4 wt % Propylene Carbonate |
| | 32.3 wt % Deionized Water |
| Cloud Point Temperature | ~18° C. |
| Volume % of Top Layer Below Cloud Point Temperature | ~57% |
| Composition of Top Layer | Water + PPG 425 Rich Phase |
| Volume % of Bottom Layer Below Cloud Point Temperature | ~43% |
| Composition of Bottom Layer | Propylene Carbonate Rich Phase |

| Example Composition #4 | |
|---|---|
| Composition | 21.5 wt % PPG 425 |
| | 39.2 wt % Propylene Carbonate |
| | 39.3 wt % Deionized Water |
| Cloud Point Temperature | ~13.6° C. |
| Volume % of Top Layer Below Cloud Point Temperature | ~77% |
| Composition of Top Layer | Water + PPG 425 Rich Phase |
| Volume % of Bottom Layer Below Cloud Point Temperature | ~23% |
| Composition of Bottom Layer | Propylene Carbonate Rich Phase |

| Example Composition #5 | |
|---|---|
| Composition | 21.5 wt % PPG 425 |
| | 39.0 wt % Propylene Carbonate |
| | 39.25 wt % Deionized Water |
| | 0.25 wt % Ammonium Sulfate |
| Cloud Point Temperature | ~15.6° C. |
| Volume of Top Layer Below Cloud Point Temperature | ~73.3% |
| Composition of Top Layer | Water + PPG 425 + Ammonium Sulfate Rich Solution |
| Volume of Bottom Layer Below Cloud Point Temperature | ~26.7% |
| Composition of Bottom Layer | Propylene Carbonate - Rich Solution |

Composition #5 may show the presence of a relatively small concentration of ammonium sulfate (for example: 0.25 wt %) increases the UCST cloud point temperature of the liquid system relative to Composition #4.

| Example Composition #6 | |
| --- | --- |
| Composition | 21.2 wt % PPG 425<br>38.3 wt % Propylene Carbonate<br>38.6 wt % Deionized Water<br>1.9 wt % Glycerol |
| Cloud Point Temperature | ~17.3° C. |
| Volume of Top Layer Below Cloud Point Temperature | ~73.3% |
| Composition of Top Layer | Water + PPG 425 + Glycerol - Rich Solution |
| Volume of Bottom Layer Below Cloud Point Temperature | ~26.7% |
| Composition of Bottom Layer | Propylene Carbonate - Rich Solution |

Composition #6 may show the presence of a relatively small concentration of glycerol (for example: 1.9 wt %) increases the UCST cloud point temperature of the liquid system relative to Composition #4.

| Example Composition #7 | |
| --- | --- |
| Composition | 21.1 wt % PPG 425<br>38.3 wt % Propylene Carbonate<br>38.5 wt % Deionized Water<br>2.2 wt % Propylene Glycol |
| Cloud Point Temperature | ~11.9° C. |
| Volume of Top Layer Below Cloud Point Temperature | ~84.5% |
| Composition of Top Layer | Water + PPG 425 + Propylene Glycol - Rich Solution |
| Volume of Bottom Layer Below Cloud Point Temperature | ~15.5% |
| Composition of Bottom Layer | Propylene Carbonate - Rich Solution |

Composition #7 shows the presence of a relatively small concentration of propylene glycol (for example: 2.2 wt %) may decrease the UCST cloud point temperature of the liquid system relative to Composition #4.

Example Reagent Compositions with LCST Cloud Point Temperature and Cloud Point Temperature Adjustment or Tuning and Relatively Low Viscosity The below compositions may also demonstrate the relatively small adjustments in composition that may be employed to adjust the cloud point temperature or LCST of the liquid system. The below compositions also demonstrate the ability to adjust the size and composition of the bottom and top liquid layers (or middle layers or other layers or phases) formed from a LCST phase change. Some of the below compositions may also demonstrate tunable LCST compositions comprising only non-toxic, non-volatile or nearly non-volatile chemicals (for example: water vapor). Some of the below compositions may also demonstrate tunable LCST compositions comprising only non-corrosive or low corrosivity reagents. Some of the below compositions also demonstrate fully tunable LCST compositions comprising no or limited presence of an ionic compound.

It is important to note the one or more phases which may forming below the LCST temperature in a LCST system may have different density compared to one or more other phases. As a result, the one or more phases may form liquid 'layers,' where each layer is concentrated or comprises a liquid phase.

Note: The presence of most ionic compounds comprising, for example, including, but not limited to, sodium chloride, potassium bicarbonate, potassium carbonate, ammonium bicarbonate, ammonium carbonate, ammonium phosphates, ammonium sulfate, decrease the LCST cloud point temperature in aqueous systems with, for example, Polypropylene Glycol or Polyethylene Glycol or Polyethylene Glycol Dimethyl Ether. In aqueous systems with, for example, Polypropylene Glycol, the cloud point temperature may decrease with increased concentration of glycerol. In aqueous systems with, for example, Polypropylene Glycol, the cloud point temperature may increase with increased concentration of propylene glycol.

| Example Composition #8 | |
| --- | --- |
| Composition | 32.8 wt % PPG 425<br>65.3 wt % Deionized Water<br>1.9 wt % Sodium Chloride |
| Cloud Point Temperature | ~35.9° C. |

| Example Composition #9 | |
| --- | --- |
| Compostion | 32.3 wt % PPG 425<br>64.4 wt % Deionized Water<br>3.3 wt % Sodium Chloride |
| Cloud Point Temperature | ~28.2° C. |
| Volume % of Top Layer Above Cloud Point Temperature | ~23.2% |
| Composition of Top Layer | PPG 425 Rich Phase |
| Volume % of Bottom Layer Above Cloud Point Temperature | ~76.8% |
| Composition of Bottom Layer | Water + Sodium Chloride Rich Phase |

Composition #9 may show increasing the concentration of sodium chloride decreases the cloud point temperature of the liquid system relative to Composition #8.

| Example Composition #10 | |
| --- | --- |
| Composition | 30.4 wt % PPG 425<br>60.5 wt % Deionized Water<br>6.0 wt % Polyethylene Glycol Dimethyl Ether (PEGDME) 250<br>3.1 wt % Sodium Chloride |
| Cloud Point Temperature | ~28.9° C. |
| Volume % of Top Layer Above Cloud Point Temperature | ~24.2% |
| Composition of Top Layer | PPG 425 + PEGDME 250 Rich Phase |
| Volume % of Bottom Layer Above Cloud Point Temperature | ~75.8% |
| Composition of Bottom Layer | Water + Sodium Chloride Rich Phase |

| Example Composition #11 | |
| --- | --- |
| Composition | 28.4 wt % PPG 425<br>56.7 wt % Deionized Water<br>12.0 wt % Polyethylene Glycol Dimethyl Ether (PEGDME) 250<br>2.9 wt % Sodium Chloride |

-continued

| Example Composition #11 | |
|---|---|
| Cloud Point Temperature #1 | ~29° C. |
| Volume % of Top Layer Above Cloud Point Temperature (Cloud Point #1) | ~17.0% |
| Composition of Top Layer | PPG 425 + PEGDME 250 Rich Phase |
| Volume % of Bottom Layer Above Cloud Point Temperature (Cloud Point #1) | ~83.0% |
| Composition of Bottom Layer | Water + Sodium Chloride Rich Phase |
| Cloud Point Temperature #2 | ~35° C. |
| Volume % of Top Layer Above Cloud Point Temperature (Cloud Point #2) | ~22.7% |
| Composition of Top Layer | PPG 425 + PEGDME 250 Rich Phase |
| Volume % of Bottom Layer Above Cloud Point Temperature (Cloud Point #2) | ~77.3% |
| Composition of Bottom Layer | Water + Sodium Chloride Rich Phase |

| Example Composition #12 | |
|---|---|
| Composition | 49.3 wt % PPG 425 |
| | 49.3 wt % Deionized Water |
| | 1.4 wt % Sodium Chloride |
| Cloud Point Temperature | ~34.1° C. |
| Volume % of Top Layer Above Cloud Point Temperature | ~60% |
| Composition of Top Layer | PPG 425 Rich Phase |
| Volume % of Bottom Layer Above Cloud Point Temperature | ~40% |
| Composition of Bottom Layer | Water + Sodium Chloride Rich Phase |

| Example Composition #13 | |
|---|---|
| Composition | 20.0 wt % PPG 425 |
| | 57.9 wt % Deionized Water |
| | 20.2 wt % Propylene Carbonate |
| | 1.8 wt % Ammonium Sulfate |
| Cloud Point Temperature | ~31.5° C. |
| Volume % of Top Layer Above Cloud Point Temperature | ~65% |
| Composition of Top Layer | Water + Ammonium Sulfate Rich Phase |
| Volume % of Bottom Layer Above Cloud Point Temperature | ~35% |
| Composition of Bottom Layer | Propylene Carbonate + PPG-425 Rich Phase |

Example Composition #13 may show PPG 425+Propylene Carbonate+Water+Salt solutions may form a LCST system with or without a UCST with different relative concentrations of reagents than, for example, Composition #5.

Cool or Heat Absorption or Transfer Using Relatively Low Viscosity UCST Reagents Summary (FIG. 13): FIG. 13 may show an embodiment for highly efficient cooling transfer using relatively low viscosity upper critical solution temperature (UCST) phase change liquid solution with liquid-liquid separation.

The first step of FIG. 13 may involve cooling a single liquid phase solution (L-1) below its UCST, which may phase transition into two or more liquid phases in a multi-liquid phase mixture (LL-1). Said phase transition may be exothermic and may release heat into one or more applications requiring heating, or to one or more cooling sources, or to evaporative cooling, or to one or more heat sinks or to a combination thereof.

The liquid-liquid phase change may significantly increase the cooling or heating capacity of a unit mass of solvent relative to, for example, conventional specific heat-only driven coolants. In the case of FIGS. 17 and 20, said significant increase in cooling capacity may be achieved a pre-existing or conventional heat transfer system schematic (drop-in heat transfer fluid). In the case of FIG. 13, the liquid-liquid separation and separate liquid transport (described further in the next paragraph) may enable cooling transfer over longer distances or using lower cost less insulated pipe or using lower cost non-insulated pipe or with smaller liquid volumes while achieving the similar cooling capacity or combination thereof. The liquid phase transition may also reduce the required temperature difference between the 'cold' input coolant and the 'hot' output coolant (or vise versa in the case of heating), as cooling may be transferred with a significantly smaller temperature swing or delta T due to, for example, the existence of a latent heat of liquid-liquid phase transition.

The two or more-liquid phase solution (LL-1) may be separated using one or more liquid-liquid separation devices (LLS-1) into two or more separate liquid streams (L-2 and L-3), each which may comprise, at least in part, one of the liquid phases in LL-1. In FIG. 13, the separate liquid streams may be transported 'separately' to prevent contact between the liquid phases during transport. If the temperature of one or more of the liquid streams rises to at or above the UCST of the liquid system, the separate liquid streams may not dissolve in each other as they may be separate during transport. Regardless of the temperature of the two separate liquid streams over the course of transport, the two separate liquid streams may absorb heat upon combining the separate liquid streams at or above the combined liquid's UCST, which may be at one or more applications requiring cooling. As a result, the separated liquid phases may be transported 'infinite' or significantly longer distances and may supply cooling upon arrival at the application requiring cooling. The embodiment may mix the two or more liquid phases before entering the one or more cooling application heat exchangers or one or more cooling application heat exchangers may independently function as apparatuses for combining or mixing the liquid phases.

Summary (FIG. 16): FIG. 16 may show an embodiment for transferring heat from a heat source to an application requiring heating using one or more UCST phase changes and/or liquid-liquid separations.

The present embodiment may comprise a cooling transfer system functioning as a heat transferring system, for example, including, but not limited to, due to a change in system conditions, due to a change in economics, due to a change in system surroundings, due to a change in weather conditions, due to economic reasons, or for other reasons, or for a combination thereof.

Systems described herein for heating or cooling transfer may be reversibly applied to both cooling or heat transfer.

Alternatively, the present embodiment may be employed where one or more of the liquid phases have a useful application at the heat source. For example, the present embodiment may be employed where cooling is also desired at the heat source. For example, the present embodiment may be employed as a means of providing 'cool' storage for the heat source (for example, including, but not limited to, a power plant or industrial site), wherein, for example, two or more liquid phases are stored in separate storage vessels and may be later mixed to provide cooling or useful work when needed.

For example, the present embodiment may be employed as a basis of an osmotic heat engine, wherein, for example, two or more liquid phases may be mixed in the presence of a semipermeable membrane or pressure retarded osmosis system, and wherein, for example, one or more phases may function as a draw solution and one or more liquid phases may function as a feed solution. The osmotic heat engine may generate useful work. For example, said osmotic heat engine may enable the heat source to generate power or additional power or other form of useful work, while, for example, also being cooled.

Summary (FIG. 17): FIG. 17 may show an embodiment for highly efficient cooling transfer using relatively low viscosity upper critical solution temperature (UCST) phase change liquid. The present embodiment may transport liquid phases resulting from phase change, at least in part, as a multi-liquid phase mixture.

The present embodiment may transfer cooling with the latent heat of the one or more UCST phase transitions and/or the specific heat capacity of one or more liquid phases. The present embodiment may enable, for example, 1.1-6 times, or 2-15 times, or 1-50 times, or a combination thereof, greater cooling transfer per unit of liquid compared to, for example, a prior art specific heat driven cool transfer system. Furthermore, the temperature difference required between the 'cold' coolant input and 'hot' coolant output may be reduced relative to a prior art specific heat capacity coolant due to, including, but not limited to, the potentially 1-100 times greater cooling capacity at or near the cloud point temperature of the coolant liquid system. This may significantly reduce the energy consumption required in cooling by, for example, including, but not limited to, reducing the cooling or heating temperature difference required in a heat pump (heat pumps may have higher coefficients of performance with smaller temperature differences) or enable the greater use of ambient cooling or heating sources, or a combination thereof.

At least a portion of the UCST liquid systems/compositions described herein may be employed in heating and cooling transfer systems that may be designed to use prior art specific heat coolants and may be employed as a direct coolant replacement of said prior art specific heat coolants. One or more of the UCST compositions described herein and applicable to FIG. 17 may be non-corrosive and/or 'salt-free' if desired. UCST compositions may comprise similar, same or lower viscosity than specific heat coolants. UCST compositions may comprise largely non-toxic, non-volatile reagents, and may comprise in part or entirely low cost, commodity derived, or commodity reagents.

In FIG. 17 and other embodiments described herein, evaporative cooling may be employed. For example, one or more reagents in UCST or LCST liquid systems may comprise water and, if desired, the other reagents may be non-volatile, and, if desired, at least partially resistant to degradation, oxidation, or corrosion, or a combination thereof. A cooling phase change (for example, the formation of two or more liquid phases from less liquid phases or one liquid phase or the formation of less liquid phases or one liquid phase from two or more liquid phases) may occur during evaporative cooling or one or more phases may be further cooled using evaporative cooling or a combination thereof. Evaporative cooling may involve, for example, the evaporation of water vapor into a gas stream, such as air, and/or, if desired, cooling one or more liquid phases to at or near the 'wet-bulb temperature' of the liquid. Water or other reagents may be added as a makeup stream to make-up for water or other losses during, for example, evaporative cooling. The latent heat of phase transition during one or more UCSTs or LCST may facilitate evaporation.

FIG. 17 and other embodiments may lack multi-liquid phase separation devices if, including, but not limited, for example, one or more or a combination of the following: the liquids are transported a relatively short distance or temperature change or losses are minimal or non-consequential or to reduce complexity or to increase compatibility with pre-existing infrastructure. For example, a lack of one or more multi-liquid phase separation devices may enable the UCST or LCST reagents to be 'drop-in', or employed within infrastructure which may be designed for prior art specific heat coolants or heat transfer fluids. Other embodiments herein are 'drop-in' or retrofittable schemes, reagents, or technologies.

FIG. 13 may be more desirable when transporting cooling long distances or through significant temperature variation. For example, if the cooling reagents are transported through a relatively 'hot' region and then enter a cooling region, in FIG. 13, the reagents may retain, at least in part, their latent heat of phase transition as the two or more liquid phases may be unable to dissolve in each other while passing through said example 'hot' region as they may, if desired, not be in fluid contact during at least a portion of the liquid transport.

Summary (FIG. 20): FIG. 20 may show an embodiment for transferring heat using a solution with a UCST phase transition. FIG. 20 may transport phase change fluids as a multi-liquid phase mixture.

The present embodiment may transfer heat with the latent heat of the one or more UCST phase changes and, if desired, the specific heat of one or more liquid phases. The present embodiment may enable, for example, 1.1-6 times, or 2-15 times, or 1-50 times, or a combination thereof, greater heating transfer per unit of liquid compared to, for example, a prior art specific heat driven heat transfer system. Furthermore, the temperature difference required between the 'hot' heat transfer fluid input and 'cold' heat transfer fluid output may be reduced relative to a prior art specific heat capacity heat transfer fluid due to, including, but not limited to, the potentially 1-100 times greater heat transfer capacity at or near the cloud point temperature of the heat transfer fluid liquid system. This may significantly reduce the energy consumption required in heating by, including, but not limited to, reducing the heating or cooling temperature difference required in a heat pump (heat pumps may have higher coefficients of performance with smaller temperature differences) or may enable the greater use of ambient or waste cooling or heating sources, or a combination thereof.

Even as a single liquid mixture, UCST or LCST phase transition of one or more liquid systems described herein may enable the transfer of heating or cooling or lower grade heat or lower grade cooling over longer distances or with lower cost or lower insulation piping or with greater heat transfer capacity or with lower liquid volumes or a combination thereof, enabling currently uneconomical or more expensive heat or cooling transport proposals to be economical or feasible or both. The multiphase liquid mixture may function, for example, as a temperature buffer during heat or cooling transport due to, for example, the liquid system absorbing heating or cooling from the surroundings during transport due to, for example, the latent heat of one or more phase transitions (for example: dissolution or clouding). For example, the liquid system may arrive at the system requiring heating or cooling at a similar or near temperature or a closer temperature to the temperature of the cooling or heating input source, which may be despite heat or cool losses to the surrounding environment or other heat or cooling experienced during transport.

| Example Inputs & Outputs (FIGS. 1 and 5) | |
|---|---|
| Inputs | Outputs |
| Cool Input or Cool Sink | Cooling Output to Application Requiring Cooling |
| Electricity (fluid pumping, liquid-liquid separation devices, or combinations thereof) | |

| Example Inputs & Outputs (FIGS. 4 and 8) | |
|---|---|
| Inputs | Outputs |
| Heat Input | Heat Output to Application Requiring Heating |
| Electricity (fluid pumping, liquid-liquid separation devices, or combinations thereof) | |

Step-by-Step Description (FIG. 13):
1) Cooling 'Absorption' from Cold Source or Heat 'Discharge' into Heat Sink enhanced by or employing UCST Phase Change into two or more Liquid Phases: Relatively warm combined solution (L-1) (which may comprise a single liquid phase) may be cooled in one or more Heat Sink Heat Exchangers, where it may be cooled through heat exchange with one or more cool sources or applications requiring heating or undergoes evaporative cooling or a combination thereof (RE-1). During cooling, the single liquid phase may be cooled at or below one or more cloud point temperatures, which may result in the formation of two or more liquid phases in a mixture (LL-1).
2) Two-Liquid Phase Liquid-Liquid Separation and Separate Transport: LL-1 may be at least in part separated using one or more multi-liquid phase separation devices (LLS-1), which may result in two or more separate liquid streams, each which may comprise a separate liquid phase (L-2 and L-3). Said separate liquid streams (L-2 and L-3) may be transported separately to one or more applications requiring cooling wherein, for example, there may be little or no fluid contact between the two liquid phases (for example: separate pipes or liquid channels) or said liquid streams may be transported in isolation, or a combination thereof.
3) Combining or Mixing Separate Liquid Phases into a Combined Mixture: Said separate liquid streams (L-2 and L-3) may be combined or mixed either before the one or more applications requiring cooling heat exchangers or within or during one or more of the applications requiring cooling heat exchangers. Said liquids may be combined or mixed using a liquid stream merging valve, a static mixer, a continuous mixer or other liquid combining or mixing devices known in the art or a combination thereof. Upon mixing, depending on, for example, the temperature of the separate or independent liquids (L-2 and L-3), said streams may dissolve and said dissolution may be endothermic. Said dissolution may result in, for example, including, but not limited to, a combined single-phase liquid stream comprising one or more of the originally separate liquid phases (L-4), separate liquid phases in a combined multi-liquid phase mixture (LL-2), or a combination thereof. If a portion or all the separate liquid phases dissolve in each other upon mixing without significant external heat input, the temperature of the combined liquid phases may be lower than the temperature of the separate liquid phases before combining or mixing.
4) Cooling 'Release' or Heat 'Absorption' which may employ dissolution of liquid phases: L-4 or LL-2 or a combination thereof may be transferred to one or more 'cooling application heat exchangers' wherein said one or more streams may be heat exchanged (HE-2) with the one or more applications requiring cooling and may undergo further dissolution phase transition. The resulting liquid stream may comprise at least a portion of the two or more liquid phases dissolved in each other or a single combined solution (L-1).

Step-by-Step Description (FIG. 16):
1) Heat 'Discharge' into Application Requiring Heating enhanced by or employing UCST Phase Change into two or more Liquid Phases: Relatively warm combined single liquid phase solution (L-1) may be heat exchanged (RE-1) with one or more applications requiring heating. During the release of heat into the one or more heating application heat exchangers, the single liquid phase may be cooled at or below one or more UCST cloud point temperatures, resulting in the formation of two or more liquid phases in a mixture (LL-1).
2) Two-Liquid Phase Liquid-Liquid Separation and Separate Transport: LL-1 may be separated using one or more liquid-liquid separation devices (LLS-1), which may result in two or more at least partially separate liquid streams, each which may comprise a at least partially separated liquid phase (L-2 and L-3). Said separate liquid streams (L-2 and L-3) may be transported separately to one or more heat input sources, wherein, for example, there may be little or no fluid contact between the two or more liquid phases during at least a portion of transport (for example: separate pipes or liquid channels) or the liquid phases may be transported in isolation, or a combination thereof.
3) Combining or Mixing Separate Liquid Phases into a Combined Mixture: L-2 and L-3 may be combined or mixed either before the one or more heat input sources or heat input source heat exchangers or within or during one or more of the heat input heat exchangers. The liquids may be combined or mixed using a liquid stream merging valve, a static mixer, a continuous mixer or other liquid combining or mixing devices known in the art or a combination thereof. Upon mixing, depending on, for example, the temperature of the separate or independent liquids (L-2 and L-3), none, a portion, or all of the liquid phases may dissolve in each other. The resulting liquid stream may be, for example, including, but not limited to, a combined single-phase liquid stream comprising one or more of the originally separate liquid phases (L-4), separate liquid phases in a combined mixture (LL-2), or a combination thereof. If a portion or all the separate liquid phases dissolve in each other upon mixing without significant external heat input, the temperature of the combined liquid phases may be lower than the temperature of the separate liquid phases before combining or mixing.

4) Cooling 'Release' or Heat 'Absorption' enhanced by or employing dissolution of liquid phases: L-4 or LL-2 or a combination thereof may be transferred to one or more 'heat input heat exchangers' wherein L-4 or LL-2 may be heat exchanged (HE-2) with the one or more heat sources or applications requiring cooling. The resulting liquid stream may comprise at least a portion of the two or more liquid phases dissolved in each other or a single combined dissolved solution comprising the two or more formerly separate liquid streams (L-1) or a combination thereof Step-by-Step Description (FIG. 17):
1) Cooling 'Absorption' from Cold Source or Heat 'Discharge' into Heat Sink employing UCST Phase Change into two or more Liquid Phases: Relatively warm combined solution (L-1) (which may comprise a single liquid phase) may be cooled in one or more Heat Sink Heat Exchangers, where L-1 may be cooled through heat exchange with a cool source or L-1 undergoes evaporative cooling or a combination thereof (RE-1). L-1 may be cooled at or below one or more cloud point temperatures, which may result in the phase transition into a multi-liquid phase mixture (LL-1).
2) Cooling 'Release' or Heat 'Absorption' employing dissolution of liquid phases at or above, for example, UCST: LL-1 or a combined single phase liquid solution or a combination thereof may be transferred to one or more 'cooling application heat exchangers' wherein said fluid stream may be heat exchanged (HE-2) with the one or more applications requiring cooling. The resulting liquid stream may comprise at least a portion of the two or more liquid phases dissolved in each other or a single combined solution which may comprise the two or more formerly separate liquid streams (L-1), or a combination thereof Step-by-Step Description (FIG. 20):
1) Heat 'Discharge' into Application Requiring Heating employing UCST Phase Change into two or more Liquid Phases: Relatively warm combined solution (L-1) (which may comprise a single liquid phase) may be heat exchanged (RE-1) with one or more applications requiring heating. For example, during the release of heat into the one or more heating application heat exchangers, L-1 may be cooled at or below one or more UCST cloud point temperatures, which may result in the phase transition into two or more liquid phases (LL-1).
2) Cooling 'Release' or Heat 'Absorption' employing dissolution of liquid phases: LL-1 or a combination thereof may be transferred to one or more 'heat input heat exchangers' wherein said fluid stream may be heat exchanged (HE-2) with the one or more heat sources or applications requiring cooling. The resulting liquid stream may comprise at least a portion of the two or more liquid phases dissolved in each other or a single combined dissolved solution (L-1), or a combination thereof.

Example Application 1: Ocean or Thermocline Water Body Cooling System

Background: In prior art, methods for recovering cool from the thermocline of the ocean or other deep-water body employ a specific heat coolant or pump water (which may also be a specific heat coolant) directly from the depths of the water body to the surface. The greatest problems hindering the adoption of prior art technologies are:
1) The losses of 'cool' due to the transferring 'cool' from the 'deep depths' to the surface through relatively warm water over relatively long distances.
2) The requirement of pumping large volumes of liquid to provide sufficient 'cool' transfer (low heat transfer capacity)
3) The high CAPEX and OPEX involved with the infrastructure, including, for example, insulated pipes, to, for example, reduce the effects of challenge #1 and the large diameter pipes, large pumps, significant electricity consumption, antifoulants, or a combination thereof which may be required to overcome, at least in part, the limitations of challenge #2.

Because of the above challenges, cooling transfer from deep water bodies is generally limited to regions where deep water is close to the shore (for example: in Hawaii) or regions where cold water is at shallower depths, or where cold water is close to shore. This leaves a significant untapped potential for utilizing water body thermoclines as means of a cooling source to reduce energy consumption related to cooling or increase the efficiency of heat engines or create heat engines or combinations thereof. Additionally, there is significant opportunity to increase the efficiency or improve performance or reduce operating cost or reduce capital cost of pre-existing systems for cool transfer from cool water bodies or other cool sources.

Summary (FIG. 21A): FIG. 21A may show systems and methods for effectively transferring or utilizing 'cool' temperatures from a water body or the depths of a thermocline liquid or water body using, for example, UCST cooling cloud point liquid phase transition (which may comprise a low viscosity liquid system composition working fluid) followed by, for example, multi-liquid phase separation. Systems, methods, and reagents described herein may be capable of transferring cooling or at least a portion of the cooling available from depths of a water body or thermocline independent of or with a lesser impact from scooling temperature losses to the surrounding water. This unprecedented capability may be enabled by the low viscosity, low cost, cloud-point temperature tunable UCST reagents disclosed herein.

Additionally, systems, methods, and reagents described herein may reduce or eliminate the need for insulated piping during the cool transport. Due to the potentially greater heat transport capacity because of, for example, including, but not limited to, the latent heat of UCST or LCST phase transition, required liquid volumes per a unit of cooling transferred may be significantly less compared to prior art specific heat based coolants or direct water pumping. The reagents described herein may be non-toxic and nearly or entirely benign to the environment in the case of, for example, a leak.

Relatively 'warm' combined single liquid phase solution 'working fluid' (L-1) may be transferred in, for example, one or more pipes, beneath the surface of a water body and transferred to at least the depth of the water body where the surrounding water temperature is at or below the one or more UCSTs of the liquid system. The one or more pipes may, in part, be 'non-insulated' or thermally conductive to enable heat transfer to the surrounding water body. The one or more UCST phase transitions may occur, for example, at least in part, which may occur during the transport of the liquid system working fluid to the desired depth, which may reduce or prevent the need for additional heat exchanger apparatus or apparatuses in the relatively 'cold' region of the water body. Said one or more UCST phase transitions may involve the formation of a multi-liquid phase mixture (LL-1), which may be separated, if desired and/or at least in part, into its constituent liquid phases using, for example, one or more liquid-liquid separation devices (LLS-1). Each at least partially separated liquid phase may comprise a separate liquid stream (L-2 and L-3).

With the liquid-liquid separation device being located, for example, at the depths of a liquid or water body, it may be desirable for the liquid separation method to be highly reliable and require minimal, if any, maintenance. It may be desirable for moving and/or electronic parts, for example, pumps, to be located near, at, or above the surface of the liquid body. The liquid-liquid separation device may comprise, including, but not limited to, one or more or a combination of the following: decanter, coalescer, filter, centrifuge, cyclone, or combination thereof. It may be desirable for the multi-liquid phase separation device to contain moving parts, including, but not limited to, hydraulic, electric, non-electric, or passive moving parts. It may be desirable for the multi-liquid separation device or devices to require little maintenance and/or require minimal moving mechanical parts as, for example, said device or devices may be located beneath the surface of the water or liquid body. The materials of construction may desirably be corrosion resistant or corrosion free. For example, the piping and, if desired, the liquid-liquid separation device, may be made of a polymer or composite, for example, including, but not limited to, one or more or a combination of the following: high density polyethylene, mid-density polyethylene, low density polyethylene, polypropylene, PVC, fluorocarbon plastics, silicone plastics, stainless steel, corrosion resistant aluminum, corrosion resistant alloys, composites, or ceramics.

L-2 and L-3 may be transported in separate channels or separate pipes, for example, during at least a portion or all of fluid transport. The separate working fluid streams may heat up over the course of transport to the surface of the water body due to, for example, the thermocline of the water body. Because the working fluids are separate, they may not dissolve in each other during transport as they may be separate liquid streams.

When the two or more separate liquid system working fluids approach or reach the one or more applications requiring cooling or one or more applications requiring cooling heat exchangers (HE-2), the two or more separate liquid system working fluids (L-2 and L-3) may be combined or mixed and may be heat exchanged with the application or applications requiring cooling or a cooling enthalpy source. The dissolution of the combined liquid phases may result in the absorption of heat or a temperature reduction or both due to the endothermic dissolution at or above the UCST temperature or temperatures of the working fluids.

Summary (FIG. 21B): FIG. 21, including FIG. 21B, may show systems and methods for more effectively transporting cool temperatures from the depths of a thermocline water body using low viscosity UCST reagents. The present embodiment may enable, including but not limited to, one or more or a combination of the following: a significant increase the cooling transport capacity per a unit mass of heat transfer working fluid, or the heat transfer working fluid to reach the surface at a temperature closer to or equivalent to the 'cool source' temperature despite, for example, 'cool' losses to the surrounding environment or water or liquid body during, for example, transport.

The present embodiment may involve transporting a 'warm' liquid stream to a depth below the surface where it may be cooled by the surrounding relatively cooler temperatures and may be transported to the surface to transfer, for example, said cooler temperatures to an application requiring cooling. The technology may form a two or more liquid phase solution in a UCST phase transition from a single liquid phase solution due to, for example, cooling beneath the surface of the water body at or below the UCST temperature and heat exchanging the latent heat released from the phase transition into the surrounding water body, which may result in a multi-liquid phase mixture. Said multi-liquid phase mixture may be transported to the surface as a combined mixture. As the liquid stream is transported to the surface, the temperature of the surrounding water, for example, may increase due to the thermocline of the water body. The temperature of the surrounding water body may increase to above the temperature of the liquid system UCST of the multi-liquid phase mixture. Heat may penetrate the pipe transporting the two or more liquid phases. Unlike working fluids reliant solely on specific heat, the two or more liquid phases may absorb at least a portion of this heat penetration due to, for example, endothermic dissolution, which may enable the working fluid to remain at the 'cool' temperature or at the same or similar or close temperature despite heat input. Heat input or cooling losses to the surroundings may be buffered at or near the temperature of the one or more UCSTs of the liquid system until, for example, the liquid system has exchanged with enough heat input to fully expend the latent heat of endothermic dissolution.

When liquids are transported at significant depths or significantly different altitudes, the density of the fluid relative to the surrounding fluids may have influence on the pressure of the fluid relative to its surroundings. To minimize capital costs, the pressure of the fluid may desirably be similar to the pressure of its surroundings, as significant pressure differences may require infrastructure that is resilient to said pressure differences. The pressure difference may be minimized by employing working fluids with similar densities to the density of, for example, the surrounding seawater or water body or liquid body. Fortunately, many of the low viscosity UCST and LCST liquid systems described herein may possess densities that are the same, similar, or relatively close to the density of seawater or freshwater. For liquid bodies in general, the compositions of UCST or LCST liquid systems may be tailored, if desired to create closer density working fluids to, for example, minimize pressure differences at, for example, deep depths.

Summary (FIG. 21C): FIG. 21, such as FIGS. 21B and 21C, may show systems and methods for transporting cool temperatures from the depths of a thermocline water body using LCST or UCST reagents. The present embodiment may enable, including but not limited to, one or more or a combination of the following: a significant increase the cooling transport capacity per a unit mass of liquid system working fluid or for the liquid system to reach the surface at a temperature closer to or equivalent to the 'cool source' temperature despite, for example, 'cool' losses to the surrounding environment.

The present embodiment may involve transporting a 'warm' multi-liquid phase stream to a depth below the surface of a liquid body where said stream may be cooled by the surrounding relatively cooler temperatures below one or more LCSTs, which may result in an exothermic dissolution phase transition, which may form a single liquid phase combined solution. Said single liquid phase combined solution stream may be transported to the surface to, for example, absorb heat from one or more applications requiring cooling. As the liquid stream is transported to the surface, the temperature of the surrounding water, for example, may increase due to the thermocline of the water body. The temperature of the surrounding water body may increase to above the temperature of LCST of the combined single liquid phase solution. Heat may penetrate the pipe transporting the LCST working fluid. Unlike working fluids reliant solely on specific heat, the LCST working fluid may absorb at least a portion of this heat input through endothermic phase transition into a multi-liquid phase mixture, which may enable the working fluid to remain at the 'cool' temperature or at the same or similar or close temperature despite, for example, heat intrusion. Heat input or cooling losses to the surroundings may be buffered at or near the temperature of the one or more LCST of the working fluid until the working fluid has exchanged with sufficient heat input to fully expend the endothermic phase change. If the working fluid phase change is fully expended (for example: all or most of the components of the solution have undergone complete endothermic phase change) upon reaching the surface, the working fluid may function as a specific heat working fluid during heat exchange with the cooling application. The endothermic LCST or UCST phase change may enable the working fluid, even if employed as a specific heat working fluid upon reaching the surface, to be a lower temperature specific heat working fluid compared to an embodiment employing a working fluid that functions solely as a specific heat working fluid.

| Example Inputs & Outputs (FIGS. 9A-9C) | |
|---|---|
| Inputs | Outputs |
| Cool Input or Cool Sink | Cooling Output to Application Requiring Cooling |
| Electricity (fluid pumping, liquid-liquid separation devices, or combinations thereof) | |

Driving Forces:
Latent Heat of UCST Phase Change Retained through Transporting Liquid Phases as two or more separate liquid streams. The working fluid may be transported 'infinite' or exponentially longer distances while transporting cold. If the two or more liquid phases reach a temperature above their UCST temperature during transport, they may not dissolve in each other as separate liquid streams. This may enable at least a portion of the latent heat of the UCST phase change to be retained independent of the temperature or heat input or heat losses experienced by the one or more UCST working fluid phases during transport.

Latent Heat of UCST or LCST phase change may function as a temperature buffer if, for example, the complete UCST or LCST reagent mixture is transported in fluid contact together. For example, the reagents may absorb heat intrusion through endothermic phase change, for example, at or near their LCST or UCST temperatures, which may reduce or eliminate temperature rise relative to a specific heat-only reagent.

Systems and methods may be setup as a retrofit or working fluid replacement technology, in, for example, FIGS. 9B and 9C. The embodiment may not or may require, for example, minimal, if any, infrastructure changes relative to a pre-existing heat exchange loop with a specific heat working fluid.

Low insulation or no insulation pipes may be required in some embodiments, which may reduce CAPEX Reagents may have greater or significantly greater cooling storage capacity relative to specific heat-only working fluids
    May enable significantly less liquid volume flow rates for the same amount of cooling capacity
    May enable lower CAPEX, including, but not limited to, for example smaller diameter piping, lower cost materials, or combination thereof.

Example Application 2: District Cooling

District cooling or heating may involve providing cooling or heating to multiple applications requiring cooling or heating from one or more centralized cooling or heating sources.

Background or Problem in Prior Art:

For example, the greatest limitations of district cooling or heating or combination thereof networks may involve 1) heat or cooling losses during transport of heating or cooling and 2) the large volumes of fluid required to be circulated per unit of heating or cooling transfer. Due to, at least in part, ' 1),' the temperature of the heating or cooling working fluid exiting their associated heating and cooling sources must be significantly greater than (in the case of district heating) or significantly less than (in the case of district cooling) the temperature of the heating or cooling working fluid, respectively, upon supplying heating or cooling to the associated application or applications requiring heating or cooling. The required higher or lower temperature of the exiting heat transfer working fluid to overcome transport losses may necessitate the use of higher grade, more costly heating or cooling sources. These losses increase directly with the required working fluid transport distance, thus longer distance transport of heating and cooling becomes uneconomical for present district heating or cooling networks. Additionally, the ability of district heating and cooling networks to employ low grade sources of heating and cooling, including, but not limited to, power plant condenser water waste heat, cold water bodies, cold temperatures at higher elevations, or cooling available from the gasification of LNG, or a combination thereof, is limited to applications in close proximity to the heating or cooling sources.

Example Solution:

The compositions, systems & methods described herein may enable heating and cooling transfer in district heating networks with significantly lower CAPEX and/or OPEX, while also enabling, including, but not limited to, transport of heating or cooling independent of the temperature of the heating or cooling transfer working fluids during transport, which may enable longer distance district heat or cooling transport.

Example New Opportunities for District Cooling or Heating which May be Enabled by Embodiments Described Herein District heating from abundant low-grade waste heat, from, for example, power generation and industry, at greater distances from the source
District cooling from relatively 'cool' water bodies liquid, solid, light, mass or a combination thereof bodies
District heating from relatively 'warm' liquid, solid, light, mass or a combination thereof bodies
District cooling from cooling regions, at, for example, higher altitudes
Cooling or heating storage flow batteries. Liquid phases are stored in separate tanks. Liquid phases may be mixed to generated heating or cooling, for example, at or near the cooling or heating application.

Example Opportunities to Significantly Improve Pre-Existing or Future District Cooling or Heating Network Using Embodiments Described Herein Make district cooling more efficient
Less working fluid pumping per unit of cool transferred
Lower temperature difference required between the 'Cool Source' and the 'Hot' output temperature of the cooling working fluid, enabling more energy efficient cooling if, for example, a heat pump is employed
Compatible with systems employing evaporative cooling
Expansion of district cooling or heating network may be more feasible

Example Opportunities to Significantly Improve Pre-Existing District Heating Networks Using Embodiments Described Herein Makes district cooling more efficient
Less working fluid pumping per unit of cool transferred
Lower temperature difference required between the 'Cool Source' and the 'Hot' output temperature of the cooling working fluid, enabling more energy efficient cooling if, for example, a heat pump is employed
Enable embodiment to be in part or entirely powered by low temperature waste heat sources
Compatible with systems employing evaporative cooling

Example Application 3: Datacenter Cooling or Heating or Both

Example Application 4: Power Plant Condenser Cooling

Example Benefits:
UCST or LCST phase change liquid may be employed as a replacement for water as a heat transfer fluid, for example, which may include, but is not limited to, in recirculating cooling ponds or evaporative cooling systems.
Lower liquid volume or liquid mass per a unit of heat transfer or cooling capacity
The UCST or LCST phase change liquid may be employed in evaporative cooling if, for example, water is a constituent reagent. Further treatment of aerosols or other vapors formed may be required depending on the composition and vapor pressure of the other constituent reagents.
Cooling sources may be located at greater distances from the power plant or system requiring cooling
Cooling may be stored when there is excess availability (for example, during cool night temperatures or when the power plant is not in operation) and utilized later when it is needed or relatively 'cooler' temperatures are unavailable. For example, cooling may be stored as two or more separate liquid phases from a liquid system resulting from a UCST phase change, where each separate liquid phase may be stored separately. Upon use, the two or more separate liquid phases may be mixed, resulting in cooling if, for example, above the cloud point temperature.

Example Application 5: Drop-In Coolant or Heat Transfer Liquid

There may be multiple applications for coolants and heat transfer liquids. The LCST or UCST reagents described herein may be employed as replacements for coolants or heat transfer liquids that may be presently employed or may be employed in one or more cooling or heat transfer applications known in the art. For example, in electronics cooling or high power electronics cooling, specific heat-based heat transfer liquids, such as water or aqueous solutions, are common heat transfer fluids. One or more low viscosity LCST or UCST reagent compositions introduced herein may be employed to directly replace these specific heat coolants to, for example, enable, including, but not limited to, lower pumping energy requirements or greater heat transfer capacity or greater energy efficiency or combination thereof. Similarly, said one or more low viscosity LCST or UCST reagent compositions may be employed as, for example, including, but not limited to, compressor coolants, food & beverage coolants, automotive coolants, radiative heating heat transfer liquids, battery coolant, vehicle coolant, engine coolant, deicing surface heat transfer liquids, cooling surface coolants, or combination thereof.

Cool or Heat Absorption or Transfer Using Relatively Low Viscosity LCST Reagents Summary (FIG. 14):
FIG. 14 may show an embodiment for transferring heat from a heat source to one or more applications requiring heating using one or more LCST phase changes and/or liquid phase separations.

The present embodiment may comprise a heat transfer system functioning as a cool transferring system, for example, which may be due to, including, but not limited to, due to a change in system conditions, due to a change in economics, due to a change in system surroundings, due to a change in weather conditions, due to economic reasons, or for other reasons, or for a combination thereof.

Alternatively, the present embodiment may be employed where one or more of the liquid phases have a useful application at or near the cool source or heat sink/cold sink. For example, the scheme may be employed where cooling is also desired. For example, the scheme may be employed as a means of also providing 'heat' storage for the an application requiring heating (for example, including, but not limited to, a district heating or deicing system), wherein, for example, the two or more liquid phases may be stored in separate storage vessels and may be mixed in the future to provide cooling or useful work when needed.

For example, the scheme may be employed to as the basis of an osmotic heat engine or energy storage device, wherein, for example, the two or more liquid phases may be mixed in the presence of a semipermeable membrane or pressure retarded osmosis system, and wherein, for example, one or more phases function as a draw solution and one or more liquid phases function as a feed solution. The osmotic heat engine may generate useful work. For example, said osmotic heat engine may enable the cold input source to generate power or additional power or other form of useful work, while, for example, also being heated or being a heat sink.

Summary (FIG. 15): FIG. 15 may show an embodiment for highly efficient heat transfer using, for example, relatively low viscosity lower critical solution temperature (LCST) phase change liquid solution, which may employ multi-liquid phase mixture separation.

The first step of FIG. 15 may involve heating a, for example, single liquid phase solution (L-1) at or above one or more LCSTs, which may result in an endothermic LCST phase transition into a multi-liquid phase mixture (LL-1). The liquid system may 'absorb' or transfer heat through the latent heat of the one or more LCST phase transition and, if desired, the specific heat of one or more liquid phases.

LCST or UCST phase transitions may increase the heating or heat transfer capacity of a unit mass of solvent relative to, for example, prior art specific heat-only driven heat transfer fluids, while also potentially reducing CAPEX and without or with minimal, for example, additional safety risks. Said significant increase in heating or cooling capacity may be achieved, for example, with no additional complexity to a conventional cooling schematic (drop-in technology). Multi-liquid phase separation and separate liquid transport (described further in the next paragraph) may enable heating transfer over longer distances or using lower cost less insulated pipe or using lower cost non-insulated pipe or with smaller liquid volumes while achieving similar heating or cooling capacity or combination thereof. The liquid-liquid phase change may also reduce the required temperature difference between the 'hot' input heat transfer fluid and the 'cold' output heat transfer fluid, as heat may be transferred with a significantly smaller temperature swing due to, for example, the existence of a latent heat of the phase change, rather than, for example, entirely relying on heat transfer fluid specific heat temperature change to transport heat.

The two or more-liquid phase solution (LL-1) may be separated using one or more liquid-liquid separation devices (LLS-1) into two or more separate liquid streams (L-2 and L-3), each which may comprise, at least in part, one of the liquid phases in LL-1. Said separate liquid streams may be transported 'separately' to, for example, prevent contact between the liquid phases during transport. If the temperature of one or more of the liquid streams drops to at or above the cloud point temperature of liquid system during transport, the separate liquid phases may not dissolve in each other as they may separate during, for example, transport, and there may be no or minimal liquid contact between the two separate liquid streams during transport. Regardless of the temperature of the two separate liquid streams upon arrival at the 'application requiring heating,' the two separate liquid streams may release heat and provide heating upon combining the separate liquid streams at or below the combined liquid's LCST. As a result, the separated liquid phases may be transported 'infinite' distances or longer distances and may supply at least a portion of heat from latent heat of phase transition to, for example, the one or more applications requiring heating. The embodiment may mix the two or more liquid phases before entering the one or more heating application heat exchangers or the one or more heating application heat exchangers may independently function as apparatuses for combining or mixing the liquid phases or a combination thereof.

Summary (FIG. 18): FIG. 20 may show an embodiment for transferring cooling using a solution with a LCST phase change while maintaining a single liquid solution.

The present embodiment may transfer cooling with the latent heat of the one or more LCST phase changes and, if desired, the specific heat of one or more liquid phases. The temperature difference required between the 'cold' coolant input and 'hot' coolant output may be significantly reduced relative to a specific heat 'coolant' due to, including, but not limited to, the cooling capacity at or near the cloud point temperature being equivalent to 1-100 times more than the equivalent specific heat coolant. This may significantly reduce the energy consumption required in cooling by, including, but not limited to, reducing the heating or cooling temperature difference required in a heat pump (heat pumps may have higher coefficients of performance with smaller temperature differences) or enable the greater use of ambient or waste cooling or heating sources, or a combination thereof.

Even as a single liquid mixture, the UCST or LCST phase change may enable the transfer of heating or cooling or lower grade heat or lower grade cooling over longer distances or with lower cost or lower insulation piping or a combination thereof, enabling currently uneconomical or more expensive heat or cooling transport proposals to be economical or feasible or both and enabling pre-existing systems to be more economical. The multiphase liquid mixture may function, for example, as a temperature buffer during heat or cooling transport due to, for example, the liquid phases absorbing heating or cooling from the surroundings during transport through phase change (for example: dissolution or clouding). For example, the solution may arrive at the system requiring heating or cooling at a similar or near temperature or a closer temperature to the temperature of the cooling or heating input source, despite heat or cool losses to the surrounding environment or other heat or cooling experienced during transport.

Summary (FIG. 19): FIG. 19 may show an embodiment for highly efficient cooling transfer using, for example, relatively low viscosity lower critical solution temperature (LCST) liquid system.

FIG. 15 may be more desirable when transporting heat long distances or through significant temperature variation. For example, if the heat transfer reagents are transported through a relatively 'cold' region and then enter a relatively hot region, in FIG. 13, the reagents will retain their latent heat of cooling as the two or more liquid phases will be unable to dissolve in each other while passing through said relatively 'cold' region as they may not be in fluid contact during at least a portion or all of the liquid transport.

| Example Inputs & Outputs (FIGS. 2 and 6) | |
| --- | --- |
| Inputs | Outputs |
| Cool Input or Cool Sink | Cooling Output to Application Requiring Cooling |
| Electricity (fluid pumping, liquid-liquid separation devices, or combinations thereof) | |

| Example Inputs & Outputs (FIGS. 3 and 7) | |
|---|---|
| Inputs | Outputs |
| Heat Input | Heat Output to Application Requiring Heating |
| Electricity (fluid pumping, liquid-liquid separation devices, or combinations thereof) | |

Step-by-Step Description (FIG. 14):
1) Heat 'Absorption' or Supplying Cooling to Application Requiring Cooling enhanced by or employing LCST Phase Change into two or more Liquid Phases: Relatively cool combined solution (L-1) (which may comprise a single liquid phase) may be heat exchanged (RE-1) with one or more applications requiring cooling. During the absorption of heat from the one or more cooling application heat exchangers, L-1 may be heated at or above one or more LCSTs, which may result in the endothermic phase change forming a multi-liquid phase mixture (LL-1).
2) Two-Liquid Phase Liquid-Liquid Separation and Separate Transport: LL-1 may be separated using one or more multi-liquid phase separation devices (LLS-1), which may result in two or more separate at least partially separated liquid streams, each which may comprise a separate liquid phase (L-2 and L-3). Said separate liquid streams (L-2 and L-3) may be transported separately to the heat sink, wherein, for example, there may be little or no fluid contact between the two liquid streams during at least a portion of transport (for example: separate pipes or liquid channels) or the liquid phases are transported in isolation, or a combination thereof.
3) Combining or Mixing Separate Liquid Phases into a Combined Mixture: The separate liquid streams (L-2 and L-3) may be combined or mixed either before the one or more heat sinks or cooling input heat exchangers or within or during one or more of the cool input heat exchangers or a combination thereof. L-2 and L-3 may be combined or mixed using a stream merging valve, a static mixer, a continuous mixer or other liquid combining or mixing devices known in the art or a combination thereof. Upon mixing, depending on, for example, the temperature of the separate or independent liquids (L-2 and L-3), none, a portion, or all of the liquid phases may dissolve in each other. The resulting liquid stream may be, for example, including, but not limited to, a combined single-phase liquid stream comprising one or more of the originally separate liquid phases (L-4), separate liquid phases in a combined mixture (LL-2), or a combination thereof. If a portion or all the separate liquid phases dissolve in each other upon mixing without significant external heat removal or heat losses or cool input, the temperature of the combined liquid phases may be higher than the temperature of the separate liquid phases.
4) Heat Release or Heat Generation or Heat Transfer or Heat Sink or Cooling Input Transfer enhanced by or employing dissolution of liquid phases: L-4 or LL-2 or a combination thereof may be transferred to one or more heat sink, or cool sink, or cool input heat exchangers or evaporative coolers or in-situ evaporative cooling or combination thereof wherein L-4 or LL-2 may be heat exchanged (HE-2) with one or more cool sources or applications requiring heating and may undergo an exothermic phase transition. The resulting liquid stream may comprise at least a portion of the two or more liquid phases dissolved in each other or a single combined dissolved solution comprising the two or more formerly separate liquid streams (L-1).

Step-by-Step Description (FIG. 15):
1) Heating 'Absorption' from Heat Source or Cool 'Discharge' into Application Requiring Cooling enhanced by or employing UCST Phase Change into two or more Liquid Phases: Relatively cool combined solution (L-1) (which may comprise a single liquid phase) may be heated in one or more Heat Source Heat Exchangers, where it may be heated through heat exchange with a heat source (RE-1). L-1 may be heated at or above one or more cloud point temperatures which may result in the formation of a multi-liquid phase mixture (LL-1).
2) Multi-Liquid Phase Mixture Separation and Separate Transport: LL-1 may be separated using one or more multi-liquid phase separation devices (LLS-1), which may result in two or more at least partially separate liquid streams, each which may comprise, at least in part, a separate liquid phase (L-2 and L-3). Said separate liquid streams (L-2 and L-3) may be transported separately to one or more heating applications wherein, for example, there is little or no fluid contact between the two liquid phases (for example: separate pipes or liquid channels) or the liquid phases are transported in isolation, or a combination thereof
3) Combining or Mixing Separate Liquid Phases into a Combined Mixture: The separate liquid streams (L-2 and L-3) may be combined or mixed either before the one or more application requiring heating heat exchangers or within or during one or more of the heating application heat exchangers or a combination thereof. The liquids may be combined or mixed using a liquid stream merging valve, a static mixer, a continuous mixer or other liquid combining or mixing devices known in the art or a combination thereof. Upon mixing, depending on, for example, the temperature of the separate or independent liquids (L-2 and L-3), none, a portion, or all the liquid phases may dissolve. The resulting liquid stream may be, for example, including, but not limited to, a combined single-phase liquid stream comprising one or more of the originally separate liquid phases (L-4), separate liquid phases in a combined mixture (LL-2), or a combination thereof. If a portion or all the separate liquid phases dissolve in each other upon mixing without significant external heat sink or heat losses or cooling input, the temperature of the combined liquid phases may be higher than the temperature of the separate liquid phases before combining or mixing.
4) Heat Release or Heat Generation or Heat Transfer enhanced by or employing dissolution of liquid phases: L-4 or LL-2 or a combination thereof may be transferred to one or more 'heating application heat exchangers' wherein L-4 or LL-2 may be heat exchanged (HE-2) with the one or more applications requiring heating and may undergo exothermic phase transition. The resulting liquid stream may comprise at least a portion of the two or more liquid phases dissolved in each other or a single combined solution comprising the two or more formerly separate liquid streams (L-1) or a combination thereof.

Step-by-Step Description (FIG. 18):
1) Heat Absorption or Cooling Transfer from Application Requiring Cooling enhanced by or employing LCST Phase Change into two or more Liquid Phases: Relatively cool combined solution (L-1) (which may comprise a single liquid phase) may be heat exchanged (RE-1) with one or more applications requiring cooling. During the absorption of heat into the one or more cooling application heat exchangers, the single liquid phase may be heated at or above one or more LCST cloud point temperatures, which may result in one or more endothermic phase transitions into a multi-liquid phase mixture (LL-1).

2) Heat Discharge or Heat Transfer enhanced by or employing dissolution of liquid phases: LL-1 may be transferred to one or more 'cool input heat exchangers' wherein said fluid stream may be heat exchanged (HE-2) with one or more cool sources or applications requiring heating, wherein LL-1 may undergo one or more exothermic dissolution phase transitions. The resulting liquid stream (L-1) may comprise at least a portion of the multi-liquid phase mixture dissolved in each other or a single combined dissolved solution comprising the two or more formerly separate liquid streams, or a combination thereof. Cooling may also include or comprise evaporative cooling. For example, the one or more liquid streams may contain water and a portion of said water may be evaporated into, for example, resulting in or facilitating cooling or heat removal.

Step-by-Step Description (FIG. 19):

1) Heat 'Absorption' from Heat Source enhanced by or employing, for example LCST Phase Change into Multi-Liquid Phase Mixture: Relatively cold combined solution (L-1) (which may comprise a single liquid phase) may be heated in one or more Heat Input Heat Exchangers, where it may be heated through heat exchange with one or more heat sources (RE-1). During heating, the L-1 may be heated at or above one or more cloud point temperatures, which may result in the formation of two or more liquid phases in a multi-liquid phase mixture (LL-1) due to, for example, one or more LCST phase transitions.

2) Heat 'Release' or Heat Generation or Heat Transfer enhanced by or employing dissolution of liquid phases at or above, for example, LCST phase change dissolution: LL-1 or a combined single phase liquid solution or a combination thereof may be transferred to one or more 'heating application heat exchangers' wherein said fluid stream may be heat exchanged (HE-2) with the one or more applications requiring heating, which may result in one or more LCST dissolution phase transitions. A resulting liquid stream (L-1) may comprise at least a portion of the two or more liquid phases dissolved in each other or a single combined solution comprising the two or more formerly separate liquid streams, or a combination thereof.

Example Application 1: Power Plant or Industrial Waste Heat Transport to Low Grade Heating Demand Sources Example Application 2: Power Plant Condenser Cooling Example Benefits may include, but are not limited to, one or more of the following:
May reduce the amount of liquid requiring pumping relative to water only cooling water system,
System may contain to employ evaporative cooling May be a drop-in technology for, for example, re-circulating or closed loop evaporative cooling systems Example Application 3: Deicing Roads Summary: The present embodiment may pertain to systems and methods for deicing or otherwise heating roads or other surfaces, which may involve, for example, using, for example, passive or low-cost heat sources.

| Example Inputs & Outputs (FIG. 22) | |
|---|---|
| Inputs | Outputs |
| Heat Input from Relatively Warm Surface or Road or Waste Heat or Other Heat Source | Heat Output to De-Ice or Warm Surface or Surface of Road |
| Electricity (fluid pumping, liquid-liquid separation devices, or combinations thereof) | |

Figure 23A:
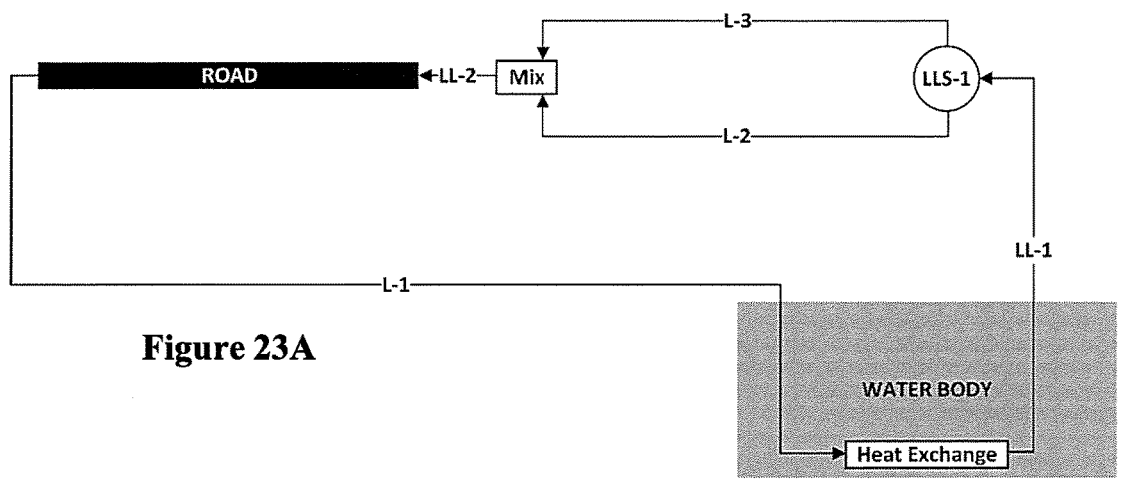
FIG. 23A: Road or Surface Heating or Deicing Employing LCST solubility change liquids with Liquid-Liquid Separation comprising using relatively 'warm' water body underneath, for example, floating ice layer, as heat source.
Figure 23B:
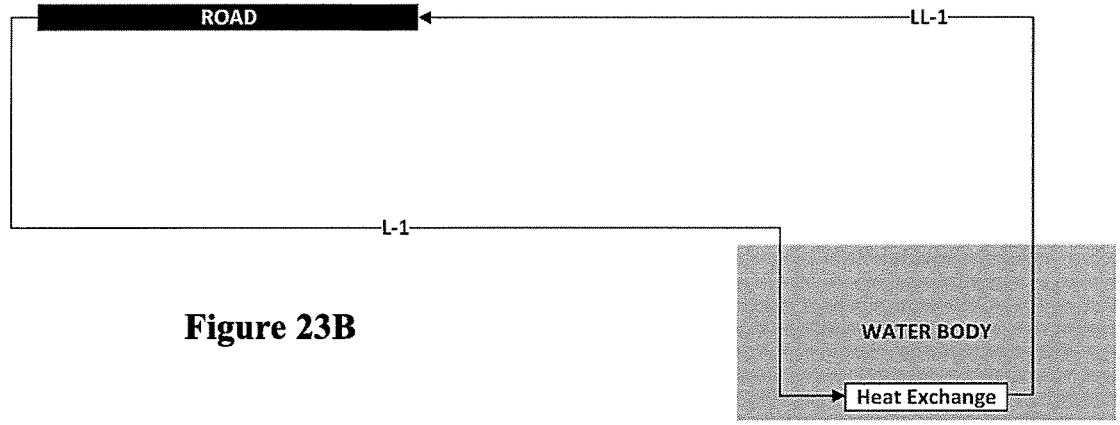
FIG. 23B (Above): Road or Surface Heating or Deicing Employing LCST solubility change liquids with Single Liquid Stream comprising using relatively 'warm' water body underneath, for example, floating ice layer, as heat source.

| Example Inputs & Outputs (FIG. 23) | |
|---|---|
| Inputs | Outputs |
| Heat Input from Relatively Warm Water Body Underneath, for example, floating ice | Heat Output to De-Ice or Warm Surface or Surface of Road or Function as an Enthalpy Source |
| Electricity (fluid pumping, liquid-liquid separation devices, or combinations thereof) | |

Step-by-Step Description (FIG. 22A—Regeneration and Storage of Heat):

1) Heat Absorption from Relatively 'Warm' Road or Surface with Endothermic LCST Phase Change from Combined Solution to Multi-Phase Liquid Solution: Combined liquid solution, which may comprise a single liquid phase solution (L-1), may be passed through a relatively 'warm' surface, such as a road in sunlight or a road where the ambient temperature outside or on the surface may be relatively 'warm,' which may be, for example, above the freezing temperature of water. For example, during said heat exchange, L-1 may be heated at or above one or more cloud point temperatures, which may result in one or more endothermic phase transitions and/or in the formation of a multi-liquid phase mixture (LL-1).

2) Separation Multi-Phase Liquid Solution into two or more separate liquid phases using one or more liquid-liquid separation devices: The multi-liquid phase mixture (LL-1) may be transferred through, for example, a valve, for example a 3-way ball valve (V-1), which may direct the multi-liquid phase mixture (LL-2) into one or more multiphase liquid separation devices (LLS-1). LLS-1 may separate the liquid mixture, at least in part, into, for example, one or more constituent liquid phases, which may result in two or more separate liquid streams (L-2 and L-3). Each liquid stream may comprise a constituent liquid phase or at least a portion of one constituent liquid phase from, for example, LL-2.

3) Storage of Separate Liquid Phases in Separate Liquid Storage: L-2 and L-3 may be transferred and stored in vessels specific to each liquid stream. Each vessel or storage reagent may, for example, store one liquid phase or may store liquid phases in isolation or separate from one or more other liquid phase or phases.

Figure 22B:
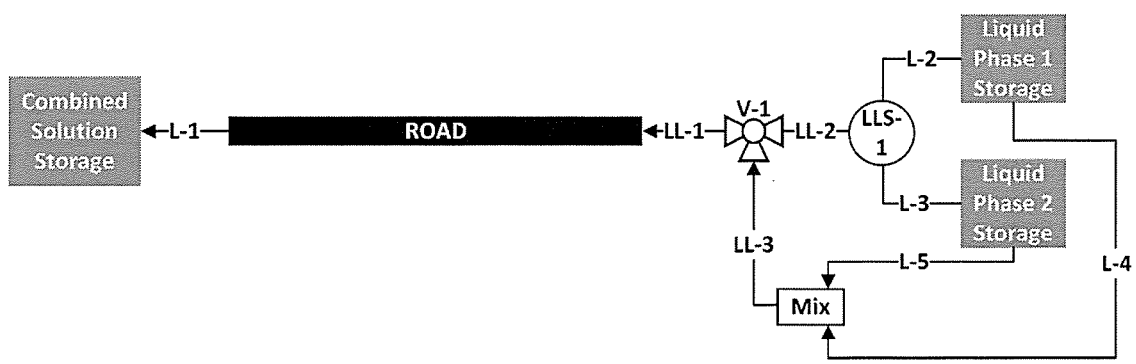
FIG. 22B: Road or Surface Heating or Deicing Employing LCST with Liquid-Liquid Separation and Liquid Storage—Embodiment operating in 'heat release' mode.

Step-by-Step Description (FIG. 22B—Heat Release or Generation for, for example, deicing): May comprise the same or a similar embodiment as FIG. 22A, except the present figure may be employed during heat release, employed, for example, for deicing. FIG. 22B may be 22A in reverse.

1) Transferring Separate Liquid Phases from Associated Storage Vessels and Mixing into Combined Liquid Mixture: At least a portion of liquids located in, for example, separate liquid storage units may be transferred from their associated separate liquid storage units as separate liquid streams (L-4 and L-5). L-4 and L-5 may be mixed to form a combined liquid mixture comprising, for example, a multiphase liquid mixture (LL-3) or may undergo partial dissolution into a single liquid phase, or fully dissolve into a combined liquid phase. The liquid streams may be mixed, for example, before or during step 2.

2) Heat 'Release' into or in Heat Exchange with Relatively 'Cold' Surface or Road due to Exothermic Dissolution of One or More Liquid Phases: The combined multiphase liquid mixture (LL-3 and LL-1) may be transferred through a relatively 'cold' surface, which may result in the exothermic dissolution of the one or more liquid phases into a single-phase liquid mixture (L-1), while releasing heat into the road or other relatively 'cold' surface. The heat generated may be enough to melt ice or snow, or prevent ice build-up, or enable the temperature of the road to be at or above the temperature of freezing, or enable the temperature of the road to be greater than ambient temperature or the temperature of the road or surface otherwise, or a combination thereof 3) Combined Solution Transferred to Storage Vessel or Vessels: L-1 may be transferred to one or more combined solution storage vessels. The combined solution may be regenerated into two or more liquid phases when a heat source or heat sources are available or employing, for example, the systems & methods described in Figure or FIG. 4A.

Step-by-Step Description (FIG. 23A):

1) Heat Absorption from, for example, Water Body—LCST Phase Change into Two or More Liquid Phases: A combined liquid stream (L-1), which may comprise, for example, one liquid phase, may transferred to a water body, which may, for example, possess ice floating on its surface. The liquid beneath the surface of a water body, even with ice cover, may possess a temperature greater than the freezing point of water. For example, liquid water is at its maximum density at about 4° C. L-1 may be heat exchanged with the relatively 'warm' water beneath the surface, which may be above one or more LCSTs and may result in an endothermic phase change, which may result in the formation of a multi—liquid phase mixture (LL-1). Heat exchanging may comprise, for example, pumping the combined solution through a pipe or coils of pipes beneath the surface of, for example, the water body.

2) Separation Multi-Phase Liquid Solution into two or more separate liquid phases using one or more liquid-liquid separation devices: The multi-liquid phase mixture (LL-1) may be transferred to or within one or more multiphase liquid separation devices (LLS-1). LLS-1 may separate the liquid mixture, at least in part, into, for example, one or more constituent liquid phases, which may result in two or more separate liquid streams (L-2 and L-3). Each liquid stream may comprise a constituent liquid phase or at least a portion of one constituent liquid phase from, for example, LL-2.

3) Transferring Separate Liquid Phases from, for example, Location Near or In Water Body to Heating Application, such as Heating Road or Other Surface: L-2 and L-3 may be transferred as separate liquid streams. L-2 and L-3 may be isolated from each other and may not be in fluid contact with each-other for at least a portion of liquid transfer. At least a portion of latent heat stored in the liquid system may effectively transfer to the one or more applications requiring heating, which may be at least in part independent of the temperature of the individual liquid streams during transfer and/or independent of the distance the individual liquid phases are transferred.

4) Heat 'Release' into or in Heat Exchange with Relatively 'Cold' Surface or Road due to Exothermic Dissolution of One or More Liquid Phases: At or near or within the one or more destinations requiring heating, such as a relatively 'cold' surface or road, the two or more liquid phases (L-2 and L-3) are mixed. Said solution may be transferred through the one or more relatively 'cold' surfaces, which may result in the exothermic dissolution of the one or more liquid phases into a single-phase solution (L-1), which may, for example, release heat into the road or other relatively 'cold' surface requiring heating. The heat exchanged may be sufficient to melt ice or snow or prevent ice build-up or enable the temperature of the road to be at or above the temperature of freezing or enable the temperature of the road to be greater than ambient temperature or the raise the temperature of the working fluid, road, or other surface compared to ambient conditions. The resulting combined solution may comprise the input or starting solution of step 1.

Step-by-Step Description (FIG. 23B—Single liquid mixture heat transfer—may employ LCST or UCST in heat transfer):

1) Heat Absorption or LCST Phase Change into Two or More Liquid Phases from Water Body: A combined liquid stream (L-1), which may comprise, for example, one liquid phase, may be transferred to a water body, which may, for example, possess ice floating on its surface. The liquid beneath the surface of a water body, even with ice cover, may possess a temperature greater than the freezing point of water. For example, liquid water may be at its maximum density at about 4° C. L-1 may be heat exchanged with the relatively 'warm' water beneath the surface, which may result in one or more endothermic phase transitions which may result in the formation of a multi—liquid phase mixture (LL-1). Heat exchanging may simply comprise, for example, pumping the combined solution through a pipe or coils of pipes beneath the surface of the water body.

2) Transferring Combined Multiphase Liquid Mixture from Location Near or In Water Body to Application Requiring Heating, such as Heating Road or Other Surface: The multi-liquid phase mixture (LL-1) may be transferred to the one or more applications requiring heating. The multiple liquid phases of the multi-liquid phase mixture may remain in fluid contact during transport and may be transported in the same pipe or pipes. Due to, for example, cooling from potentially cool temperatures surrounding the solution transfer pipe or pipes, one or more liquid phases in the multiphase liquid mixture may dissolve in each other during transport. Said dissolution of the one or more liquid phases may be exothermic, which may enable the temperature of the multi-liquid phase mixture to remain relatively stable or relatively more stable, for example, at or near one or more LCSTs of the liquid system.

3) Heat 'Release' into or in Heat Exchange with Relatively 'Cold' Surface or Road due to Exothermic Dissolution of One or More Liquid Phases: At or near the one or more destinations requiring heating, such as a relatively 'cold' surface or road, LL-1 may arrive comprising a multi-phase liquid solution, a single combined phase liquid solution, or a combination thereof. LL-1 may be transferred through the one or more relatively applications requiring heating, which may release heat into the road or other relatively 'cold' surface requiring heating due to, for example, latent heat of dissolution phase transition and/or specific heat capacity. The heat released may be derived from the exothermic dissolution of remaining liquid phases, the specific heat capacity of the solution, or a combination thereof. The heat exchanged may be sufficient to melt ice or snow or prevent ice build-up or enable the temperature of the road to be at or above the temperature of freezing or enable the temperature of the road to be greater than ambient temperature or the raise the temperature of the working fluid, road, or other surface compared to ambient conditions. The resulting combined solution may comprise the input or starting solution of step 1.

Example Application 4: Substitute Coolant or Heat Transfer Liquid

Cooling Powered Osmotic Heat Engine

Figure 24:
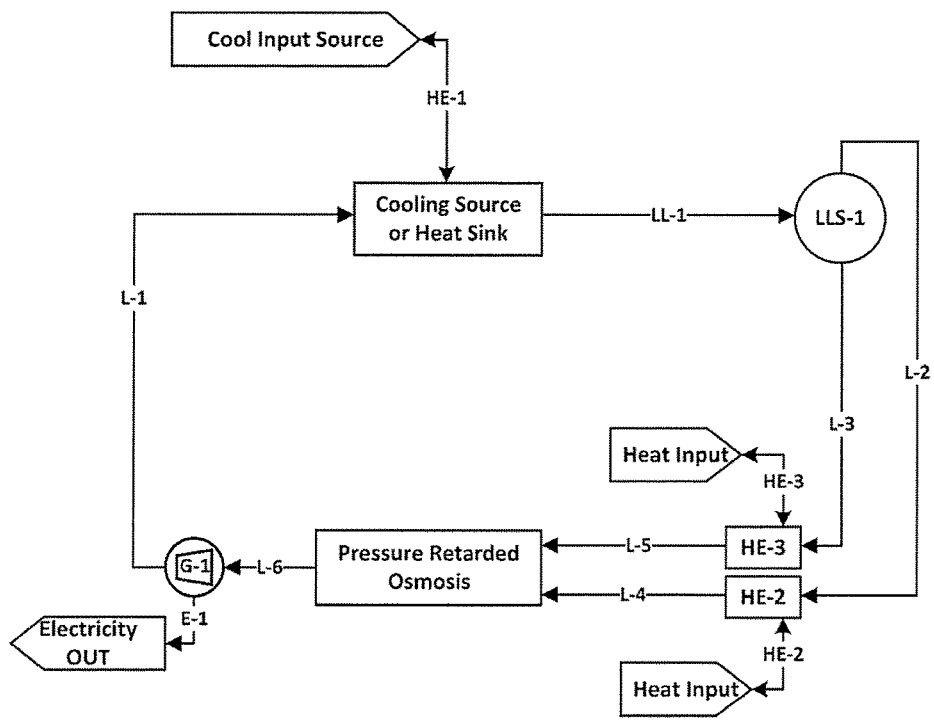
FIG. 24: Cooling Phase Change Regenerated Osmotic Heat Engine Employing UCST solubility change liquids with Liquid-Liquid Separation.

Summary (FIG. 24):

The present embodiment may pertain to systems and methods for generating electricity from relatively small temperature differences. The working fluid in the present embodiment may comprise a relatively low viscosity liquid system, which may possess one or more UCST phase transition temperatures. The liquid system may be regenerable and reversible.

The one or more liquid phases, which may be formed from a UCST phase transition, may be employed in an osmotic heat engine to generate power from, for example, the mixing of two or more of the liquid phases. One or more liquid phases may comprise a feed solution. One or more liquid phases may comprise a draw solution. One or more liquid phases, if desired, may undergo further treatment before being employed as a feed solution or draw solution. For example, said treatment may include, but is not limited to, separation of residual reagents desired to be components of the opposing liquid phase or phases or part of the opposing solution type (for example: Feed solution vs. draw solution).

The present embodiment may enable power generation from a cool source and a heat source, where, for example, the distance between the cool source and heat source may be significant or may require fluid transport through regions of opposing temperature to the desired temperature source or a combination thereof.

For example, one or more versions of the present embodiment may be an effective means of generating electricity from the thermocline of a water body, where the cool source is located near or at the bottom of the water body and the heat source is above, at, or near the surface of the water body. In said example, the working fluid carrying the cool source may require travelling through warm water before reaching the application requiring cooling, which, with a working fluid relying on specific heat, may result in losses to the surrounding water body.

In an example version of the present embodiment, the UCST liquid system may form two or more separate liquid phases at or near the cold source and said separate liquid phases may be separated, at least in part, into two separate liquid streams before the liquid phases are transferred to the heat source. With the liquid phases separate during transport, the liquid phases may be heated to any temperature in the thermocline without, for example, experiencing significant energetic losses in the subsequent osmotic heat engine. Unlike an embodiment employing exclusively a specific heat working fluid, the present embodiment may benefit from cool losses during transport to the surface as the compositions of the separate liquid phases will not change while less heat input would be required at the surface before or during the osmotic heat engine stage.

For example, one or more versions of the present embodiment may be an effective means of generating electricity from power generation or industrial waste heat, including, for example, where the distance between the cold source and the waste heat source is relatively significant. For example, at the cool source, such as a relatively cool water body, the embodiment may form two or more liquid phases. Said two or more liquid phases may be separated into two or more separate liquid streams and transported to, for example, one or more waste heat sources. At said waste heat source, the two or more liquid phases may be heated with one or more sources of waste heat and may be mixed utilizing pressure retarded osmosis to generate electricity. For example, another benefit of one or more versions of the present embodiment may be the ability for the osmotic heat engine to generate electricity from waste heat, for example, in a location where pre-existing infrastructure may exist to transport or use or otherwise sell the electricity or power generated. For example, another benefit of one or more versions of the present embodiments may be the ability to regenerate the two or more liquid phases at the cold source, as, for example, the regeneration of the two or more liquid phases may be lower complexity or require less maintenance or moving parts relative to, for example, the one or more osmotic heat engine units.

The pressure retarded osmosis system may generate electricity, for example, from difference in osmotic pressure between the reagents above the molecular weight cutoff of one or more membranes in one liquid phase or liquid stream and the reagents above the molecular weight cutoff of one or more of the same membranes in another liquid phase or liquid stream. For example, one or more of said liquid streams may be a feed solution and one or more of said liquid streams may be a draw solution.

For example, one or more versions of the present embodiment may be an effective means of generating power from the difference in temperature between a cold region and a hot region of significant distance apart. For example, one side or one region of a tunnel, mountain, or other substantial geographic feature may be at a significantly different temperature than another side or region. A version of the present embodiment may be employed to generate electricity from said temperature difference as, for example, it may generate electricity regardless of temperature variation during working fluid transport.

| Example Inputs & Outputs (FIG. 24) | |
|---|---|
| Inputs | Outputs |
| Cool Input from One or More Cool Input Sources | Electricity (Net Output) (from pressure retarded osmosis hydroelectric generator) |
| Heat Input from One or More Heat Input Sources | |
| Electricity (fluid pumping, liquid-liquid separation devices, or combinations thereof) | |

Step-by-Step Description:
1) Combined Solution UCST Cooling Cloud Point Regeneration: A combined, solution (L-1), which may comprise a single liquid phase and/or may comprise a combined solution of the draw and feed streams, may be cooled, using, for example, one or more cooling sources or evaporative cooling, to, for example at or below its cloud point or UCST temperature. L-1 may phase transitions into a multi-liquid phase mixture (LL-1). The cool source may comprise, including, but not limited to, one or more cooling input sources or evaporation or a combination thereof.
2) Separation of Multi-Liquid Phase or Two Liquid Phase Mixture into Constituent Liquid Phases: The multi-liquid phase mixture (LL-1) may be transferred to or within one or more multiphase liquid separation devices (LLS-1). LLS-1 may separate the liquid mixture, at least in part, into, for example, one or more constituent liquid phases, which may result in two or more separate liquid streams (L-2 and L-3). One separated liquid phase may comprise, for example, the draw solution, and other liquid phase may comprise, for example, the feed solution.
3) Preheating of Separate Liquid Streams Above their Combined UCST: L-2 and/or L-3 may be preheated (L-4 and L-5) using one or more heat sources (HE-2 or HE-3) to above the cloud point temperature or UCST of the liquid system. Alternatively, or additionally, heat input may occur within the one or more osmotic heat engine or pressure retarded osmosis units.
4) Pressure Retarded Osmosis Power Generation Employed One Liquid Phase as a Feed Solution and One Liquid Phase as a Draw Solution: L-4 and L-5 may comprise a feed solution and one or more of the liquid phases may comprise a draw solution. Said feed solution may be transferred into the feed input section of the pressure retarded osmosis membrane system and said draw solution may be transferred into the draw solution input section of the pressure retarded osmosis membrane system. At the membrane level, at least a portion of the feed solution may migrate through the membrane pores into the draw solution, which may result in hydraulic pressure. Said hydraulic pressure may be converted into electricity using, for example, a hydroelectric generator (G-1), which generates, for example, electricity (E-1).

Note: The liquid streams may be heated before or during the pressure retarded osmosis unit or a combination thereof.

Note: The embodiment may include a further membrane step to remove or separate residual draw solution or relatively high molecular weight compounds from the one or more liquid phases to be employed as a feed solution.

Note: In some embodiments, at least a portion of the feed solution does not pass through the membrane and may remain after passing through the membrane module. Said remaining feed solution may be mixed with the output diluted draw solution, for example, after power generation. The resulting combined solution may be sent to step 1.

Example Components may include, but are not limited:
Nanofiltration or other PRO membrane that can reject PPGs or PEGs or other molecules above a certain molecular weight or hydration radius, however cannot reject or possess minimal rejection of, including, but not limited to, one or more or a combination of the following: Water, Propylene Glycol, Glycerol, One or More Dissolved Ionic Compounds, Propylene Carbonate, Ethylene Glycol, low molecular weight compounds, low molecular weight organic compounds Draw Solution: Water+PPG 425 Rich Phase (may contain low concentrations of Propylene Carbonate)

Feed Solution: Propylene Carbonate-Rich Phase (may contain low concentrations of PPG 425 or water or both)

The UCST temperature may be adjusted between, for example, $-10\text{-}100°$ C.

For Ocean Thermal Energy Conversion, for example, a two-phase liquid solution with near equal volume liquid phases and high selectively to form the draw solution in one layer or phase and feed solution in another layer or phase has been created with any UCST temperature $-10\text{-}100°$ C. In said application, the reagent composition effectively achieved the UCST temperature in the desirable temperature range for this application, $4\text{-}20°$ C.

One benefit of said described composition is the relatively high selectively of each liquid phase to form its desired components. For example, the propylene carbonate liquid phase may comprise relatively low concentration or amount of PPG 425, while the Water+PPG 425 liquid phase may comprise most or nearly all of the PPG 425 or Water in the system.

The embodiment may be regenerated by cooling using, for example, including, but not limited to, one or more or a combination of the following: cool from ocean or lake or other cold sink thermocline or cold temperatures, or other ambient cold source.

Before or during the membrane-based embodiment for Pressure Retarded Osmosis power generation, the reagents may be heated above a UCST temperature or temperature region before or during contact between the membrane and liquid to enable, for example, to solubility of both reagents.

Example Applications

Figure 25:
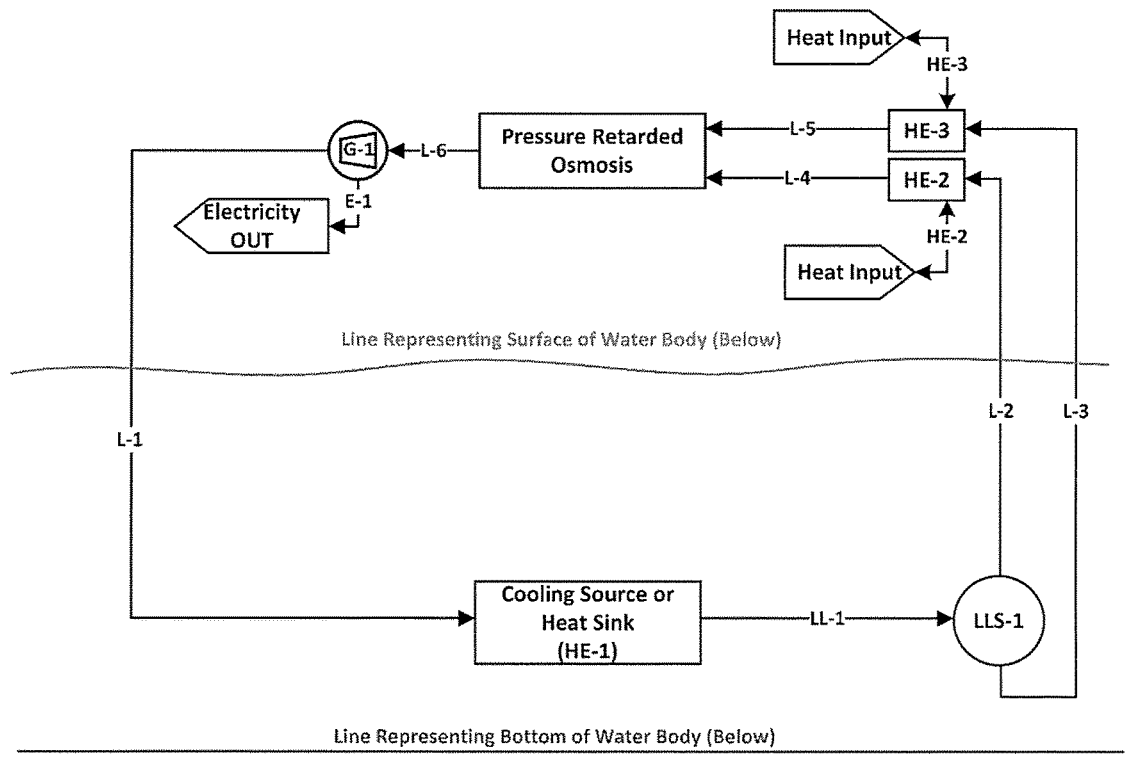
FIG. 25: Ocean Thermal Energy Conversion (OTEC) Cooling Phase Change Regenerated Osmotic Heat Engine Employing UCST solubility change liquids with Liquid-Liquid Separation. (Note: Process elements in figure may not shown to scale relative to depth in water body).

OTEC System (example embodiment may comprise FIG. 25):

The present embodiments may be employed as a device for generating power from the difference in temperature in the thermocline of a water body, for example, the difference in temperature between the surface and lower depths of a water body. Similarly, present embodiments may be employed as a device for generating power from the difference in temperature between temperatures outside of a water body or heat sink and the temperature inside a water body or heat sink.

In versions of the embodiments employed in Ocean Thermal Energy Conversion to generate power from, for example, the thermocline of a water body, the heat sink or cooling heat exchange section of the embodiment (for example: RE-1), LL-1, L-1, or the one or more liquid— liquid phase separation devices (LLS-1), or a combination thereof may be located beneath the surface of the water body. The heat input, pressure retarded osmosis system, power generation unit, power output (for example: Electricity) or a combination thereof may be located on the surface, on, above, or outside the water body or cold sink.

The present embodiment may enable complete or nearly complete recovery of the temperature thermocline. The regeneration of the single liquid phase into two or more liquid phases may occur below on or more UCSTs, for example, beneath the surface of the water. Said two or more liquid phases may be separated into two or more separate liquid streams which may comprise at least a portion of the constituent liquid phases. The composition of said liquid streams may remain constant as the liquid phases are pumped to the surface, as they may be separate from each other and may not be in fluid contact during at least a portion of transport. Upon reaching the surface, said separate liquid streams may comprise the same composition as when they were formed at the cooling source. Additionally, the increase in temperature of the liquid phases as they are pumped up the thermocline (at lesser depths, the temperature is generally warmer) may be beneficial, as it, including, but not limited to, may reduce the heat input, if any, required before or during pressure retarded osmosis.

Note: In an alternative version of the example embodiment, the ocean or water body or other cold sink section of the embodiment may contain, for example, no or minimal moving parts. The ocean or cold water body may comprise a cooling heat exchange functioning as the cooling source or heat sink. A combined solution (which may comprise a single liquid phase) may be cooled to form the two or more liquid phase mixture. The devices employed to separate the multi-liquid phase mixture into its constituent liquid phases may be, for example, employed on, above, or outside the water body.

Power Plant or Industrial Waste Heat or Solar Heat Powered System (District Cooling Powered System):

The present embodiments may be employed to generate power from relatively small temperature differences. Other sources of small temperature differences, may include, but not limited to, power plant waste heat, power plant cooling water, datacenter cooling fluid, uneven temperatures of the surface of the earth, low grade solar thermal, industrial waste heat, or combinations thereof.

In the specific embodiment of power plants and other systems requiring cooling, the present embodiments may be employed as a replacement or supplement of the coolant or cooling fluid presently employed, for example, as a replacement for cooling water. The present embodiments may enable a power plant or other heat or cold source to efficiently or more efficiently be cooled, while, simultaneously generating additional power. For example, the UCST cooling phase change into two or more liquid phases may occur in, for example, an evaporative cooling step, and the cooling of one or more units in the power plants may occur as a heat exchange with the pressure retarded osmosis system. Heat required for the endothermic mixing occurring during pressure retarded osmosis may be supplied by the power plant as a heat exchange directly with the condenser (for example: an alternative to cooling with condenser water). Heat input may occur before or during pressure retarded osmosis.

Heating Powered Osmotic Heat Engine

Figure 26:
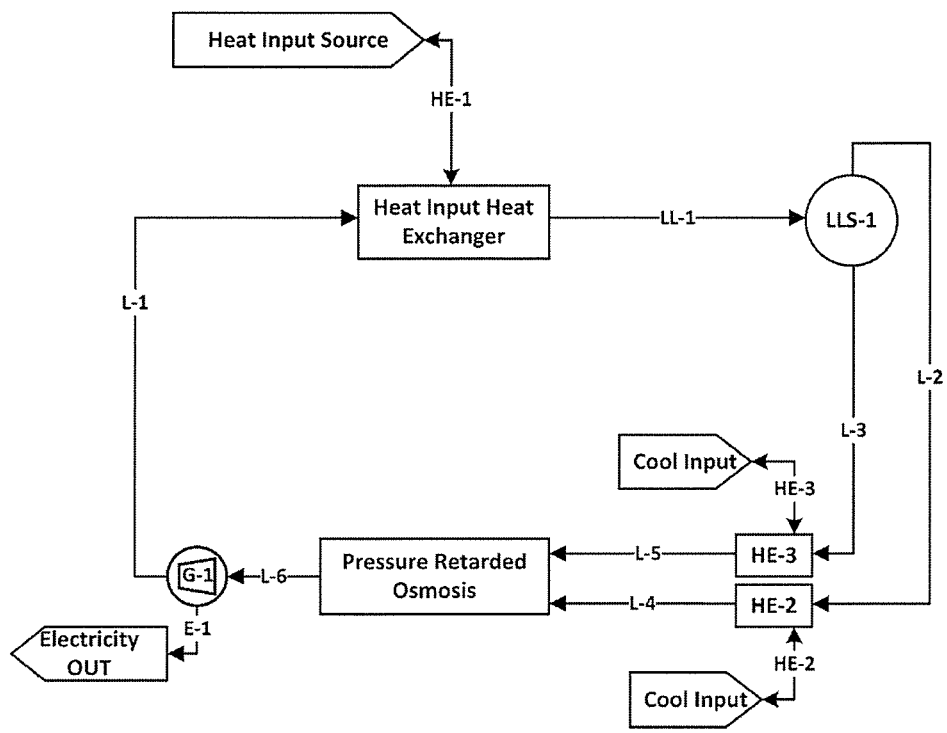
FIG. 26: Heating Phase Change Regenerated Osmotic Heat Engine Employing LCST solubility change liquids with Liquid-Liquid Separation.
Figure 27:
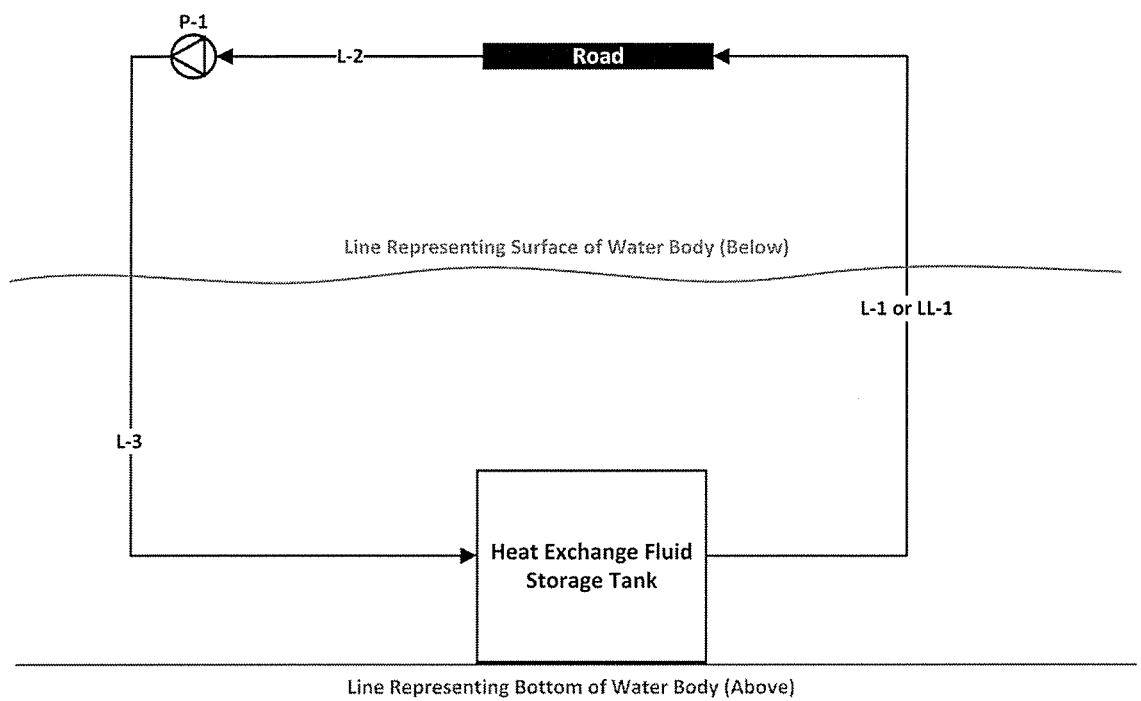
FIG. 27: Systems & Methods for Deicing Roads and Surfaces using Antifreeze or UCST or LCST or Combination Thereof Fluid Stored or Heat Exchanged or Combination Thereof Beneath the Surface of a Water Body.
Figure 28:
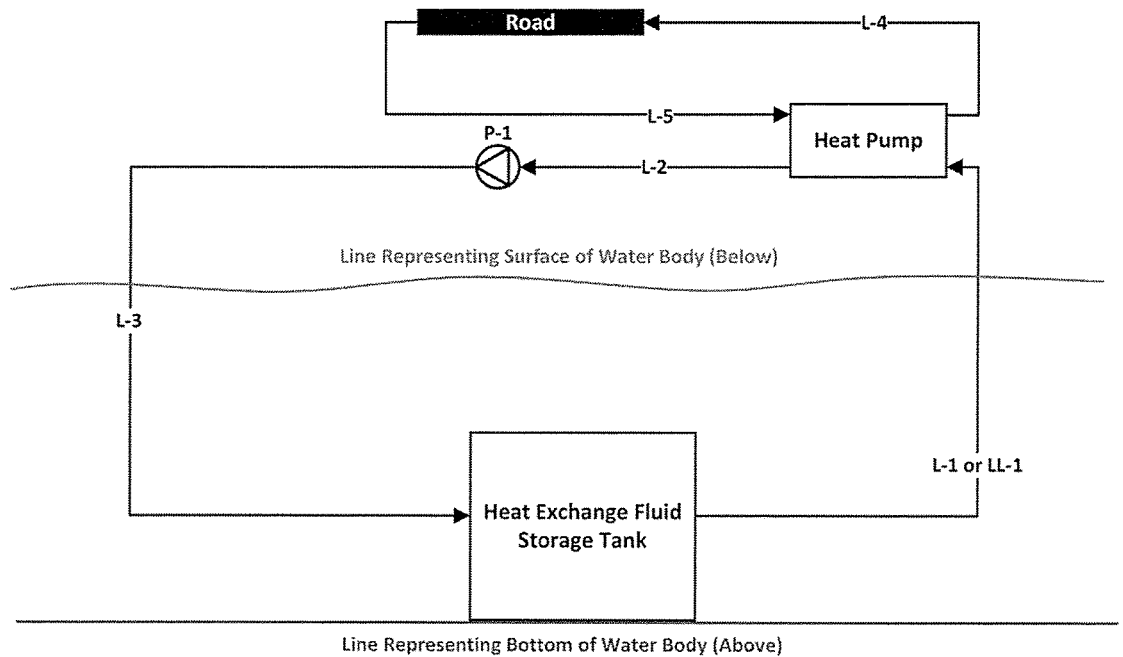
FIG. 28: Systems & Methods for Deicing Roads and Surfaces using Antifreeze or UCST or LCST or Combination Thereof Fluid Stored or Heat Exchanged or Combination Thereof Beneath the Surface of a Water Body Further Comprising a Heat Pump.
Figure 29:
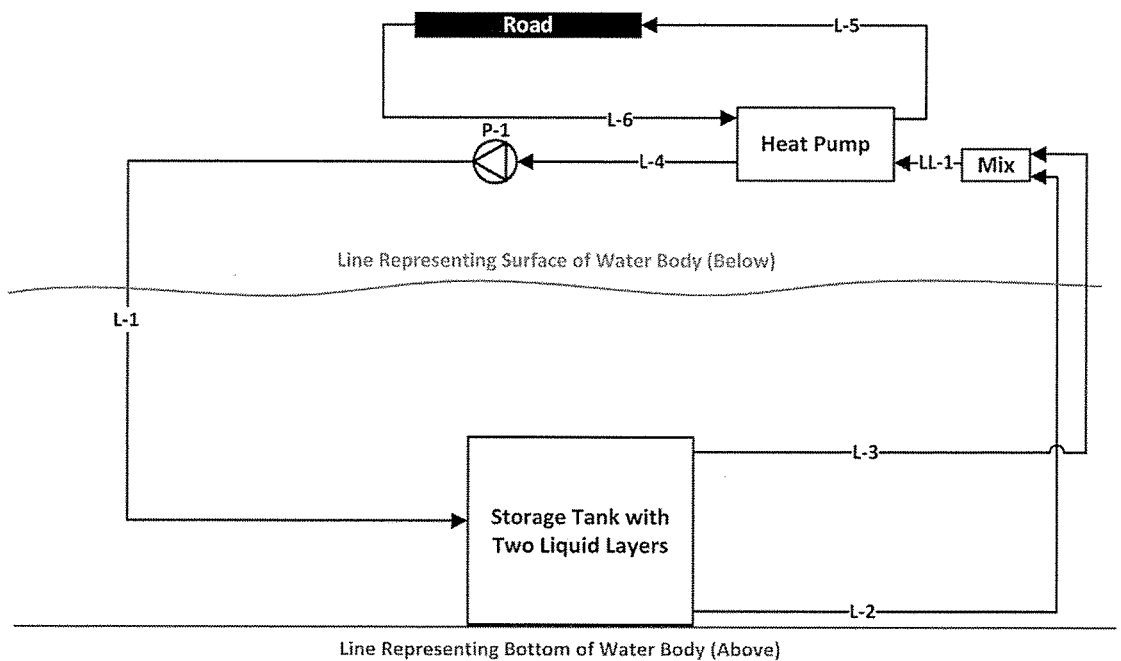
FIG. 29: Systems & Methods for Deicing Roads and Surfaces using LCST Multi-Layer Solution in One or More Storage Tanks Beneath the Surface of a Water Body.
Figure 30:
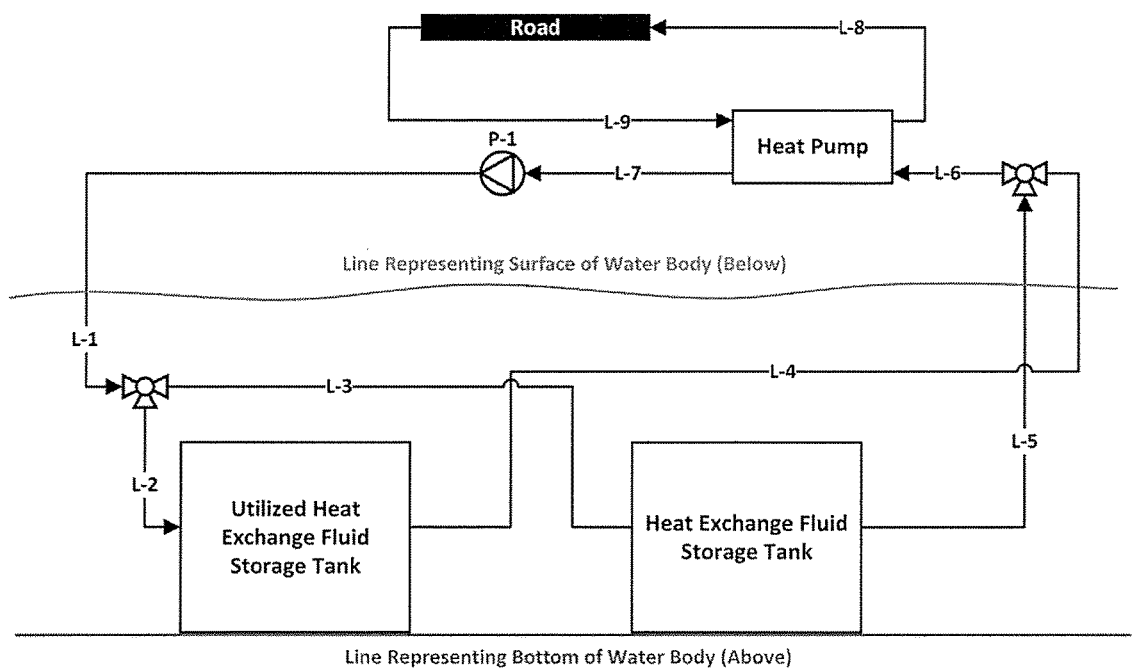
FIG. 30: Systems & Methods for Deicing Roads and Surfaces using LCST Multi-Layer Solution in One or More Storage Tanks Beneath the Surface of a Water Body with Utilized Heat Exchange Fluid Storage Vessel.
Figure 31:
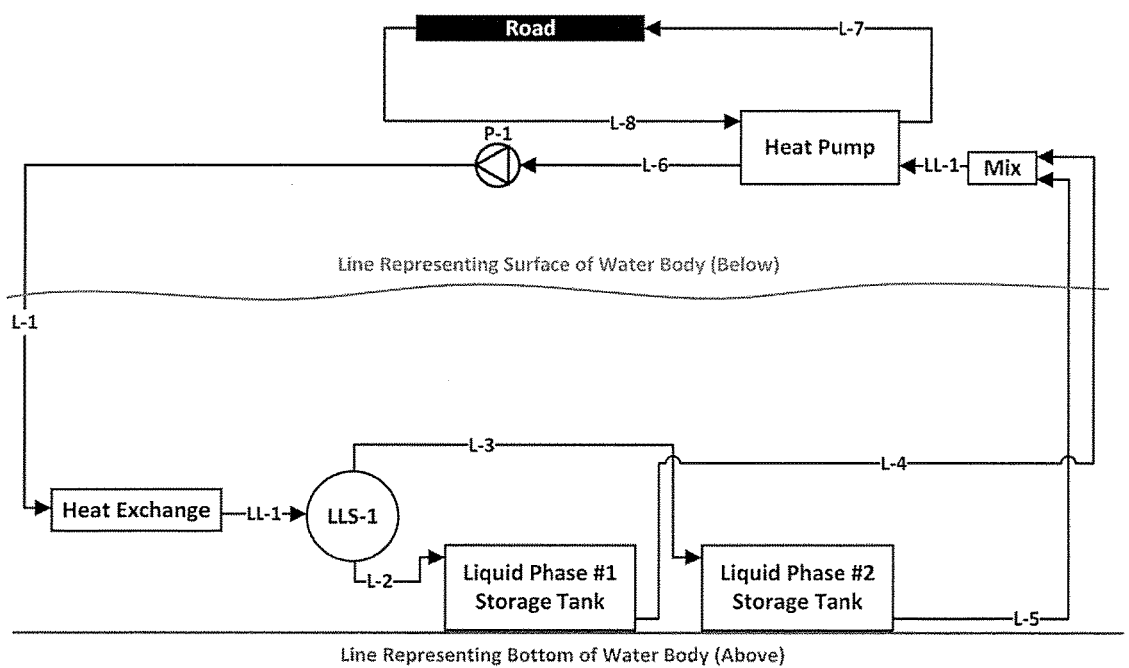
FIG. 31: Systems & Methods for Deicing Roads and Surfaces using LCST Heat Absorption and Release. Each Liquid Phase Stored in Separate Subsurface Storage Vessels.

Summary (FIG. 26):

The present embodiment may pertain to systems and methods for generating electricity from relatively small temperature differences. The working fluid or liquid system in the present embodiment may comprise a relatively low viscosity liquid system, which may form two or more liquid phases from a single phase liquid solution upon heating above one or more adjustable heating cloud point temperatures. The liquid system may be regenerable and reversible.

The one or more liquid phases, which may be formed from a UCST phase transition, may be employed in an osmotic heat engine to generate power from, for example, the mixing of two or more of the liquid phases. One or more liquid phases may comprise a feed solution. One or more liquid phases may comprise a draw solution. One or more liquid phases, if desired, may undergo further treatment before being employed as a feed solution or draw solution. For example, said treatment may include, but is not limited to, separation of residual reagents desired to be components of the opposing liquid phase or phases or part of the opposing solution type (for example: Feed solution vs. draw solution).

The present embodiment may enable power generation from a heat source and a cool source, where, for example, the distance between the cool source and heat source are significant or require fluid transport through regions of opposing to the desired temperature source or temperature variation, a combination thereof.

For example, one or more versions of the present embodiment may enable power generation from small temperature differences with low cost reagents, non-hazardous operations, relatively moderate system conditions, and relatively low system complexity.

For example, one or more versions of the present embodiment may function as both an osmotic heat engine power generation system and a heat transfer system for cooling or heat transfer. For example, heat input may be derived from an application requiring cooling, for example, a power plant condenser. Cooling input may be integrated with the osmotic heat engine. For example, heat may be released during the mixing and dissolution of the two or more liquid phases in a pressure retarded osmosis power generation unit.

For example, another benefit of one or more versions of the present embodiment may include that electricity generation occurs at the cold source or cold input. This may enable the unit, for example, to be employed in applications where pre-existing infrastructure may exist for heat input, for example, in applications as a heat exchange fluid in, for example, a power plant, industrial application, or datacenter. Said benefit may include applications where pre-existing infrastructure for heat input may require less complexity or has little versatility, for example, the one or more condenser heat exchangers at a power plant. For example, liquid-liquid separation may occur subsequently to said heat exchange.

For example, one or more versions of the present embodiment may be an effective means of generating power from the difference in temperature between a cold region and a hot region of significant distance apart. For example, one side or one region of a tunnel, mountain, or other substantial geographic feature may be at a significantly different temperature than another side or region. A version of the present embodiment may be employed to generate electricity from said temperature difference as, for example, it may generate electricity regardless of heating or cooling losses during working fluid transport between the one or more heating or cooling sources.

| Example Inputs & Outputs (FIG. 26) | |
|---|---|
| Inputs | Outputs |
| Cool Input from One or More Cool Input Sources | Electricity (Net Output) (from pressure retarded osmosis hydroelectric generator) |
| Heat Input from One or More Heat Input Sources | |
| Electricity (fluid pumping, liquid-liquid separation devices, or combinations thereof) | |

Step-by-Step Description:
1) Combined Solution LCST Heat Absorption Phase Transition into Multi-Liquid Phase Mixture: A combined solution (L-1), which may comprise a single liquid phase and/or a combined solution of the draw and feed streams is heated, using one or more heat sources, at or below its cloud point or LCST temperature. L-1 may phase transition into a multi-liquid phase mixture, which may be immiscible at or above the cloud point or LCST temperature, comprising multi-liquid phase mixture (LL-1).
2) Separation of Multi-Liquid Phase or Two Liquid Phase Mixture into Constituent Liquid Phases: The individual constituent liquid phases of the multi-phase liquid stream (LL-1) may be separated, at least in part, into independent liquid streams comprising, for example, at least a portion of each liquid phase (L-2 and L-3). One separated liquid stream may comprise, for example, draw solution, and other separated liquid phase may comprise, for example, feed solution.
3) Precooling of Separate Liquid Streams Below their Combined LCST: The separate liquid streams (L-2 and L-3) may be precooled (L-4 and L-5) using one or more cool sources (HE-2 or HE-3) or evaporative cooling or combination thereof to below the cloud point temperature or LCST of the liquid system. Alternatively, or additionally, cooling input may occur within the one or more osmotic heat engine or pressure retarded osmosis units.
4) Pressure Retarded Osmosis Power Generation Employing One or More Liquid Phases as a Feed Solution and One or More Liquid Phases as a Draw Solution: One or more of the liquid phases may comprise a feed solution or one or more of the liquid phases may comprise a draw solution or combination thereof. Said feed solution may be transferred into the feed input section of the pressure retarded osmosis membrane system and said draw solution may be transferred into the draw solution input section of the pressure retarded osmosis membrane system. At the membrane level, at least a portion of the feed solution may migrate through the membrane pores into a draw solution, which may result in hydraulic pressure deriving from an osmotic pressure difference. Said hydraulic pressure may be converted into electricity using, for example, a hydroelectric generator (G-1), which generates, for example, electricity (E-1).

Note: One or more streams may be cooled before or during the pressure retarded osmosis unit or a combination thereof.

Note: The embodiment may include a further membrane step to remove or separate residual draw solution or relatively high molecular weight compounds from the one or more liquid phases to be employed as a feed solution.

Note: In some embodiments, at least a portion of the feed solution may not pass through the membrane and may remain after passing through one or more membrane modules or the end-to-end pressure retarded osmosis unit. Said remaining feed solution may be mixed with the output diluted draw solution, for example, after power generation. The resulting combined solution may be sent to step 1.

Example Components:
Nanofiltration or other PRO membrane that can reject PPGs or PEGs or other molecules above a certain molecular weight or hydration radius, however cannot reject or possess minimal rejection of, including, but not limited to, one or more or a combination of the following: Water, Propylene Glycol, Glycerol, One or More Dissolved Ionic Compounds, Propylene Carbonate, Ethylene Glycol, low molecular weight compounds, low molecular weight organic compounds Draw Solution: PPG 425 Rich Phase (may contain low concentrations of Propylene Carbonate)

Feed Solution: Aqueous Salt Solution or Aqueous Glycerol Solution Rich Phase or combination thereof (may contain low concentrations of PPG 425 or water or both)

The LCST temperature may be adjusted between, for example, −10-100° C.

One benefit of said described composition is the relatively high selectively of each liquid phase to form its desired components.

Before or during the membrane-based embodiment for Pressure Retarded Osmosis power generation, the reagents may be cooled below one or more LCST or phase change temperatures or temperature regions before or during contact between the membrane and liquid to enable, for example, to solubility of both reagents.

Example Application 1: Power Plant or Industrial Waste Heat or Low-Grade Solar Thermal Powered System Example Application 2: District Heating Powered System Additional Example Embodiments De-Icing Roads and Other Surfaces Employing 'Warm' Temperature Beneath the Surface of a Water Body Summary (FIGS. 27-31):

The present embodiments may pertain to systems & methods for deicing roads and other surfaces with minimal energy consumption, cost, or combination thereof. The present embodiment may comprise, including, but not limited to, one or more or a combination of the following components: fluid storage vessel, one or more heat exchangers, fluid transfer pipes, fluid transfer pump, piping or heat exchange other heat exchange method under, within, or above the heated surface or surfaces, or components beneath the surface of one or more water bodies or components on, above, or outside one or more water bodies. Components beneath the surface of the water body may include, but are not limited to, for example, one or more or a combination of the following: heat exchange fluid storage vessel, one or more heat exchangers, or fluid transfer pipes. Components above the surface of the water body may include, but are not limited to, one or more or a combination of the following:

fluid transfer pipes, fluid transfer pump, piping or heat exchange other heat exchange method under, within, or above the heated surface or surfaces. Heat exchange fluids or liquid system may comprise, for example, including, but not limited to, antifreeze or UCST composition or LCST composition or combination thereof.

The present embodiments may enable the effective harnessing of a relatively stable temperature heat or enthalpy source during below water freezing temperature conditions, the temperature beneath the surface of a water body during sub-freezing air, or surface temperatures or a combination thereof.

The present embodiments may include, for example, one or more heat exchange fluid or liquid system storage tanks located beneath the surface of a water body. Heat exchange fluid may be pumped from the liquid storage tank and heat exchanged with a road or other surface requiring deicing or heating. The heat exchange fluid may be returned to the original heat exchange fluid tank or transferred to another tank employed, for example, to store utilized heat exchange fluid.

Other benefits of the embodiments described herein may include, but are not limited to, one or more or a combination of the following: small land use or land footprint, temperature stable fluid storage during subfreezing surface temperatures without requiring the placement of the tank beneath the ground, passive source of heat, no or minimal carbon dioxide emissions, environmentally benign, and widespread availability of water bodies in proximity to major roads in cold regions.

For example, the present embodiments may be applicable to roads and other surfaces requiring deicing relatively nearby or in relatively close proximity to one or more bodies of water. Example cities, include, but are not limited to, Chicago, Ill., Minneapolis, Minn., Buffalo, NY, Detroit, Mich., Tianjin, China, Moscow, Russia, Nanjing, China, Cleveland, Ohio, Milwaukee, Wis., Toronto, Canada, Provo, UT, Saskatoon, Canada.

The present embodiments may employ said heat exchange fluid as a heat or enthalpy source for a liquid source heat pump. The heat pump may transfer the heat to another heat exchange fluid, which is heat exchanged with the road or other surface requiring heating or deicing. Water may be at the highest density at around 4° C. Depending on the temperature of the surface of the road and the heat exchange apparatus between the surface of the road and the heat exchange fluid, 4° C. may be insufficient to overcome the delta-T of the heat exchange with the road and supply sufficient heating for deicing (note: other temperature heat sources may be available). One or more heat pumps may be employed, for example, to extract heat from the fluid heat exchanging with the water body and supply higher temperature heat exchange fluid as the heat input source to the surface of the road. The higher temperature heat exchange fluid may be, for example, including, but not limited to, greater than 4° C., or greater than 5° C., or greater than 10° C., or greater than 15° C., or greater than 20° C., or less than 20° C., or greater than 30° C., or combination thereof. Due to, for example, the relatively small temperature difference between the input temperature to the heat pump and output temperature of the heat pump, the heat pump may exhibit a high coefficient of performance and a high heat transfer efficiency. For example, a heat pump transferring heat from 4° C. input to 10° C. output may have a coefficient of performance of, for example, >8, or >10, or >15, or combination thereof. As a result, for example, the present embodiment may effectively heat and device a road with electrical or other form of valuable energy input comprising less than $1/15^{th}$ or less than $1/10^{th}$ or less than $1/5^{th}$ the total energy supplied to the road or other surface being heated or deiced. The present embodiment may make it economically viable from a CAPEX and OPEX perspective to device roads or other surfaces without or with less use or application of snow plows, salt, molasses, sand or other costly or environmentally harmful or combination thereof operations or consumables.

The present embodiments may employ a LCST phase change liquid system wherein the LCST may be less than the temperature some water at or beneath the surface or at the bottom of a water body. The liquid system may form two or more liquid phases, which may be, at least in part, separated. For example, said liquid phases may separate by forming two or more liquid layers in, for example, one or more liquid storage tanks beneath the surface of one or more water bodies. The two or more liquid layers may be separated and stored in separate storage tanks. Alternatively, the two or more liquid layers may remain in the storage tanks. When the separated liquid phases may need to be utilized, one or more liquid phases may be pumped from the one or more storage tanks as separate liquid streams or in separate locations. The two or more liquid streams may be mixed to released heat and heat exchange said heat with, for example, road or other application requiring heating. It is important to note than active cloud point adjustment or refrigeration or heat pump cycles described may also be employed in one or more surface heating or heat transfer embodiments to, for example, facilitate or enable said embodiments or may embody said embodiments.

The embodiments may employ a utilized heat exchange fluid storage tank or tanks. Said utilized heat exchange fluid storage tank or tanks may also function as heating phase change vessels or as a liquid-liquid separation device or a combination thereof.

Note: During warmer air temperatures, for example, during warmer seasons, the heat exchange and fluid storage system beneath the surface of the water body may employed as a cooling system to supply a cooling source or cooling enthalpy source. The heat exchange fluid may be, for example, the enthalpy source for an air conditioner or other form of cooling heat pump. Said cooling heat pump may function as a heating heat pump during cooling air temperature conditions. Depending on the temperature difference between the heat exchange fluid in the water body, outside air temperatures, and the temperature of the heating or cooling application, during cool time periods, the heat exchange fluid may function as an enthalpy source for a heat pump employed for space heating or as an enthalpy source for a heat pump employed to supply heat to de-ice roads.

Note: Water from beneath the surface of the water body may not desirably be pumped directly for the purposes of heating a road or de-icing because of, for example, the risk of ice formation during the 'heat exchange' embodiment with the road, biofouling risks, or combinations thereof.

Note: The one or more heat exchange fluid storage tanks may be located beneath the surface of the water only during specific time periods or year-round or a combination thereof. The one or more heat exchange fluid storage tanks, if desired, may not be in direct fluid contact or liquid-liquid contact with the surrounding water body to prevent, for example, fluid losses or environmental ramifications of fluid losses or both.

Note: In a heat exchange embodiment, where the heat exchange fluid may be directly heat exchanged with the water beneath the surface of a water body for purposes of deicing, for example, a road, the heat exchanger may accumulate ice, resulting in a loss in heat exchange efficiency. This may be prevented by employing, for example, a relatively large volume heat exchange fluid storage vessel to store the heat exchange fluid beneath the surface of the water body. This may be prevented by employing, for example, a larger heat exchange surface area. This may be prevented by employing, for example, a greater water flow over the heat exchanger surfaces. This may be prevented by employing, for example, the one or more heat exchange fluid transfer pipes as heat exchangers.

Note: In embodiments employing, for example, one or more storage tank to store utilized heat exchange fluid, the storage tanks storing utilized heat exchange fluid may later be employed as heat source heat exchange fluid tanks and the present heat source heat exchange fluid tanks may be later employed as utilized heat exchange fluid storage tanks.

Note: As heat exchange fluid is pumped out of one or more heat exchange fluid storage vessels, the removed liquid volume may be replaced with, including, but not limited to, one or more or a combination of the following: recirculated or return stream heat exchange fluid, recirculated or return stream heat exchange fluid pre-heated in heat exchange with water beneath the surface of the pond before entering one or more heat exchange fluid storage vessels, air, compressed air, hydraulic fluid, or compressed gas.

Note: The heat exchange fluids may comprise relatively environmentally benign or environmentally friendly reagents. For example, may include, but not limited to, one or more or a combination of the following: water, sugars, propylene glycol, glycerol, propylene carbonate, ethanol, ethers, diols, polypropylene glycol, polypropylene carbonate, polyethylene glycol, or polyethylene carbonate.

Conditions, Compositions, Other Parameters, Other Notes

Example 'CST reagents', or 'LCST Reagents', or 'UCST reagents', or 'UCST drivers', may include, but are not limited to, one or more or a combination of the following: Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200, ionic liquids Example 'LCST binding reagents', or 'LCST binder reagents', or low Solubility Reagents' may include, but are not limited to, one or more or a combination of the following: Ethylene Glycol Diacetate, Propylene Glycol Diacetate, Dipropylene Glycol Dimethyl Ether (DPE), 2-Heptanone, Propylene glycol monomethyl ether acetate, Propylene Carbonate, Cyclohexanone, 1-Octanol, Dipropylene Glycol Methyl Ether Acetate, 1-Methyl-2-pyrrolidinone, Ethylene glycol monohexyl ether, Acetal (1,1-Diethoxyethane), Isoamyl acetate, Dibutyl ether, m-Xylene, Isopropyl acetate, Dimethyl carbonate, Butanone, Methyl tert-butyl ether (MTBE), o-Xylene, Acetylacetone, p-Xylene, Methyl Isobutyl Ketone, Toluene, 3-Pentanone, Propyl acetate, Ethylene glycol monopropyl ether, 2-Methoxyethyl acetate, 5-Methyl-2-hexanone, 4-Methyl-2-pentanone, 3-Pentanone, 2-Pentanone, 2-methyl tetrahydrofuran The UCST liquid systems described herein may include compositions that possess a UCST temperature that is adjustable or tunable to any temperature from −20-1000° C.

The LCST liquid systems introduced herein may include compositions that possess a LCST temperature that is adjustable or tunable to any temperature from −20-1000° C.

UCST liquid system compositions include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol LCST reagent compositions include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol Viscosity is greater than, equal to, or less than 100,000 cP, or 10,000 cP, or 1,000 cP, or 500 cP, or 100 cP, or 50 cP, or 40 cP, or 30 cP, or 20 cP, or 10 cP, or 9 cP, or 8 cP, or 7 cP, or 6 cP, or 5 cP, or 4 cP, or 3 cP, or 2 cP, or 1 cP or 0.5 cP, or combination thereof Cooling Inputs or Sources include, but are not limited to, one or more or a combination of the following: thermocline water body, thermocline liquid body, water body, cold liquid body, evaporative cooling, heat pump cooling, air cooling, heat exchange with enthalpy source, cyrogenic cooling, LNG gasification, pressure reduction, cold surface, radiative cooling, endothothermic phase change Heating Inputs or Sources include, but are not limited to, one or more or a combination of the following: Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Temperatures: temperatures of operation are greater than, less than, or equal to or a combination thereof include, but are not limited to, one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Mass percentages of one or more components comprise greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Relative mass distribution of one or more liquid phases may include, but is not limited to, greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems Depth reached by workings fluids, including, but not limited to, working fluids possessing an UCST or LCST, recovering cool or heat or enthalpy or entropy or combination thereof from water body or other liquid body thermocline to recover cool or heat may include, but are not limited to, one or more or a combination of the following: depths in the range of 0 to 15,000 meters, depths in the range of 0 to 1,000,000 meters; less than, equal to, or greater than 10 meters, or 20 meters, or 50 meters, or 100 meters, or 250 meters, or 500 meters, or 1000 meters Applications may include, but are not limited to, one or more or a combination of the following: refrigeration, heat pump, cool transfer, heat transfer, radiative heating, radiative cooling, osmotic heat engine, geothermal heat transfer, ground source heat pump, geothermal cooling, geothermal heating, food & beverage production, industrial cooling, industrial heating, district heat, power generation, power plant cooling, transportation cooling, transportation heating, space heating, space cooling, HVAC, generating electricity from small temperature differences, generating electricity from relatively larger temperature differences, generating power from temperature differences, transferring heat or cool long distances, data center cooling, extractions, gas separations, separations, protein extractions, protein separations The compositions discussed herein may be expected to find numerous applications outside of heat or cooling transfer or energy generation. Example applications may include, but are not limited to, one or more or a combination of the following: drug delivery systems, drug delivery systems where solid carriers dissolve upon heating or cooling, biocompatible applications, diagnostic or sensor devices, diagnostic or sensor devices wherein the presence of one or more analytes results in the phase separation/mixing triggered by a certain analyte, low tech thermometers, sensors which form more or less layers or change colors above or below one or more specific temperatures, thermometers, temperature probes, temperature sensors, humidifiers, humidifiers or water evaporators or water absorbers, humidifiers, humidifiers or water evaporators or water absorbers wherein one or more liquid phases has a different water vapor pressure than other liquid phases or combined solution, cold or heat storage in packaging, reusable hot or cold packs, carriers for one or more types of catalysts, transportation of fuels, transportation of gases, transportation of liquids, reversible transport of reagents.

Reagents or compositions may involve multiple phases or properties, which may include, but are not limited to, Gas, Liquid, aqueous, solid, dissolved, one or more ionic species or forms, one or more liquid phase species, biphasic mixture, multiphasic mixture, multiphasic mixture comprising liquids, solid mixture, supercritical, hydrate, triple-point, or combination thereof Reagents or compositions may include, but are not limited to, one or more or a combination of the following: compound containing carbon, compound containing hydrogen, compound containing oxygen, compound containing nitrogen, compound containing sulfur, saturated hydrocarbon, unsaturated hydrocarbon, cyclic hydrocarbon, cyclo hydrocarbon, aromatic hydrocarbon, alkane, alkene, alkyne, cycloalkane, alkadiene, polymers, halogenated hydrocarbons, hydrocarbons with one or more functional groups, one or more hydrocarbons in crude oil, one or more different hydrocarbons in crude oil, one or more hydrocarbons in naphtha, one or more hydrocarbons in gasoline, one or more hydrocarbons in diesel, one or more hydrocarbons in heavy oil, one or more hydrocarbons in natural gas, natural gas liquids, one or more hydrocarbons in kerosene, organic solvents, light hydrocarbons, heavy hydrocarbons, water insoluble hydrocarbons, partially water soluble hydrocarbons, water soluble hydrocarbons, low toxicity hydrocarbons, medium toxicity hydrocarbons, high toxicity hydrocarbons, methane, Ethane, Ethene (ethylene), Ethyne (acetylene), Propane, Propene (propylene), Propyne (methylacetylene), Cyclopropane, Propadiene, Butane, Butene (butylene), Butyne, Cyclobutane, Butadiene, Pentane, Pentene, Pentyne, Cyclopentane, Pentadiene, (piperylene), Hexane, Hexene, Hexyne, Cyclohexane, Hexadiene, Heptane, Heptene, Heptyne, Cycloheptane, Heptadiene, Octane, Octene, Octyne, Cyclooctane, Octadiene, hydrocarbon solution, hydrocarbon containing mixture, amino acids (a) Membrane—Based Separation may comprise one or a combination of the following: Nanofiltration, Organic Solvent Nanofiltration, Reverse Osmosis, Forward Osmosis, Ultrafiltration, Microfiltration (b) Distillation or evaporations may comprise one or a combination of the following: Batch distillation, Continuous distillation, Simple distillation, Fractional distillation, Steam distillation, Azeotropic distillation, Multi-effect distillation, Multi-stage flash distillation, Flash distillation, Mechanical vapor compression distillation, Membrane distillation, Vacuum distillation, Short path distillation, Zone distillation, Air sensitive distillation (c) Switchable solvent—may comprise one or a combination of the following: Thermally switchable, $CO_2$-switchable, Switchable solvents responsive to other changes to system conditions.

One or more reagents may comprise water, organic solvent, siloxanes, ionic liquids, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than than 0.01 atm at 20° C., or a mixture thereof.

One or more reagents may comprise water, ammonia, ammonium, amine, azine, amino ethyl ethanol amine, 2-amino-2-methylpropan-1-ol (AMP), MDEA, MEA, primary amine, secondary amine, tertiary amine, low molecular weight primary or secondary amine, metal-ammine complex, metal-ammonia complex, metal-ammonium complex, sterically hindered amine, imines, azines, piperazine, alkali metal, lithium, sodium, potassium, rubidium, caesium, alkaline earth metal, calcium, magnesium, ionic liquid, thermally switchable compounds, $CO_2$ switchable compounds, enzymes, metal-organic frameworks, quaternary ammonium, quaternary ammonium cations, quaternary ammonium cations embedded in polymer, or mixtures thereof.
ion exchange, ion exchange membrane, electrodialysis, or removal or replacement of the absorbent and/or $CO_2$ containing solution.

One or more reagents may comprise organic solvent, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, zwitterionic polymers, amino acids, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, or mixtures thereof.

The membrane may be comprised of any useful material and such useful material may vary depending upon the components to be separated, their molecular weight, viscosity, and/or other properties. Useful membranes may include, for example, membranes comprised of a material selected from a thin film composite; a polyamide; a cellulose acetate; a ceramic membrane; other materials and combinations thereof.

One or more reagents may comprise, for example, one or more or a combination of the following: volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than than 0.01 atm at 20° C., or a mixture thereof.

In some embodiments one or more reagents may comprise a thermally switchable reagent, a $CO_2$ switchable reagent, or a non-ionic carbon containing compound.

Chilled, wherein cooling may be conducted by, for example, including, but not limited to, ambient source, water bodies, cooling tower, industrial evaporative chiller, evaporative cooling and other chilling or cooling processes known in the art.

For example, the membranes, evaporators, or other separatin mechanisms may include one or more or a combination of the following: membrane, reverse osmosis, hot reverse osmosis, nanofiltration, organic solvent nanofiltration, hot nanofiltration, ultrafiltration, hot ultrafiltration, microfiltration, filtration, distillation, membrane distillation, multi-effect distillation, mechanical vapor compression distillation, binary distillation, azeotrope distillation, hybrid separation devices, flash distillation, multistage flash distillation, extractive distillation, switchable solvent, LCST phase change, UCST phase change, 'salting-out,' or centrifuge, or combinations thereof.

reagentreagent In some embodiments the membrane may have a molecular weight cutoff of greater than about 80 daltons. That is, the membrane allows passage of a substantial or majority amount of components with a molecular weight or hydration radius of less than about 80 daltons while rejecting a substantial or majority amount of components with a molecular weight of greater than about 80 daltons. In the art, another definition of molecular weight cut-off may refer to the lowest molecular weight solute (in daltons) in which 90% of the solute is retained by the membrane, or the molecular weight of the molecule that is 90% retained by the membrane. Membranes with a molecular weight cutoff of less than 1,000 daltons, or less than 10,000 daltons, or less than 50,000 daltons, or less than 100,000 daltons, or less than 200,000 daltons, or less than 500,000 daltons, or less than 1,000,000 daltons may also be useful depending upon the circumstances and components employed Reagents may include, but are not limited to, water, ammonia, ammonium amine, primary amine, secondary amine, tertiary amine, methylamine (MEA), methylethanolamine, aminoethylethanolamine, azine, imine, strong base, hydroxide, sodium hydroxide, potassium hydroxide, sodium oxide, potassium oxide, organic solvent, commercial $CO_2$ capture absorbents, quaternary ammonium compound, Selexol, Rectisol, KS-1, UCARSOL, metal-organic framework, solid adsorbent, high surface area compounds, activated carbon, zeolites, carbon nanotubes, graphene, graphene oxide, amine, amino ethyl ethanol amine, 2-Amino-2-methylpropan-1-ol (AMP), MDEA, MEA, primary amine, secondary amine, or tertiary amine, low molecular weight primary or secondary amine, metal-ammine complex, metal-ammonia complex, metal-ammonium complex, sterically hindered amine, imines, azines, piperazine, amine functionalized polymers, alkali metal, lithium, sodium, potassium, rubidium, caesium, alkaline earth metal, calcium, magnesium, cations, ionic liquid, $CO_2$ switchable solvents, $CO_2$ switchable surfactants carbonate, polymer containing amine functional groups, poler containing $CO_2$ reactive functional groups, enzymes, metal-organic frameworks, glycolamine, diglycolamine, piperazine, diethanolamine, diglycolamine, diisopropanolamine, quaternary ammonia or quaternary ammonium cations, or quaternary ammonium cations embedded in polymer, or mixtures thereof.

The concentration of one or more reagents relative to solvent or relative to one or more other reagents may include, but is not limited to, mass % concentrations of less than any of the following: 0.001%, or 0.1%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 20%, or 30%, or 40%, or 50%, or 60%, or 70%, or 80%, or 90%, or 100%.

Heat sources, may include, but are not limited to, Power Plant (Natural gas, coal, oil, petcoke, biofuel, municipal waste), Waste Water Treatment, Landfill gas, Air, Metal production/refining (such as Iron, Steel, Aluminum, etc.), Glass production, Oil refineries, HVAC, Transportation vehicles (ships, boats, cars, buses, trains, trucks, airplanes), Natural Gas, Biogas, Alcohol fermentation, Volcanic Activity, Decomposing leaves/biomass, Septic tank, Respiration, Manufacturing facilities, Fertilizer production, or Geothermal processes where $CO_2(g)$ releases from a well or wells.

One or more embodiments may be aqueous or non-aqueous. Solvents may include, for example, polar organic solvents, including, but not limited to, ethylene carbonate, propylene carbonate, ethylene glycol, propylene glycol, DMSO, water and acetonitrile or inorganic solvents, such as liquid ammonia or liquid amines and mixtures thereof.

The concentration of one or more reagents may be as a low as 0.000001 M or as great as pure reagent. In molarity terms, the concentration of the one or more reagents may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 10M, or 12M, or 15M, or 18M, or even pure reagent One or more soluble reagents may be preheated or cooled before, during, or after injection into one or more mixing apparatuses.

Mixing apparatuses and methods may include, but are not limited to, one or more or a combination of the following: batch mixers, continuous stirred-tank reactors, CSTRs, distillation column, packed column, electrospray, spray column, countercurrent spray column, and/or other apparatuses and/or methods. The apparatus may be heated using waste heat or other heat source for, including, but not limited to, promoting gas desorption, promoting gas desorption, reducing viscosity and/or increasing the rate of solvent mixing.

Reagents or streams may include, but is not limited to, one or more or a combination of the following: water, polymers, organic solvents, concentrated soluble reagent solutions, water soluble polymers, combinations of soluble reagents, solvent mixtures, emulsions, pure reagent, pure solvent, aqueous solvent, surfactant containing solvents, zwitterions, solids, soluble solids, gases, liquid-solid mixtures, soluble gases, aerosols, suspended solids, solid-gas mixtures, super critical fluids, and fluid mixtures.

Application of Heating or Cooling: Heating or cooling may be incorporated throughout the integrated process.

In water, Polyethylene glycols (PEGs) and polypropylene glycols (PPGs), for example, may have higher Gibbs free energy of mixing and osmotic pressure at lower temperatures.

The concentration of one or more reagents or soluble reagents, including, but not limited to, may contain a mass % concentration of said one or more reagents or soluble reagents as low as 0.0001% to as great as 99.99999%. Mass % concentrations of the one or more reagents or soluble reagents may be practically greater than any of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Mass % solubility of one or more reagents may be practically greater than any of the following: insoluble, 0.001%, 0.01%, 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or 100%, or completely miscible.

System pressures, may include, but are not limited to, greater than one or more or a combination of the following: 0.00001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 40 atm, or 50 atm, or 60 atm, or 75 atm, or 100 atm, or 120 atm, or 150 atm, or 200 atm, or 500 atm, or 1,000 atm, or 10,000 atm, or 100,000 atm, or less than 1,000,000 atm.

Separation devices and mechanisms may include, but are not limited to, one or more or a combination of the following: coalescer, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, hybrid systems, thermally switchable solvent, centrifuge, or filter or combinations thereof.

The power source of one or more pumps may include, but is not limited to, one or more or a combination of the following: electricity, pressure exchanger, turbocharger, hydraulic pressure, heat, pressure retarded osmosis, or forward osmosis.

Following the membrane or filter based separation, energy can be recovered by both or either the permeate and/or the concentrate. These energy recovery devices are known in the art and may include, but are not limited to, pressure exchangers and turbochargers.

=sources may include, but are not limited to, waste heat, power plant waste heat, steam, heat, pump or compressor waste heat, industrial process waste heat, steel waste heat, metal refining and production waste heat, paper mill waste heat, cement production waste heat, calcination waste heat, factory waste heat, petroleum refining waste heat, solar heat, solar pond, air conditioner waste heat, combustion heat, geothermal heat, ocean or water body thermal heat, stored heat, and gas absorption solution heat. Temperatures of heating or cooling for any of the embodiments disclosed include, but are not limited to, less than any of the following: −20° C., or −10° C., or 0° C., or 10° C., or 20° C., or 25° C., or 30° C., or 35° C., or 40° C., or 41.5° C., or 41.5° C., or 41.5° C.-60° C., or 45° C., or 50° C., or 55° C., or 60° C., or 60-100° C., or 110° C., or 150° C., or 1000° C.

Relatively lower molecular weight reagents may be employed if advantageous, including, but not limited to, polyethylene glycols 150-2000, polypropylene glycols 425-4000 and glycol ethers, such as triglyme.

One or more embodiments may be constructed and transported in smaller scale modules or as a unit, such as in shipping containers and transported and used in other locations.

Multicomponent separation devices or multistage separation devices may be employed. Said device or devices may include, but are not limited to, one or more or a combination of the following: binary distillation, azeotrope distillation, membrane distillation, mechanical vapor compression, hybrid systems, flash distillation, multistage flash distillation, multieffect distillation, extractive distillation, switchable solvent, reverse osmosis, nanofiltration, organic solvent nanofiltration, ultrafiltration, and microfiltration. For example, such a hybrid system may involve at least partially recovering the soluble reagent using nanofiltration and then further concentrating the soluble reagent using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other reagent dissolved in solution may be further recovered or concentrated or even removed from the one or more layers or separate solutions that are formed.

The osmotic pressure range of one or more solutions may be as low as 0.001 atm to as great as 1,000,000 atm. The osmotic pressure may be as low as less than any of the following: 0.001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 35 atm, or 40 atm, or 45 atm, or 50 atm, or 55 atm, or 60 atm, or 65 atm, or 70 atm, or 75 atm, or 80 atm, or 85 atm, or 90 atm, or 95 atm, or 100 atm, or 150 atm, or 200 atm, or 500 atm, or 1,000 atm, or 10,000 atm, or 100,000 atm, or less than 1,000,000 atm, or pure solvent.

Solid precipitation, dissolution, or liquid freezing may occur, intentionally or unintentionally, within one or more embodiments, including, but not limited to, due to changes in concentrations, concentrations, dissolved gas concentrations, pressures, temperature, other system conditions, or combinations thereof.

One or more CST reagents may comprise random or sequential copolymers of low molecular weight diols such as 1,2 propanediol, 1,2 ethanediol, and/or 1,3 propanediol.

For example, thermosensitive poly(N isopropylacrylamide) (PNIPAM) hydrogels can absorb water below the volume phase transition temperature (VPTT, ~32C) and expel water at temperatures above the VPTT. Other examples of these hydrogel reagents include polyacrylamide (PAM), PNIPAM, and poly(Nisopropylacrylamide-co-acrylic acid) and sodium (P(NIPAM-co-SA)).

Other CST reagents may include, but are not limited to, Methylcellulose and triethylamine.

Reagents that change solubility or other recovery method due to pressure or a combination of pressure and temperature may also be useful. These may include, but are not limited to, PSA, polyacrylamide (PAM), PNIPAM, and poly(Nisopropylacrylamide-co-acrylic acid sodium (P(NIPAM-co-SA)) hydrogels.

Changes in solution kinetic energy can act as a stimulus to change or promote a change in the solubility or other form of recovery of an added reagent. Kinetic energy can be of various forms, including, but not limited to, mixing and sonication. Ultrasonic sonication may increase or decrease solubility or phase transition.

reagentreagentreagentreagentreagentreagentreagentreagentreagentreagentreag entreagentreagentreagentreagent Examples of waste heat sources may include, but are not limited to, the following: Power Plant (Natural gas, coal, oil, petcoke, biofuel, municipal waste), Condensing water, Flue Gas, Steam, Oil refineries, Metal production/refining (Iron, Steel, Aluminum, etc.), Glass production, Manufacturing facilities, Fertilizer production, Transportation vehicles (ships, boats, cars, buses, trains, trucks, airplanes), Waste Water Treatment, Solar thermal, Solar pond, Solar photovoltaic, Geothermal (Deep Well), Biofuel powered vehicles, Biofuel/Biomass/Municipal Waste Power Plants, Desulfurization, Alcohol production, hydrogen sulfide treatment, acid (e.g. sulfuric) production, Renewable fertilizer production, Ocean Thermal, Space heating, Grey water, Diurnal temperature variation, Geothermal (Shallow well/loop), or respiration.

Heat or cooling may be applied at any point of one or more embodiments

Heat exchangers and recovery devices may be employed where advantageous.

Mixing devices, may include, but are not limited to, on or more or a combination of the following:
  CSTR, Batch, Semibatch, or flash devices
  Turbine: Rushton Turbine, or Smith Turbine, or Helical Turbine, or Bakker Turbine
  Low shear mixer, High shear mixer, Dynamic mixer, Inline mixer, Static mixer, Turbulent flow mixer, No mixer, Close-clearance mixer, High shear disperser, Static mixers, Liquid whistles, Mix-Itometer, Impeller mixer, Liquid-Liquid mixing, Liquid-Solid mixing, Liquid-Gas mixing, Liquid-Gas-Solid mixing, Multiphase mixing, Radial Flow, Axial Flow, Flat or curved blade geometry Any portion of the process may be heated or cooled. Heat sources may include, but are not limited to, waste heat, power plant waste heat, steam, heat, pump or compressor waste heat, industrial process waste heat, steel waste heat, metal refining and production waste heat, paper mill waste heat, factory waste heat, petroleum refining waste heat, solar heat, solar pond, air conditioner waste heat, combustion heat, geothermal heat, ocean or water body thermal heat, stored heat, and $CO_2(g)$ absorption solution heat.

One or more reagents or compositions may comprise: Aqueous solution, Water soluble polymer, Soluble polymer, Glycol Polyethylene Glycol, Polypropylene Glycol Ethers, Glycol Ethers, Glycol ether esters, Triglyme. Polyethylene Glycols of multiple geometries, Methoxypolyethylene Glycol, Polyvinyl Alcohol Polyvinylpyrrolidone, Polyacrylic Acid, Diol polymers, 1,2 propanediol, 1,2 ethanediol, 1,3 propanediol, Cellulose Ethers, Methylcellulose, Cellosize, Carboxymethylcellulose, Hydroxyethylcellulose, Sugar Alcohol, Sugars, Alcohols Ketones, Aldehydes, Esters, Organosilicon compounds, Halogenated solvents CST Reagents may include, but are not limited to, one or more or a combination of the following:
  Poly(ethylene glycol) (PEG) and Poly(ethylene oxide) (PEO)
    Heterobifunctional PEGs: Azide (–N3) Functionalized, Biotin Functionalized, Maleimide Functionalized, NHS Ester Functionalized, Thiol Functionalized, COOH Functionalized, Amine Functionalized, Hydroxyl Functionalized, Acrylate/Methacrylate Functionalized
    Homobifunctional PEGs
    Monofunctional PEGs
    PEG Dendrimers and Multi-arm PEGs: PEG-core Dendrimers, Multi-arm PEGs, Multi-arm PEG Block Copolymers
    PEG Copolymers: PEG Diblock Copolymers, PEG/PPG Triblock Copolymers, Biodegradable PEG Triblock Copolymers, Multi-arm PEG Block Copolymers, Random Copolymers
    PEG and Oligo Ethylene Glycol: Examples: PEG 200, PEG 300, PEG 400, PEG 600, PEG 1000, PEG 1450, PEG 1500, PEG 2050, PEG 3350, PEG 8000, PEG 10000
    Poly(ethylene oxide)
    High Oligomer Purity PEG
    Polyethylene glycol-polyvinyl alcohol (PEG-PVA)
  Polypropylene Glycol (PPG)
    Examples: PPG 425-4000
  Poly(N-isopropylacrylamide) (PNIPAM) and Polyacrylamide (PAM)
  PNIPAM Copolymers
    Poly(N-isopropylacrylamide) (PNIPAM)
    Polyacrylamide (PAM) and Copolymers
  Poly(2-oxazoline) and Polyethylenimine (PEI)
  Poly(acrylic acid), Polymethacrylate and Other Acrylic Polymers
  Poly(vinyl alcohol) (PVA) and Copolymers
    Poly(vinyl alcohol) (PVA)
    Poly(vinyl alcohol-co-ethylene) ethylene
  Poly(vinylpyrrolidone) (PVP) and Copolymers
  Polyelectrolytes, may include, but not limited to, one or more or a combination of the following: Poly(styrenesulfonate) (PSS) and Copolymers, Polyacrylamide (PAM)-based Polyelectrolytes, Poly(acrylic acid) (PAA), Sodium Salt, Poly(allylamine hydrochloride), Poly(diallyldimethylammonium chloride) Solution, Poly(vinyl acid)
  Cucurbit[n]uril Hydrate
  Quaternary ammonium polymers
  Carboxypolymethylene (carbomer)
  Polyvinyl methyl ether-maleic anhydride (PVM-MA)
  Carboxypolymethylene (carboxyvinyl polymer)
  Polyvinyl methyl ether-maleic anhydride
  Carboxymethylcellulose
  Hydroxyethylcellulose and derivatives
  Methylcellulose and derivatives
  Other cellulose ethers, may include, but are not limited to: Ethylcellulose or Hydroxypropylcellulose
  Sodium carboxymethylcellulose
  Hydroxyethylcellulose and ethyl hydroxyethylcellulose
  Natural water-soluble polymers: Starches, Sugars, Polysaccharides, Agar, Alginates, Carrageenan, Furcellaran, Casein and caseinates, Gelatin, Guar gum and derivatives, Gum arabic, Locust bean gum, Pectin, *Cassia* gum, Fenugreek gum, *Psyllium* seed gum, Tamarind gum, Tara gum, Gum ghatti, Gum karaya, Gum tragacanth, Xanthan gum, Curdlan, Diutan gum, Gellan gum, Pullulan, Scleroglucan (*sclerotium* gum)

PEGs are available with different geometries, including, but not limited to, the following:
  Branched PEGs: have three to ten PEG chains emanating from a central core group.
  Star PEGs: have 10 to 100 PEG chains emanating from a central core group.
  Comb PEGs: have multiple PEG chains normally grafted onto a polymer backbone.

Reagent properties for embodiments, may include, but not limited to, one or more or a combination of the following:
  Soluble reagent, Soluble organic solvent, Soluble polymer, Water soluble reagent, Soluble reagent separable with a membrane, Water soluble reagent separable with a membrane, Water soluble organic solvent, Water soluble polymer, Organic solvent separable with a membrane, Polymer separable with a membrane, Soluble organic solvent separable with a membrane, Soluble polymer separable with a membrane, Large molecular weight water soluble organic solvent, Small molecular weight water soluble polymer, Non-volatile organic solvent, Low volatility organic solvent, High volatility organic solvent that is separable with a membrane, Organic solvent with a molecular weight, including, but not limited to, greater than 100 da or any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da, Polymer with a molecular weight, including, but not limited to, greater than 100 da or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da, Reagent with a molecular weight, including, but not limited to, greater than 100 da or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da, Organic solvent with a hydration radius, including, but not limited to, greater than 100 da, or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da Polymer with a hydration radius, including, but not limited to, greater than 100 da, or or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da Reagent with a hydration radius, including, but not limited to, greater than 100 da, or or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da The solubility of one or more reagents may be less than, equal to, or greater than including, but not limited to, one or more of the following: 0.00001 g per kg solvent, 0.01 g per kg solvent, 0.1 g per kg solvent, 0.5 g per kg solvent, 1 g per kg solvent, 1.5 g per kg of solvent, 2 g per kg of solvent, 3 g per kg of solvent, 4 g per kg of solvent, 5 g per kg of solvent, 6 g per kg of solvent, 7 g per kg of solvent, 8 g per kg of solvent, 9 g per kg of solvent, 10 g per kg of solvent, 11 g per kg of solvent, 12 g per kg of solvent, 13 g per kg of solvent, 14 g per kg of solvent, 15 g per kg of solvent, 16 g per kg of solvent, 17 g per kg of solvent, 18 g per kg of solvent, 19 g per kg of solvent, 20 g per kg of solvent, 21 g per kg of solvent, 22 g per kg of solvent, 23 g per kg of solvent, 24 g per kg of solvent, 25 g per kg of solvent, 26 g per kg of solvent, 27 g per kg of solvent, 28 g per kg of solvent, 29 g per kg of solvent, 30 g per kg of solvent, 40 g per kg of solvent, 50 g per kg of solvent, 60 g per kg of solvent, 70 g per kg of solvent, 80 g per kg of solvent, 90 g per kg of solvent, 100 g per kg of solvent, 110 g per kg of solvent, 150 g per kg of solvent, 200 g per kg of solvent, 300 g per kg of solvent, 400 g per kg of solvent, 500 g per kg of solvent, 750 g per kg of solvent, 1000 g per kg of solvent, 1500 g per kg of solvent, 2000 g per kg of solvent Additional applications for the embodiments described herein, may include, but are not limited to, one or more or a combination of the following: acid gas removal, hydrocarbon-hydrocarbon separation, hydrocarbon-inert gas separation, acid gas processing, natural gas processing, gas processing, syngas purification, syngas acid gas removal, $CO_2$ removal from steam methane reforming gases, $CO_2$ removal from steam biomass reforming gases biogas upgrading, $CO_2$ removal from hydrocarbon reforming gases, biogas upgrading, gas treatment, $CO_2$ capture, post-combustion capture, pre-combustion capture, landfill gas, flue gas, air separation, gas concentrating, gas removal, aerosol removal, aerosol separation, enhanced oil recovery with or without supercritical fluids, enhanced oil recovery gas processing, enhanced oil recovery gas processing for $CO_2$ reinjection, separation of Fischer-Tropsch gases or liquids.

Reagents, compounds, ionic compounds, salts, solvents, or reagents may include, but are not limited to, one or more or a combination of the following: H−, H+, D−, D+, H2−, H2+, H3+, He−, He+, He, H+, He2+, Li−, Li+, Na−, Na+, K−, K+, Cu−, Cu+, LiH−, LiH+, NaH−, NaH+, KH+, Be−, Be+, Mg−, Mg+, Ca−, Ca+, Zn−, Zn+, BeH−, BeH+, MgH−, MgH+, CaH+, ZnH+, BeH2+, B−, B+, Al−, Al+, Sc+, Ga−, Ga+, BH−, BH+, AlH−, AlH+, ScH+, GaH+, BH2−, BH2+, AlH2−, o2AlH2+, BH3−, BH3+, AlH3−, AlH3+, BH4−, AlH4−, C−, C+, Si−, Si+, Ti−, Ti+, Ge−, Ge+, CH−, CH+, SiH−, SiH+, GeH+, CH2−, CH2+, SiH2−, SiH2+, GeH2−, CH3−, CH3+, SiH3−, SiH3+, GeH3+, CH4−, CH4+, SiH4+, N−, N+, P−, P+, V+, As−, As+, NH−, NH+, PH−, PH+, AsH+, NH2−, NH2+, PH2−, PH2+, AsH2+, NH3−, NH3+, PH3+, AsH3+, NH4+, PH4+, O−, O+, S−, S+, Se−, Se+, OH−, OH+, HS−, HS+, CrH+, HSe−, HSe+, H2O−, H2O+, H2S−, H2S+, H2Se+, H3O+, H3S+, H3Se+, F−, F+, Cl−, Cl+, Br−, Br+, I−, I+, HF−, HF+, HCl−, HCl+, HBr−, HBr+, H2F+, H2Cl+, H2Br+, Ne−, Ne+, Ar−, Ar+, Kr+, NeH+, ArH+, KrH+, XeH+, Li2−, Li2+, NaLi−, NaLi+, Na2−, Na2+, NaK+, Be2−, Be2+, Mg2−, Mg2+, B2−, B2+, Al2−, Al2+, BC−, BC+, C2−, C2+, SiC−, SiC+, Si2−, Si2+, C2H−, C2H+, C2H2+, H2CC−, HCCH−, C2H3−, C2H3+, C2H4−, C2H4+, C2H5−, C2H5+, C2H6+, C2H7+, LiN+, BeN−, BeN+, BN−, AlN−, AlN+, BN+, CN−, CN+, CP−, CP+, SiN−, SiN+, SiP−, SiP+, N2−, N2+, PN−, PN+, P2−, P2+, HCN−, HCN+, NNH+, HPO+, CNH2+, H2CN+, HCNH+, N2H2+, CH2NH2+, N2H4+, CH3NH2+, N2H5+, CH3NH3+, CH3PH3+, LiO−, LiO+, LiS+, NaO−, NaO+, KO+, BeO−, BeO+, MgO−, MgO+, MgS−, MgS+, BeS−, BeS+, BO−, AlO−, AlO+, BS−, BS+, AlS−, AlS+, BO+, CO−, CO+, CS−, CS+, SiO−, SiO+, SiS−, SiS+, CSe−, CSe+, GeO+, NO−, NO+, NS−, NS+, PO−, PO+, PS−, PS+, O2−, O2+, SO−, SO+, S2−, S2+, SeO−, SeO+, SeS−, SeS+, Se2−, Se2+, COH+, HCO−, HCO+, HCS−, HCS+, HNO−, HNO+, NOH+, HNS−, HO2−, HO2+, KOH2+, H2CO−, H2CO+, H2CS−, H2CS+, H2O2+, H2S2+, CH2OH+, CH3O−, CH3O+, H2CSH+, H3O2+, CH3OH−, CH3OH+, CH3SH+, CH3OH2+, CH3SH2+, H5O2+, LiCl−, LiCl+, NaF−, NaF+, NaCl−, NaCl+, LiBr−, LiBr+, NaBr−, NaBr+, LiF−, LiF+, BeF−, BeF+, MgF−, MgF+, MgCl−, MgCl+, ZnF−, ZnF+, BeCl−, BeCl+, BF−, BF+, AlF−, AlF+, BCl−, BCl+, AlCl−, AlCl+, GaF+, GaCl+, CF−, CF+, CCl−, CCl+, SiF−, SiF+, SiCl−, SiCl+, GeF+, NF−, NF+, NCl−, NCl+, PF−, PF+, PCl−, PCl+, FO−, FO+, ClO−, ClO+, SF−, SF+, SCl−, SCl+, BrO−, F2−, F2+, ClF, ClF+, Cl2−, Cl2+, BrF−, BrF+, BrCl−, BrCl+, Br2−, Br2+, I2+, HOBr+, F2H+, FHF−, Cl2H+, CH3ClH+, LiNe+, Ne2+, Ar2+, Li3+, C3+, C3H3−, C3H3+, C3H3+, C3H5+, C3H7+, C3H7+, C3H7+, N3−, N3+, CH3CN−, CH3CN+, HNCNH2+, NCNH3+, C2H5NH+, C2H6N+, (CH3)2NH2+, CH3CH2NH3+, Li2O+, CNO−, NCO−, SCN−, BO2−, BO2+, N2O−, N2O+, CO2−, CO2+, OCS+, CS2−, CS2+, NO2−, NO2+, PO2−, PO2+, O3−, O3+, SO2−, SO2+, S3−, S3+, SeO2+, HCO2−, HNNO+, NNOH+, HOCO+, HNO2+, O3H+, SO2H+, CH2CO+, H2COO+, CH3CO−, CH3CO+, CH3OO−, CH3OO+, H2CONH2+, C2H4OH+, C2H4OH+, CH3CHOH+, FCO+, CF2−, CF2+, SiF2+, CCl2−, CCl2+, ClOO+, OClO−, OClO+, NF2+, SF2−, SF2+, F3−, Cl3−, HCCF+, HFCO+, CH2CHF+, C4+, C4H2+, C2N2+, HCCCN+, C3H3N+, CH3NHN2+, CH6N3+, (CH3)3NH+, C3H7NH3+, CO3−, NO3−, NO3+, SO3−, SO3+, HCO3−, C2H2O2+, H2NO3+, CH3COO−, H3CO3+, NH2CONH2+, NH2COOH2+, NH3COOH+, CH5N2O+, H2NCOHNH2+, CH3COCH3−, CH3COHCH3+, C2Cl2+, BF3−, BF3+, ClO3−, CF3−, CF3+, SiF3+, CCl3−, CCl3+, SiCl3+, NH−, NF3+, NF3H+, AsF3H+, CH2ClCH2OH2+, C5H5−, C3H3N2−, C4H4N−, C4H6N+, C4H6N+, C4H6N+, NC4H12+, C3O2+, PO4−−−, SO4−, HSO4−, C4H4O+, C4H10O+, ClO4−, BF4−, CCl4+, C2HF3+, C6H5−, C6H6+, C6H7+, C5H6N+, C2O4−−, CF3CN+, C2F4+, SiF5−, SF5+, C7H7+, CF3COO−, PF6−, C6N4−, H, H, D, D, H2, H2, H3, He, He, He, H, He2, Li, Li, Na, Na, K, K, Cu, Cu, LiH, Li, NaH, NaH, KH, Be, Be, Mg, Mg, Ca, Ca, Zn, Zn, BeH, BeH, MgH, MgH, CaH, ZnH, BeH2, B, B, Al, Al, Sc, Ga, Ga, BH, BH, AlH, AlH, ScH, GaH, BH2, BH2, AlH2, o2AlH2, BH3, BH3, AlH3, AlH3, BH4, AlH4, C, C, Si, Si, Ti, Ti, Ge, Ge, CH, CH, SiH, SiH, GeH, CH2, CH2, SiH2, SiH2, GeH2, CH3, CH3, SiH3, SiH3, GeH3, CH4, CH4, SiH4, N, N, P, P, V, As, As, NH, NH, PH, PH, AsH, NH2, NH2, PH2, PH2, AsH2+, NH3, NH3, PH3, AsH3, NH4, PH4, O, O, S, S, Se, Se, OH, OH, HS, HS, CrH, HSe, HSe, H2O, H2O, H2S, H2S, H2Se, H3O, H3 S, H3 Se, F, F, Cl, Cl, Br, Br, I, I, HF, HF, HCl, HCl, HBr, HBr, H2F, H2Cl, H2Br, Ne, Ne, Ar, Ar, Kr, NeH, ArH, KrH, XeH, Li2, Li2, NaLi, NaLi, Na2, Na2, NaK, Be2, Be2, Mg2, Mg2, B2, B2, Al2, Al2, BC, BC, C2, C2, SiC, SiC, Si2, Si2, C2H, C2H, C2H2, H2CC, HCCH, C2H3, C2H3, C2H4, C2H4, C2H5, C2H5, C2H6, C2H7, LiN, BeN, BeN, BN, AN, AN, BN, CN, CN, CP, CP, SiN, SiN, SiP, SiP, N2, N2, PN, PN, P2, P2, HC, HCN, NNH, HPO, CNH2, H2CN, HCNH, N2H2, CH2NH2, N2H4, CH3NH2, N2H5, CH3NH3, CH3PH3, LiO, LiO, LiS, NaO, NaO, KO, BeO, BeO, MgO, MgO, MgS, MgS, BeS, BeS, BO, AlO, AlO, BS, BS, AlS, AlS, BO, CO, CO, CS, CS, SiO, SiO, SiS, SiS, CSe, CSe, GeO, NO, NO, NS, NS, PO, PO, PS, PS, O2, O2, SO, SO, S2, S2, SeO, SeO, SeS, SeS, Se2, Se2, COH, HCO, HCO, HCS, HCS, HNO, HNO, NOH, HNS, HO2, HO2, KOH2, H2CO, H2CO, H2CS, H2CS, H2O2, H2S2, CH2OH, CH3O, CH3O, H2CSH, H3O2, CH3OH, CH3OH, CH3 SH, CH3OH2, CH3SH2, H5O2, LiCl, LiCl, NaF, NaF, NaCl, NaCl, LiBr, LiBr, NaBr, NaBr, LiF, LiF, BeF, BeF, MgF, MgF, MgCl, MgCl, ZnF, ZnF, BeCl, BeCl, BF, BF, AlF, AlF, BCl, BCl, AlCl, AlCl, GaF, GaCl, CF, CF, CCl, CCl, SiF, SiF, SiCl, SiCl, GeF, NF, NF, NCl, NCl, PF, P, PCl, PC, FO, FO, ClO, ClO, SF, SF, SCl, SCl, BrO, F2, F2, ClF, ClF, Cl2, Cl2, BrF, BrF, BrCl, BrCl, Br2, Br2, I2, HOBr, F2H, FHF−, Cl2H, CH3ClH, LiNe, Ne2, Ar2, Li3, C3, C3H3, C3H3, C3H3, C3H5, C3H7, C3H7, C3H7, N3, N3, CH3CN, CH3CN, HNCNH2, NCNH3, C2H5NH, C2H6N, (CH3)2NH2, CH3CH2NH3, Li2O, CNO, NCO, SCN, BO2, BO2, N2O, N2O, CO2, CO2, OCS, CS2, CS2, NO2, NO2, PO2, PO2, O3, O3, SO2, SO2, S3, S3, SeO2, HCO2, HNNO, NNOH, HOCO, HNO2, O3H, SO2H, CH2CO, H2COO, CH3CO, CH3CO, CH3OO, CH3OO, H2CONH2, C2H4OH, C2H4OH, CH3CHOH, FCO, CF2, CF2, SiF2, CCl2, CCl2, ClOO, OClO, OClO, NF2, SF2, SF2, F3, Cl3, HCCF, HFCO, CH2CHF, C4, C4H2, C2N2, HCCCN, C3H3N, CH3NHN2, CH6N3, (CH3)3NH, C3H7NH3, CO3, NO3, NO3, SO3, SO3, HCO3, C2H2O2, H2NO3, CH3COO, H3CO3, NH2CONH2, NH2COOH2, NH3COOH, CH5N2O, H2NCOHNH2, CH3COCH3, CH3COHCH3, C2Cl2, BF3, BF3, ClO3, CF3, CF3, SiF3, CCl3, CCl3, SiCl3, NF3, NF3, NF3H, AsF3H, CH2ClCH2OH2, C5H5, C3H3N2, C4H4N, C4H6N, C4H6N, C4H6N, NC4H12, C3O2, PO4, SO4, HSO4, C4H4O, C4H10O, ClO4, BF4, CCl4, C2HF3, C6H5, C6H6, C6H7, C5H6N, C2O4, CF3CN, C2F4, SiF5, SF5, C7H7, CF3COO, PF6, C6N4, ionic liquids Cloud Point Temperature may be equivalents to CST, or LCST, or UCST, or a combination thereof Cloud Point Temperatures heating or LCST temperature or combination thereof may include, but are not limited to, equal to, greater than, or less than one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Cloud Point Temperatures cooling or UCST temperature or combination thereof may include, but are not limited to, equal to, greater than, or less than one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Absorption unit operations may include, but are not limited to, one or more or a combination of the following: absorption column, column, contactor, gas-liquid contactor, liquid-liquid contactor, liquid solid contactor, membrane contactor, gas membrane contactor, packed column, membrane column, plated column, multistage column, solid handling column, liquid handling column, multiphase column, rotating absorption unit, kinetic motion absorption unit, stripping column, mixing vessel, continuously stirred reactor, pressurization vessel, depressurization vessel, multistage vessel, batch setup, mixing of two or more phases, formation of more phases from less phases, formation of less phases from relatively more phases, heating vessel, cooling vessel, membrane absorption, membrane selective absorption Evaporator or desorption unit operations may include, but are not limited to, one or more or a combination of the following: column, contactor, gas-liquid contactor, membrane column, membrane contactor, gas membrane contactor, packed column, plated column, multistage column, multistage vessel, batch setup, liquid-liquid contactor, liquid solid contactor, solid handling column, liquid handling column, multiphase column, rotating desorption unit, kinetic motion desorption unit, stripping column, mixing vessel, continuously stirred reactor, reboiler, depressurization vessel, pressurization vessel, flash vessel, flash unit, multistage flash unit, mixing of two or more phases, formation of more phases from less phases, formation of less phases from relatively more phases, heating vessel, cooling vessel, carrier gas stripping, steam stripping, air stripping, recirculating gas stripping, stripping using one or more gases being desorbed, ammonia stripping, membrane stripping, membrane distillation, membrane selective absorption One or more reagents may comprise hydrocarbons. Hydrocarbons, may include, but are not limited to, one or more or a combination of the following: compound containing carbon, compound containing hydrogen, compound containing oxygen, compound containing nitrogen, compound containing sulfur, saturated hydrocarbon, unsaturated hydrocarbon, cyclic hydrocarbon, cyclo hydrocarbon, aromatic hydrocarbon, alkane, alkene, alkyne, cycloalkane, alkadiene, polymers, halogenated hydrocarbons, hydrocarbons with one or more functional groups, one or more hydrocarbons in crude oil, one or more different hydrocarbons in crude oil, one or more hydrocarbons in naphtha, one or more hydrocarbons in gasoline, one or more hydrocarbons in diesel, one or more hydrocarbons in heavy oil, one or more hydrocarbons in natural gas, natural gas liquids, one or more hydrocarbons in kerosene, organic solvents, light hydrocarbons, heavy hydrocarbons, water insoluble hydrocarbons, partially water soluble hydrocarbons, water soluble hydrocarbons, low toxicity hydrocarbons, medium toxicity hydrocarbons, high toxicity hydrocarbons, methane, Ethane, Ethene (ethylene), Ethyne (acetylene), Propane, Propene (propylene), Propyne (methylacetylene), Cyclopropane, Propadiene, Butane, Butene (butylene), Butyne, Cyclobutane, Butadiene, Pentane, Pentene, Pentyne, Cyclopentane, Pentadiene, (piperylene), Hexane, Hexene, Hexyne, Cyclohexane, Hexadiene, Heptane, Heptene, Heptyne, Cycloheptane, Heptadiene, Octane, Octene, Octyne, Cyclooctane, Octadiene, hydrocarbon solution, hydrocarbon containing mixture Superior properties for desorption or evaporation may include, but are not limited to, one or more or a combination of the following: higher equilibrium partial pressure of one or more gases or different gases, lower equilibrium partial pressure of one or more gases or different gases, faster desorption kinetics, greater desorption of a desired gas relative to a less desired gas, low viscosity, low volatility of other solvent constituents, low relative volatility of other solvent constituents, no degradation, no corrosion, minimal degradation, minimal corrosion, compatibility with gas impurities, minimal impurities in desorbed gases Salts may include, but are not limited to, one or more or a combination of the following: ionic compounds, ionic liquids, anions, cations, complex salts, complex ions, compounds with properties similar to salts, salts with properties dissimilar to salts, alkali, alkaline-earth, transition metal, metal, semiconductor, metalloids, ammonia, ammonium, amine, basic compound, halogenated compound, sulfate, nitrate, carbonate, hydrogen carbonate, carbamate, nitrite, sulfite, carbon compound, sulfur compound, electrolyte, nitrogen compound, phosphorous compound, phosphorous containing anion, halogen containing anion Some reagents may include, but are not limited to, Carbon Dioxide (gas), Carbon Dioxide (liquid), Carbon Dioxide (aqueous), Carbon Dioxide (solid), Carbon Dioxide (dissolved), Carbon Dioxide (one or more ionic species), Carbon Dioxide (one or more liquid phase species), Carbon Dioxide (solid mixture), Carbon Dioxide (supercritical), Carbon Dioxide (Hydrate), Carbon Dioxide (triple point), Acidic Reagent (gas), Acidic Reagent (liquid), Acid Reagent (aqueous), Acidic Reagent Gas (Hydrate) Acidic Reagent (solid), Acidic Reagent (dissolved), Acidic Reagent (one or more ionic species), Acidic Reagent (one or more liquid phase species), Acidic Reagent (solid mixture), Acid Reagent (supercritical), Acidic Reagent (triple point), Basic Compound (gas), Basic Compound (liquid), Basic Compound (solid), Basic Compound (dissolved), Basic Compound (one or more ionic species), Basic Compound (one or more liquid phase specific), Basic Compound (solid mixture), Basic Compound (supercritical), Basic Compound (hydrate), Basic Compound (triple point), Hydrocarbon (gas), Hydrocarbon (liquid), Hydrocarbon (aqueous), Hydrocarbon (dissolved), Hydrocarbon (non-aqueous), Hydrocarbon (one or more ionic species), Hydrocarbon (one or more liquid phase species), Hydrocarbon (solid), Hydrocarbon (solid mixture), Hydrocarbon (supercritical), Hydrocarbon (Hydrate), Hydrocarbon (triple point).

Viscosity is greater than, equal to, or less than 100,000 cP, or 10,000 cP, or 1,000 cP, or 500 cP, or 100 cP, or 50 cP, or 40 cP, or 30 cP, or 20 cP, or 10 cP, or 9 cP, or 8 cP, or 7 cP, or 6 cP, or 5 cP, or 4 cP, or 3 cP, or 2 cP, or 1 cP or 0.5 cP, or combination thereof Cooling Inputs or Sources may include, but are not limited to, one or more or a combination of the following: thermocline water body, thermocline liquid body, water body, cold liquid body, evaporative cooling, heat pump cooling, air cooling, heat exchange with enthalpy source, cyrogenic cooling, LNG gasification, pressure reduction, cold surface, radiative cooling, endothothermic phase change Heating Inputs or Sources may include, but are not limited to, one or more or a combination of the following: Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Temperatures: temperatures of operation or UCST or LCST or a combination thereof may be greater than, less than, or equal to or a combination thereof include, but are not limited to, one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Mass percentages of one or more components comprise greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Relative mass distribution of one or more liquid phases may include, but is not limited to, greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

A 'substantial' concentration of one or more components (For Example: reagents or reagents or solvents or antisolvents) may include, but is not limited to, mass percentages of one or more components comprising greater than or equal to one or more or a combination of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

pH may be greater than or equal to or less than one or more or a combination of the following: 1, or 2, or 3, or 4, or 5, or 6, or 7, or 8, or 9, or 10, or 11, or 12, or 13, or 14

Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems One or more reagents may comprise water, organic solvent, siloxanes, ionic liquids, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than than 0.01 atm at 20° C., or a mixture thereof water, ammonia, ammonium, amine, azine, amino ethyl ethanol amine, 2-amino-2-methylpropan-1-ol (AMP), MDEA, MEA, primary amine, secondary amine, tertiary amine, low molecular weight primary or secondary amine, metal-ammine complex, metal-ammonia complex, metal-ammonium complex, sterically hindered amine, imines, azines, piperazine, alkali metal, lithium, sodium, potassium, rubidium, caesium, alkaline earth metal, calcium, magnesium, ionic liquid, thermally switchable compounds, CO2 switchable compounds, enzymes, metal-organic frameworks, quaternary ammonium, quaternary ammonium cations, quaternary ammonium cations embedded in polymer, or mixtures thereof.

Soluble reagent may comprise, for example, water, organic solvent, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, or mixtures thereof.

Useful membranes for at least partial recovery may include, for example, any membrane capable of at least partially rejecting said reagent while allowing substantial passage of CO2 containing solution or gas containing solution or vice versa. Such membranes may comprise a membrane selected from the group consisting of Reverse Osmosis, Nanofiltration, Organic Solvent Nanofiltration, Ultrafiltration, Microfiltration, and Filtration membranes. In some embodiments the membrane may have a molecular weight cutoff of greater than about 80 daltons. That is, the membrane allows passage of a substantial or majority amount of components with a molecular weight of less than about 80 daltons while rejecting a substantial or majority amount of components with a molecular weight of greater than about 80 daltons up to about 600 daltons. In the art, another definition of molecular weight cut-off may refer to the lowest molecular weight solute (in daltons) in which 90% of the solute is retained by the membrane, or the molecular weight of the molecule that is 90% retained by the membrane. Membranes with a molecular weight cutoff of less than 1,000 daltons, or less than 10,000 daltons, or less than 50,000 daltons, or less than 100,000 daltons, or less than 200,000 daltons, or less than 500,000 daltons, or less than 1,000,000 daltons may also be useful depending upon the circumstances and components employed.

The membrane may be comprised of any useful material and such useful material may vary depending upon the components to be separated, their molecular weight, viscosity, and/or other properties. Useful membranes may include, for example, membranes comprised of a material selected from a thin film composite; a polyamide; a cellulose acetate; a ceramic membrane; other materials and combinations thereof.

One or more reagents may comprise, for example, one or more or a combination of the following: volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than 0.01 atm at 20° C., or a mixture thereof.

One or more embodiments may employ a membrane with a molecular weight cut-off, which may include but not limited to, less than any of the following: 250 da, or 200 da, or 150 da, or 125 da, or 100 da, or 95 da, or 90 da, or 85 da, or 80 da, or 75 da Multicomponent separation devices or multistage separation devices may be employed. Said device or devices may include, but are not limited to, one or more or a combination of the following: binary distillation, azeotrope distillation, membrane distillation, mechanical vapor compression, hybrid systems, flash distillation, multistage flash distillation, multi effect distillation, extractive distillation, switchable solvent, reverse osmosis, nanofiltration, organic solvent nanofiltration, ultrafiltration, and microfiltration. For example, such a hybrid system may involve at least partially recovering the soluble reagent using nanofiltration and then further concentrating the soluble reagent using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other reagent dissolved in solution may be further recovered or concentrated or even removed from the one or more layers or separate solutions that are formed.

Applied Pressure or Osmotic Pressure of Solution: The osmotic pressure range of a solution may be as low as 0.001 atm to as great as 1,000,000 atm. The osmotic pressure may be as low as less than any of the following: 0.001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 35 atm, or 40 atm, or 45 atm, or 50 atm, or 55 atm, or 60 atm, or 65 atm, or 70 atm, or 75 atm, or 80 atm, or 85 atm, or 90 atm, or 95 atm, or 100 atm, or 150 atm, or 200 atm, or 500 atm, or 1,000 atm, or 10,000 atm, or 100,000 atm, or less than 1,000,000 atm, or pure solvent.

Using waste heat or chilling to accelerate or facilitate one or more steps and other hybrid waste heat and membrane recovery process combinations may be employed Solid precipitation and dissolution may occur in one or more embodiments, which may include as a results of including, but not limited to, due to changes in concentrations, concentrations, dissolved gas concentrations, pressures, temperature, other system conditions, or combinations thereof.

One or more separation devices or techniques or methods, may include, but not limited to, one or more or a combination of the following: filtration, centrifuge, decanting, distillation, magnetism, and/or membrane based process, such as reverse osmosis, osmotically assisted reverse osmosis, disc tube reverse osmosis (DTRO), high pressure reverse osmosis, forward osmosis, electrodialysis, nanofiltration, organic solvent nanofiltration ultrafiltration, membrane distillation, integrated electric-field nanofiltration, hot nanofiltration, or hot ultrafiltration.

LISTING OF REPRESENTATIVE EMBODIMENTS REPRESENTATIVE CLOUD POINT EMBODIMENTS

1. A composition comprising:
water;
a CST reagent; and
a low solubility reagent;
wherein said low solubility reagent has limited solubility in a solution consisting of water and CST reagent below a cloud point temperature and has miscible solubility in a solution consisting of water and CST reagent above a cloud point temperature.
2. The composition of embodiment 1 wherein the cloud point temperature of the composition changes based on the concentration of CST reagent in the composition.
3. The composition of embodiment 1 wherein the cloud point temperature of the composition decreases with increasing concentration of CST reagent.
4. The composition of embodiment 1 wherein the cloud point temperature of the composition increases with decreasing concentration of CST reagent.
5. The composition of embodiment 1 further comprising one or more salts.
6. The composition of embodiment 5 wherein the cloud point temperature of the composition increases with increasing concentration of one or more salts.
7. The composition of embodiment 5 wherein the cloud point temperature of the composition decreases with decreasing concentration of one or more salts.
8. The composition of embodiment 1 wherein the CST reagent comprises a reagent which exhibits decreasing osmotic pressure with increasing temperature in a solution consisting of water and said CST reagent.
9. The composition of embodiment 1 wherein the CST reagent comprises a reagent which possesses greater affinity for said low solubility reagent relative to water with increasing temperature.
10. The composition of embodiment 1 wherein said low solubility reagent comprises a reagent with limited solubility in water alone
11. The composition of embodiment 1 wherein said low solubility reagent comprises a reagent with miscible solubility in the CST reagent.
12. The composition of embodiment 1 wherein the CST reagent comprises 'polymer', Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200, or a mixture thereof 13. The composition of embodiment 1 wherein the low solubility reagent comprises an organic solvent.

14. The composition of embodiment 1 wherein the low solubility reagent comprises Ethylene Glycol Diacetate, Propylene Glycol Diacetate, Dipropylene Glycol Dimethyl Ether (DPE), 2-Heptanone, Propylene glycol monomethyl ether acetate, Propylene Carbonate, Cyclohexanone, 1-Octanol, Dipropylene Glycol Methyl Ether Acetate, 1-Methyl-2-pyrrolidinone, Ethylene glycol monohexyl ether, Acetal (1,1-Diethoxyethane), Isoamyl acetate, Dibutyl ether, m-Xylene, Isopropyl acetate, Dimethyl carbonate, Butanone, Methyl tert-butyl ether (MTBE), o-Xylene, Acetylacetone, p-Xylene, Methyl Isobutyl Ketone, Toluene, 3-Pentanone, Propyl acetate, Ethylene glycol monopropyl ether, 2-Methoxyethyl acetate, 5-Methyl-2-hexanone, 4-Methyl-2-pentanone, 3-Pentanone, 2-Pentanone, 2-methyl tetrahydrofuran, a reagent which is a liquid or gas or supercritical fluid at room temperature, or a mixture thereof.

15. The composition of embodiment 1 wherein the low solubility reagent comprises ethyl acetate, methyl acetate, methyl formate, dimethyl ether, diethyl ether, dimethoxymethane, diethoxymethane, a reagent which is a liquid or gas or supercritical fluid at room temperature, carbon dioxide, supercritical carbon dioxide, sulfur dioxide, refrigerant, volatile hydrocarbon, volatile fluorocarbon, or a mixture thereof.

16. The composition of embodiment 1 wherein the composition has a viscosity less than 50 cP at room temperature.

17. The composition of embodiment 1 wherein the cloud point temperature of the composition is from about −10 to about 110° C. depending upon the concentration of CST reagent in the composition.

18. A UCST process for heating or cooling comprising:
   1) phase transitioning a liquid phase into two or more liquid phases to release heat;
   2) separating at least a portion of each of said two or more liquid phases into separate streams; and
   3) mixing and dissolving said separate streams to form a single liquid phase solution to absorb heat.

19. The process of embodiment 18 wherein said phase transitioning is conducted at a temperature greater than the temperature of an application of heating or less than the temperature of an application of cooling.

20. The process of embodiment 18 wherein a temperature of phase transitioning is adjusted to ensure it is greater than the temperature one or more heating applications or less than the temperature of one or more heat sources in need of cooling.

21. The process of embodiment 18 wherein the liquid phase comprises: water; a CST reagent; and a low solubility reagent having a limited solubility in a solution consisting of water and CST reagent below a cloud point temperature and having a miscible solubility in a solution consisting of water and CST reagent above a cloud point temperature.

22. A LCST process for heating or cooling comprising:
   1) phase transitioning a liquid phase into two or more liquid phases to absorb heat;
   2) separating at least a portion of each of said two or more liquid phases into separate streams; and
   3) mixing and dissolving said separate streams to form a single liquid phase solution to release heat.

23. The process of embodiment 22 wherein said phase transitioning is conducted at a temperature greater than the temperature of an application of heating or less than the temperature of an application of cooling.

24. The process of embodiment 22 wherein a temperature of phase transitioning is adjusted to ensure it is greater than the temperature one or more heating applications or less than the temperature of one or more heat sources in need of cooling.

25. The process of embodiment 22 wherein the liquid phase comprises a critical solution temperature (CST) reagent, an LCST reducing reagent, and water.

26. The process of embodiment 25 wherein said phase transitioning temperature is adjusted by increasing or decreasing the concentration of LCST reducing reagent.

27. The process of embodiment 22 which further comprises employing an LCST binder reagent which has miscible solubility in CST reagent and has limited solubility in water.

28. The process of embodiment 27 wherein said phase transitioning temperature is adjusted by increasing or decreasing the concentration of one or more LCST binder reagents.

REPRESENTATIVE REFRIGERATION EMBODIMENTS

1. A liquid phase refrigeration or heat pump cycle process with a liquid system wherein the process comprises:
   1) absorbing heat by mixing two or more liquid phases endothermically in a phase transition; and
   2) releasing heat exothermically by transforming a liquid phase into two or more liquid phases in a phase transition; and
   3) adjusting the phase transition temperature such that the phase transition temperature of step 1) is different than the phase transition temperature of step 2).

2. The process of Embodiment 1 wherein said liquid system comprises (1) an absorption solution comprising a critical solution temperature (CST) reagent and a UCST solvent; and (2) a reagent with limited solubility in UCST reagent that is substantially miscible with said absorption solution above an upper critical solution temperature and has limited solubility with said absorption solution below the upper critical solution temperature and wherein said adjusting comprises changing the concentration of said CST reagent with respect to the UCST solvent.

3. The process of Embodiment 1 wherein said adjusting step employs a membrane.

4. The process of Embodiment 2 wherein said CST reagent exhibits decreasing osmotic pressure with increasing temperature in a solution consisting of water and said CST reagent.

5. The process of Embodiment 2 wherein said CST reagent is selected from the group consisting of
Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200.

6. The process of Embodiment 1 wherein the process is reversible.

7. The process of Embodiment 1 which further comprises repeating step 1), step 2), step 3) or all steps.

8. A liquid phase refrigeration or heat pump cycle process with a liquid system wherein the process comprises:

1) releasing heat by mixing two or more liquid phases exothermically in a phase transition; and 2) absorbing heat endothermically by transforming a liquid phase into two or more liquid phases in a phase transition; and 3) adjusting the phase transition temperature such that the phase transition temperature of step 1) is different than the phase transition temperature of step 2).

9. The process of Embodiment 8 wherein said phased system comprises a critical solution temperature (CST) reagent, an LCST reducing reagent, and water and wherein said adjusting comprises removing substantially all of said LCST reducing reagent before or during step 1) and introducing said LCST reducing reagent before or during step 2).

10. The process of Embodiment 9 wherein said adjusting step employs a membrane for removing substantially all of said LCST reducing reagent before or during step 1) thereby forming a concentrate suitable for use to introduce LCST reducing reagent before step 2).

11. The process of Embodiment 9 wherein said CST reagent exhibits decreasing osmotic pressure with increasing temperature in a solution consisting of water and said CST reagent.

12. The process of Embodiment 9 wherein said CST reagent is selected from the group consisting of Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200.

13. The process of Embodiment 8 wherein the process is reversible.

14. The process of Embodiment 8 which further comprises repeating step 1), step 2), step 3) or all steps.

15. The process of embodiment 9 which further comprises a binder reagent which is substantially miscible with the CST reagent and has limited solubility in water.

16, The process of Embodiment 15 wherein the binder reagent comprises Ethylene Glycol Diacetate, Propylene Glycol Diacetate, Dipropylene Glycol Dimethyl Ether (DPE), 2-Heptanone, Propylene glycol monomethyl ether acetate, Propylene Carbonate, Cyclohexanone, 1-Octanol, Dipropylene Glycol Methyl Ether Acetate, 1-Methyl-2-pyrrolidinone, Ethylene glycol monohexyl ether, Acetal (1,1-Diethoxyethane), Isoamyl acetate, Dibutyl ether, m-Xylene, Isopropyl acetate, Dimethyl carbonate, Butanone, Methyl tert-butyl ether (MTBE), o-Xylene, Acetylacetone, p-Xylene, Methyl Isobutyl Ketone, Toluene, 3-Pentanone, Propyl acetate, Ethylene glycol monopropyl ether, 2-Methoxyethyl acetate, 5-Methyl-2-hexanone, 4-Methyl-2-pentanone, 3-Pentanone, 2-Pentanone, 2-methyl tetrahydrofuran, or a mixture thereof.

17. The process of Embodiment 1 wherein the UCST solvent is water.

18. The process of Embodiment 9 wherein the LCST reducing agent is selected from a salt, glycerol, urea, and mixtures thereof.

19. A composition for refrigeration comprising:
an absorption solution comprising water and a critical solution temperature (CST) reagent; and
a reagent with limited solubility in water that is substantially miscible with said absorption solution above an upper critical solution temperature and has limited solubility with said absorption solution below the upper critical solution temperature.

20. The composition of Embodiment 19 wherein said CST reagent exhibits decreasing osmotic pressure with increasing temperature in a solution consisting of water and said CST reagent.

21. The composition of Embodiment 19 wherein said CST reagent is selected from the group consisting of Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200.

22. The composition of Embodiment 19 wherein said reagent with low water solubility comprises a volatile reagent.

23. The composition of Embodiment 19 wherein said reagent with low water solubility comprises ethyl acetate, methyl acetate, methyl formate, dimethyl ether, diethyl ether, dimethoxymethane, diethoxymethane, carbon dioxide, supercritical carbon dioxide, sulfur dioxide, a refrigerant, a hydrocarbon, a fluorocarbon, or a mixture thereof.

24. An absorption refrigeration cycle process comprising:
forming a liquid system comprising (1) an absorption solution that comprises a lower critical solution temperature reagent, a lower critical solution temperature binder reagent, or a combination thereof and (2) a refrigerant comprising a solvent reagent and a LCST reducing reagent; and forming two or more liquid phases due to a LCST phase transition wherein one liquid phase comprises an absorption solution comprising a lower critical solution temperature reagent, a lower critical solution temperature binder reagent, or a combination thereof and wherein another liquid phase comprises a refrigerant liquid phase comprising a solvent reagent and a LCST reducing reagent.

25. The process of embodiment 24 wherein said two or more liquid phases are at least partially separated.

26. The process of embodiment 24 further comprising evaporating said refrigerant in a heat absorbing step and absorbing said refrigerant into said absorption solution in a heat releasing step thereby forming an absorption solution—refrigerant solution.

27. The process of embodiment 26 wherein subsequent to evaporating a solution comprising at least a portion of said LCST reducing reagent remains.

28. The process of embodiment 27 further comprising mixing said solution comprising at least a portion of said LCST reducing reagent with absorption solution or the remainder of the liquid system.

29. The process of embodiment 24 wherein the refrigerant comprises water, ammonia, an amine, ethyl amine, methyl amine, an alcohol, a water soluble volatile reagent, a volatile reagent with greater solubility in water than CST reagent, or a mixture thereof.

30. The process of embodiment 24 wherein said LCST reducing reagent comprises a salt, a reagent soluble in solvent and substantially insoluble in CST reagent, a reagent soluble in solvent and substantially insoluble in LCST binder reagent, ionic compounds, anions, cations, complex salts, complex ions, compounds with properties similar to salts, salts with properties dissimilar to salts, alkali, alkaline earth, transition metal, metal, semiconductor, metalloids, sodium, potassium, calcium, ammonia, ammonium, amine, basic compound, halogenated compound, sulfate, nitrate, carbonate, hydrogen carbonate, carbamate, nitrite, sulfite, carbon compound, fluoride, sulfur compound, electrolyte, nitrogen compound, phosphorous compound, phosphorous containing anion, halogen containing anion, and mixtures thereof.

FURTHER REPRESENTATIVE EMBODIMENTS

1. A composition comprising:
water;
a CST reagent; and
a low solubility reagent;
wherein said low solubility reagent has limited solubility in a solution consisting of water and a critical solution temperature (CST) reagent below a cloud point temperature and has miscible solubility in a solution consisting of water and CST reagent above a cloud point temperature.
2. A composition for refrigeration comprising:
an absorption solution comprising water and a critical solution temperature (CST) reagent; and a reagent with limited solubility in water that is substantially miscible with said absorption solution above an upper critical solution temperature and has limited solubility with said absorption solution below the upper critical solution temperature.
3. The composition of Embodiments 1 or 2 wherein the CST reagent comprises (1) a reagent which exhibits decreasing osmotic pressure with increasing temperature in a solution consisting of water and said CST reagent or (2) a reagent which possesses greater affinity for said low solubility reagent relative to water with increasing temperature.
4. The composition of Embodiments 1 or 2 wherein the CST reagent comprises 'polymer', Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200, or a mixture thereof.
5. The composition of Embodiments 1 or 2 wherein (1) the cloud point temperature of the composition changes over a range of from about 0 to about 100° C. based on the concentration of CST reagent in the composition, or (2) the composition has a viscosity of less than 50 cP at room temperature; or (3) both (1) and (2).
6. The composition of Embodiments 1 or 2 wherein said reagent with limited solubility in water comprises a volatile reagent, non-volatile reagent, ethyl acetate, methyl acetate, methyl formate, dimethyl ether, diethyl ether, dimethoxymethane, diethoxymethane, carbon dioxide, supercritical carbon dioxide, sulfur dioxide, a refrigerant, a hydrocarbon, a fluorocarbon, an organic solvent, Ethylene Glycol Diacetate, Propylene Glycol Diacetate, Dipropylene Glycol Dimethyl Ether (DPE), 2-Heptanone, Propylene glycol monomethyl ether acetate, Propylene Carbonate, Cyclohexanone, 1-Octanol, Dipropylene Glycol Methyl Ether Acetate, 1-Methyl-2-pyrrolidinone, Ethylene glycol monohexyl ether, Acetal (1,1-Diethoxyethane), Isoamyl acetate, Dibutyl ether, m-Xylene, Isopropyl acetate, Dimethyl carbonate, Butanone, Methyl tert-butyl ether (MTBE), o-Xylene, Acetylacetone, p-Xylene, Methyl Isobutyl Ketone, Toluene, 3-Pentanone, Propyl acetate, Ethylene glycol monopropyl ether, 2-Methoxyethyl acetate, 5-Methyl-2-hexanone, 4-Methyl-2-pentanone, 3-Pentanone, 2-Pentanone, 2-methyl tetrahydrofuran, a reagent which is a liquid or gas or supercritical fluid at room temperature, or a mixture thereof.
7. The composition of embodiments 1 or 2 further comprising one or more salts.
8. A UCST process for heating or cooling comprising:
1) phase transitioning a liquid phase into two or more liquid phases to release heat;
2) separating at least a portion of each of said two or more liquid phases into separate streams; and
3) mixing and dissolving said separate streams to form a single liquid phase solution to absorb heat;
wherein the liquid phase comprises water; a CST reagent; and a low solubility reagent having a limited solubility in a solution consisting of water and CST reagent below a cloud point temperature and having a miscible solubility in a solution consisting of water and CST reagent above a cloud point temperature.
9. A LCST process for heating or cooling comprising:
1) phase transitioning a liquid phase into two or more liquid phases to absorb heat;
2) separating at least a portion of each of said two or more liquid phases into separate streams; and
3) mixing and dissolving said separate streams to form a single liquid phase solution to release heat;
wherein the liquid phase comprises a critical solution temperature (CST) reagent, an LCST reducing or binding reagent, and water.
10. The process of Embodiments 8 or 9 wherein said phase transitioning is conducted at a temperature greater than the temperature of an application of heating or less than the temperature of an application of cooling.
11. A liquid phase refrigeration or heat pump cycle process with a liquid system wherein the process comprises:
1) absorbing heat by mixing two or more liquid phases endothermically in a phase transition; and
2) releasing heat exothermically by transforming a liquid phase into two or more liquid phases in a phase transition; and
3) adjusting the phase transition temperature such that the phase transition temperature of step 1) is different than the phase transition temperature of step 2);
wherein said liquid system comprises (1) an absorption solution comprising a critical solution temperature (CST) reagent and a UCST solvent; and (2) a reagent that is substantially miscible with said absorption solution above an upper critical solution temperature and has limited solubility with said absorption solution below the upper critical solution temperature and wherein said adjusting comprises changing the concentration of said CST reagent with respect to the UCST solvent.
12. A liquid phase refrigeration or heat pump cycle process with a liquid system wherein the process comprises:
1) releasing heat by mixing two or more liquid phases exothermically in a phase transition; and
2) absorbing heat endothermically by transforming a liquid phase into two or more liquid phases in a phase transition; and
3) adjusting the phase transition temperature such that the phase transition temperature of step 1) is different than the phase transition temperature of step 2);
wherein said liquid system comprises a critical solution temperature (CST) reagent, an LCST reducing reagent, and water and wherein said adjusting comprises removing substantially all of said LCST reducing reagent before or during step 1) and introducing said LCST reducing reagent before or during step 2).

13. The process of Embodiments 11 or 12 wherein said CST reagent exhibits decreasing osmotic pressure with increasing temperature in a solution consisting of water and said CST reagent.

14. The process of Embodiments 11 or 12 or 13 wherein said CST reagent comprises Polyethylene Glycol Dimethyl Ether, Polypropylene Glycol, Polyethylene Glycol, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PEGDME 250, PEGDME 500, PEG 1000, PEG 600, PEG 400, PEG 200, or mixtures thereof.

15. An absorption refrigeration cycle process comprising:
forming a liquid system comprising (1) an absorption solution that comprises a lower critical solution temperature reagent, a lower critical solution temperature binder reagent, or a combination thereof and (2) a refrigerant comprising a solvent reagent and a LCST reducing reagent; and
forming two or more liquid phases due to a LCST phase transition wherein one liquid phase comprises an absorption solution comprising a lower critical solution temperature reagent, a lower critical solution temperature binder reagent, or a combination thereof and wherein another liquid phase comprises a refrigerant liquid phase comprising a solvent reagent and a LCST reducing reagent.

What is claimed is:

1. An upper critical solution temperature (UCST) process for heating or cooling comprising:
   1) phase transitioning a composition comprising a UCST liquid phase into two or more liquid phases to release heat; and
   2) mixing and dissolving said two or more liquid phases to form a single liquid phase solution to absorb heat; wherein a temperature of phase transitioning is adjusted to ensure it is greater than the temperature one or more heating applications or less than the temperature of one or more heat sources in need of cooling and wherein said adjustment in phase transition temperature is reversible.

2. The process of claim 1 wherein the temperature of phase transitioning is adjusted by employing a membrane to adjust the concentration of a reagent in the UCST liquid phase, the two or more liquid phases, or a combination thereof.

3. The process of claim 1 wherein the temperature of phase transitioning is adjusted by employing a membrane to adjust the concentration of a reagent in the composition comprising a UCST liquid phase.

4. The process of claim 1 wherein the temperature of phase transitioning is adjusted by employing a membrane to change the concentration of a reagent in the UCST liquid phase having a large molecular weight relative to a second reagent.

5. The process of claim 1 wherein the temperature of phase transitioning is adjusted by employing a membrane to change the concentration of a reagent in the UCST liquid phase having a large molecular weight relative to water.

6. The process of claim 1 wherein the temperature of phase transitioning is adjusted by employing a membrane to change the concentration of a salt in the UCST liquid phase.

7. The process of claim 1 wherein the temperature of phase transitioning is adjusted by employing a membrane to change the concentration of a combined solution in the UCST liquid phase.

8. The process of claim 1 wherein the temperature of phase transitioning is adjusted by employing a membrane to generate a permeate and then adding said permeate to the UCST liquid phase.

9. The process of claim 1 wherein the temperature of phase transitioning is adjusted by employing a membrane to generate a concentrate and then adding said concentrate to the UCST liquid phase.

10. The process of claim 2 wherein said membrane comprises wherein said membrane comprises a semi-permeable membrane, a nanofiltration membrane, an organic solvent nanofiltration membrane, a reverse osmosis membrane, a forward osmosis membrane, an osmotically assisted membrane, a disc tube reverse osmosis membrane, a high pressure reverse osmosis membrane, or a combination.

11. The process of claim 3 wherein said membrane comprises wherein said membrane comprises a semi-permeable membrane, a nanofiltration membrane, an organic solvent nanofiltration membrane, a reverse osmosis membrane, a forward osmosis membrane, an osmotically assisted membrane, a disc tube reverse osmosis membrane, a high pressure reverse osmosis membrane, or a combination.

12. A lower critical solution temperature (LCST) process for heating or cooling comprising:
   1) phase transitioning a composition comprising a LCST liquid phase into two or more liquid phases to absorb heat; and
   2) mixing and dissolving said two or more liquid phases to form a single liquid phase solution to release heat; wherein a temperature of phase transitioning is adjusted to ensure it is greater than the temperature one or more heating applications or less than the temperature of one or more heat sources in need of cooling and wherein said adjustment in phase transition temperature is reversible.

13. The process of claim 11 wherein the temperature of phase transitioning is adjusted by employing a membrane to adjust the concentration of a reagent in the LCST liquid phase, the two or more liquid phases, or a combination thereof.

14. The process of claim 11 wherein the temperature of phase transitioning is adjusted by employing a membrane to adjust the concentration of a reagent in the composition comprising a LCST liquid phase.

15. The process of claim 11 wherein the temperature of phase transitioning is adjusted by employing a membrane to change the concentration of a reagent in the LCST liquid phase having a large molecular weight relative to a second reagent.

16. The process of claim 11 wherein the temperature of phase transitioning is adjusted by employing a membrane to change the concentration of a reagent in the LCST liquid phase having a large molecular weight relative to water.

17. The process of claim 11 wherein the temperature of phase transitioning is adjusted by employing a membrane to change the concentration of a salt in the LCST liquid phase.

18. The process of claim 11 wherein the temperature of phase transitioning is adjusted by employing a membrane to change the concentration of a combined solution in the LCST liquid phase.

19. The process of claim 11 wherein the temperature of phase transitioning is adjusted by employing a membrane to generate a permeate and then adding said permeate to the LCST liquid phase.

20. The process of claim 11 wherein the temperature of phase transitioning is adjusted by employing a membrane to generate a concentrate and then adding said concentrate to the LCST liquid phase.

21. The process of claim 12 wherein said membrane comprises a semi-permeable membrane, a nanofiltration membrane, an organic solvent nanofiltration membrane, a reverse osmosis membrane, a forward osmosis membrane, an osmotically assisted membrane, a disc tube reverse osmosis membrane, a high pressure reverse osmosis membrane, or a combination.

* * * * *